United States Patent
Khetawat et al.

(10) Patent No.: US 8,150,397 B2
(45) Date of Patent: Apr. 3, 2012

(54) METHOD AND APPARATUS FOR ESTABLISHING TRANSPORT CHANNELS FOR A FEMTOCELL

(75) Inventors: Amit Khetawat, San Jose, CA (US); Milan Markovic, Pleasanton, CA (US); Michael D. Gallagher, San Jose, CA (US); Patrick Tao, San Jose, CA (US); Rajeev Gupta, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 973 days.

(21) Appl. No.: 11/927,552

(22) Filed: Oct. 29, 2007

(65) Prior Publication Data

US 2008/0261596 A1 Oct. 23, 2008

Related U.S. Application Data

(63) Continuation of application No. 11/859,762, filed on Sep. 22, 2007, now abandoned.

(60) Provisional application No. 60/826,700, filed on Sep. 22, 2006, provisional application No. 60/869,900, filed on Dec. 13, 2006, provisional application No. 60/911,862, filed on Apr. 13, 2007, provisional application No. 60/949,826, filed on Jul. 13, 2007, provisional application No. 60/884,889, filed on Jan. 14, 2007, provisional application No. 60/893,361, filed on Mar. 6, 2007, provisional application No. 60/884,017, filed on Jan. 8, 2007, provisional application No. 60/911,864, filed on Apr. 13, 2007, provisional application No. 60/862,564, filed on Oct. 23, 2006, provisional application No. 60/949,853, filed on Jul. 14, 2007, provisional application No. 60/954,549, filed on Aug. 7, 2007.

(51) Int. Cl.
*H04W 36/00* (2009.01)
*H04W 4/00* (2009.01)

(52) U.S. Cl. ............ 455/436; 455/426.1; 455/403; 455/456.2; 455/435.2; 370/338; 370/329; 370/328; 370/352

(58) Field of Classification Search ............. 455/552.1, 455/436, 411; 370/338, 328, 352
See application file for complete search history.

(56) References Cited

U.S. PATENT DOCUMENTS 5,014,197 A 5/1991 Wolf
(Continued)

FOREIGN PATENT DOCUMENTS

EP 0936777 8/1999
(Continued)

OTHER PUBLICATIONS

Non-Final Office Action of U.S. Appl. No. 10/116,311, Feb. 9, 2006 (mailing date), Mohammed, Jahangir.
(Continued)

*Primary Examiner* — Charles Appiah
*Assistant Examiner* — Emem Stephen
(74) *Attorney, Agent, or Firm* — Adeli & Tollen LLP

(57) ABSTRACT

Some embodiments are implemented in a communication system that includes a first wireless communication system and a second wireless communication system that includes a Femtocell access point (FAP) and a network controller that can communicatively couple the FAP to the first wireless communication system. In some embodiments, the network controller can communicatively couple to the first wireless communication system through a UTRAN Iu interface. Some embodiments provide a resource management method that determines that a user equipment (UE) has roved in a region serviced by the FAP. The FAP includes a generic access resource control (GA-RC) protocol sub-layer. The method creates a separate GA-RC state dedicated to the UE in the GA-RC protocol sub-layer. The method also sets the GA-RC state dedicated to the UE to a deregistered state to indicate that the UE is not registered to use the services of the second wireless communication system.

14 Claims, 53 Drawing Sheets

U.S. PATENT DOCUMENTS

| | | | |
|---|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellinger |
| 5,267,261 A | 11/1993 | Blakeney, II |
| 5,367,558 A | 11/1994 | Gillig et al. |
| 5,390,233 A | 2/1995 | Jensen et al. |
| 5,392,331 A | 2/1995 | Patsiokas et al. |
| 5,406,615 A | 4/1995 | Miller, II et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry et al. |
| 5,634,193 A | 5/1997 | Ghisler |
| 5,640,414 A | 6/1997 | Blakeney, II et al. |
| 5,659,598 A | 8/1997 | Byrne et al. |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,815,525 A | 9/1998 | Smith et al. |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,995,500 A | 11/1999 | Ma et al. |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,226,515 B1 | 5/2001 | Pauli et al. |
| 6,236,852 B1 | 5/2001 | Veerasamy et al. |
| 6,243,581 B1 | 6/2001 | Jawanda |
| 6,256,511 B1 | 7/2001 | Brown et al. |
| 6,263,211 B1 | 7/2001 | Brunner et al. |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,415,410 B1 | 7/2002 | Kanerva et al. |
| 6,430,395 B2 | 8/2002 | Arazi et al. |
| 6,434,389 B1 | 8/2002 | Meskanen et al. |
| 6,438,383 B1 | 8/2002 | Hall et al. |
| 6,445,921 B1 | 9/2002 | Bell |
| 6,463,307 B1 | 10/2002 | Larsson et al. |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo |
| 6,633,761 B1 | 10/2003 | Singhal et al. |
| 6,643,512 B1 | 11/2003 | Ramaswamy |
| 6,647,426 B2 | 11/2003 | Mohammed |
| 6,654,589 B1 | 11/2003 | Haumont |
| 6,654,610 B1 | 11/2003 | Chen et al. |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,683,853 B1 | 1/2004 | Kannas et al. |
| 6,711,400 B1 | 3/2004 | Aura |
| 6,766,160 B1 | 7/2004 | Lemilainen et al. |
| 6,785,535 B2 | 8/2004 | Lucidarme et al. |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen et al. |
| 6,823,154 B2 | 11/2004 | Koga et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch |
| 6,853,851 B1 | 2/2005 | Rautiola et al. |
| 6,895,255 B1 | 5/2005 | Bridgelall |
| 6,909,705 B1 | 6/2005 | Lee et al. |
| 6,910,074 B1 | 6/2005 | Amin et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 6,993,359 B1 | 1/2006 | Nelakanti et al. |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,065,353 B1 | 6/2006 | Bolinth et al. |
| 7,069,022 B2 | 6/2006 | Rajaniemi et al. |
| 7,099,339 B1 | 8/2006 | Wang et al. |
| 7,107,055 B2 | 9/2006 | Gallagher et al. |
| 7,127,250 B2 | 10/2006 | Gallagher et al. |
| 7,171,205 B2 | 1/2007 | Gallagher et al. |
| 7,197,309 B2 | 3/2007 | Gallagher et al. |
| 7,200,112 B2 | 4/2007 | Sundar et al. |
| 7,200,383 B2 | 4/2007 | Eronen |
| 7,200,399 B2 | 4/2007 | Gallagher et al. |
| 7,209,744 B2 | 4/2007 | Gallagher et al. |
| 7,212,819 B2 | 5/2007 | Gallagher |
| 7,215,961 B2 | 5/2007 | Gallagher et al. |
| 7,231,046 B1 | 6/2007 | Einola et al. |
| 7,245,916 B2 | 7/2007 | Gallagher et al. |
| 7,251,227 B2 | 7/2007 | de Jong et al. |
| 7,272,397 B2 | 9/2007 | Gallagher et al. |
| 7,283,821 B2 | 10/2007 | Gallagher et al. |
| 7,283,822 B2 | 10/2007 | Gallagher et al. |
| 7,308,263 B2 | 12/2007 | Gallagher et al. |
| 7,324,818 B2 | 1/2008 | Gallagher et al. |
| 7,349,698 B2 | 3/2008 | Gallagher et al. |
| 7,369,854 B2 | 5/2008 | Gallagher et al. |
| 7,369,859 B2 | 5/2008 | Gallagher |
| 7,389,412 B2 | 6/2008 | Sharma et al. |
| 7,420,964 B2 | 9/2008 | Närvänen et al. |
| 7,441,043 B1 | 10/2008 | Henry et al. |
| 7,454,207 B2 | 11/2008 | Gallagher et al. |

| | | |
|---|---|---|
| 7,471,655 B2 | 12/2008 | Gallagher et al. |
| 7,580,424 B2 | 8/2009 | Ravishankar et al. |
| 7,606,190 B2 | 10/2009 | Markovic et al. |
| 7,640,036 B2 | 12/2009 | Kallio |
| 7,684,803 B2 | 3/2010 | Gallagher et al. |
| 7,769,385 B2 | 8/2010 | Gallagher et al. |
| 7,773,993 B2 | 8/2010 | Gallagher et al. |
| 7,852,817 B2 | 12/2010 | Gallagher et al. |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0009199 A1 | 1/2002 | Ala-Laurila et al. |
| 2002/0032030 A1 | 3/2002 | Berglund et al. |
| 2002/0036983 A1 | 3/2002 | Widegren et al. |
| 2002/0045459 A1 | 4/2002 | Morikawa |
| 2002/0051463 A1 | 5/2002 | Higuchi |
| 2002/0059516 A1 | 5/2002 | Turtiainen et al. |
| 2002/0065099 A1 | 5/2002 | Bjorndahl |
| 2002/0066036 A1 | 5/2002 | Makineni et al. |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 | 7/2002 | Bridgelall |
| 2002/0086682 A1 | 7/2002 | Naghian |
| 2002/0095599 A1 | 7/2002 | Hong et al. |
| 2002/0101848 A1 | 8/2002 | Lee et al. |
| 2002/0102974 A1 | 8/2002 | Raith |
| 2002/0114322 A1 | 8/2002 | Xu et al. |
| 2002/0118674 A1 | 8/2002 | Faccin et al. |
| 2002/0120749 A1 | 8/2002 | Widegren et al. |
| 2002/0123325 A1 | 9/2002 | Cooper |
| 2002/0131387 A1 | 9/2002 | Pitcher et al. |
| 2002/0131396 A1 | 9/2002 | Knuutila et al. |
| 2002/0132630 A1 | 9/2002 | Arazi et al. |
| 2002/0141393 A1 | 10/2002 | Eriksson et al. |
| 2002/0142761 A1 | 10/2002 | Wallstedt et al. |
| 2002/0143874 A1 | 10/2002 | Marquette et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0172209 A1 | 11/2002 | Ohta et al. |
| 2002/0174335 A1 | 11/2002 | Zhang et al. |
| 2002/0191556 A1 | 12/2002 | Krishnarajah et al. |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0018480 A1 | 1/2003 | Mecayten |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer, III |
| 2003/0087653 A1 | 5/2003 | Leung et al. |
| 2003/0092445 A1 | 5/2003 | Timonen et al. |
| 2003/0112789 A1 | 6/2003 | Heinonen et al. |
| 2003/0114158 A1 | 6/2003 | Soderbacka et al. |
| 2003/0119480 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil et al. |
| 2003/0172264 A1 | 9/2003 | Dillon |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0224820 A1 | 12/2003 | Einola et al. |
| 2003/0227940 A1 | 12/2003 | Fiat |
| 2003/0231623 A1 | 12/2003 | Ryu et al. |
| 2003/0235186 A1 | 12/2003 | Park |
| 2004/0008649 A1 | 1/2004 | Wybenga et al. |
| 2004/0009749 A1 | 1/2004 | Arazi et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0063451 A1 | 4/2004 | Bonta et al. |
| 2004/0068571 A1 | 4/2004 | Ahmavaara |
| 2004/0072593 A1 | 4/2004 | Robbins et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0087319 A1 | 5/2004 | Bos et al. |
| 2004/0147223 A1 | 7/2004 | Cho |
| 2004/0171378 A1 | 9/2004 | Rautila |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0240525 A1 | 12/2004 | Karabinis et al. |
| 2005/0002407 A1 | 1/2005 | Shaheen et al. |
| 2005/0041787 A1 | 2/2005 | Casey et al. |
| 2005/0053070 A1 | 3/2005 | Jouppi |
| 2005/0064896 A1 | 3/2005 | Rautiola et al. |
| 2005/0070288 A1 | 3/2005 | Belkin et al. |
| 2005/0101245 A1* | 5/2005 | Ahmavaara ................. 455/1 |
| 2005/0101329 A1 | 5/2005 | Gallagher |
| 2005/0111409 A1 | 5/2005 | Spear et al. |
| 2005/0130659 A1 | 6/2005 | Grech et al. |
| 2005/0144647 A1 | 6/2005 | Zussman et al. |
| 2005/0160161 A1 | 7/2005 | Barrett et al. |
| 2005/0186948 A1 | 8/2005 | Gallagher et al. |
| 2005/0198199 A1 | 9/2005 | Dowling |
| 2005/0198306 A1 | 9/2005 | Palojarvi et al. |
| 2005/0207395 A1 | 9/2005 | Mohammed |
| 2005/0239441 A1 | 10/2005 | Eronen |
| 2005/0250522 A1 | 11/2005 | Gilbert |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0272425 A1 | 12/2005 | Amerga et al. |
| 2005/0272449 A1 | 12/2005 | Gallagher et al. |
| 2005/0286466 A1 | 12/2005 | Tagg et al. |
| 2006/0009202 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks, III |
| 2006/0021036 A1 | 1/2006 | Chang et al. |
| 2006/0036733 A1 | 2/2006 | Fujimoto et al. |
| 2006/0050667 A1 | 3/2006 | Verma et al. |
| 2006/0063544 A1 | 3/2006 | Zhao et al. |
| 2006/0075073 A1 | 4/2006 | Bichot |
| 2006/0094431 A1 | 5/2006 | Saifullah et al. |
| 2006/0098598 A1 | 5/2006 | Gallagher |
| 2006/0099935 A1 | 5/2006 | Gallagher et al. |
| 2006/0111113 A1 | 5/2006 | Waris |
| 2006/0114871 A1 | 6/2006 | Buckley et al. |
| 2006/0116125 A1 | 6/2006 | Buckley et al. |
| 2006/0133393 A1 | 6/2006 | Yun |
| 2006/0146803 A1 | 7/2006 | Bae et al. |
| 2006/0166687 A1 | 7/2006 | Edman |
| 2006/0179474 A1 | 8/2006 | Bichot |
| 2006/0183482 A1 | 8/2006 | Ueda |
| 2006/0198347 A1* | 9/2006 | Hurtta et al. ................. 370/338 |
| 2006/0223532 A1 | 10/2006 | Liu et al. |
| 2006/0239277 A1 | 10/2006 | Gallagher |
| 2006/0262778 A1 | 11/2006 | Haumont et al. |
| 2006/0268845 A1 | 11/2006 | He et al. |
| 2006/0276139 A1 | 12/2006 | Pummill et al. |
| 2006/0286981 A1 | 12/2006 | Suumaki et al. |
| 2007/0019600 A1 | 1/2007 | Zhang |
| 2007/0022469 A1 | 1/2007 | Cooper et al. |
| 2007/0041360 A1 | 2/2007 | Gallagher et al. |
| 2007/0053370 A1 | 3/2007 | Aghvami et al. |
| 2007/0054668 A1 | 3/2007 | Scheinert et al. |
| 2007/0058609 A1 | 3/2007 | Goel et al. |
| 2007/0094374 A1 | 4/2007 | Karia et al. |
| 2007/0183421 A1 | 8/2007 | Terrell et al. |

| | | | |
|---|---|---|---|
| 2007/0202891 A1 | 8/2007 | Diachina et al. | |
| 2007/0230453 A1 | 10/2007 | Giaretta et al. | |
| 2007/0242672 A1 | 10/2007 | Grayson et al. | |
| 2007/0243872 A1 | 10/2007 | Gallagher et al. | |
| 2007/0259673 A1 | 11/2007 | Willars et al. | |
| 2007/0266244 A1 | 11/2007 | Walker et al. | |
| 2007/0268855 A1 | 11/2007 | Grayson et al. | |
| 2007/0286092 A1 | 12/2007 | Famolari et al. | |
| 2007/0286132 A1 | 12/2007 | Vikberg et al. | |
| 2007/0287459 A1 | 12/2007 | Diachina et al. | |
| 2007/0293222 A1 | 12/2007 | Vikberg et al. | |
| 2008/0039086 A1 | 2/2008 | Gallagher et al. | |
| 2008/0039087 A1 | 2/2008 | Gallagher et al. | |
| 2008/0043669 A1 | 2/2008 | Gallagher et al. | |
| 2008/0051060 A1 | 2/2008 | Lee et al. | |
| 2008/0076386 A1 | 3/2008 | Khetawat et al. | |
| 2008/0076392 A1 | 3/2008 | Khetawat et al. | |
| 2008/0076393 A1 | 3/2008 | Khetawat et al. | |
| 2008/0076411 A1 | 3/2008 | Khetawat et al. | |
| 2008/0076412 A1 | 3/2008 | Khetawat et al. | |
| 2008/0076419 A1 | 3/2008 | Khetawat et al. | |
| 2008/0076420 A1 | 3/2008 | Khetawat et al. | |
| 2008/0076425 A1 | 3/2008 | Khetawat et al. | |
| 2008/0102794 A1 | 5/2008 | Keevill et al. | |
| 2008/0102801 A1 | 5/2008 | Lazaridis et al. | |
| 2008/0117841 A1 | 5/2008 | Chen | |
| 2008/0123596 A1 | 5/2008 | Gallagher et al. | |
| 2008/0125120 A1 | 5/2008 | Gallagher et al. | |
| 2008/0130564 A1 | 6/2008 | Gallagher et al. | |
| 2008/0130568 A1 | 6/2008 | Gallagher et al. | |
| 2008/0132224 A1 | 6/2008 | Gallagher et al. | |
| 2008/0132239 A1 | 6/2008 | Khetawat et al. | |
| 2008/0137612 A1 | 6/2008 | Gallagher et al. | |
| 2008/0165725 A1 | 7/2008 | Huomo et al. | |
| 2008/0181204 A1 | 7/2008 | Gallagher et al. | |
| 2008/0207170 A1 | 8/2008 | Khetawat et al. | |
| 2008/0219218 A1 | 9/2008 | Rydnell et al. | |
| 2008/0220813 A1 | 9/2008 | Brown et al. | |
| 2008/0299976 A1 | 12/2008 | Gallagher et al. | |
| 2008/0299977 A1 | 12/2008 | Gallagher et al. | |
| 2008/0305792 A1 | 12/2008 | Khetawat et al. | |
| 2008/0305793 A1 | 12/2008 | Gallagher et al. | |
| 2008/0318571 A1 | 12/2008 | Vikberg et al. | |
| 2009/0075660 A1 | 3/2009 | Hallenstal et al. | |
| 2009/0149157 A9 | 6/2009 | Gallagher et al. | |
| 2009/0262704 A1 | 10/2009 | Khetawat et al. | |
| 2010/0074181 A1 | 3/2010 | Markovic et al. | |

FOREIGN PATENT DOCUMENTS

| | | |
|---|---|---|
| EP | 1207708 | 5/2002 |
| EP | 1703673 A1 | 9/2006 |
| EP | 1749371 | 2/2007 |
| EP | 1749372 | 2/2007 |
| EP | 2044715 | 4/2009 |
| EP | 2074839 | 7/2009 |
| EP | 2293640 | 3/2011 |
| EP | 2293645 | 3/2011 |
| GB | 2282735 | 4/1995 |
| GB | 2315193 A | 1/1998 |
| GB | 2428937 | 2/2007 |
| GB | 2428942 | 2/2007 |
| GB | 2430120 | 3/2007 |
| GB | 2430121 | 3/2007 |
| GB | 2430839 | 4/2007 |
| GB | 2432082 | 5/2007 |
| WO | WO 92/04796 | 3/1992 |
| WO | WO 97/24004 | 3/1997 |
| WO | WO 99/48312 | 9/1999 |
| WO | WO 99/48315 | 9/1999 |
| WO | WO 00/28762 | 5/2000 |
| WO | WO 00/51387 | 8/2000 |
| WO | WO 02/09448 | 1/2002 |
| WO | WO 02/45456 | 6/2002 |
| WO | WO 03/039009 | 5/2003 |
| WO | WO 03/092312 | 11/2003 |
| WO | WO 2004/002051 | 12/2003 |
| WO | WO 2004/034219 | 4/2004 |
| WO | WO 2004/036770 | 4/2004 |
| WO | WO 2004/039111 | 5/2004 |
| WO | WO 2005/006597 | 1/2005 |
| WO | WO 2005/065214 A2 | 7/2005 |
| WO | WO 2005/069546 A1 | 7/2005 |
| WO | WO 2005/107169 | 11/2005 |
| WO | WO 2005/107297 | 11/2005 |
| WO | WO 2005/114918 | 12/2005 |
| WO | WO 2005/114920 | 12/2005 |
| WO | WO 2006/053102 | 5/2006 |
| WO | WO 2007/015066 | 2/2007 |
| WO | WO 2007/015067 | 2/2007 |
| WO | WO 2007/015068 | 2/2007 |
| WO | WO 2007/015071 | 2/2007 |
| WO | WO 2007/015075 | 2/2007 |
| WO | WO 2008/009016 | 1/2008 |
| WO | WO 2008/036961 | 3/2008 |
| WO | WO 2008/055251 | 5/2008 |
| WO | PCT/2008/076913 | 9/2008 |
| WO | WO 2008/106360 | 9/2008 |
| WO | WO 2009/021152 | 2/2009 |

OTHER PUBLICATIONS

Non-Final Office Action of U.S. Appl. No. 10/115,767, Dec. 22, 2005 (mailing date), Mohammed, Jahangir.
Non-Final Office Action of U.S. Appl. No. 10/116,023, Apr. 13, 2006 (mailing date), Mohammed, Jahangir.
Non-Final Office Action of U.S. Appl. No. 10/115,835, Jul. 25, 2005 (mailing date), Mohammed, Jahangir.
Final Office Action of U.S. Appl. No. 10/116,186, Feb. 1, 2006 (mailing date), Mohammed, Jahangir.
Non-Final Office Action of U.S. Appl. No. 10/251,901, May 5, 2005 (mailing date), Gallagher, Michael, et al.
Non-Final Office Action of U.S. Appl. No. 10/688,470, Dec. 15, 2005 (mailing date), Gallagher, Michael, et al.
Notice of Allowance of U.S. Appl. No. 10/688,470, Jul. 19, 2006 (mailing date), Gallagher, Michael, et al.
Non-Final Office Action of U.S. Appl. No. 11/004,439, Apr. 21, 2006 (mailing date), Gallagher, Michael.
U.S. Appl. No. 11/110,222, filed Apr. 20, 2005, Gallagher, Michael, et al.
U.S. Appl. No. 11/068,445, filed Feb. 24, 2005, Gupta, Rajeev, et al.
Non-Final Office Action of U.S. Appl. No. 11/225,870, May 30, 2006, (mailing date), Gallagher, Michael, et al.
Non-Final Office Action of U.S. Appl. No. 11/225,398, Apr. 5, 2006 (mailing date), Gallagher, Michael, et al.
Non-Final Office Action of U.S. Appl. No. 11/225,872, May 8, 2006 (mailing date), Gallagher, Michael, et al.
Non-Final Office Action of U.S. Appl. No. 11/225,871, Mar. 30, 2006 (mailing date), Gallagher, Michael, et al.
Non-Final Office Action of U.S. Appl. No. 11/226,617, Apr. 6, 2006 (mailing date), Gallagher, Michael, et al.
Non-Final Office Action of U.S. Appl. No. 11/226,610, Mar. 29, 2006 (mailing date), Gallagher, Michael, et al.
Non-Final Office Action of U.S. Appl. No. 11/228,853, Jun. 5, 2006 (mailing date), Gallagher, Michael, et al.
Non-Final Office Action of U.S. Appl. No. 11/228,853, Nov. 22, 2006 (mailing date), Gallagher, Michael, et al.
Notice of Allowance of U.S. Appl. No. 11/228,853, Feb. 23, 2007 (mailing date), Gallagher, Michael, et al.
Non-Final Office Action of U.S. Appl. No. 11/229,470, Jun. 6, 2006 (mailing date), Gallagher, Michael, et al.
Non-Final Office Action of U.S. Appl. No. 11/229,470, Oct. 24, 2006 (mailing date), Gallagher, Michael, et al.
Non-Final Office Action of U.S. Appl. No. 11/229,470, May 22, 2007 (mailing date), Gallagher, Michael, et al.
Final Office Action of U.S. Appl. No. 11/229,470, Dec. 14, 2007 (mailing date), Gallagher, Michael, et al.
Non-Final Office Action of U.S. Appl. No. 11/229,470, Feb. 27, 2008 (mailing date), Gallagher, Michael, et al.
Non-Final Office Action of U.S. Appl. No. 11/229,470, Oct. 1, 2008 (mailing date), Gallagher, Michael, et al.
Non-Final Office Action of U.S. Appl. No. 11/227,842, Jun. 5, 2006 (mailing date), Gallagher, Michael, et al.
Non-Final Office Action of U.S. Appl. No. 11/227,573, Apr. 6, 2006 (mailing date), Gallagher, Michael, et al.

Non-Final Office Action of U.S. Appl. No. 11/227,840, Apr. 21, 2006 (mailing date), Gallagher, Michael, et al.
Non-Final Office Action of U.S. Appl. No. 11/227,784, Mar. 28, 2006 (mailing date), Gallagher, Michael, et al.
U.S. Appl. No. 12/233,571, filed Sep. 18, 2008, Khetawat, Amit, et al.
U.S. Appl. No. 12/187,360, filed Aug. 6, 2008, Gallagher, Michael, et al.
U.S. Appl. No. 12/193,598, filed Aug. 18, 2008, Gallagher, Michael, et al.
U.S. Appl. No. 12/194,442, filed Aug. 19, 2008, Gallagher, Michael, et al.
U.S. Appl. No. 12/328,719, filed Dec. 4, 2008, Gallagher, Michael, et al.
U.S. Appl. No. 12/328,732, filed Dec. 4, 2008, Gallagher, Michael, et al.
International Search Report for PCT/US2003/032855, Apr. 21, 2004 (mailing date), Kineto Wireless, Inc.
International Preliminary Report on Patentability and Written Opinion for PCT/US2005/013807, Oct. 25, 2006 (mailing date), Kineto Wireless, Inc.
International Search Report and Written Opinion for PCT/US2005/016767, Nov. 7, 2005 (mailing date), Kineto Wireless, Inc.
International Preliminary Report on Patentability and Written Opinion for PCT/US2005/016767, Nov. 14, 2006 (mailing date), Kineto Wireless, Inc.
International Search Report and Written Opinion for PCT/US2005/040689, Mar. 13, 2006 (mailing date), Kineto Wireless, Inc.
International Preliminary Report on Patentability and Written Opinion for PCT/US2005/040689, May 15, 2007 (mailing date), Kineto Wireless, Inc.
International Search Report and Written Opinion for PCT/US2005/016921, Sep. 19, 2005 (mailing date), Kineto Wireless, Inc.
International Preliminary Report on Patentability and Written Opinion for PCT/US2005/016921, Nov. 23, 2006 (mailing date), Kineto Wireless, Inc.
International Search Report and Written Opinion for PCT/US2007/083266, Apr. 2, 2008 (mailing date), Kineto Wireless, Inc.
International Search Report and Written Opinion for PCT/US2008/054623, Aug. 18, 2008 (mailing date), Kineto Wireless, Inc.
International Search Report and Written Opinion for PCT/US2007/073557, Jul. 16, 2008 (mailing date), Kineto Wireless, Inc.
International Search Report and Written Opinion for PCT/US2008/076913, Dec. 22, 2008 (mailing date), Kineto Wireless, Inc.
*Erricson Press Release*: "Ericsson presents the Mobile@Hometm concept," Mar. 21, 2001, http://www.ericsson.com/press/archive/2001Q1/20010321-0048.html, printed Jan. 6, 2004, pp. 1-2.
Claus Lindholt Hansen et al., "Mobile@Home—a New 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet, " *Mobile Networks and Applications*, Jan. 6, 2001 Kluwer Academic Publishers, Manufactured in the Netherlands (2001) 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
"3$^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT);Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 (Sep. 1, 2004) Technical Specification, Sep. 1, 2004, 29 pages.
"Unlicensed Mobile Access (UMA); Architecture (Stage 2);" UMA Architecture (Stage 2) R1.0.0 (Sep. 1, 2004) Technical Specification, Sep. 1, 2004, 78 pages.
"Unlicensed Mobile Access (UMA); Protocols (Stage 3);" UMA Protocols (Stage 3) R1.0.0 (Sep. 1, 2004) Technical Specification, Sep. 1, 2004, 142 pages.
"Unlicensed Mobile Access (UMA); Architecture (Stage 2);" UMA Architecture (Stage 2) R1.0.1 (Oct. 8, 2004) Technical Specification, Oct. 8, 2004, 80 pages.
"Unlicensed Mobile Access (UMA); Protocols (Stage 3);" UMA Protocols (Stage 3) R1.0.1 (Oct. 8, 2004) Technical Specification, Oct. 8, 2004, 142 pages.
"Unlicensed Mobile Access (UMA); Architecture (Stage 2);" UMA Architecture (Stage 2) R1.0.2 (Nov. 3, 2004) Technical Specification, Nov. 3, 2004, 79 pages.
"Unlicensed Mobile Access (UMA); Protocols (Stage 3);" UMA Protocols (Stage 3) R1.0.2 (Nov. 5, 2004) Technical Specification, Nov. 5, 2004, 142 pages.
"Unlicensed Mobile Access (UMA); Architecture (Stage 2);" UMA Architecture (Stage 2) R1.0.3 (Feb. 28, 2005) Technical Specification, Feb. 28, 2005, 85 pages.
"Unlicensed Mobile Access (UMA); Protocols (Stage 3);" UMA Protocols (Stage 3) R1.0.3 (Feb. 26, 2005) Technical Specification, Feb. 26, 2005, 156 pages.
"Unlicensed Mobile Access (UMA); Architecture (Stage 2);" UMA Architecture (Stage 2) R1.0.4 (May 2, 2005) Technical Specification, May 2, 2005, 87 pages.
"Unlicensed Mobile Access (UMA); Protocols (Stage 3);" UMA Protocols (Stage 3) R1.0.4 (May 2, 2005) Technical Specification, May 2, 2005, 162 pages.
"3$^{rd}$ Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.

"3rd Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.1.0 (Jan. 2005), Apr. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.2.0, Jun. 2005 68 pages.

"3rd Generation Partnership Project; Technical Specification Group GSM/EDGE Radio Access Network; Generic Access to the A/Gb interface; Stage 2 (Release 6)" 3GPP TS 43.318 V6.3.0, Sep. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.4.0, Nov. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.5.0, Jan. 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.6.0 (Apr. 2006), May 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.7.0, Jul. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.8.0, Nov. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.9.0, Feb. 2007, 71 pages.

"3rd Generation Partnership Project; Technical Specification Group GSM/EDGE Radio Access Network; Generic access to the A/Gb interface; Stage 2 (Release 7)" 3GPP TS 43.318 V7.0.0, Nov. 2006, 71 pages.

"3rd Generation Partnership Project; Technical Specification Group GSM/EDGE Radio Access Network; Generic access to the A/Gb interface; Stage 2 (Release 7)" 3GPP TS 43.318 V7.1.0, Feb. 2007, 71 pages.

"3rd Generation Partnership Project; Technical Specification Group GSM/EDGE Radio Access Network; Generic access to the A/Gb interface; Stage 2 (Release 7)" 3GPP TS 43.318 V7.2.0, May 2007, 71 pages.

"Proposal for Stage 3 description for Generic Access to A/Gb interface", Tdoc GP-050279, Jan. 24-28, 2005, 1 page.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0, Sep. 2005, 148 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0, Nov. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0, Jan. 2006, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0, May 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.6.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0, Mar. 2007, 154 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.9.0, Jun. 2007, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0, Mar. 2007, 163 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.3.0, Jun. 2007, 163 pages.

Non-Final Office Action of U.S. Appl. No. 11/225,872, Sep. 20, 2006 (mailing date), Gallagher, Michael, et al.

Non-Final Office Action of U.S. Appl. No. 11/225,872, Feb. 13, 2007 (mailing date), Gallagher, Michael, et al.

Notice of Allowance of U.S. Appl. No. 11/225,872, Apr. 16, 2007 (mailing date), Gallagher, Michael, et al.

Final Office Action of U.S. Appl. No. 11/225,871, Aug. 18, 2006 (mailing date), Gallagher, Michael, et al.

Non-Final Office Action of U.S. Appl. No. 11/225,871, Dec. 4, 2006 (mailing date), Gallagher, Michael, et al.

Non-Final Office Action of Mar. 21, 2007 (mailing date), Gallagher, Michael, et al.

U.S. Appl. No. 11/225,871.

Notice of Allowance of U.S. Appl. No. 11/225,871, Jun. 27, 2007 (mailing date), Gallagher, Michael, et al.

Non-Final Office Action of U.S. Appl. No. 11/226,617, Nov. 12, 2008 (mailing date), Gallagher, Michael, et al.

Non-Final Office Action of U.S. Appl. No. 11/229,471, Apr. 8, 2009 (mailing date), Gallagher, Michael, et al.

Non-Final Office Action of U.S. Appl. No. 12/192,532, Feb. 4, 2009 (mailing date), Gallagher, Michael, et al.
Non-Final Office Action of U.S. Appl. No. 12/193,598, Feb. 19, 2009 (mailing date), Gallagher, Michael, et al.
"3rd Generation Partnership Project; Technical Specification Group GSM/EDGE Radio Access Network; Generic access to the A/Gb interface; Stage 2 (Release 6)" 3GPP TS 43.318 V6.10.0, Aug. 2007, 71 pages.
"3rd Generation Partnership Project; Technical Specification Group GSM/EDGE Radio Access Network; Generic access to the A/Gb interface; Stage 2 (Release 7)" 3GPP TS 43.318 V7.3.0, Aug. 2007, 71 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.10.0, Sep. 2007, 153 pages.
"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.4.0, Sep. 2007, 167 pages.
International Search Report for PCT/US2007/79258, Mar. 11, 2008 (mailing date), Kineto Wireless, Inc.
Written Opinion of the International Searching Authority for PCT/US2007/79258, Mar. 11, 2008 (mailing date), Kineto Wireless, Inc.
Portions of prosecution history of U.S. Appl. No. 11/128,461, May 26, 2009, Markovic, Milan, et al.
Portions of prosecution history of U.S. Appl. No. 11/737,128, Sep. 15, 2010, Gallagher, Michael, et al.
Portions of prosecution history of U.S. Appl. No. 11/778,041, Aug. 27, 2010, Gallagher, Michael, et al.
Portions of prosecution history of U.S. Appl. No. 11/778,043, Jun. 14, 2010, Gallagher, Michael, et al.
Portions of prosecution history of U.S. Appl. No. 11/927,665, Aug. 3, 2010, Gallagher, Michael, et al.
EP Office Action of EP05747754, Apr. 15, 2008 (mailing date), Kineto Wireless, Inc.
EP Office Action of EP05747754, Feb. 3, 2010 (mailing date), Kineto Wireless, Inc.
International Preliminary Report on Patentability for PCT/US2007/073557, Jan. 14, 2009, Kineto Wireless, Inc.
EP Supplementary Search Report of EP07812949, Mar. 26, 2010, Kineto Wireless, Inc.
EP Office Action of EP07812949, Mar. 31, 2010, Kineto Wireless, Inc.
International Preliminary Report on Patentability for PCT/US2007/079258, Mar. 24, 2009, Kineto Wireless, Inc.
EP Supplementary Search Report of EP07843030, Apr. 7, 2010, Kineto Wireless, Inc.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, 90 pages, vol. 3-SA, No. V230, Nov. 2003.
Updated portions of prosecution history of U.S. Appl. No. 11/225,872, Apr. 16, 2007, Gallagher, Michael D., et al.
Updated portions of prosecution history of U.S. Appl. No. 11/225,871, Jun. 27, 2007, Gallagher, Michael D., et al.
Portions of prosecution history of U.S. Appl. No. 11/128,615, Dec. 5, 2008, Gallagher, Michael D., et al.
Updated portions of prosecution history of U.S. Appl. No. 11/128,461, Sep. 14, 2009, Markovic, Milan, et al.
Updated portions of prosecution history of U.S. Appl. No. 11/737,128, Mar. 21, 2011, Gallagher, Michael D., et al.
Updated portions of prosecution history of U.S. Appl. No. 11/778,041 Feb. 15, 2011, Gallagher, Michael D., et al.
Updated portions of prosecution history of U.S. Appl. No. 11/778,043, Nov. 10, 2010, Gallagher, Michael D., et al.
Updated portions of prosecution history of U.S. Appl. No. 11/927,665 Feb. 3, 2011, Gallagher, Michael D., et al.
Portions of prosecution history of U.S. Appl. No. 11/982,402, Mar. 10, 2011 Gallagher, Michael D., et al.
Updated portions of prosecution history of U.S. Appl. No. 12/192,532, Jul. 2, 2010, Gallagher, Michael D., et al.
Portions of prosecution history of U.S. Appl. No. 12/194,442, Feb. 23, 2010, Gallagher, Michael D. et al.
Portions of prosecution history of U.S. Appl. No. 12/328,732, Feb. 23, 2010, Gallagher, Michael D., et al.
Portions of prosecution history of U.S. Appl. No. 12/564,039, Jun. 30, 2010, Markovic, Milan, et al.
International Search Report and Written Opinion for PCT/US2005/013945, Sep. 21, 2005 (mailing date), Kineto Wireless, Inc.
International Preliminary Report on Patentability for PCT/US2005/013945, Oct. 25, 2006, Kineto Wireless, Inc.
Portions of prosecution history of EP05749844, Nov. 11, 2010 (mailing date), Kineto Wireless, Inc.
European Search Report for EP10184667, Mar. 22, 2010 (mailing date), Kineto Wireless, Inc.
Updated portions of prosecution history of EP05747754, Jan. 18, 2011 (mailing date), Kineto Wireless, Inc.
European Search Report for EP10184715, Mar. 22, 2011 (mailing date), Kineto Wireless, Inc.
Updated portions of prosecution history of EP07812949, Aug. 9, 2010 (mailing date), Kineto Wireless, Inc.
Updated portions of prosection history of EP07843030, Feb. 4, 2011 (mailing date), Kineto Wireless, Inc.

* cited by examiner

US 8,150,397 B2

METHOD AND APPARATUS FOR ESTABLISHING TRANSPORT CHANNELS FOR A FEMTOCELL

CLAIM OF BENEFIT TO PRIOR APPLICATIONS

This application is a continuation application of U.S. Non-Provisional Patent Application Ser. No. 11/859,762 filed Sep. 22, 2007 now abandoned, entitled "Method and Apparatus for Resource Management". Patent Application Ser. No. 11/859,762 claims benefit to U.S. Provisional Application Ser. No. 60/826,700, entitled "Radio Access Network—Generic Access to the Iu Interface for Femtocells", filed Sep. 22, 2006; U.S. Provisional Application Ser. No. 60/869,900, entitled "Generic Access to the Iu Interface for Femtocells", filed Dec. 13, 2006; U.S. Provisional Application Ser. No. 60/911,862, entitled "Generic Access to the Iu Interface for Femtocells", filed Apr. 13, 2007; U.S. Provisional Application Ser. No. 60/949,826, entitled "Generic Access to the Iu Interface", filed Jul. 13, 2007; U.S. Provisional Application Ser. No. 60/884,889, entitled "Methods to Provide Protection Against Service Theft for Femtocells", filed Jan. 14, 2007; U.S. Provisional Application Ser. No. 60/893,361, entitled "Methods to Prevent Theft of Service for Femtocells Operating in Open Access Mode", filed Mar. 6, 2007; U.S. Provisional Application Ser. No. 60/884,017, entitled "Generic Access to the Iu Interface for Femtocell—Stage 3", filed Jan. 8, 2007; U.S. Provisional Application Ser. No. 60/911,864, entitled "Generic Access to the Iu Interface for Femtocell—Stage 3", filed Apr. 13, 2007; U.S. Provisional Application Ser. No. 60/862,564, entitled "E-UMA—Generic Access to the Iu Interface", filed Oct. 23, 2006; U.S. Provisional Application Ser. No. 60/949,853, entitled "Generic Access to the Iu Interface", filed Jul. 14, 2007; and U.S. Provisional Application Ser. No. 60/954,549, entitled "Generic Access to the Iu Interfaces—Stage 2 Specification", filed Aug. 7, 2007. The contents of each of the above mentioned applications, namely Ser. Nos. 11/859,762, 60/826,700, 60/869,900, 60/911,862, 60/949,826, 60/884,889, 60/893,361, 60/884,017, 60/911,864, 60/862,564, 60/949,853, and 60/954,549, are hereby incorporated by reference.

FIELD OF THE INVENTION

The invention relates to telecommunication. More particularly, this invention relates to a technique for seamlessly integrating voice and data telecommunication services across a licensed wireless system and a short-ranged licensed wireless system.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks has seen rapid growth. For example, such unlicensed wireless systems may support wireless communication based on the IEEE 802.11a, b or g standards (WiFi), or the Bluetooth® standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth® standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. The unlicensed wireless communication systems, however, require the use of dual-mode wireless transceivers to communicate with the licensed system over the licensed wireless frequencies and with the unlicensed system over the unlicensed wireless frequencies. The use of such dual-mode transceivers requires the service providers to upgrade the existing subscribers' transceivers which operate only on licensed wireless frequencies to dual-mode transceivers. Therefore, there is a need in the art to develop a system that provides the benefits of the systems described above, without the need for dual-mode transceivers.

SUMMARY OF THE INVENTION

Some embodiments are implemented in a communication system that includes a first wireless communication system and a second wireless communication system that includes a Femtocell access point (FAP) and a network controller that can communicatively couple the FAP to the first wireless communication system.

In some embodiments, the network controller can communicatively couple to the first wireless communication system through a UTRAN Iu interface. In some embodiments, the FAP can communicatively couple to a user equipment using a short-range licensed wireless frequency.

Some embodiments provide a resource management method that determines that a user equipment (UE) has roved in a region serviced by the FAP. The FAP includes a generic access resource control (GA-RC) protocol sub-layer. The method creates a separate GA-RC state dedicated to the UE in the GA-RC protocol sub-layer. The method also sets the GA-RC state dedicated to the UE to a deregistered state to indicate that the UE is not registered to use the services of the second wireless communication system.

Some embodiments provide method that determines whether a UE has roved-out of the second communication system. The method receives a periodic message at the FAP from the UE. When the FAP fails to receive a pre-determined number of the periodic messages, the method sends a deregister message to the network controller over a unique connection between the FAP and the network controller which is dedicated to the UE and also releases the dedicated connection.

Some embodiments provide a method of that releases resources after the loss of connectivity. The method sends a periodic message from the FAP to the network controller over a connection between the FAP and the network controller to determine whether the connection is lost. When the FAP determines that the connection is lost, the FAP deregisters a user equipment (UE) that is communicatively coupled with the FAP and forces the UE to perform a cell reselection.

Some embodiments provide a method that registers a Femtocell access point (FAP). The method sends a register request message that includes a registration type from the FAP to the network controller. The registration type identifies the FAP as a device to be registered with the network controller. When the register request message is acceptable by the network controller, the FAP receives a register accept message.

Some embodiments provide a method for performing discovery. The method sends a discovery request message that includes a licensed wireless cell information to a provisioning network controller. The method receives a discovery accept message at the FAP. The discovery accept message includes identification of a default network controller determined based on the cell information. The discovery accept message is sent by the provisioning network controller when the provisioning network controller determines that the provisioning network controller can accept the discovery request message.

Some embodiments provide a method of performing a user equipment (UE) registration. The method establishes a unique connection dedicated to the UE between the FAP and the network controller. The method receives a register request message at the network controller from the FAP through the dedicated connection.

Some embodiments provide a security control method. The method receives a security mode command that includes a set of security keys and a set of security algorithms at the FAP from the network controller, the set of security keys and the set of security algorithms are received at the network controller from the first wireless communication system. The method determines the integrity of a set of messages that are exchanged between the FAP and a user equipment (UE) that is communicatively coupled to the FAP through an air interface by using the set of security keys and the set of security algorithms.

Some embodiments provide method of providing security. The method establishes a secure tunnel between the FAP and the network controller. The method communicatively couples the FAP and several user equipments (UEs) to the network controller by using the secure tunnel. The UEs are communicatively coupled to the FAP through an air interface.

Some embodiments provide a method of preventing theft of service. The method creates an authorized session that includes a session identity for a first user equipment (UE). The session is for communicatively coupling the first UE with the first wireless communication system through the FAP. The first UE is recognized by the first wireless communication system as an authorized UE to use the FAP. The method rejects a request by the FAP to register a second UE when the identity of the second UE does not match any identity in the set of first UE identities. The rejected request includes the session identity of the authorized session and the identity of the second UE. The second UE is not recognized by the first wireless communication system as an authorized UE to use the FAP.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
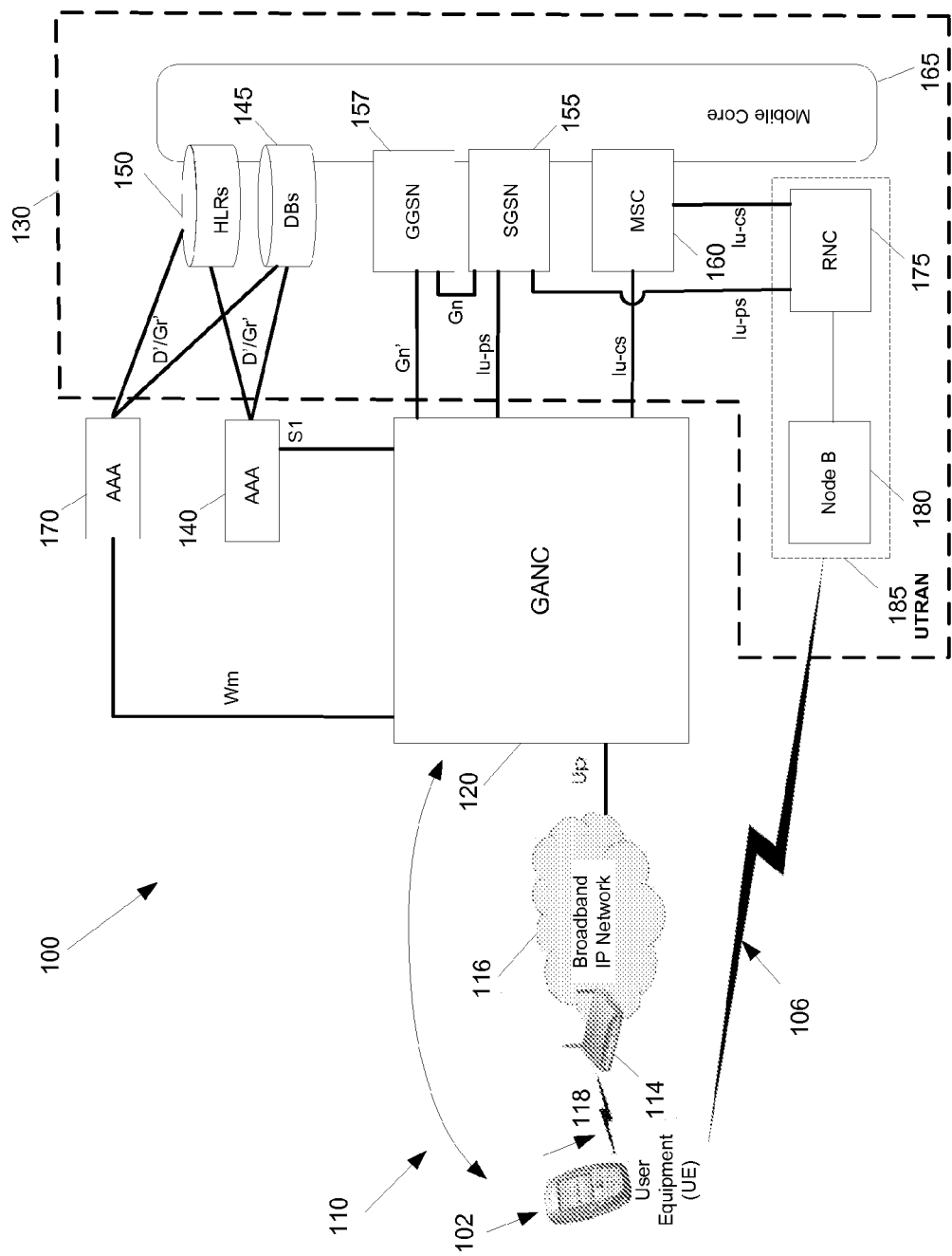
FIG. 1 illustrates an integrated communication system (ICS) of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Throughout the following description, acronyms commonly used in the telecommunications industry for wireless services are utilized along with acronyms specific to the present invention. A table of acronyms used in this application is included in Section XV.

Some embodiments are implemented in a communication system that includes a first wireless communication system and a second wireless communication system that includes a Femtocell access point (FAP) and a network controller that can communicatively couple the FAP to the first wireless communication system.

In some embodiments, the network controller can communicatively couple to the first wireless communication system through a UTRAN Iu interface. In some embodiments, the FAP can communicatively couple to a user equipment using a short-range licensed wireless frequency.

Some embodiments provide a resource management method that determines that a user equipment (UE) has roved in a region serviced by the FAP. The FAP includes a generic access resource control (GA-RC) protocol sub-layer. The method creates a separate GA-RC state dedicated to the UE in the GA-RC protocol sub-layer. The method also sets the GA-RC state dedicated to the UE to a deregistered state to indicate that the UE is not registered to use the services of the second wireless communication system.

Some embodiments provide method that determines whether a UE has roved-out of the second communication system. The method receives a periodic message at the FAP from the UE. When the FAP fails to receive a pre-determined number of the periodic messages, the method sends a deregister message to the network controller over a unique connection between the FAP and the network controller which is dedicated to the UE and also releases the dedicated connection.

Some embodiments provide a method of that releases resources after the loss of connectivity. The method sends a periodic message from the FAP to the network controller over a connection between the FAP and the network controller to determine whether the connection is lost. When the FAP determines that the connection is lost, the FAP deregisters a user equipment (UE) that is communicatively coupled with the FAP and forces the UE to perform a cell reselection.

Some embodiments provide a method that registers a Femtocell access point (FAP). The method sends a register request message that includes a registration type from the FAP to the network controller. The registration type identifies the FAP as a device to be registered with the network controller. When the register request message is acceptable by the network controller, the FAP receives a register accept message.

Some embodiments provide a method for performing discovery. The method sends a discovery request message that includes a licensed wireless cell information to a provisioning network controller. The method receives a discovery accept message at the FAP. The discovery accept message includes identification of a default network controller determined based on the cell information. The discovery accept message is sent by the provisioning network controller when the provisioning network controller determines that the provisioning network controller can accept the discovery request message.

Some embodiments provide a method of performing a user equipment (UE) registration. The method establishes a unique connection dedicated to the UE between the FAP and the network controller. The method receives a register request message at the network controller from the FAP through the dedicated connection.

Some embodiments provide a security control method. The method receives a security mode command that includes a set of security keys and a set of security algorithms at the FAP from the network controller, the set of security keys and the set of security algorithms are received at the network controller from the first wireless communication system. The method determines the integrity of a set of messages that are exchanged between the FAP and a user equipment (UE) that is communicatively coupled to the FAP through an air interface by using the set of security keys and the set of security algorithms.

Some embodiments provide method of providing security. The method establishes a secure tunnel between the FAP and the network controller. The method communicatively couples the FAP and several user equipments (UEs) to the network controller by using the secure tunnel. The UEs are communicatively coupled to the FAP through an air interface.

Some embodiments provide a method of preventing theft of service. The method creates an authorized session that includes a session identity for a first user equipment (UE). The session is for communicatively coupling the first UE with the first wireless communication system through the FAP. The first UE is recognized by the first wireless communication system as an authorized UE to use the FAP. The method rejects a request by the FAP to register a second UE when the identity of the second UE does not match any identity in the set of first UE identities. The rejected request includes the session identity of the authorized session and the identity of the second UE. The second UE is not recognized by the first wireless communication system as an authorized UE to use the FAP.

Several more detailed embodiments of the invention are described in sections below. Specifically, Section I describes the overall integrated communication system in which some embodiments are incorporated. The discussion in Section I is followed by a discussion of the system architecture of a Femtocell system in Section II. Next, Section III describes the protocol architecture of the Femtocell system. Section IV then describes the resource management procedures of the Femtocell system in some embodiments. Next, Section V presents the mobility management functions of the Femtocell system in some embodiments.

Next, Section VI describes the call management procedures of the Femtocell system. This section is followed by Section VII which describes the packet services of the Femtocell system in some embodiments. Error handling procedures are described in Section VIII. Lists of messages and information elements used in different embodiments are provided in Section IX. Short Message Services support of the Femtocell system is described in Section X followed by the description of the emergency services in Section XI.

The Femtocell system security functions are described in Section XII. This description is followed by Femtocell system service access control discussed in Section XIII. Next, Section XIV description of a computer system with which some embodiments of the invention are implemented. Finally, Section XV lists the abbreviations used.

I. Overall System

A. Integrated Communication Systems (ICS)

FIG. 1 illustrates an integrated communication system (ICS) architecture 100 in accordance with some embodiments of the present invention. ICS architecture 100 enables user equipment (UE) 102 to access a voice and data network 165 via either a licensed air interface 106 or an ICS access interface 110 through which components of the licensed wireless core network 165 are alternatively accessed. In some embodiments, a communication session through either interface includes voice services, data services, or both.

The mobile core network 165 includes one or more Home Location Registers (HLRs) 150 and databases 145 for subscriber authentication and authorization. Once authorized, the UE 102 may access the voice and data services of the mobile core network 165. In order to provide such services, the mobile core network 165 includes a mobile switching center (MSC) 160 for providing access to the circuit switched services (e.g., voice and data). Packet switched services are provided for through a Serving GPRS (General Packet Radio Service) Support Node (SGSN) 155 in conjunction with a gateway such as the Gateway GPRS Support Node (GGSN) 157.

The SGSN 155 is typically responsible for delivering data packets from and to the GGSN 157 and the user equipment within the geographical service area of the SGSN 155. Additionally, the SGSN 155 may perform functionality such as mobility management, storing user profiles, and storing location information. However, the actual interface from the mobile core network 165 to various external data packet services networks (e.g., public Internet) is facilitated by the GGSN 157. As the data packets originating from the user equipment typically are not structured in the format with which to access the external data networks, it is the role of the GGSN 157 to act as the gateway into such packet services networks. In this manner, the GGSN 157 provides addressing for data packets passing to and from the UE 102 and the external packet services networks (not shown). Moreover, as the user equipment of a licensed wireless network traverses multiple service regions and thus multiple SGSNs, it is the role of the GGSN 157 to provide a static gateway into the external data networks.

Figure 3:
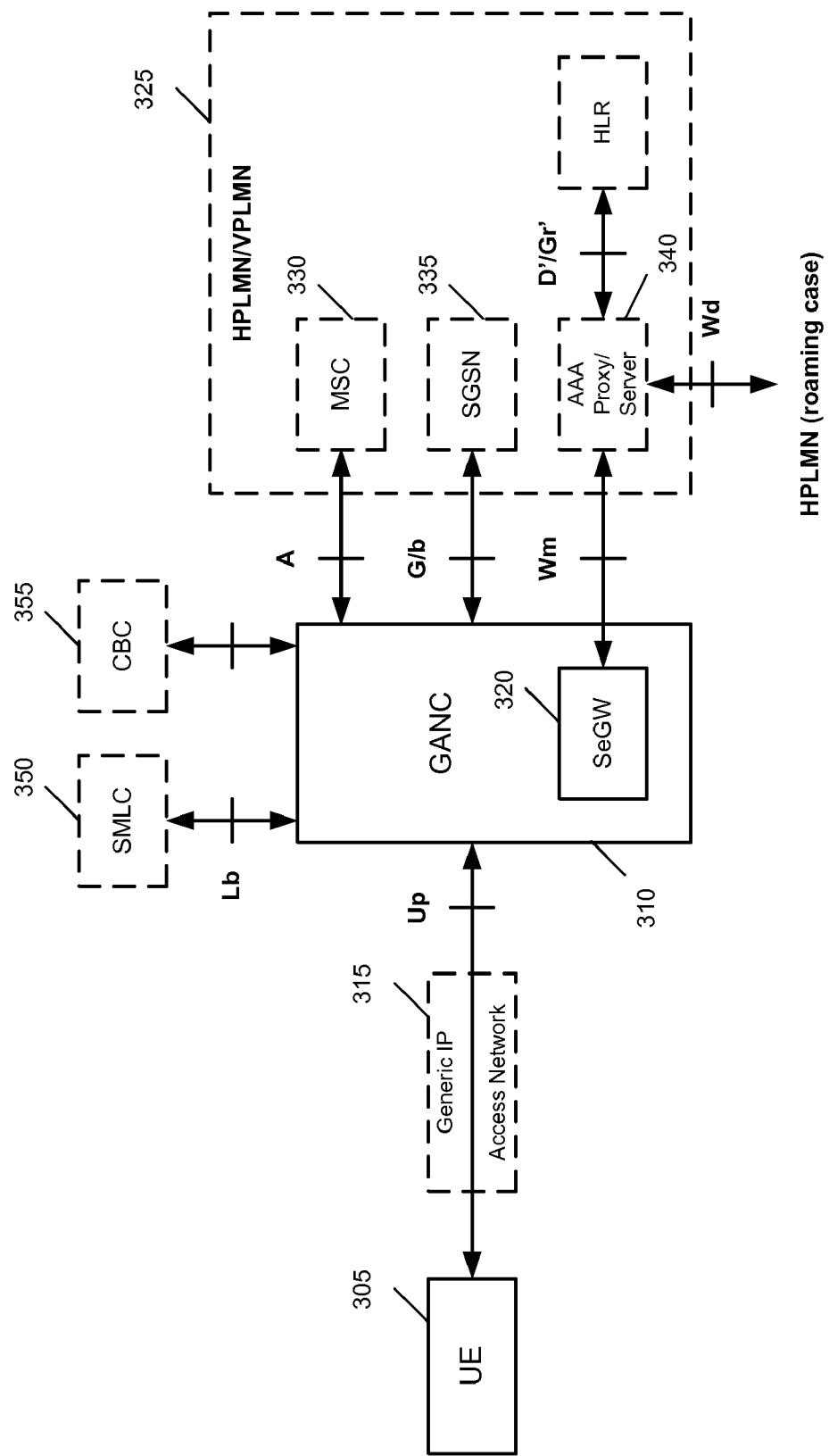
FIG. 3 illustrates the overall A/Gb-mode GAN functional architecture of some embodiments.

In the illustrated embodiment, components common to a UMTS Terrestrial Radio Access Network (UTRAN), based cellular network that includes multiple base stations referred to as Node Bs 180 (of which only one is shown for simplicity) that facilitate wireless communication services for various user equipment 102 via respective licensed radio links 106 (e.g., radio links employing radio frequencies within a licensed bandwidth). However, one of ordinary skill in the art will recognize that in some embodiments, the licensed wireless network may include other components such the GSM/EDGE Radio Access Network (GERAN). An example of a system using A and Gb interfaces to access GERAN is shown in FIG. 3 described further below.

The licensed wireless channel 106 may comprise any licensed wireless service having a defined UTRAN or GERAN interface protocol (e.g., Iu-cs and Iu-ps interfaces for UTRAN or A and Gb interfaces for GERAN) for a voice/data network. The UTRAN 185 typically includes at least one Node B 180 and a Radio Network Controller (RNC) 175 for managing the set of Node Bs 180. Typically, the multiple Node Bs 180 are configured in a cellular configuration (one per each cell) that covers a wide service area. A licensed wireless cell is sometimes referred to as a macro cell which is a logical term used to reference, e.g., the UMTS radio cell (i.e., 3G cell) under Node-B/RNC which is used to provide coverage typically in the range of tens of kilometers. Also, the UTRAN or GERAN is sometimes referred to as a macro network.

Each RNC 175 communicates with components of the core network 165 through a standard radio network controller interface such as the Iu-cs and Iu-ps interfaces depicted in FIG. 1. For example, a RNC 175 communicates with MSC 160 via the UTRAN Iu-cs interface for circuit switched services. Additionally, the RNC 175 communicates with SGSN 155 via the UTRAN Iu-ps interface for packet switched services through GGSN 157. Moreover, one of ordinary skill in the art will recognize that in some embodiments, other networks with other standard interfaces may apply. For example, the RNC 175 in a GERAN network is replaced with a Base Station Controller (BSC) that communicates with the MSC 160 via an A interface for the circuit switched services and the BSC communicates with the SGSN via a Gb interface of the GERAN network for packet switched services.

In some embodiments of the ICS architecture, the user equipment 102 use the services of the mobile core network (CN) 165 via a second communication network facilitated by the ICS access interface 110 and a Generic Access Network Controller (GANC) 120 (also referred to as a Universal Network Controller or UNC).

In some embodiments, the voice and data services over the ICS access interface 110 are facilitated via an access point 114 communicatively coupled to a broadband IP network 116. In some embodiments, the access point 114 is a generic wireless access point that connects the user equipment 102 to the ICS network through an unlicensed wireless network 118 created by the access point 114. In some other embodiments, the access point 114 is a Femtocell access point (FAP) 114 communicatively coupled to a broadband IP network 116. The FAP facilitates short-range licensed wireless communication sessions 118 that operate independent of the licensed communication session 106. In some embodiments, the GANC, FAP, UE, and the area covered by the FAP are collectively referred to as a Femtocell System. A Femtocell spans a smaller area (typically few tens of meters) than a macro cell. In other words, the Femtocell is a micro cell that has a range that is 100, 1000, or more times less than a macro cell. In case of the Femtocell system, the user equipment 102 connects to the ICS network through a short-range licensed wireless network created by the FAP 114. Signals from the FAP are then transmitted over the broadband IP network 116.

The signaling from the UE 102 is passed over the ICS access interface 110 to the GANC 120. After the GANC 120 performs authentication and authorization of the subscriber, the GANC 120 communicates with components of the mobile core network 165 using a radio network controller interface that is the same or similar to the radio network controller interface of the UTRAN described above, and includes a UTRAN Iu-cs interface for circuit switched services and a UTRAN Iu-ps interface for packet switched services (e.g., GPRS). In this manner, the GANC 120 uses the same or similar interfaces to the mobile core network as a UTRAN Radio Access Network Subsystem (e.g., the Node B 180 and RNC 175).

In some embodiments, the GANC 120 communicates with other system components of the ICS system through one or more of several other interfaces, which are (1) "Up", (2) "Wm", (3) "D'/Gr'", (4) "Gn'", and (5) "S1". The "Up" interface is the standard interface for session management between the UE 102 and the GANC 120. The "Wm" interface is a standardized interface between the GANC 120 and an Authorization, Authentication, and Accounting (AAA) Server 170 for authentication and authorization of the UE 102 into the ICS. The "D'/Gr'" interface is the standard interface between the AAA server 170 and the HLR 160. Optionally, some embodiments use the "Gn'" interface which is a modified interface for direct communications with the data services gateway (e.g., GGSN) of the mobile core network.

Some embodiments optionally include the "S1" interface. In these embodiments, the "S1" interface provides an authorization and authentication interface from the GANC 120 to an AAA sever 140. In some embodiments, the AAA server 140 that supports the S1 interface and the AAA server 170 that supports Wm interface may be the same. More details of the S1 interface are described in U.S. application Ser. No. 11/349, 025, entitled "Service Access Control Interface for an Unlicensed Wireless Communication System", filed Feb. 6, 2006.

In some embodiments, the UE 102 must register with the GANC 120 prior to accessing ICS services. Registration information of some embodiments includes a subscriber's International Mobile Subscriber Identity (IMSI), a Media Access Control (MAC) address, and a Service Set Identifier (SSID) of the serving access point as well as the cell identity from the GSM or UTRAN cell upon which the UE 102 is already camped (a UE is camped on a cell when the UE has completed the cell selection/reselection process and has chosen a cell; the UE monitors system information and, in most cases, paging information). In some embodiments, the GANC 120 may pass this information to the AAA server 140 to authenticate the subscriber and determine the services (e.g., voice and data) available to the subscriber. If approved by the AAA server 140 for access, the GANC 120 will permit the UE 102 to access voice and data services of the ICS system.

These circuit switched and packet switched services are seamlessly provided by the ICS to the UE 102 through the various interfaces described above. In some embodiments, when data services are requested by the UE 102, the ICS uses the optional Gn' interface for directly communicating with a GGSN 157. The Gn' interface allows the GANC 120 to avoid the overhead and latency associated with communicating with the SGSN 155 over the Iu-ps interface of the UTRAN or the Gb interface of the GSM core networks prior to reaching the GGSN 157.

B. Applications of ICS

Figure 2:
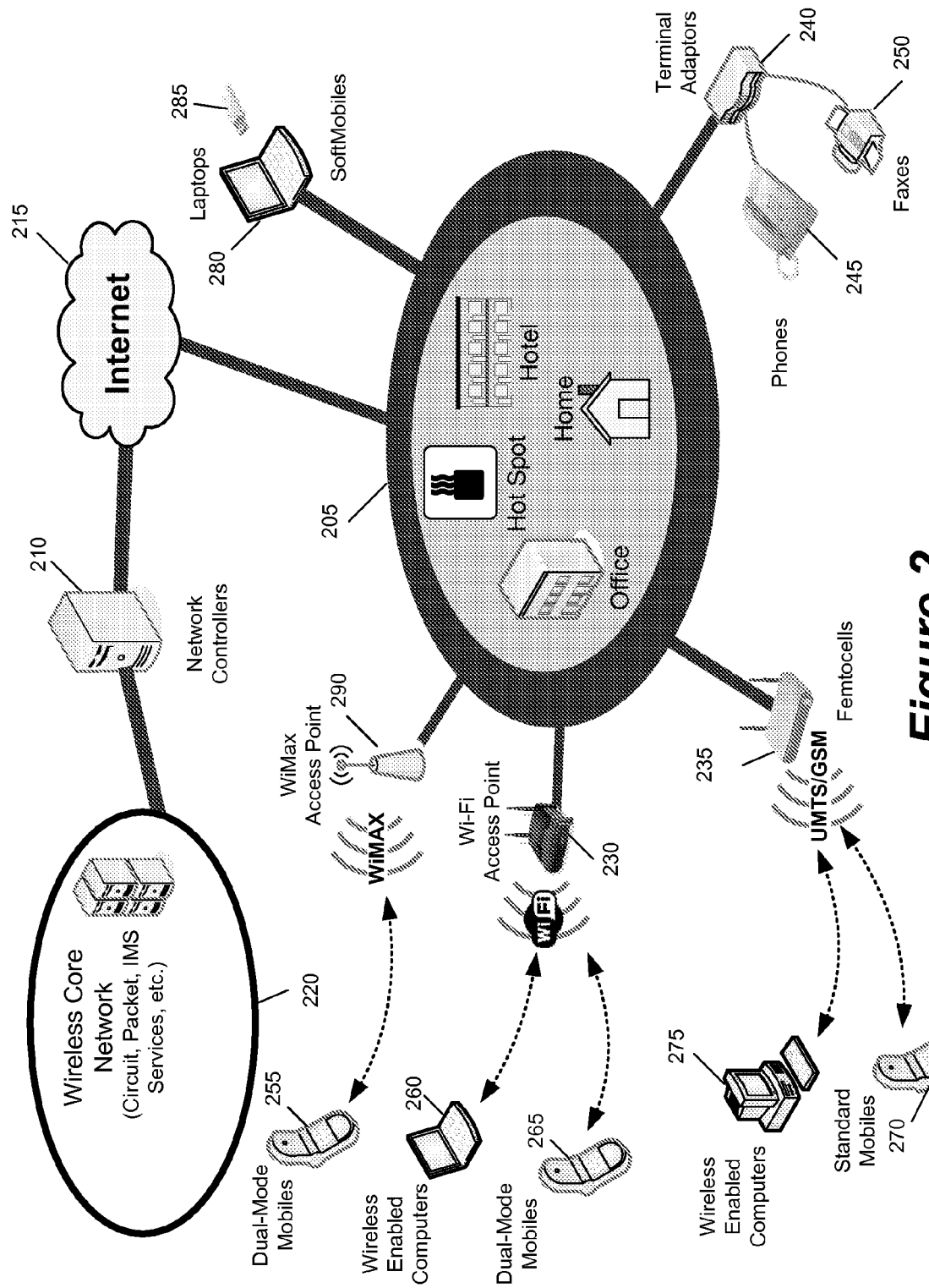
FIG. 2 illustrates several applications of an ICS in some embodiments.

An ICS provides scalable and secure interfaces into the core service network of mobile communication systems. FIG. 2 illustrates several applications of an ICS in some embodiments. As shown, homes, offices, hot spots, hotels, and other public and private places 205 are connected to one or more network controllers 210 (such as the GANC 120 shown in FIG. 1) through the Internet 215. The network controllers in turn connect to the mobile core network 220 (such as the core network 165 shown in FIG. 1).

FIG. 2 also shows several user equipments. These user equipments are just examples of user equipments that can be used for each application. Although in most examples only one of each type of user equipments is shown, one of ordinary skill in the art would realize that other type of user equipments can be used in these examples without deviating from the teachings of the invention. Also, although only one of each type of access points, user equipment, or network controllers are shown, many such access points, user equipments, or network controllers may be employed in FIG. 2. For instance, an access point may be connected to several user equipment, a network controller may be connected to several access points, and several network controllers may be connected to the core network. The following sub-sections provide several examples of services that can be provided by an ICS.

1. Wi-Fi

A Wi-Fi access point 230 enables a dual-mode cellular/Wi-Fi UEs 260-265 to receive high-performance, low-cost mobile services when in range of a home, office, or public Wi-Fi network. With dual-mode UEs, subscribers can roam and handover between licensed wireless communication system and Wi-Fi access and receive a consistent set of services as they transition between networks.

2. Femtocells

A Femtocell enables user equipments, such as standard mobile stations 270 and wireless enabled computers 275 shown, to receive low cost services using a short-range licensed wireless communication sessions through a FAP 235.

3. Terminal Adaptors

Terminal adaptors 240 allow incorporating fixed-terminal devices such as telephones 245, Faxes 250, and other equipments that are not wireless enabled within the ICS. As far as the subscriber is concerned, the service behaves as a standard analog fixed telephone line. The service is delivered in a manner similar to other fixed line VoIP services, where a UE is connected to the subscriber's existing broadband (e.g., Internet) service.

4. WiMAX

Some licensed wireless communication system operators are investigating deployment of WiMAX networks in parallel with their existing cellular networks. A dual mode cellular/WiMAX UE 255 enables a subscriber to seamlessly transition between a cellular network and such a WiMAX network through a WiMax access point 290.

5. SoftMobiles

Connecting laptops 280 to broadband access at hotels and Wi-Fi hot spots has become popular, particularly for international business travelers. In addition, many travelers are beginning to utilize their laptops and broadband connections for the purpose of voice communications. Rather than using mobile phones to make calls and pay significant roaming fees, they utilize SoftMobiles (or SoftPhones) and VoIP services when making long distance calls.

To use a SoftMobile service, a subscriber would place a USB memory stick 285 with an embedded SIM into a USB port of their laptop 280. A SoftMobile client would automatically launch and connect over IP to the mobile service provider. From that point on, the subscriber would be able to make and receive mobile calls as if she was in her home calling area.

Several examples of Integrated Communication Systems (ICS) are given in the following sub-sections. A person of ordinary skill in the art would realize that the teachings in these examples can be readily combined. For instance, an ICS can be an IP based system and have an A/Gb interface towards the core network while another ICS can have a similar IP based system with an Iu interface towards the core network.

C. Integrated Systems with A/Gb and/or Iu Interfaces Towards the Core Network

FIG. 3 illustrates the A/Gb-mode Generic Access Network (GAN) functional architecture of some embodiments. The GAN includes one or more Generic Access Network Controllers (GANC) 310 and one or more generic IP access networks 315. One or more UEs 305 (one is shown for simplicity) can connect to a GANC 310 through a generic IP access network 315. The GANC 310 has the capability to appear to the core network 325 as a GSM/EDGE Radio Access Network (GERAN) Base Station Controller (BSC). The GANC 310 includes a Security Gateway (SeGW) 320 that terminates secure remote access tunnels from the UE 305, providing mutual authentication, encryption and data integrity for signaling, voice and data traffic.

The generic IP access network 315 provides connectivity between the UE 305 and the GANC 310. The IP transport connection extends from the GANC 310 to the UE 305. A single interface, the Up interface, is defined between the GANC 310 and the UE 305.

The GAN co-exists with the GERAN and maintains the interconnections with the Core Network (CN) 325 via the standardized interfaces defined for GERAN. These standardized interfaces include the A interface to Mobile Switching Center (MSC) 330 for circuit switched services, Gb interface to Serving GPRS Support Node (SGSN) 335 for packet switched services, Lb interface to Serving Mobile Location Center (SMLC) 350 for supporting location services, and an interface to Cell Broadcast Center (CBC) 355 for supporting cell broadcast services. The transaction control (e.g. Connection Management, CC, and Session Management, SM) and user services are provided by the core network (e.g. MSC/VLR and the SGSN/GGSN).

As shown, the SeGW 320 is connected to a AAA server 340 over the Wm interface. The AAA server 340 is used to authenticate the UE 305 when it sets up a secure tunnel. Some embodiments require only a subset of the Wm functionalities for the GAN application. In these embodiments, as a minimum the GANC-SeGW shall support the Wm authentication procedures.

Figure 4:
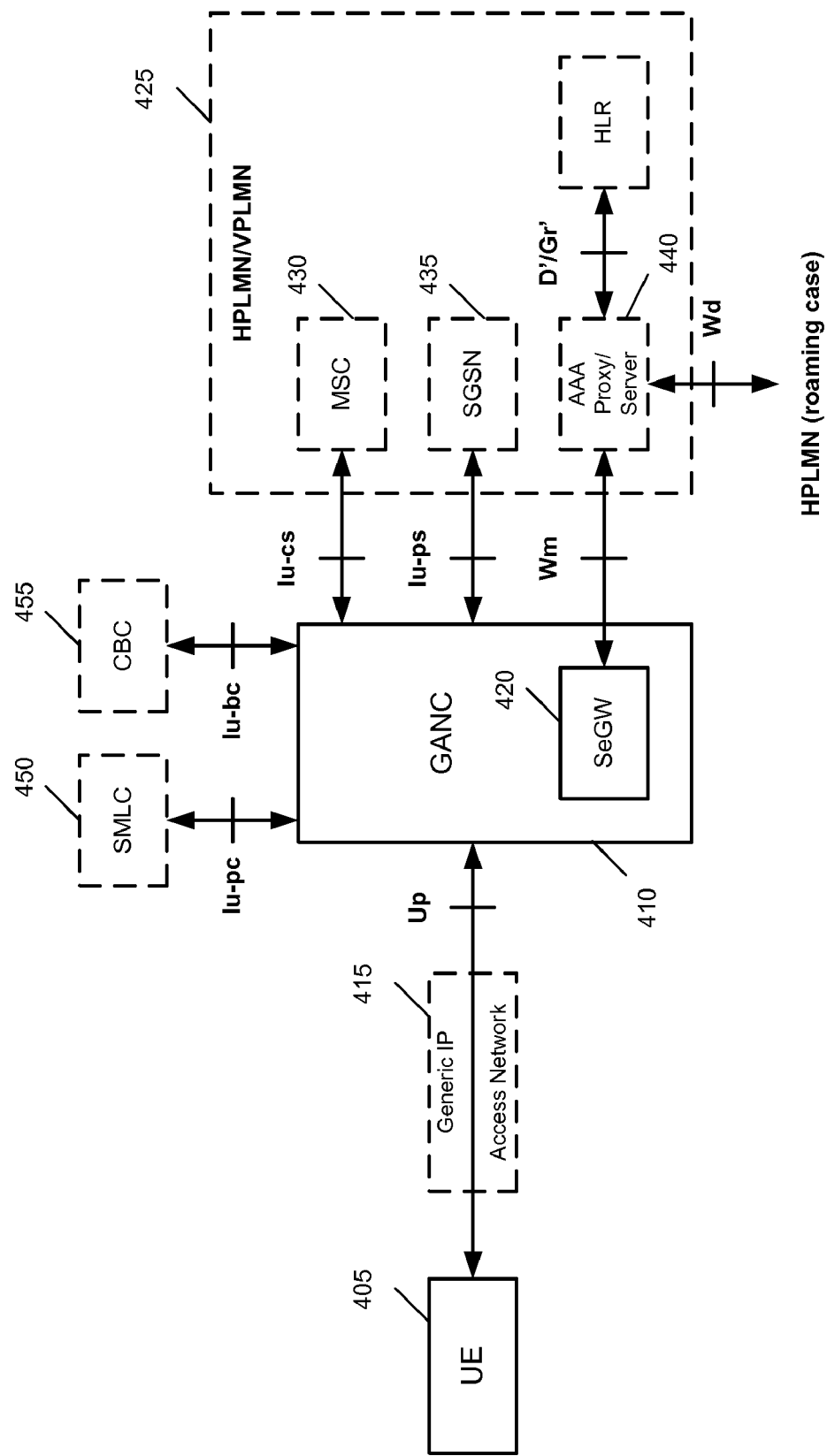
FIG. 4 illustrates the overall Iu-mode GAN functional architecture of some embodiments.

FIG. 4 illustrates the Iu-mode Generic Access Network (GAN) functional architecture of some embodiments. The GAN includes one or more Generic Access Network Controllers (GANC) 410 and one or more generic IP access networks 415. One or more UEs 405 (one is shown for simplicity) can be connected to a GANC 410 through a generic IP access network 415. In comparison with the GANC 310, the GANC 410 has the capability to appear to the core network 425 as a UMTS Terrestrial Radio Access Network (UTRAN) Radio Network Controller (RNC). In some embodiments, the GANC has the expanded capability of supporting both the Iu and A/Gb interfaces to concurrently support both Iu-mode and A/Gb-mode UEs. Similar to the GANC 310, the GANC 410 includes a Security Gateway (SeGW) 420 that terminates secure remote access tunnels from the UE 405, providing mutual authentication, encryption and data integrity for signaling, voice and data traffic.

The generic IP access network 415 provides connectivity between the UE 405 and the GANC 410. The IP transport connection extends from the GANC 410 to the UE 405. A single interface, the Up interface, is defined between the GANC 410 and the UE 405. Functionality is added to this interface, over the UP interface shown in FIG. 3, to support the Iu-mode GAN service.

The GAN co-exists with the UTRAN and maintains the interconnections with the Core Network (CN) 425 via the standardized interfaces defined for UTRAN. These standardized interfaces include the Iu-cs interface to Mobile Switching Center (MSC) 430 for circuit switched services, Iu-ps interface to Serving GPRS Support Node (SGSN) 435 for packet switched services, Iu-pc interface to Serving Mobile Location Center (SMLC) 450 for supporting location services, and Iu-bc interface to Cell Broadcast Center (CBC) 455 for supporting cell broadcast services. The transaction control (e.g. Connection Management, CC, and Session Management, SM) and user services are provided by the core network (e.g. MSC/VLR and the SGSN/GGSN).

As shown, the SeGW 420 is connected to a AAA server 440 over the Wm interface. The AAA server 440 is used to authenticate the UE 405 when it sets up a secure tunnel. Some embodiments require only a subset of the Wm functionalities for the Iu mode GAN application. In these embodiments, as a minimum the GANC-SeGW shall support the Wm authentication procedures.

II. Femtocell System Architecture

Figure 5:
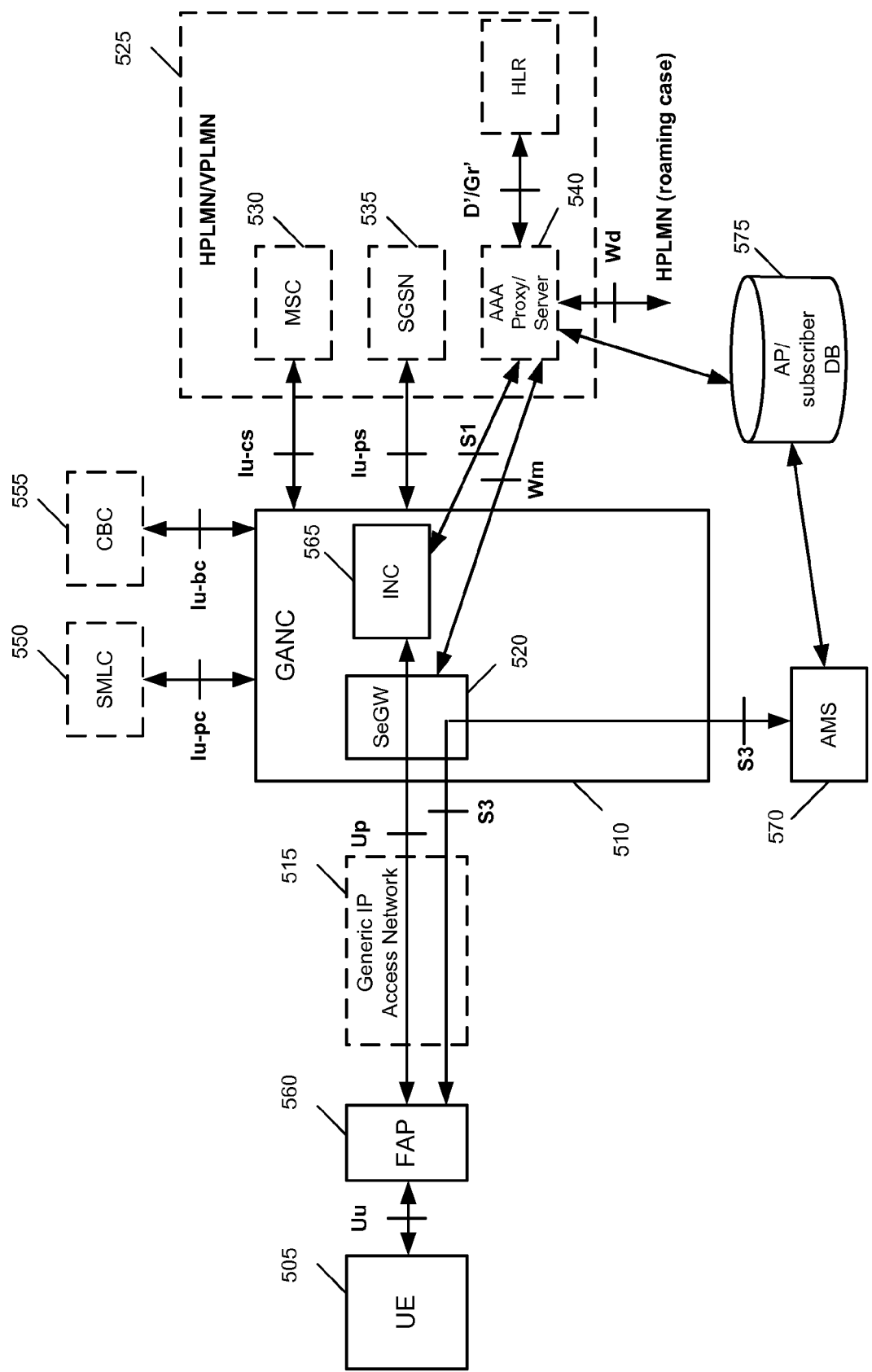
FIG. 5 illustrates the Femtocell functional architecture of some embodiments.

FIG. 5 illustrates the Femtocell system functional architecture of some embodiments. As shown, many components of the system shown in FIG. 5 are similar to components of FIG. 4. In addition, the Femtocell system includes a Femtocell Access Point (FAP) 560 which communicatively couples the UE 505 to the GANC 510 through the Generic IP Access Network 515. The interface between the UE 505 and the FAP 560 is referred to as the Uu interface in this disclosure. The UE 505 and the FAP 560 communicate through a short-range wireless air interface using licensed wireless frequencies. The GANC 510 is an enhanced version of the GANC 410 shown in FIG. 4. The Security Gateway (SeGW) 520 component of the GANC 510 terminates secure remote access tunnels from the FAP 560, providing mutual authentication, encryption and data integrity for signaling, voice and data traffic.

The Femtocell Access Point (AP) Management System (AMS) 570 is used to manage a large number of FAPs. The AMS 570 functions include configuration, failure management, diagnostics, monitoring and software upgrades. The interface between the AMS 570 and the FAP 560 is referred to as the S3 interface. The S3 interface enables secure access to Femtocell access point management services for FAPs. All communication between the FAPs and AMS is exchanged via the Femtocell secure tunnel that is established between the FAP and SeGW 520. As shown, the AMS 570 accesses to the AP/subscriber databases (Femtocell DB) 575 which provides centralized data storage facility for Femtocell AP (i.e., the FAP) and subscriber information. Multiple Femtocell system elements may access Femtocell DB via AAA server.

The IP Network Controller (INC) 565 component of the GANC 510 interfaces with the AAA/proxy server 540 through the S1 interface for provisioning of the FAP related information and service access control. As shown in FIG. 5, the AAA/proxy server 540 also interfaces with the AP/subscriber databases 575.

A. ATM and IP Based Architectures

In some embodiments, the Femtocell system uses Asynchronous Transfer Mode (ATM) based Iu (Iu-cs and Iu-ps) interfaces towards the CN. In some embodiments, the Femtocell system architecture can also support an IP based Iu (Iu-cs and Iu-ps) interface towards the CN.

A person of ordinary skill in the art would realize that the same examples can be readily applied to other types of ICS. For instance, these examples can be used when the ICS access interface 110 (shown in FIG. 1) uses unlicensed frequencies (instead of Femtocell's licensed frequencies), the access point 114 is a generic WiFi access point (instead of a FAP), etc. Also, a person of ordinary skill in the art would realize that the same examples can be readily implemented using A/Gb interfaces (described above) instead of Iu interfaces.

Figure 6:
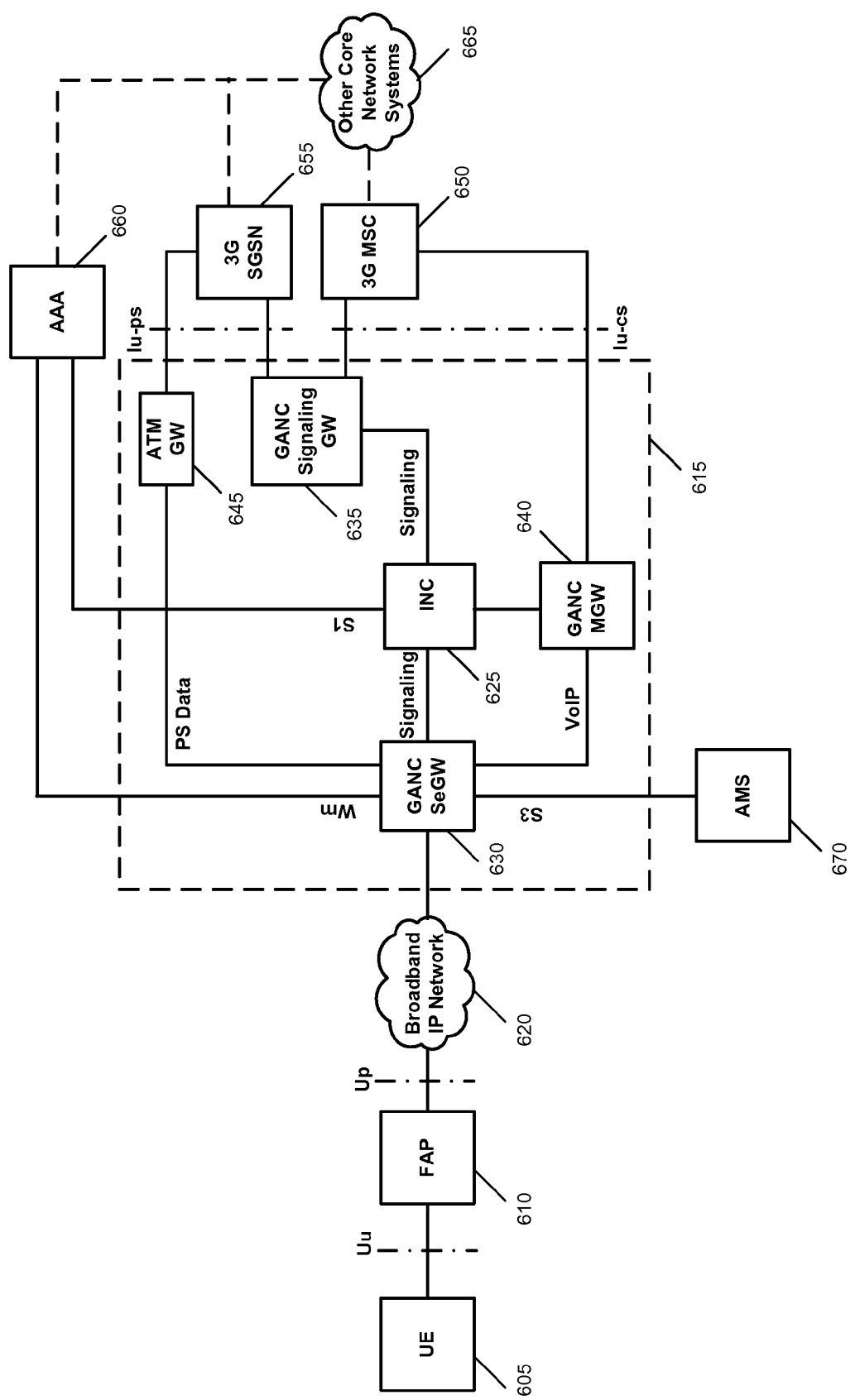
FIG. 6 illustrates Femtocell network architecture of some embodiments with an asynchronous transfer mode (ATM) interface towards the core network.

FIG. 6 illustrates the basic elements of the Femtocell system architecture with Asynchronous Transfer Mode (ATM) based Iu (Iu-cs and Iu-ps) interfaces towards the CN in some embodiments. These elements include the user equipment (UE) 605, the FAP 610, and the Generic Access Network Controller (GANC) 615, and the AMS 670.

For simplicity, only one UE and one FAP are shown. However, each GANC can support multiple FAPs and each FAP in turn can support multiple UEs. As shown, the GANC 615 includes an IP Network Controller (INC) 625, a GANC Security Gateway (SeGW) 630, a GANC Signaling Gateway 635, a GANC Media Gateway (MGW) 640, an ATM Gateway (645). Elements of the Femtocell are described further below.

Figure 7:
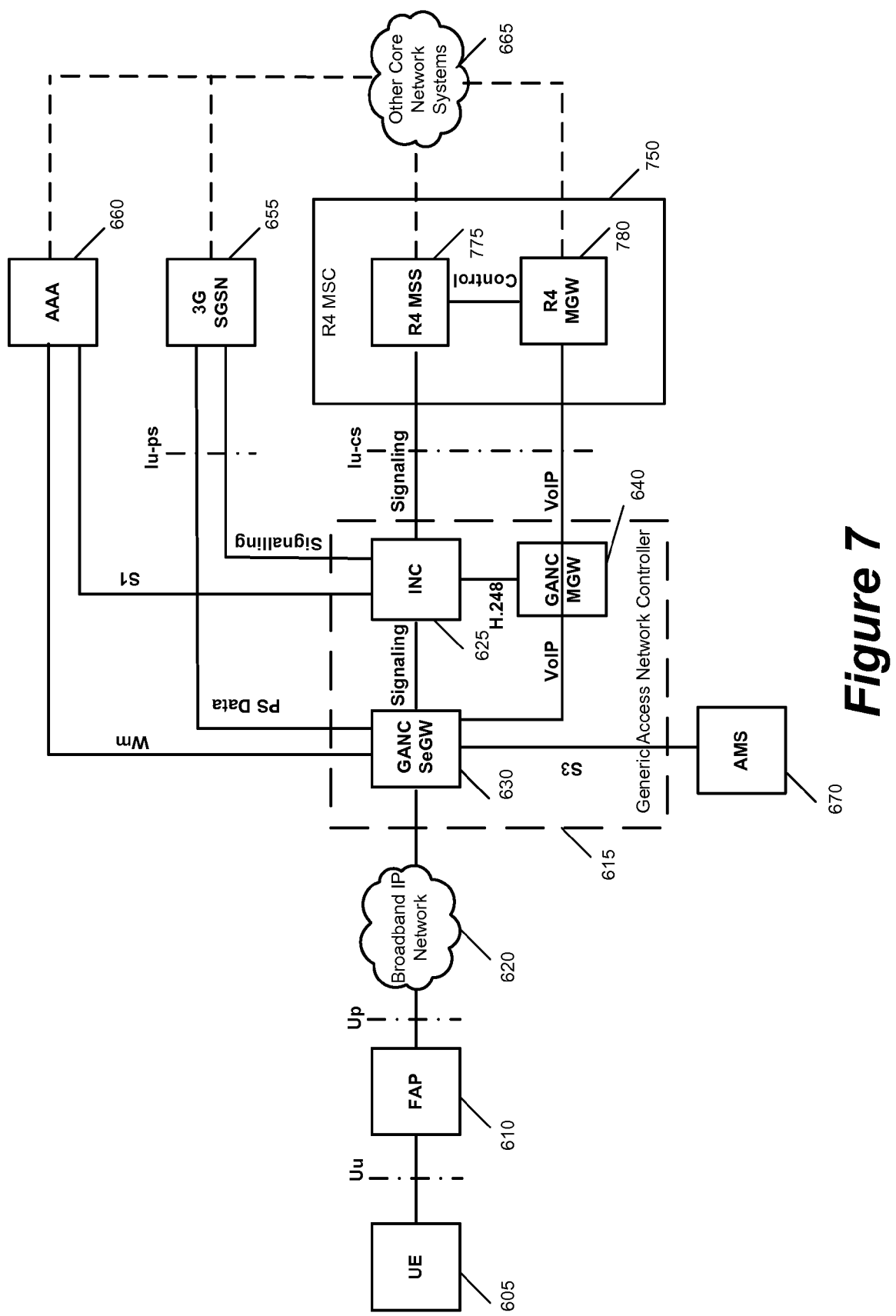
FIG. 7 illustrates Femtocell network architecture of some embodiments with IP interface towards the core network.

FIG. 7 illustrates the basic elements of the Femtocell system architecture with an IP based Iu (Iu-cs and Iu-ps) interface towards the CN in some embodiments. For simplicity, only one UE and one FAP are shown. However, each GANC can support multiple FAPs and each FAP in turn can support multiple UEs. This option eliminates the need for the GANC Signaling gateway 635 and also the ATM gateway 645. Optionally for IP based Iu interface, the GANC Media Gateway 640 can also be eliminated if the R4 MGW 705 in the CN can support termination of voice data i.e. RTP frames as defined in "Real-Time Transport Protocol (RTP) Payload Format and File Storage Format for the Adaptive Multi-Rate (AMR) and Adaptive Multi-Rate Wideband (AMR-WB) Audio Codecs", IETF RFC 3267, hereinafter "RFC 3267".

Also shown in FIGS. 6 and 7 are components of the licensed wireless communication systems. These components are 3G MSC 650, 3G SGSN 655, and other Core Network System (shown together) 665. The 3G MSC 650 provides a standard Iu-cs interface towards the GANC. Another alternative for the MSC is shown in FIG. 7. As shown, the MSC 750 is split up into a MSS (MSC Server) 775 for Iu-cs based signaling and MGW 780 for the bearer path. R4 MSC 750 is a release 4 version of a 3G MSC with a different architecture i.e. R4 MSC is split into MSS for control traffic and a MGW for handling the bearer. A similar MSC can be used for the ATM architecture of FIG. 6. Both architectures shown in FIGS. 6 and 7 are also adaptable to use any future versions of the MSC.

The 3G SGSN 655 provides packet services (PS) via the standard Iu-ps interface. The SGSN connects to the INC 625 for signaling and to the SeGW 630 for PS data. The AAA server 660 communicates with the SeGW 630 and supports the EAP-AKA and EAP-SIM procedures used in IKEv2 over the Wm interface and includes a MAP interface to the HLR/AuC. This system also supports the enhanced service access control functions over the S1 interface.

For simplicity, in several diagrams throughout the present application, only the INC component of the GANC is shown. Also, whenever the INC is the relevant component of the GANC, references to the INC and GANC are used interchangeably.

B. Functional Entities

1. User Equipment (UE)

The UE includes the functions that are required to access the Iu-mode GAN. In some embodiments, the UE additionally includes the functions that are required to access the A/Gb-mode GAN. In some embodiments, the User Equipment (UE) is a dual mode (e.g., GSM and unlicensed radios) handset device with capability to switch between the two modes. The user equipment can support either Bluetooth® or IEEE 802.11 protocols. In some embodiments, the UE supports an IP interface to the access point. In these embodiments, the IP connection from the GANC extends all the way to the UE. In some other embodiments, the User Equipment (UE) is a standard 3G handset device operating over licensed spectrum of the provider.

In some embodiments, the user equipment includes a cellular telephone, smart phone, personal digital assistant, or computer equipped with a subscriber identity mobile (SIM) card for communicating over the licensed or unlicensed wireless networks. Moreover, in some embodiments the computer equipped with the SIM card communicates through a wired communication network.

Alternatively, in some embodiments the user equipment includes a fixed wireless device providing a set of terminal adapter functions for connecting Integrated Services Digital Network (ISDN), Session Initiation Protocol (SIP), or Plain Old Telephone Service (POTS) terminals to the ICS. Application of the present invention to this type of device enables the wireless service provider to offer the so-called landline replacement service to users, even for user locations not sufficiently covered by the licensed wireless network. Moreover, some embodiments of the terminal adapters are fixed wired devices for connecting ISDN, SIP, or POTS terminals to a different communication network (e.g., IP network) though alternate embodiments of the terminal adapters provide wireless equivalent functionality for connecting through unlicensed or licensed wireless networks.

2. Femtocell Access Point (FAP)

The FAP is a licensed access point which offers a standard radio interface (Uu) for UE connectivity. The FAP provides radio access network connectivity for the UE using a modified version of the standard GAN interface (Up). In some embodiments, the FAP is equipped with either a standard 3G USIM or a 2G SIM.

In accordance with some embodiments, the FAP 610 will be located in a fixed structure, such as a home or an office building. In some embodiments, the service area of the FAP includes an indoor portion of a building, although it will be understood that the service area may include an outdoor portion of a building or campus.

3. Generic Access Network Controller (GANC)

The GANC 510 is an enhanced version of the GANC defined in "Generic access to the A/Gb interface; Stage 2", 3GPP TS 43.318 standard, hereinafter "TS 43.318 standard". The GANC appears to the core network as a UTRAN Radio Network Controller (RNC). The GANC includes a Security Gateway (SeGW) 520 and IP Network Controller (INC) 565. In some embodiments (not shown in FIG. 5), the GANC also includes GANC Signaling Gateway 635, a GANC Media Gateway (MGW) 640, and/or an ATM Gateway (645).

The SeGW 520 provides functions that are defined in TS 43.318 standard and "Generic access to the A/Gb interface; Stage 3", 3GPP TS 44.318 standard. The SeGW terminates secure access tunnels from the FAP, providing mutual authentication, encryption and data integrity for signaling, voice and data traffic. The SeGW 520 is required to support EAP-SIM and EAP-AKA authentication for the FAP 560.

The INC 565 is the kay GANC element. In some embodiments, the INC is front-ended with a load balancing router/switch subsystem which connects the INC to the other GAN systems; e.g., GANC security gateways, local or remote management systems, etc.

The GANC MGW 640 provides the inter-working function between the Up interface and the Iu-CS user plane. The GANC MGW would provide inter-working between RFC 3267 based frames received over the Up interface and Iu-UP frames towards the CN. The GANC Signaling GW 635 provides protocol conversion between SIGTRAN interface towards the INC and the ATM based Iu-cs interface towards the CN. The ATM GW 645 provides ATM/IP gateway functionality, primarily routing Iu-ps user plane packets between the SeGW (IP interface) and CN (AAL5 based ATM interface).

4. Broadband IP Network

The Broadband IP Network 515 represents all the elements that collectively, support IP connectivity between the GANC SeGW 520 function and the FAP 560. This includes: (1) Other Customer premise equipment (e.g., DSL/cable modem, WLAN switch, residential gateways/routers, switches, hubs, WLAN access points), (2) Network systems specific to the broadband access technology (e.g., DSLAM or CMTS), (3) ISP IP network systems (edge routers, core routers, firewalls), (4) Wireless service provider (WSP) IP network systems (edge routers, core routers, firewalls), and (5) Network address translation (NAT) functions, either standalone or integrated into one or more of the above systems.

5. AP Management System (AMS)

The AMS 570 is used to manage a large number of FAPs 560 including configuration, failure management, diagnostics, monitoring and software upgrades. The access to AMS functionality is provided over secure interface via the GANC SeGW 520.

Some embodiments of the above mentioned devices, such as the user equipment, FAP, or GANC, include electronic components, such as microprocessors and memory (not shown), that store computer program instructions (such as instructions for executing wireless protocols for managing voice and data services) in a machine-readable or computer-readable medium as further described below in the section labeled "Computer System". Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits (ASICs), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

III. Femtocell Protocol Architecture

A. CS Domain—Control Plane Architecture

Figure 8:
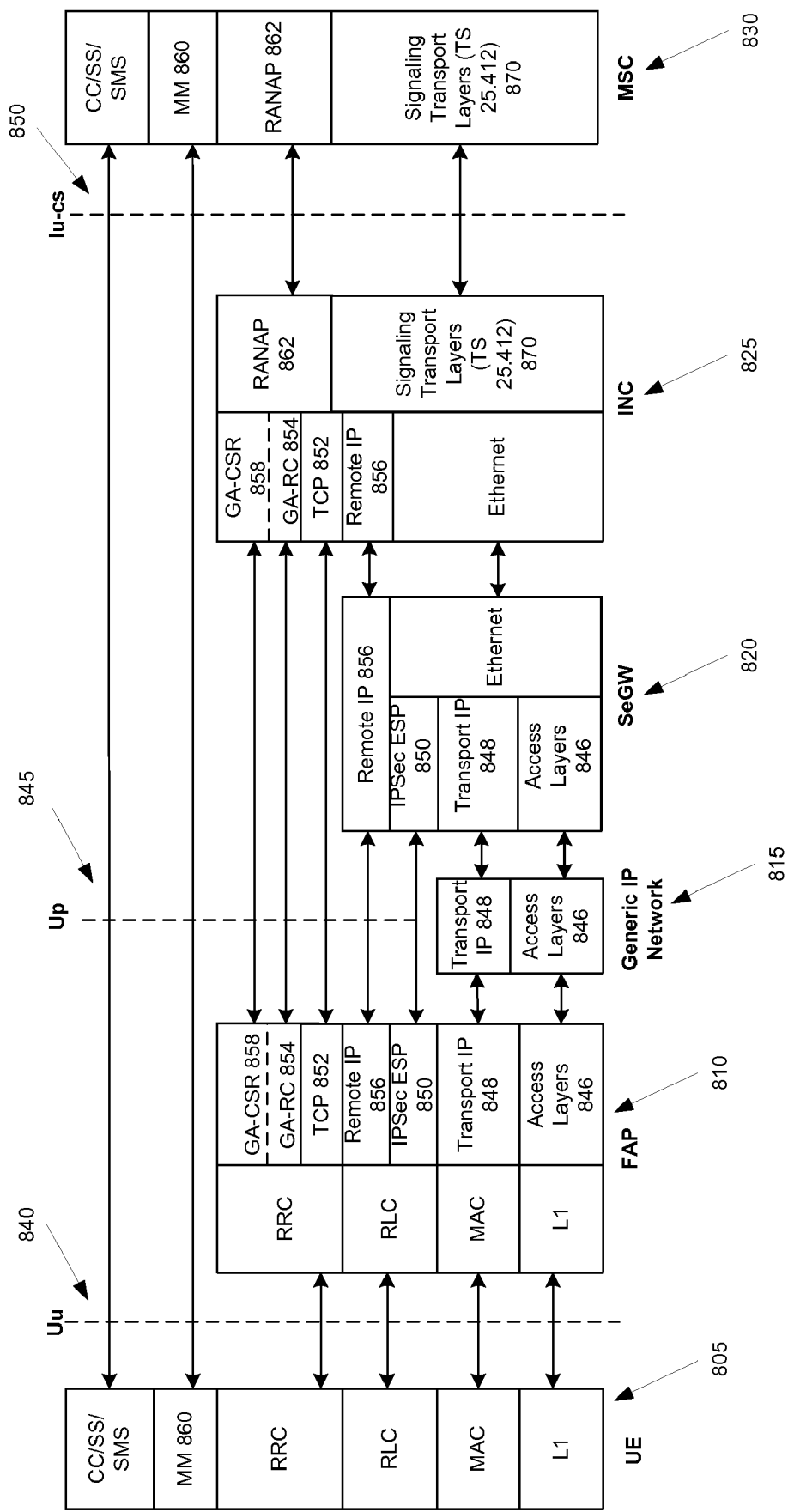
FIG. 8 illustrates CS Domain Control Plane Architecture of some embodiments.

The GAN Femtocell architecture of some embodiments in support of the CS Domain control plane is illustrated in FIG. 8. The figure shows different protocol layers for the UE 805, FAP 810, Generic IP Network 815, SeGW 820, INC 825, and MSC 830. FIG. 8 also shows the three interfaces Uu 840, Up 845 and Iu-cs 850.

1. Up Interface for the CS Domain Control Plane

The main features of the Up interface 845 for the CS domain control plane are as follows. The underlying Access Layers 846 and Transport IP layer 848 provide the generic connectivity between the FAP 810 and the GANC (which includes SeGW 820 and INC 825). The IPSec encapsulation security payload (ESP) layer 850 provides encryption and data integrity.

The TCP 852 provides reliable transport for the GA-RC 854 between FAP 810 and GANC and is transported using the Remote IP layer 856. The GA-RC 854 manages the IP connection, including the Femtocell registration procedures.

The GA-CSR 858 protocol performs functionality equivalent to the UTRAN RRC protocol, using the underlying connection managed by the GA-RC 854. Protocols, such as MM 860 and above, are carried transparently between the UE 805 and MSC 830. The GANC terminates the GA-CSR 858 protocol and inter-works it to the Iu-cs 850 interface using Radio Access Network Application Part (RANAP) 862 messaging.

The Remote IP layer 856 is the 'inner' IP layer for IPSec tunnel mode and is used by the FAP 810 to be addressed by the INC 825. Remote IP layer 856 is configured during the IPSec connection establishment. In some embodiments, the Iu-cs signaling transport layers 870 are per "UTRAN Iu interface signalling transport", 3GPP TS 25.412 standard, hereinafter "TS 25.412".

B. CS Domain—User Plane Architecture

Figure 9:
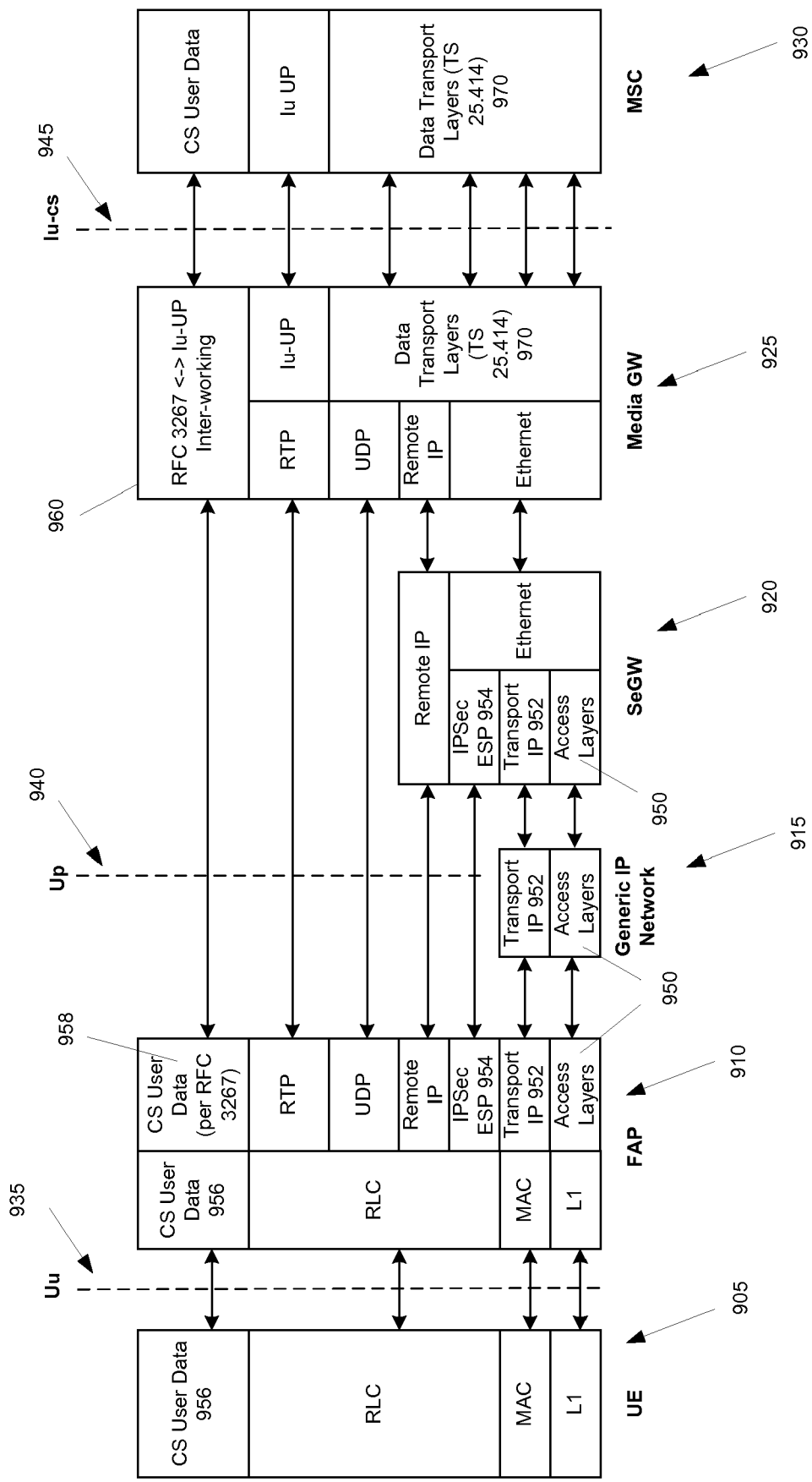
FIG. 9 illustrates CS Domain User Plane Protocol Architecture of some embodiments.

The GAN Femtocell protocol architecture of some embodiments in support of the CS domain user plane is illustrated in FIG. 9. The figure shows different protocol layers for the UE 905, FAP 910, Generic IP Network 915, SeGW 920, Media GW 925, and MSC 930. FIG. 9 also shows the three interfaces Uu 935, Up 940, and Iu-cs 945.

The main features of the CS domain user plane are as follows. The underlying Access Layers 950 and Transport IP layer 952 provide the generic connectivity between the FAP 910 and the GANC. The IPSec layer 954 provides encryption and data integrity.

The FAP 910 frames the CS user data 956 (received over the air interface) into RFC 3267 defined frames. RFC 3267 user data 958 is transported over the Up interface to the GANC Media GW 925. The GANC Media GW 925 will provide inter-working function 960 with Iu-UP (e.g., Support Mode) towards the CN. In some embodiments, Iu-UP uses ATM as a transport mechanism between the CN and the GANC Media GW 925. In some embodiments, Iu-Up uses IP as a transport mechanism between the CN and the GANC Media GW 925. In some embodiments, the CS domain user plane architecture supports AMR codec, as specified in "AMR speech codec; General description", 3GPP TS 26.071 standard with support for other codec being optional. In some embodiments, the Iu-cs Data transport layers 970 are per TS 25.414.

C. PS Domain—Control Plane Architecture

Figure 10:
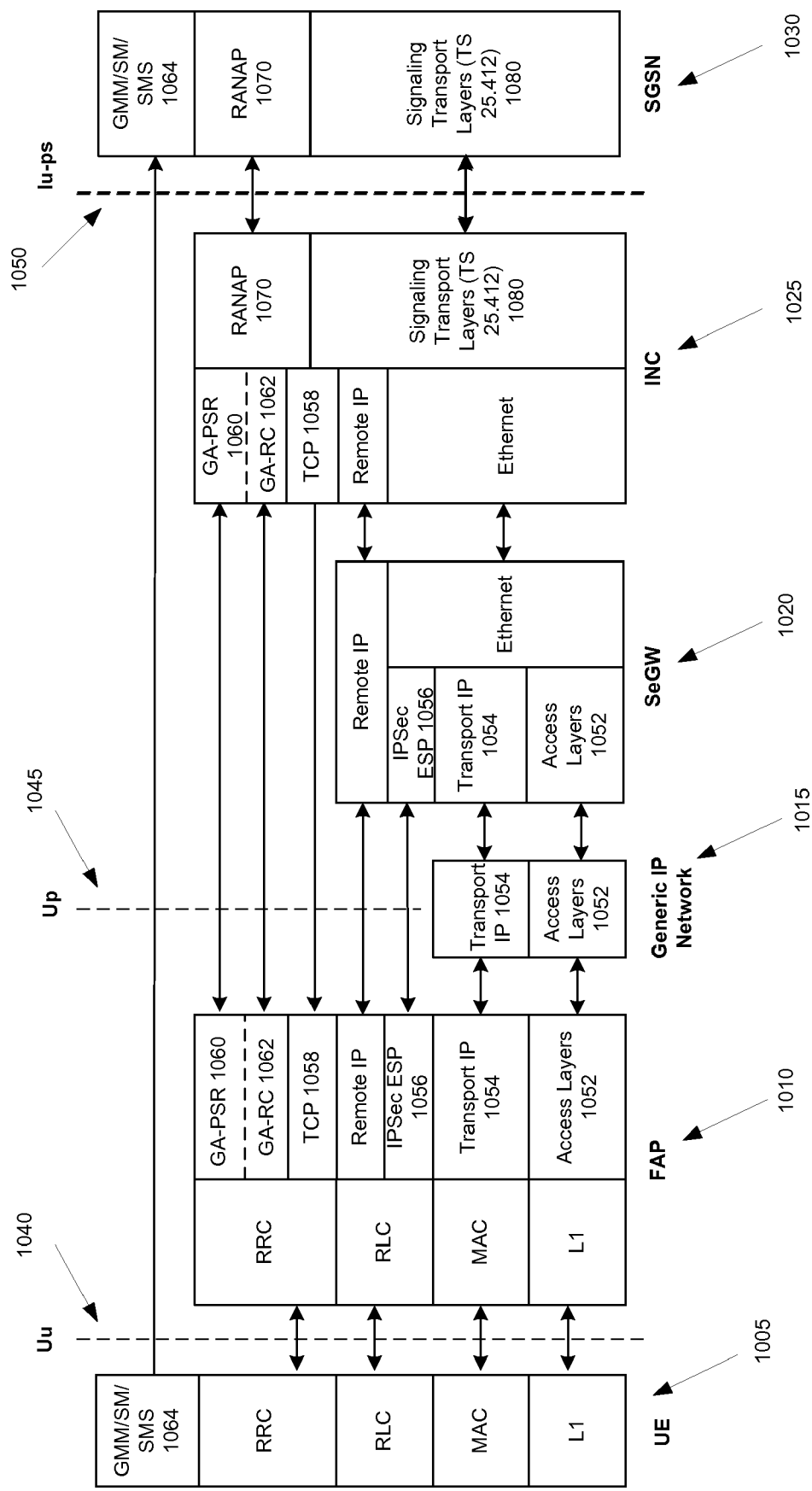
FIG. 10 illustrates PS Domain Control Plane Architecture of some embodiments.

The GAN Femtocell architecture of some embodiments in support of the PS Domain Control Plane is illustrated in FIG. 10. The figure shows different protocol layers for the UE 1005, FAP 1010, Generic IP Network 1015, SeGW 1020, INC 1025, and SGSN 1030. FIG. 10 also shows the three interfaces Uu 1040, Up 1045, and Iu-ps 1050.

The main features of the Up interface 1045 for the PS domain control plane are as follows. The underlying Access Layers 1052 and Transport IP layer 1054 provide the generic connectivity between the FAP 1010 and the GANC. The IPSec layer 1056 provides encryption and data integrity.

TCP 1058 provides reliable transport for the GA-PSR 1060 signaling messages between FAP 1010 and GANC. The GA-RC 1062 manages the IP connection, including the Femtocell registration procedures. The GA-PSR 1060 protocol performs functionality equivalent to the UTRAN RRC protocol.

Upper layer protocols 1064, such as for GMM, SM and SMS, are carried transparently between the UE 1005 and CN. The GANC terminates the GA-PSR 1060 protocol and inter-works it to the Iu-ps interface 1050 using RANAP 1070. In some embodiments, the Iu-ps signaling transport layers 1080 are per TS 25.412.

D. PS Domain—User Plane Architecture

Figure 11:
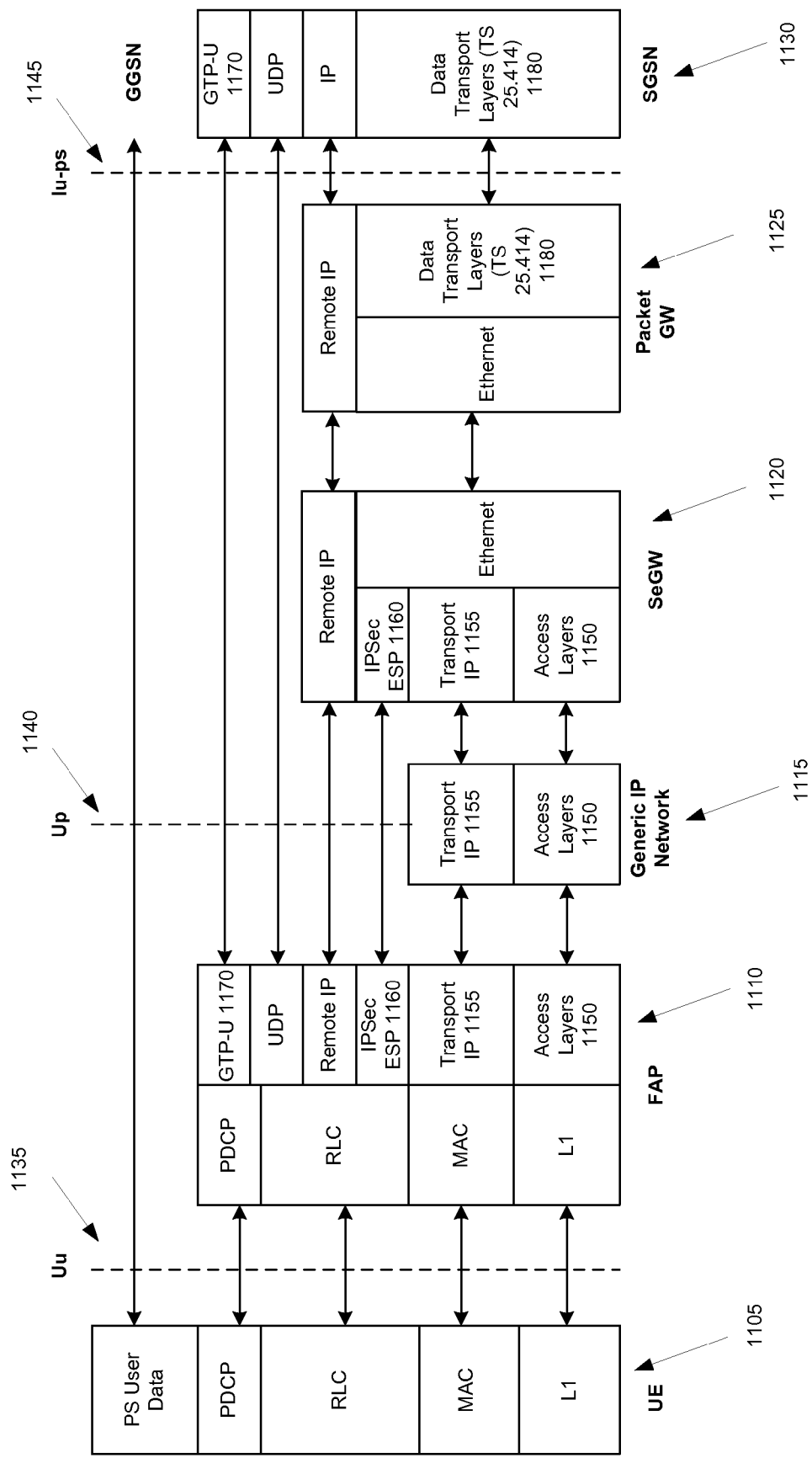
FIG. 11 illustrates PS Domain User Plane Protocol Architecture of some embodiments.

FIG. 11 illustrates the GAN Femtocell architecture for the PS Domain User Plane of some embodiments. The figure shows different protocol layers for the UE 1105, FAP 1110, Generic IP Network 1115, SeGW 1120, Packet Gateway (Packet GW) 1125, and SGSN 1130. FIG. 11 also shows the three interfaces Uu 1135, Up 1140, and Iu-ps 1145.

The main features of the Up interface 1140 for PS domain user plane are as follows. The underlying Access Layers 1150 and Transport IP layer 1155 provides the generic connectivity between the FAP 1110 and the GANC. The IPSec layer 1160 provides encryption and data integrity. The GTP-U 1170 protocol operates between the FAP 1110 and the SGSN 1130 transporting the upper layer payload (i.e. user plane data) across the Up 1140 and Iu-ps interfaces 1145.

The packet GW 1125 provides either ATM GW functionality for ATM transport or IP GW functionality for IP transport. In some embodiments, the Packet GW 1125 functionality is combined in the SeGW 1120. Additionally, in some embodiments, the Packet GW provides a GTP-U proxy functionality as well, where the GTP-U is optionally terminated in the Packet GW 1125 on either side. In the embodiments that the Packet GW 1125 provides ATM GW functionality, the packet GW 1125 provides transport layer conversion between IP (towards the FAP 1110) and ATM (towards the CN). User data 1180 is carried transparently between the UE 1105 and CN. In some embodiments, the Iu-ps Data transport layers 1180 are per TS 25.414.

E. Alternative Embodiments

In some embodiments, instead of using separate CSR and PSR protocols for communication between the FAP and the GANC, as described in this Specification, a single protocol, Generic Access Radio Resource Control (GA-RRC) is used. In these embodiments, the GA-CSR 858 (shown in FIG. 8) and GA-PSR 1060 (shown in FIG. 10) protocol layers are replaced with one protocol layer GA-RRC. Details of the GA-RRC protocol architecture and messaging are further described in the U.S. patent application Ser. No. 11/778,040, entitled "Generic Access to the Iu Interface", filed on Jul. 14, 2007. This Application, now published as U.S. Publication 2008/0039086, is incorporated herein by reference. One of ordinary skill in the art would be able to apply the disclosure of the present application regarding the GA-CSR and GA-PSR protocols to the GA-RRC protocol.

IV. Resource Management

A. GA-RC (Generic Access Resource Control)

The GA-RC protocol provides a resource management layer, with the following functions. (1) Discovery and registration with GANC, (2) Registration update with GANC, (3) Application level keep-alive with GANC, and (4) Support for identification of the FAP being used for Femtocell access.

1. States of the GA-RC Sub-layer

Figure 12:
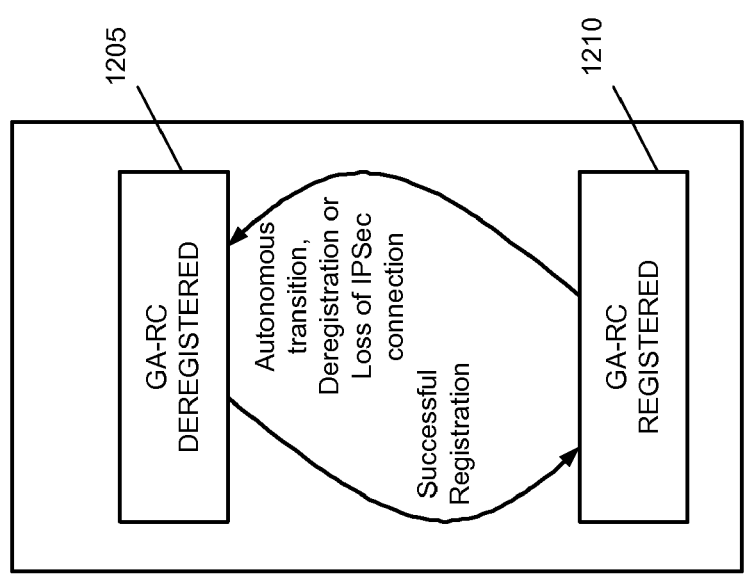
FIG. 12 illustrates the state diagram for Generic Access in the FAP of some embodiments.

FIG. 12 illustrates different states of the GA-RC sub-layer in the FAP in some embodiments. As shown, the GA-RC sub-layer in the FAP can be in one of two states: GA-RC-DEREGISTERED 1205 or GA-RC-REGISTERED 1210.

The FAP creates and maintains a separate state for the GA-RC sub-layer for each device it registers. For instance, if the FAP registers three UEs, the FAP creates and maintains three separate GA-RC sub-layers for these three UEs. Also, the FAP supports registration for two types of devices i.e. the FAP and the UE. Based on the type of device, the functionality of the GA-RC sub-layer can vary.

a) GA-RC Sub-layer for Device Type FAP

For the FAP device type, the GA-RC sub-layer is in the GA-RC-DEREGISTERED state 1205 upon power-up of the FAP. In this state, the FAP has not registered successfully with the GANC. The FAP may initiate the Registration procedure when in the GA-RC-DEREGISTERED state 1205. The FAP returns to GA-RC-DEREGISTERED state 1205 on loss of TCP or IPSec connection or on execution of the De-registration procedure. Upon transition to GA-RC-DEREGISTERED state 1205, the FAP must trigger an implicit deregistration all the UEs currently camped on the FAP.

In the GA-RC-REGISTERED state 1210, the FAP is registered with the Serving GANC. The FAP has an IPSec tunnel and a TCP connection established to the Serving GANC through which the FAP may exchange GA-RC, GA-CSR and GA-PSR signaling messages with the GANC. While the FAP remains in the GA-RC-REGISTERED state 1210 it performs application level keep-alive with the GANC.

b) GA-RC Sub-layer for Device Type UE

For the UE device type, the GA-RC sub-layer in the FAP (for each UE) is in the GA-RC-DEREGISTERED state 1205 upon UE rove-in and creation of a subsequent TCP connection between the FAP and the GANC. In this state, the UE has not been registered successfully (by the FAP) with the GANC. The FAP may initiate the Registration procedure when UE specific GA-RC sub-layer is in the GA-RC- DEREGISTERED state 1205. The GA-RC sub-layer returns to GA-RC-DEREGISTERED state 1205 on loss of TCP or IPSec connection or on execution of the De-registration procedure. Upon loss of TCP connection, FAP may attempt to re-establish the corresponding TCP session and perform the synchronization procedure. A failure to successfully re-establish the TCP session will result in GA-RC layer transitioning to GA-RC-DEREGISTERED state 1205. The GA-RC sub-layer for UE can also transition to the GA-RC-DEREGISTERED state 1205 if the corresponding GA-RC sub-layer for the FAP is in GA-RC-DEREGISTERED state 1205.

In the GA-RC-REGISTERED state 1210, the UE has been registered successfully (by the FAP) with the Serving GANC. The FAP has a shared IPSec tunnel and a new TCP connection established to the Serving GANC through which the FAP may exchange GA-RC, GA-CSR and GA-PSR signaling messages (for each registered UE) with the GANC. For each of the UE device types, the FAP will perform an application level keep-alive with the GANC on the corresponding TCP session.

In the GA-RC-REGISTERED state, the UE is camped on the Femtocell and may either be idle or the UE may be active in the Femtocell (e.g., a RRC connection may have been established). In some embodiments, an idle UE is a UE that is not currently engaged in a voice or data communication.

B. GA-CSR (Generic Access Circuit Switched Resources)

The GA-CSR protocol provides a circuit switched services resource management layer which supports the following functions: (1) setup of transport channels for CS traffic between the FAP and GANC, (2) direct transfer of NAS messages between the UE (or the FAP if the FAP supports local services) and the core network, and (3) other functions such as CS paging and security configuration.

1. States of the GA-CSR Sub-layer

Figure 13:
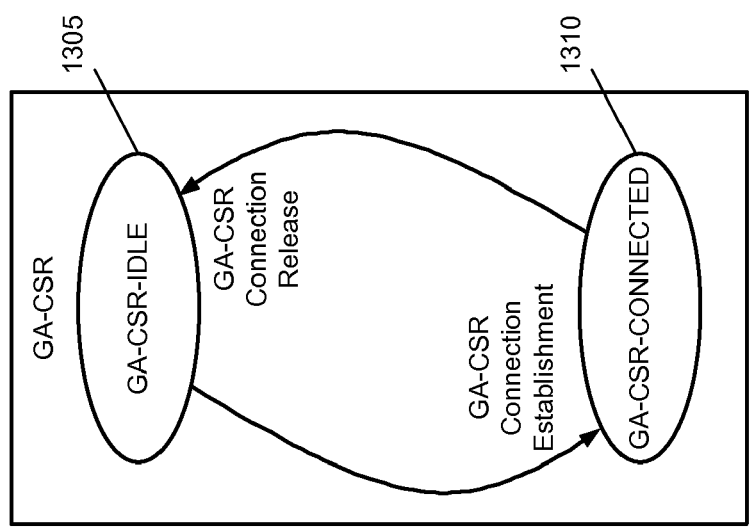
FIG. 13 illustrates the state diagram in some embodiments for GA-CSR in the FAP for each UE.

FIG. 13 illustrates the state diagram in some embodiments for GA-CSR in the FAP for each UE. As shown, the GA-CSR sub-layer in the FAP (for each UE) can be in two states: GA-CSR-IDLE 1305 or GA-CSR-CONNECTED 1310.

The GA-CSR state for each UE enters the GA-CSR-IDLE state 1305 upon rove-in to the FAP and successful registration of the UE by the FAP with the Serving GANC. This switch may occur only when the GA-RC state for the UE is in the GA-RC-REGISTERED state 1210.

The UE GA-CSR moves from the GA-CSR-IDLE state 1305 to the GA-CSR-CONNECTED state 1310 when the GA-CSR connection is established and returns to GA-CSR-IDLE state 1305 when the GA-CSR connection is released. Upon GA-CSR connection release, an indication that no dedicated CS resources exist is passed to the upper layers.

A GA-CSR connection for each UE is typically established by the FAP when upper layers messages (NAS layer) for the specific UE need to be exchanged with the network. The GA-CSR connection release can be triggered by the GANC or the FAP. If a FAP supports local services (Terminal Adaptor functionality) using the FAP SIM, there would be similar GA-CSR state for the FAP.

C. GA-PSR (Generic Access Packet Switched Resources)

The GA-PSR protocol provides a packet switched services resource management layer which supports the following functions: (1) setup of transport channels for PS traffic between the FAP (for each UE) and network, (2) direct transfer of NAS messages between the UE and the PS core network, (3) transfer of GPRS user plane data, and (4) other functions such as PS paging and security configuration.

1. States of the GA-PSR Sub-layer

Figure 14:
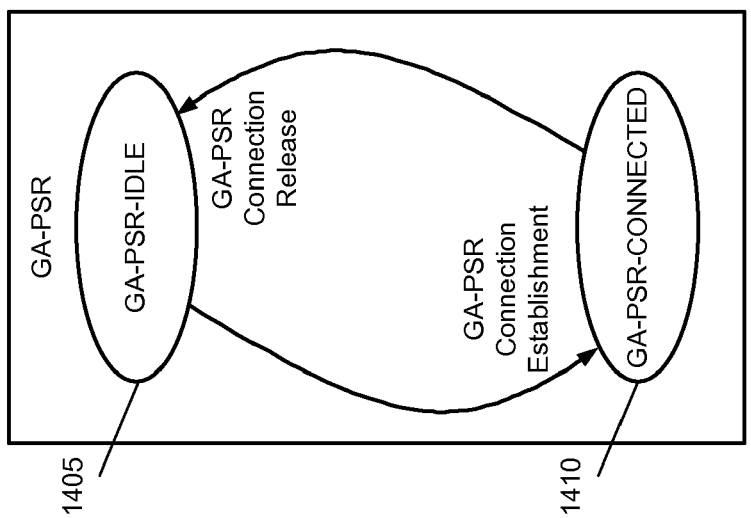
FIG. 14 illustrates the state diagram in some embodiments for GA-PSR in the FAP for each UE.

FIG. 14 illustrates the state diagram in some embodiments for GA-PSR in the FAP for each UE. As shown, the GA-PSR sub-layer for each UE can be in two states: GA-PSR-IDLE 1405 or GA-PSR-CONNECTED 1410.

The GA-PSR state for each UE enters the GA-PSR-IDLE state 1405 upon rove-in to the FAP and successful registration of the UE by the FAP with the Serving GANC. This switch may occur only when the GA-RC state for the UE is in the GA-RC-REGISTERED state 1210.

The UE GA-PSR moves from the GA-PSR-IDLE state to the GA-PSR-CONNECTED state 1410 when the GA-PSR connection is established and returns to GA-PSR-IDLE state 1405 when the GA-PSR connection is released. Upon GA-PSR connection release, an indication that no dedicated PS resources exist is passed to the upper layers. A GA-PSR connection for each UE is typically established by the FAP when upper layers messages (NAS layer) for the specific UE need to be exchanged with the network. The GA-PSR connection release can be triggered by the GANC or the FAP.

The GA-PSR Transport Channel (GA-PSR TC) provides the association between the FAP (for each UE) and GANC for the transport of PS user data over the Up interface. It is further described in "GA-PSR Transport Channel Management Procedures" Section, below. If a FAP supports local services (Terminal Adaptor functionality) using the FAP SIM, there would be similar GA-PSR state and GA-PSR TC for the FAP.

D. GA-CSR and GA-PSR Connection Handling

The GA-CSR and GA-PSR connections are logical connections between the FAP and the GANC for the CS and PS domain respectively. The GA-CSR (or the GA-PSR) connection is established when the upper layers in the FAP request the establishment of a CS (or PS) domain signaling connection and the corresponding GA-CSR (or GA-PSR) is in GA-CSR-IDLE (or GA-PSR-IDLE) state, i.e. no GA-CSR (or GA-PSR) connection exists between the FAP and GANC for the specific UE. In some embodiments, the upper layer in the FAP requests the establishment of GA-CSR (or the GA-PSR) connection, when the FAP receives a corresponding higher layer (i.e. NAS layer) message over the air interface (i.e. over the RRC connection) for the specific UE. In some embodiments, between the UE and the FAP, a single RRC connection is utilized for both CS and PS domain.

When a successful response is received from the network, GA-CSR (or GA-PSR) replies to the upper layer that the CS (or PS) domain signaling has been established and enters the corresponding connected mode (i.e., the GA-CSR-CONNECTED or GA-PSR-CONNECTED state). The upper layers have then the possibility to request transmission of a NAS messages for CS (or PS) services to the network over the corresponding GA-CSR (or GA-PSR) connection.

1. FAP Initiated GA-CSR Connection Establishment

Figure 15:
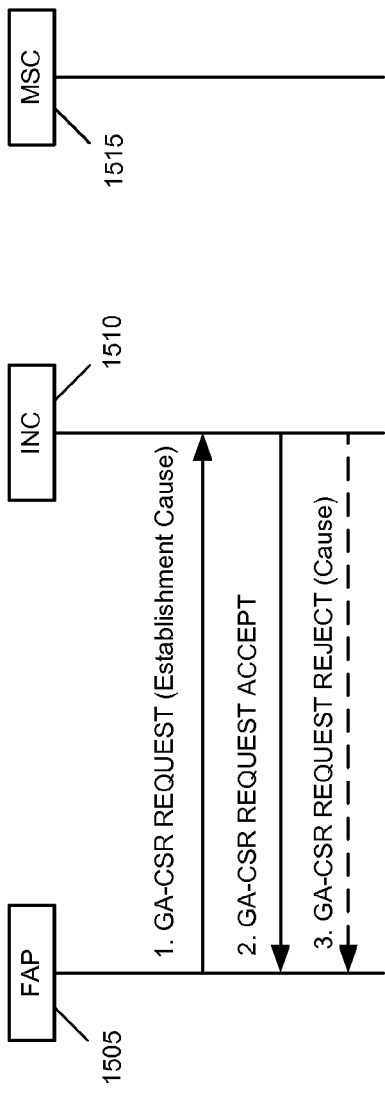
FIG. 15 illustrates FAP initiated GA-CSR connection establishment in some embodiments.

FIG. 15 illustrates successful establishment of the GA-CSR connection when initiated by the FAP 1505 in some embodiments. As shown, the FAP 1505 initiates GA-CSR connection establishment by sending (in Step 1) the GA-CSR REQUEST message to the INC 1510. This message includes the Establishment Cause indicating the reason for GA-CSR connection establishment.

INC 1510 signals the successful response to the FAP 1505 by sending (in Step 2) the GA-CSR REQUEST ACCEPT and the FAP 1505 enters the GA-CSR-CONNECTED state. Alternatively, the INC 1510 may return (in Step 3) a GA-CSR REQUEST REJECT indicating the reject cause. As shown, MSC 1515 plays no role in the FAP initiated GA-CSR connection establishment.

2. GA-CSR Connection Release

Figure 16:
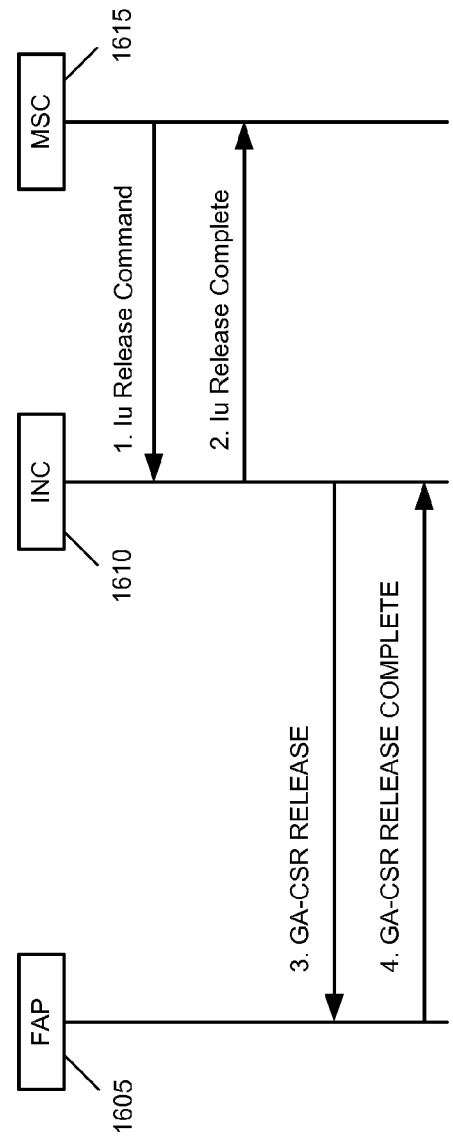
FIG. 16 illustrates GA-CSR connection release of some embodiments.

FIG. 16 shows release of the logical GA-CSR connection between the FAP 1605 and the INC 1610 in some embodiments. As shown, the MSC 1615 indicates (in Step 1) to the INC 1610 to release the CS resources (both control and user plane resources) allocated to the FAP 1605, via the Iu Release Command message. The INC 1610 confirms (in Step 2) resource release to MSC 1615 using the Iu Release Complete message.

The INC 1610 commands (in Step 3) the FAP 1605 to release resources for the specific UE connection, using the GA-CSR RELEASE message. The FAP 1605 confirms (in Step 4) resource release to the INC 1610 using the GA-CSR RELEASE COMPLETE message and the GA-CSR state in the FAP 1605 changes to GA-CSR-IDLE.

3. FAP Initiated GA-PSR Connection Establishment

Figure 17:
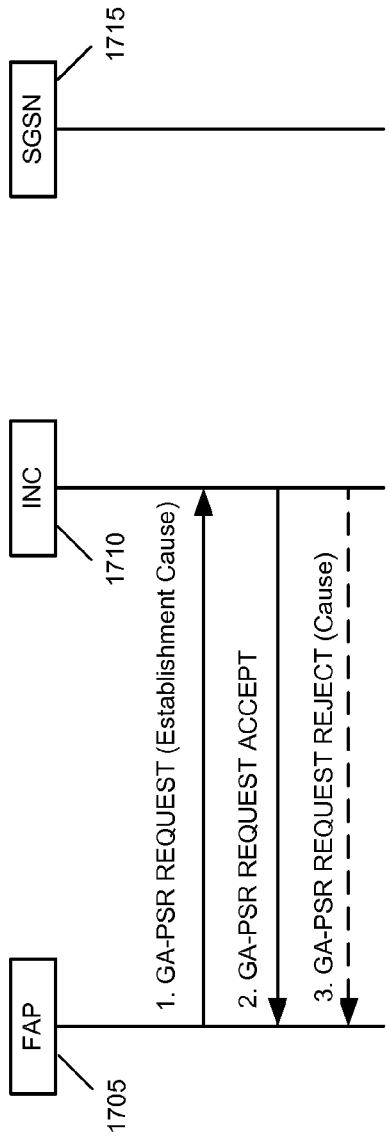
FIG. 17 illustrates FAP initiated GA-PSR connection establishment of some embodiments.

FIG. 17 shows successful establishment of the GA-PSR Connection when initiated by the FAP 1705 in some embodiments. As shown, the FAP 1705 initiates GA-PSR connection establishment by sending (in Step 1) the GA-PSR REQUEST message to the INC 1710. This message includes the Establishment Cause indicating the reason for GA-PSR connection establishment.

The INC 1710 signals the successful response to the FAP 1705 by sending (in Step 2) the GA-PSR REQUEST ACCEPT and the FAP 1705 enters the GA-PSR-CONNECTED state. Alternatively, the INC 1710 may return (in Step 3) a GA-PSR REQUEST REJECT indicating the reject cause. As shown, SGSN 1715 plays no role in the FAP initiated GA-CSR connection establishment.

4. GA-PSR Connection Release

Figure 18:
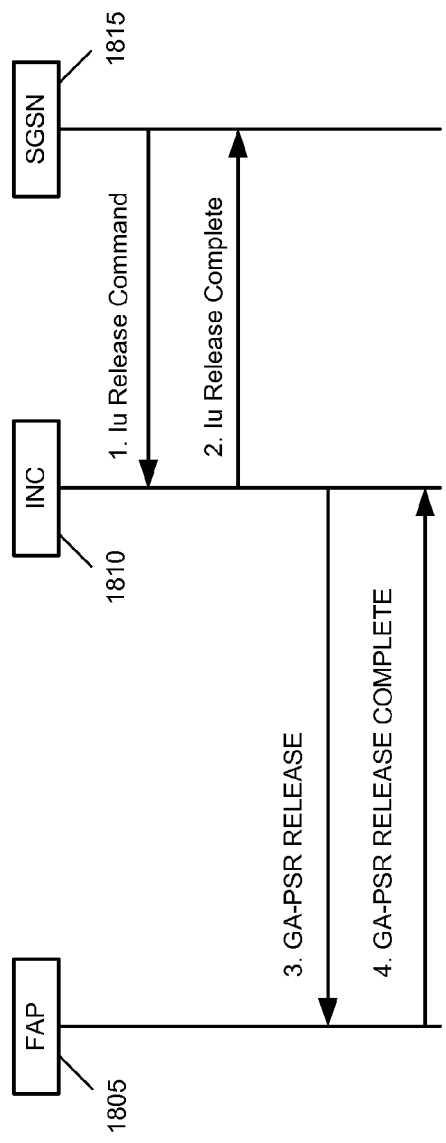
FIG. 18 illustrates GA-PSR connection release in some embodiments.

FIG. 18 illustrates release of the logical GA-PSR connection between the FAP 1805 and the GANC in some embodiments. As shown, the SGSN 1815 indicates (in Step 1) to the INC 1810 to release the PS resources (both control and user plane resources) allocated to the FAP, via the Iu Release Command message.

The INC 1810 confirms (in Step 2) resource release to SGSN 1815 by using the Iu Release Complete message. The INC 1810 commands (in Step 3) the FAP 1805 to release resources for the specific UE connection, using the GA-PSR RELEASE message. The FAP 1805 confirms (in Step 4) resource release to the GANC using the GA-PSR RELEASE COMPLETE message and the GA-PSR state in the FAP 1805 changes to GA-PSR-IDLE.

V. Mobility Management

A. UE Addressing

The IMSI associated with the SIM or USIM in the UE is provided by the FAP to the INC when it registers a specific UE attempting to camp on the FAP. The INC maintains a record for each registered UE. For example, IMSI is used by the INC to find the appropriate UE record when the INC receives a RANAP PAGING message.

B. Femtocell Addressing

The IMSI associated with the SIM or USIM in the FAP is provided by the FAP to the INC when it registers. The INC maintains a record for each registered FAP.

The Public IP address of the FAP is the address used by the FAP when it establishes an IPSec tunnel to the GANC Security Gateway. This identifier is provided by the GANC Security Gateway to the AAA server. In some embodiments, this identifier is used by the GANC network systems to support location services (including E911) and fraud detection. In some embodiments, this identifier is used by service providers to support QoS for IP flows in managed IP networks.

The Private IP address of the FAP (also referred to as the "remote IP address") is used by the FAP "inside the IPSec tunnel." This identifier is provided by the INC to the AAA server via the S1 interface when the FAP registers for Femtocell service. This identifier may be used by the Femtocell network systems in the future to support location services (including E911) and fraud detection.

In some embodiments, the Access Point ID (AP-ID) is the MAC address of the Femtocell access point through which the UE is accessing Femtocell services. This identifier is provided by the FAP to the INC via the Up interface, and by the INC to the AAA server via the S1 interface, when the FAP registers for Femtocell service. The AP-ID may be used by the Femtocell network systems to support location services (including E911, as described in "Location Based Routing" Section, below), and may also be used by the service provider to restrict Femtocell service access via only authorized FAPs (as described in "Femtocell Service Access Control" Section, below).

C. Femtocell Identification

The following points describe the Femtocell Identification strategy.

1. Location Area, Routing Area, Service Area Identification

In order to facilitate the Mobility Management functions in UMTS, the coverage area is split into logical registration areas called Location Areas (for CS domain) and Routing Areas (for PS domain). UEs are required to register with the network each time the serving location area (or routing area) changes. One or more location areas identifiers (LAIs) may be associated with each MSC/VLR in a carrier's network. Likewise, one or more routing area identifiers (RAIs) may be controlled by a single SGSN.

The LA and the RA are used in particular when the UE is in idle mode and the UE does not have any active RRC connection. The CN would utilize the last known LA (for CS domain) and RA (for PS domain) for paging of the mobile when active radio connection is not available.

The Service Area Identifier (SAI) identifies an area consisting of one or more cells belonging to the same Location Area. The SAI is a subset of location area and can be used for indicating the location of a UE to the CN. SAI can also be used for emergency call routing and billing purposes.

The Service Area Code (SAC) which in some embodiments is 16 bits, together with the PLMN-Id and the Location Area Code (LAC) constitute the Service Area Identifier.

SAI=PLMN-Id||LAC||SAC

In some embodiments, it is necessary to assign a distinct LAI to each FAP in order to detect UE's mobility from the macro network to a FAP or from one FAP to another FAP. When a UE moves from the macro network to a FAP, the UE can camp on a FAP via its internal cell selection logic. However, if the UE is in idle mode, there will be no messages exchanged between the UE and the FAP, thus making it difficult for the FAP to detect the presence of the UE. In order to trigger an initial message from UE, upon its camping on a specific FAP, the FAP will need to be assigned distinct location areas than the neighboring macro cells. This will result in the UE's MM layer triggering a Location Update message to the CN via the camped cell i.e. FAP.

UE's mobility from one FAP to another FAP must also be detected. The UE's cell selection could select a neighboring FAP and it will camp on the neighboring FAP without any explicit messaging. The neighboring FAP's Service Access Control (SAC) may not allow the camping of that specific UE, but without an initial explicit messaging there wouldn't be a way for the neighboring FAP to detect and subsequently to reject the UE.

Assuming the MCC and MNC components of the LAI remain fixed for each operator, LAI distinctiveness would be ensured by allocating a distinct LAC to each FAP, such that the LAC assigned to the FAP is different from the neighboring macro network cells and other neighboring FAPs.

However, the LAC space is limited to maximum of 64K (due to the limitation of a 16 bit LAC attribute as specified in "Numbering, addressing and identification"), 3GPP TS 23.003, hereinafter "TS 23.003". As a result, the LAC allocation scheme must provide a mechanism to re-use the LACs for a scalable solution, and at the same time minimize the operational impact on existing CN elements (MSC/SGSN).

In some embodiments, the following solution is utilized to meet the above requirements. The LAC allocation is split into two separate categories: (1) A pool of LACs managed by the FAP/AMS, and (2) A small set of LACs (one per "Iu" interface) managed by the INC.

The first set of LACs is used by the FAP/AMS to assign a unique LAC to each FAP such that it meets the following requirements (at the minimum): (1) Uniqueness with regards to the neighboring macro cells as well as other FAPs (this will ensure an initial message from the UE upon Femtocell selection and rove-in), and (2) Resolve conflicts with shared LACs where multiple FAPs sharing the same LAC are not neighbors but are accessed by the same UE (this is to allow the use of "LA not allowed" rejection code for UE rejection).

The second set of LACs (a much smaller set) is managed within each INC as follows, with the following key requirements: (1) Minimize the impact on the existing CN elements (such as minimal configuration and operational impact), (2) Seamlessly integrate the existing functionality for routing of emergency calls to appropriate PSAPs, and (3) Seamlessly integrate existing functionality for the generation of appropriate call detail records (CDRs) for billing purposes.

To meet the above requirements for the second set of LACs, each INC represents a "SuperLA" for a given Iu interface (i.e. MSC+SGSN interface). This implies the MSC/SGSN can be configured with single Super LAI/Super RAI information for that INC. Note: this does not limit the operator from configuring multiple Super LAI/Super RAI if necessary (e.g., to further subdivide the region served by a single INC into multiple geographic areas).

In addition, the INC shall utilize the following mapping functionality for assignment of SuperLA: (1) When macro coverage is reported by the FAP, INC shall support mapping of the reported macro coverage to a Super LAC, Super RAC and Service Area Code (SAC). The number of SACs utilized will be dependent on the granularity which the operator chooses for regional distribution (e.g. for emergency call routing, billing, etc), and (2) When no macro coverage is reported by the FAP, the INC shall have the following logic for the Super LAC/RAC/SAC assignment: (a) Query the AAA via the S1 interface for information on the "provisioned macro coverage" for the given FAP IMSI. If S1 reports macro coverage (based on information stored in the subscriber DB), INC uses S1 macro information to map Super LAC/RAC/SAC as above, and (b) If there is no information about the macro coverage from the S1 query, INC maps the FAP to default Super LAC/RAC/SAC; (this could result in the INC routing traffic to CN in sub-optimal mechanism). To prevent this sub-optimal routing of UE traffic to default MSC/SGSN, the following additional enhancement on the FAP may be utilized: (i) Upon a UE rove-in to this "no coverage" FAP, the FAP can gather information from the UE's initial location update (LU) request (since the UE will report last camped LAI), (ii) The FAP can collect information from multiple UEs and construct a "derived" macro coverage information (the number of UEs utilized to derive macro coverage could be algorithmic), (iii) Using this derived macro coverage information, the FAP shall send a GA-RC Register Update Uplink message to the INC, and (iv) The INC shall utilize the macro coverage information reported via the GA-RC Register Update Uplink message to map the FAP to an appropriate Super LAC/RAC/SAC as above.

A distinct LAI for each FAP also implies a distinct RAI since the RAI is composed of the LAI and Routing Area Code (RAC). The LAI and RAI are sent to the FAP via the "System Information" attribute upon successful registration of FAP. The SAI, on the other hand, is relayed to the CN in the "Initial UE message" (used to transfer initial L3 message from UE to the CN).

The FAP is expected to provide Super LAC/RAC replacement in the NAS messages from the network to the UE (e.g. LU Accept or RAU accept). The FAP must replace the "Super LAC/RAC" included in the relevant NAS messages from the network, with the appropriate locally assigned LAC/RAC information in messages sent to the UEs camped on the FAP.

2. 3G Cell Identification

A 3G Cell Id identifies a cell unambiguously within a PLMN. A 3G cell identifier is composed as below.

3G Cell Id=RNC-Id (12 bits)+cell Id (16 bits)

In some embodiments, the RNC-Id is 12 bits and cell Id is 16 bits, making the 3G Cell ID a 28 bits value. The 3G Cell Id in UMTS are managed within the UTRAN and are not exposed to the CN. As a result, the cell assignment logic can be localized to the UTRAN as long as it can ensure uniqueness within a given PLMN.

The 3G Cell Id assigned to each FAP must be distinct from its neighboring Femtocell primarily to avoid advertisement of the same cell Id in system information broadcast by two adjacent FAPs, considering the fact the physical deployment of the FAPs are ad-hoc and not controlled by the operator. In some embodiments, each INC will be statically provisioned with a unique RNC-Id and the RNC-id will be conveyed to the FAP via the System Information during registration. The FAP will be responsible for the assignment of the 16 bit cell Id locally and construct the 3G cell using the combination of INC supplied RNC-Id and locally assigned cell Id.

D. Femtocell Operating Configurations

Two Femtocell operating configurations are possible: common core configuration and separate core configuration. In common core configuration, the Femtocell LAI and the umbrella UTRAN's (e.g., the UTRAN that servers the subscriber's neighborhood) LAI are different, and the network is engineered such that the same core network entities (i.e., MSC and SGSN) serve both the Femtocells and the umbrella UMTS cells.

The primary advantage of this configuration is that subscriber movement between the Femtocell coverage area and the UMTS coverage area does not result in inter-system (i.e., MAP) signaling (e.g., location updates and handovers are intra-MSC). The primary disadvantage of this configuration is that it requires coordinated Femtocell and UMTS traffic engineering; e.g., for the purpose of MSC & SGSN capacity planning.

In separate core configuration, the Femtocell LAI and umbrella UTRAN's LAI are different, and the network is engineered such that different core network entities serve the Femtocells and the umbrella UMTS cells.

The advantage of this configuration is that engineering of the Femtocell and UMTS networks can be more independent than in the Common Core Configuration. The disadvantage of this configuration is that subscriber movement between the Femtocell coverage area and the UMTS coverage area results in inter-system (i.e., MAP) signaling.

E. Femtocell Registration

The Femtocell registration process does not involve any signaling to the PLMN infrastructure and is wholly included within the Femtocell system (i.e., between the FAP, INC, and the AAA). There are two kinds of Femtocell registrations: FAP registration and UE registration.

In FAP registration, upon power-up, the FAP registers with the INC. FAP registration serves the following purposes: (1) It informs the INC that a FAP is now connected and is available at a particular IP address. In some embodiments, the FAP creates a TCP connection to the INC before registration. The TCP connection is identified by using one or more of the following information: source IP address, destination IP address, source TCP port, destination TCP port. The INC can extract the FAP IP address from the TCP connection, (2) It provides the FAP with the operating parameters (such as LAI, Cell-Id, etc) associated with the Femtocell service at the current location. The "System Information" content that is applicable to the GAN Femtocell service is delivered to the FAP during the registration process as part of GA-RC REGISTRATION ACCEPT message sent from the INC to the FAP. The FAP utilizes the information to transmit system parameters to the UE over the broadcast control channel and (3) It allows the Femtocell system to provide the service access control (SAC) and accounting functions (e.g., AP restriction and redirection). In some embodiments, the SAC and accounting is done through the S1 interface.

In UE registration, upon Femtocell selection and cell camping, the UE initiates a LU message towards the CN via the FAP. The FAP utilizes this message to detect presence of the UE on that specific FAP. The FAP then initiates a registration message towards INC for the camped UE. UE registration by the FAP serves the following purpose: (1) It informs the INC that a UE is now connected through a particular FAP and is available at a particular IP address. The INC keeps track of this information for the purposes of (for example) mobile-terminated calling, and (2) It allows the INC to provide SAC functionality (e.g. using the S1 interface, to validate if the specific UE should be allowed Femtocell services from a specific FAP).

F. Mobility Management Scenarios

The following scenarios illustrate the message flows involved for various mobility management scenarios via the Femtocell system.

1. FAP Power On

In some embodiments, the FAP is initially provisioned with information (i.e. an IP address or a FQDN) about the Provisioning INC and the corresponding Provisioning SeGW related to that INC. This information can be in the format of either a FQDN or an IP-address or any combination of these. In case the FAP is not provisioned with information about the Provisioning SeGW, the FAP can derive a FQDN of the Provisioning SeGW from the IMSI (as described in TS 23.003). If the FAP does not have any information about either the Default INC or the Serving INC and the associated SeGW stored, then the FAP completes the Discovery procedure towards the Provisioning INC via the associated SeGW. If the FAP has stored information about the Default/Serving INC on which it registered successfully the last time, the FAP skips the discovery procedure and attempt registration with the Default/Serving INC as described below.

a) FAP Discovery Procedure

Figure 19:
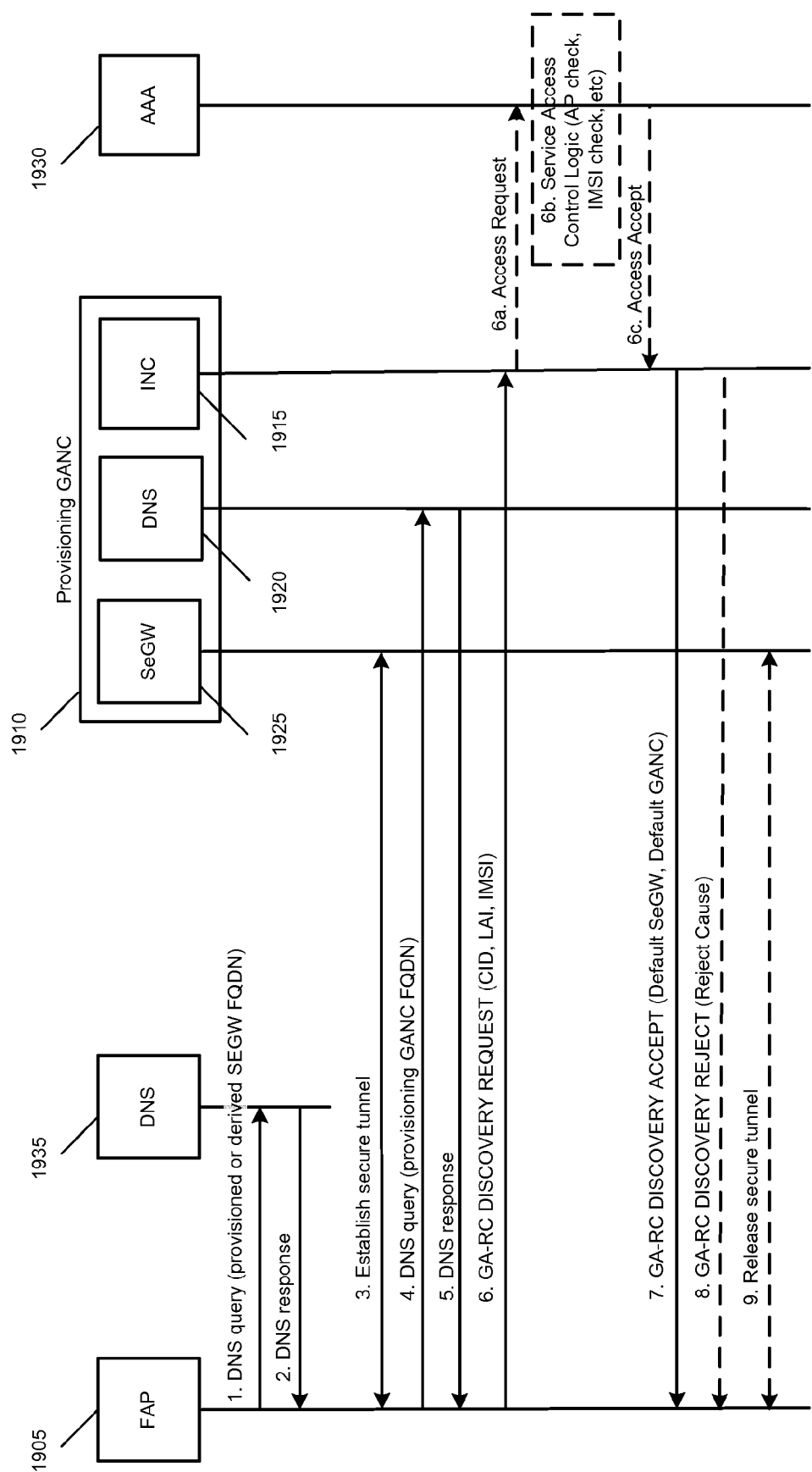
FIG. 19 illustrates FAP power on discovery procedure of some embodiments.

FIG. 19 illustrates the case in some embodiments when the FAP 1905 powers on and does not have stored information on the Default/Serving INC, and then performs a discovery procedure with the provisioning GANC 1910. The provisioning GANC 1910 includes a provisioning INC 1915, a DNS 1920, and a SeGW 1925.

As shown, if the FAP 1905 has a provisioned or derived (as described in the FAP power on sub-section, above) FQDN of the Provisioning SeGW, the FAP 1905 performs (in Step 1) a DNS query (via the generic IP access network interface) to resolve the FQDN to an IP address. If the FAP 1905 has a provisioned IP address for the Provisioning SeGW 1925, the DNS steps (Steps 1 and 2) are omitted. In some embodiments, the DNS Server 1935 is a public DNS server accessible from the FAP. The DNS Server 1935 returns (in Step 2) a response including the IP Address of the Provisioning SeGW 1925.

Next, the FAP 1905 establishes (in Step 3) a secure tunnel (e.g., an IPSec tunnel) to the Provisioning SeGW 1925. If the FAP 1905 has a provisioned or derived FQDN of the Provisioning INC 1915, the FAP 1905 performs (in Step 4) a DNS query (via the secure tunnel) to resolve the FQDN to an IP address. If the FAP has a provisioned IP address for the Provisioning INC 1915, the DNS steps (Steps 4 and 5) are omitted. The DNS Server 1920 of the provisioning GANC 1910 returns (in Step 5) a response including the IP Address of the Provisioning INC 1915.

Next, the FAP 1905 sets up a TCP connection to a well-defined port on the Provisioning INC. It then queries (in Step 6) the Provisioning INC 1915 for the Default INC, using GA-RC DISCOVERY REQUEST. The message includes: (1) Cell Info: If the FAP detects macro network coverage then the FAP provides the detected UTRAN cell ID and the UTRAN LAI (for GSM, the FAP provides the GSM cell identification and the GSM LAI). If the FAP does not detect macro network coverage, the FAP provides the last LAI where the FAP successfully registered, along with an indicator that identifies the last GERAN/UTRAN cell (e.g., by including a GERAN/UTRAN coverage Indicator Information Element (IE) which identifies the GERAN or UTRAN cell coverage). The cell Info is the information of neighboring macro cells which can be either GSM or UTRAN cells. There are multiple ways for the FAP to obtain the neighboring cell information, e.g. using pre-configuration on the FAP, obtaining the macro neighbor configuration via AMS, or having the FAP radio scan the neighboring cells. If the macro coverage is GSM, then for the scan approach, the FAP must have the capability and mechanism for scanning GSM cells, (2) FAP Identity: IMSI, and (3) The physical MAC address of the FAP: AP-ID. Optionally, if the INC 1915 has been configured for Service Access Control (SAC) over S1 interface, the INC 1915 will via AAA server 1930 authorize the FAP 1905 using the information provided in the GA-RC DISCOVERY REQUEST (Steps 6a-6c).

The Provisioning INC 1915 returns (in Step 7) the GA-RC DISCOVERY ACCEPT message, using the information provided by the FAP (e.g. the cell ID), to provide the FQDN or IP address of the Default INC and its associated Default SeGW. This is done so the FAP 1905 is directed to a "local" Default INC in the HPLMN to optimize network performance. The DISCOVERY ACCEPT message also indicates whether the INC and SeGW address provided shall or shall not be stored by the FAP 1905.

If the Provisioning INC 1915 cannot accept the GA-RC DISCOVERY REQUEST message, it returns (in Step 8) a GA-RC DISCOVERY REJECT message indicating the reject cause. The secure IPSec tunnel to the Provisioning SeGW is released (Step 9).

It is also be possible to reuse the same IPSec tunnel for FAP Registration procedures. This is the case where a discovery procedure results in the FAP to successfully find a "default" INC and a "default" SeGW. If the default SeGW is same as that used for discovery (i.e. the provisioning SeGW), then the same IPSEC tunnel can be reused. In this case the IPSec tunnel is not released.

b) FAP Registration Procedure

Figure 20:
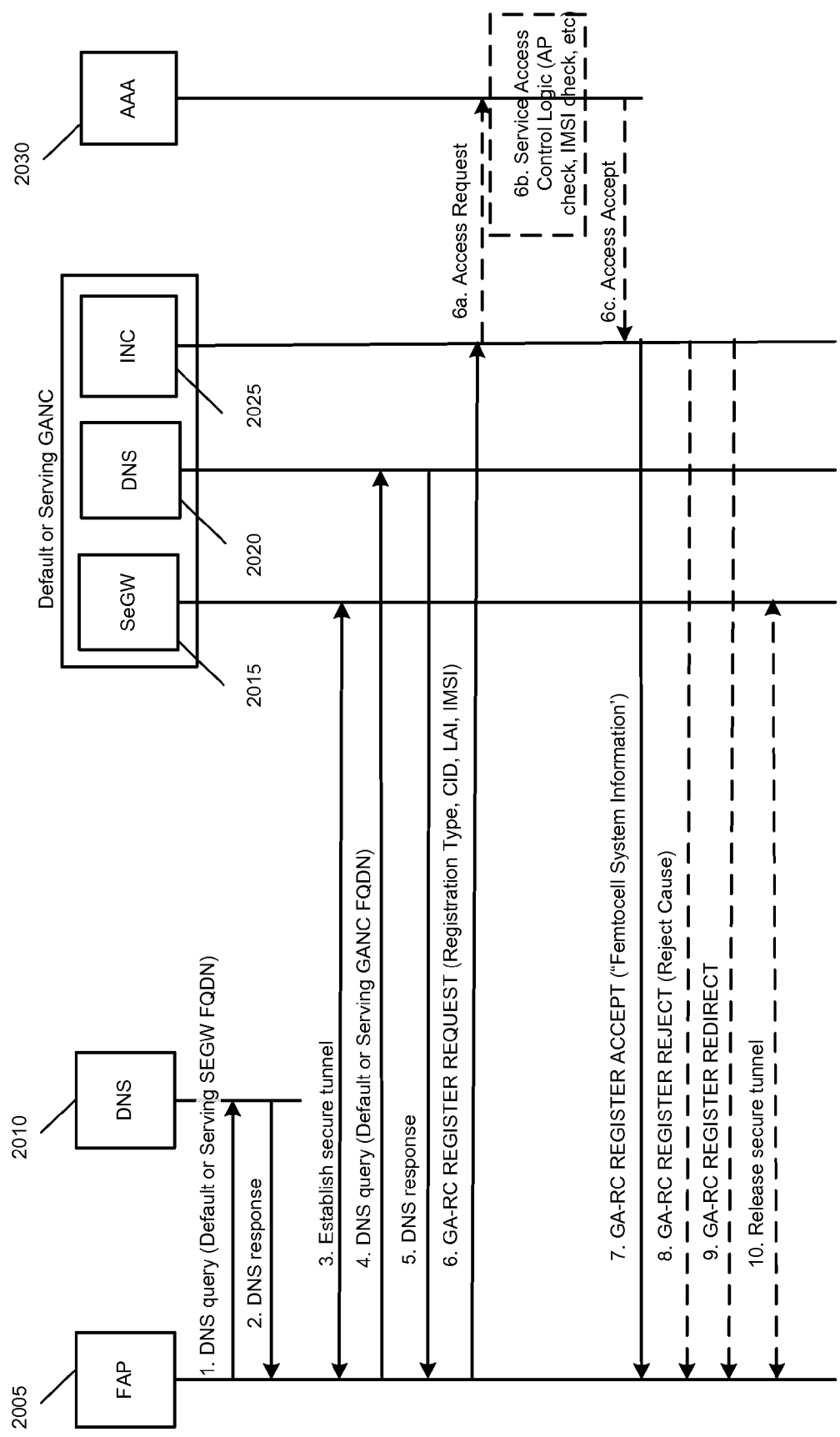
FIG. 20 illustrates FAP power on registration procedure in some embodiments.

Following the Discovery procedure the FAP establishes a secure tunnel with the Security Gateway of the Default GANC, provided by the Provisioning GANC in the Discovery procedure, and attempts to register with the Default GANC. FIG. 20 illustrates FAP power on registration procedure of some embodiments. The Default GANC may become the Serving GANC for that connection by accepting the registration, or the Default GANC may redirect the FAP to a different Serving GANC. GANC redirection may be based on information provided by the FAP during the Registration procedure, operator chosen policy or network load balancing.

As shown in FIG. 20, if the FAP 2005 was only provided the FQDN of the Default or Serving SeGW 2015, the FAP 2005 performs (in Step 1) a DNS query (via the generic IP access network interface) to resolve the FQDN to an IP address. If the FAP 2005 has a provisioned IP address for the SeGW, the DNS steps (Steps 1 and 2) are omitted. The DNS Server 2010 returns (in Step 2) a response including the IP address of the Default/Serving SeGW 2015.

Next, the FAP 2005 sets up (in Step 3) a secure IPSec tunnel to the SeGW 2015. This step may be omitted if an IPSec tunnel is being reused from an earlier Discovery or Registration. If the FAP 2005 was provided the FQDN of the Default or Serving INC, the FAP then performs (in Step 4) a DNS query (via the secure tunnel) to resolve the FQDN to an IP address. If the FAP 2005 has an IP address for the INC, the DNS steps (Steps 4 and 5) are omitted. The DNS Server 2020 returns (in Step 5) a response including the IP address of the Default/Serving INC 2025.

The FAP then sets up a TCP connection to the INC 2025. The TCP port can either be a well-known or one that has been earlier received from the network during Discovery or Registration. The FAP attempts to register (in Step 6) on the INC 2025 by transmitting the GA-RC REGISTER REQUEST. In some embodiments, the message includes one or more of the following information: Registration Type, Cell Info, Neighboring FAP Info, the physical MAC address of the FAP, FAP Identity, and location information.

The Registration Type indicates that the registering device is a Femtocell AP. This is indicated using the "GAN Classmark" IE (IEs are defined further below). The Cell Info is the neighboring UTRAN/GERAN cell ID retrieved as a result of system scan for neighbor information. The FAP must determine (using either the scan results or pre-configuration) a single suitable macro cell information to be sent in the registration.

Neighboring FAP Info is information about neighboring FAPs operating in the same PLMN and carrier frequency. This will help provide the INC with information such as the LAI and cell-ids in use by neighboring FAPs. In some embodiments, the neighboring FAP information will not be provided. The physical MAC address of the FAP is the AP-ID (in some embodiments, AP-ID is the MAC address of the FAP associated Ethernet port). The FAP Identity is the IMSI of the FAP. If GPS services are provided, location information is also supported.

Optionally, if the INC 2025 has been configured for Service Access Control (SAC) over S1 interface, the GANC will via AAA server 2030 authorize the FAP using the information provided in the REGISTER REQUEST (Steps 6a-6c). If the INC 2025 accepts the registration attempt it responds (in Step 7) with a GA-RC REGISTER ACCEPT. The message includes: (1) GAN Femtocell specific system information (e.g.) (i) Location-area identification comprising the mobile country code, mobile network code, and location area code corresponding to the Femtocell, and (ii) 3G Cell identity identifying the cell within the location area corresponding to the Femtocell. The message also includes GAN Femtocell Capability Information indicated via the use of "GAN Control Channel" IE. In some embodiments, the GAN Femtocell Capability Information include indications as to whether early Classmark sending is allowed, the GAN mode of operation, whether GPRS is available, and whether the GAN supports dual transfer mode.

In the case the INC 2025 accepts the registration attempt, the TCP connection and the secure IPSec tunnel are not released and are maintained as long as the FAP is registered to this GANC. INC does not provide operation parameters for radio management (such as carrier frequency, scrambling code, etc) to the FAP. It is expected that the FAP would obtain this information via the AMS or other pre-provisioning mechanisms.

Alternatively, the INC 2025 may reject the request. In this case, it responds (in Step 8) with a GA-RC REGISTER REJECT indicating the reject cause. The TCP connection and the secure IPSec tunnel are released and the FAP 2005 shall act as defined in the "abnormal cases" Section, below. Alternatively, if the GANC has to redirect the FAP 2005 to (another) Serving GANC, it responds (in Step 9) with a GA-RC REGISTER REDIRECT providing the FQDN or IP address of the target Serving INC and the associated SeGW. In this case the TCP connection is released (in Step 10) and the secure IPSec tunnel is optionally released depending on if the network indicates that the same IPSec tunnel can be reused for the next registration. The GA-RC REGISTER REDIRECT message includes either a single Serving SeGW and GANC address or a list of PLMN identities and associated Serving SeGW and GANC addresses and an indication of whether GANC address(es) can be stored in the FAP for future use.

c) Abnormal Cases

If the Serving INC rejects the Register Request and does not provide redirection to another Serving INC, the FAP shall re-attempt Registration to the Default INC including a cause indicating the failed registration attempt and the Serving INC and SeGW with which the Register Request failed. The FAP should also delete all stored information about this Serving GANC.

If the Default INC rejects a Registration Request and is unable to provide redirection to suitable Serving INC, the FAP may re-attempt the Discovery procedure to the Provisioning INC (including a cause indicating the failed registration attempt and the Default INC provided in the last Discovery procedure). The FAP should also delete all stored information about the Default GANC. The possible register reject causes for FAP registration attempts are Network Congestion, Location Not Allowed, Geo-Location not know, IMSI not allowed, AP not allowed, and Unspecified.

2. FAP Initiated FAP Synchronization after TCP Connection Reestablishment

Figure 21:
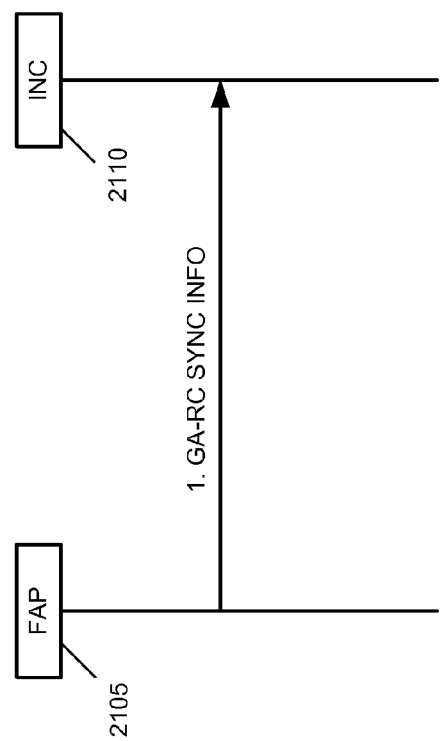
FIG. 21 illustrates the messages associated with the FAP initiated synchronization procedure in some embodiments.

In some embodiments, when FAP receives TCP Reset (TCP RST) after TCP connection failure, the FAP tries to re-establish the signaling connection using GA-RC Synchronization procedure. FIG. 21 illustrates the messages associated with the FAP initiated synchronization procedure in some embodiments.

a) Initiation of the FAP Synchronization Procedure by the FAP

In some embodiments, when FAP receives TCP RESET after TCP connection failure, the FAP attempts to re-establish TCP connection once. After successfully re-establishing TCP connection, the FAP 2105 sends (in Step 1) GA-RC SYNCHRONIZATION INFORMATION to the GANC 2110 to synchronize the state information. When the FAP is unsuccessful in re-establishing the TCP connection, the FAP releases the related local GA-CSR or GA-PSR resources, and continues as per sub-section "Handling of Lower Layer faults" described further below.

b) Processing of the FAP Synchronization Information Message by the GANC

Upon receiving the GA-RC SYNCHRONIZATION INFORMATION message from the FAP, the GANC updates the FAP state information as specified in the request. The GANC also verifies that the binding (IMSI, inner IP address) as received in the GA-RC SYNCHRONIZATION INFORMATION is the same as the one that the FAP used as identity for authentication to the GANC-SeGW.

3. System Selection

In some embodiments, in the combined 3G network, both standard UMTS RNS and UMA Femtocell network coexists within the same or different PLMN. Standard UMTS UEs utilize both access options whichever is more optimal in a specific scenario. In these embodiments, no changes are required to the PLMN selection procedures in the NAS layers (MM and above) in the UE as described in "Non-Access-Stratum functions related to Mobile Station (MS) in idle mode", 3GPP TS 23.122. Also, in these embodiments, no changes are required to the standard cell selection mechanism as described in "User Equipment (UE) procedures in idle mode and procedures for cell reselection in connected mode", 3GPP TS 25.304. The necessary configuration and the system behavior for rove-in to Femtocell coverage and rove-out to the macro network coverage are described in the following paragraphs.

During the service activation or provisioning update, the UMA Femtocell Network provides the FAP with radio parameters such as the operating UARFCN and a list of primary scrambling codes for the Femtocell. The provisioning parameters will also include the list of UARFCNs/scrambling codes associated with the neighboring macro cells.

The FAP then performs a neighborhood scan for the existence of macro coverage using the macro UARFCN information. If multiple macro network cells are detected in the FAP scan, the FAP selects the best suitable macro cell for the purpose of reporting it to the Serving INC during FAP registration. The FAP also stores the macro cell list to be provided as a neighbor list for the camping UEs.

The FAP also scans the neighborhood for the existence of other FAPs within the same PLMN. It then selects unused {UARFCN, SC} pair from the provisioned list of available pairs such that the selected {UARFCN, SC} does not conflict with any neighboring FAP's {UARFCN, SC} combination.

The FAP attempts to register with the Serving INC (obtained via Discovery/Registration mechanisms as described in the FAP discovery procedure and FAP registration procedure Sections above) and includes information about the selected macro cell and a list of neighboring FAPs. The Serving INC uses information provided during registration to assign network operating parameters for the registering FAP such as the LAI, 3G cell-id, service area, etc.

The Serving INC returns the network operating parameters to the registering FAP using the register accept message. The FAP uses a combination of information obtained through the initial provisioning and Registration and broadcasts appropriate System Information to UEs to be able to select Femtocell service and camp on the FAP.

The macro network RNCs are provisioned with the list of {UARFCN, SC} associated with Femtocell neighbors. Since the Femtocell network has to be able to scale to millions of FAPs and the deployment location cannot be controlled, the macro network RNCs are provisioned with a list of 5-10 {UARFCN, SC} combinations corresponding to the neighboring FAPs. As a result of the limitations associated with neighbor list provisioning on the macro RNC, the FAP will need to select one of the 5-10 provisioned {UARFC, SC} pairs for its operation such that no two neighboring FAPs (determined via FAPs' scan) shall re-use the same pair for its operation.

The macro RNC shall provide the FAP neighbor list information to the UEs camped on the macro network and using the specific RNC. This will result in the UEs making periodic measurements on the FAP neighbor list.

As the UE comes within the coverage area of the FAP and its signal level becomes stronger, the UE will select the Femtocell. The UE cell-reselection i.e. rove-in to FAP cell can be enhanced via two possible mechanisms: (1) The FAP cell can be in a different HPLMN (equivalent PLMN list) and will be selected via preferred equivalent PLMN selection. This assumes that the UE's current camped macro cell is not in the equivalent PLMN list, and (2) The FAP will broadcast system information (such as Qqualmin and Qrxlevmin) so that UE shall prefer the FAP cell in the presence of other macro cell coverage.

Upon cell reselection and camping on the FAP cell, the UE will initiate a location registration since the FAP LAI is different than the LAI of the previously camped macro cell.

4. UE Registration

Figure 22:
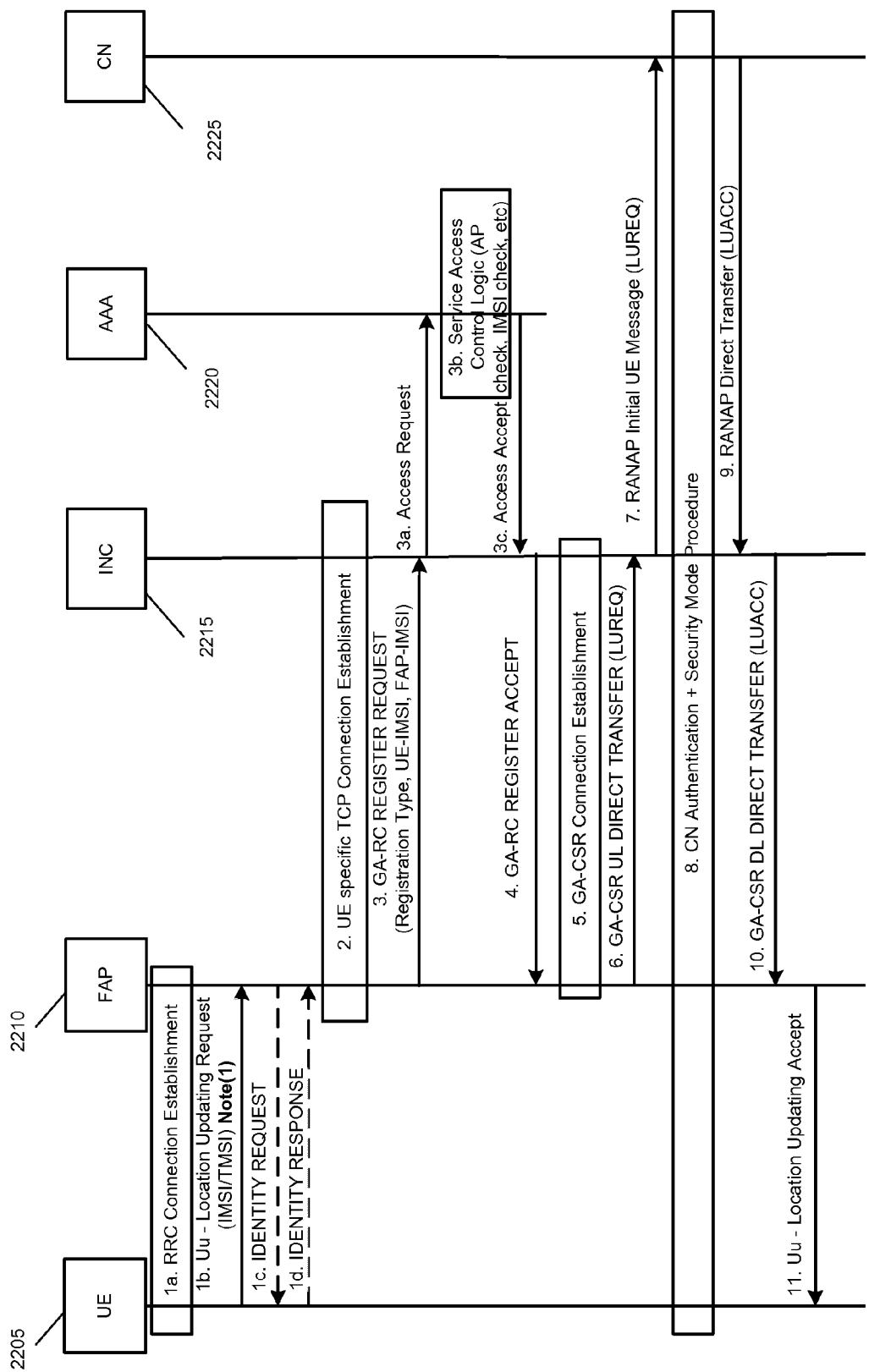
FIG. 22 illustrates UE registration in some embodiments.

The UE, upon camping on the FAP (via its internal cell selection mechanism), will initiate a NAS layer Location Update procedure towards the CN via the FAP (The LU is triggered since the FAP broadcasts a distinct LAI than its neighboring macro cells and other neighboring Femtocells). The FAP will intercept the Location Update message and attempt to register the UE with the INC as illustrated in FIG. 22. A person of ordinary skill in the art would appreciate that a UE always initiates location update procedure towards the core network, i.e., the UE uses the upper protocol layers that are directly exchanged with the core network. As described in this sub-section and several other sub-sections below, the disclosed FAP has the capability to intercept this message and to attempt to register the UE with the INC.

As shown, the UE 2205 establishes (in Step 1*a*) a radio resource control (RRC) connection with the FAP 2210 on which it camps. The UE 2205 starts (in Step 1*b*) a Location Update procedure towards the CN. In some embodiments, for networks supporting network mode 1, where there is a Gs interface between the MSC and SGSG, the UE triggers a combined Routing Area (RA)/Location Area (LA) update instead of the initial LA update upon rove-in to FAP. The FAP 2210 will intercept the Location Update request (or the combined RA/LA update request) and attempts to register the UE with the associated Serving INC over the existing IPSec tunnel. Optionally, the FAP may request (in Step 1*c*) the IMSI of the UE if the Location Update is done (in Step 1*d*) using the TMSI, since the initial registration for the UE must be done using the permanent identity i.e. the IMSI of the UE.

Next, the FAP 2210 sets up (in Step 2) a separate TCP connection (for each UE) to a destination TCP port on the INC 2215. The INC destination TCP port is the same as that used for FAP registration. The FAP 2210 attempts to register the UE 2205 on the INC 2215 using the UE specific TCP connection by transmitting (in Step 3) the GA-RC REGISTER REQUEST. The message includes Registration Type (which indicates that the registering device is a UE. This is indicated using the "GAN Classmark" IE), Generic IP access network attachment point information (i.e., AP-ID), UE Identity (i.e., UE-IMSI), and FAP identity (i.e., FAP-IMSI). In some embodiments, the AP-ID is the MAC address of the FAP.

Optionally, if the INC 2215 has been configured for Service Access Control (SAC) over S1 interface, the INC 2215 will, via AAA server 2220, authorize the UE using the information provided in the REGISTER REQUEST (Steps 3*a*-3*c*). The authorization logic on the AAA server 2220 would also check to see if the UE 2205 is allowed Femtocell access using the specific FAP.

If the INC 2215 accepts the registration attempt it responds (in Step 4) with a GA-RC REGISTER ACCEPT. Next, the FAP 2210 establishes (in Step 5) a GA-CSR connection with the INC 2215. The FAP 2210 encapsulates (in Step 6) the Location Update NAS PDU within a GA-CSR UL DIRECT TRANSFER message that is forwarded to the INC 2215 via the existing TCP connection.

Next, the INC 2215 establishes a SCCP connection to the CN 2225 and forwards (in Step 7) the Location Update request (or the combined RA/LA update request) NAS PDU to the CN 2225 using the RANAP Initial UE Message. Subsequent NAS messages between the UE 2205 and core network 2225 will be sent between INC 2215 and CN 2225 using the RANAP Direct Transfer message.

Next, the CN 2225 authenticates (in Step 8) the UE 2205 using standard UTRAN authentication procedures. The CN 2225 also initiates the Security Mode Control procedure described in the Security Mode Control Subsection under Femtocell Security Section further below. The CN 2225 indicates (in Step 9) it has received the location update and it will accept the location update using the Location Update Accept message to the INC 2215.

The INC 2215 forwards (in Step 10) this message to the FAP 2210 in the GA-CSR DL DIRECT TRANSFER. The FAP 2210 will relay (in Step 11) the Location Update Accept over the air interface to the UE 2205. Once the UE 2205 has been successfully registered (by the FAP) with the INC 2215 and performed a successful location update, the FAP 2210 will expect a periodic LU for that UE (the enabling and the periodicity of the LU is controlled by the FAP via System Information broadcast from the FAP to the UE). This exchange will serve as a keep-alive between the FAP 2210 and the UE 2205 and will help the FAP 2210 detect idle UE's moving away from the camped FAP 2210 without explicit disconnect from the network.

a) Abnormal Cases

If the Serving INC rejects the UE specific Register Request, the FAP shall reject the corresponding "Location update" request from the UE using appropriate reject mechanisms (example: RRC redirection to another cell or reject the LU with reject cause of "Location Area not allowed", etc). The FAP shall tear down the corresponding TCP session for the specific UE. The possible register reject causes for UE specific registration attempts are (1) AP not allowed (implies UE not allowed on FAP for the UE specific registration), (2) IMSI not allowed, (3) Location not allowed, (4) Unspecified, and (5) FAP not registered.

5. UE Rove Out

Figure 23:
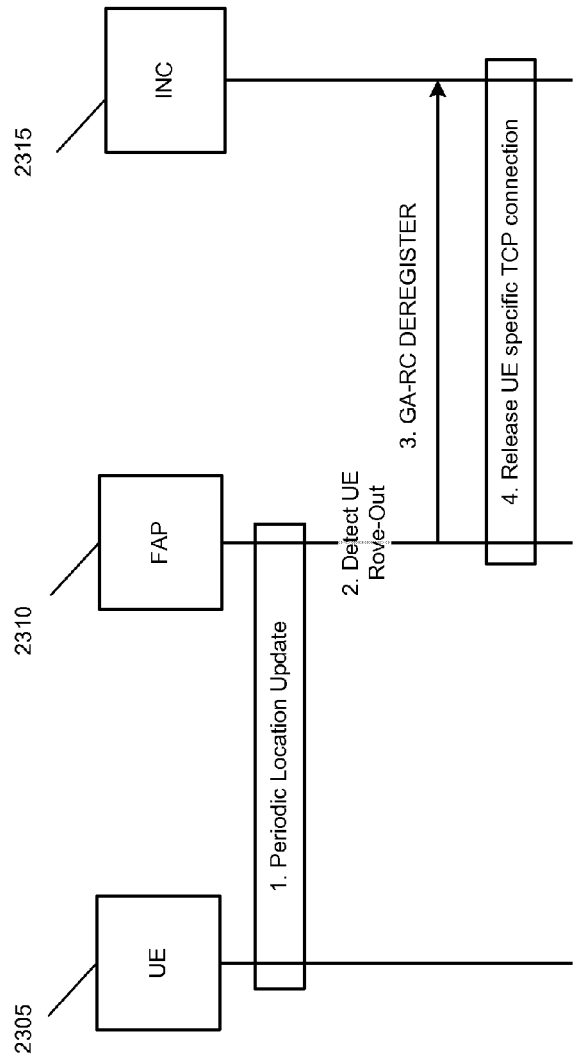
FIG. 23 illustrates UE Rove out in some embodiments.

FIG. 23 scenario illustrates the case when the UE leaves the Femtocell coverage area while idle. As shown, upon successful GAN registration and location update (LU) of the UE 2305, the FAP 2310 will monitor (in Step 1) the UE 2305 via periodic location updates. The enabling and the periodicity of the LU is controlled by the FAP 2310 via System Information broadcast from the FAP to the UE. This exchange will serve as a keep-alive between the FAP and the UE.

Next, FAP 2310 determines (in Step 2) that the UE 2305 is no longer camped on the FAP (roved out), as a result of missing a number of periodic location updates from the UE. Once, the FAP determines that the UE has roved out, the FAP informs the GANC that the UE has detached by sending (in Step 3) a GA-RC DEREGISTER message to the INC 2315 using the associated TCP connection. Since a TCP connection from the FAP to the GANC is unique for each UE, sending GA-RC DEREGISTER message on the specific TCP connection implies deregistration of the specific UE. Next, the GANC removes (in Step 4) any associated UE context upon receiving the deregister message on the UE specific TCP connection. In some embodiments, the context associated with a UE includes states and other information that the GANC keeps for each UE which is successfully registered. The FAP 2310 also releases (in Step 4) the UE specific TCP connection to the INC.

6. UE Power Down with IMSI Detach

Figure 24:
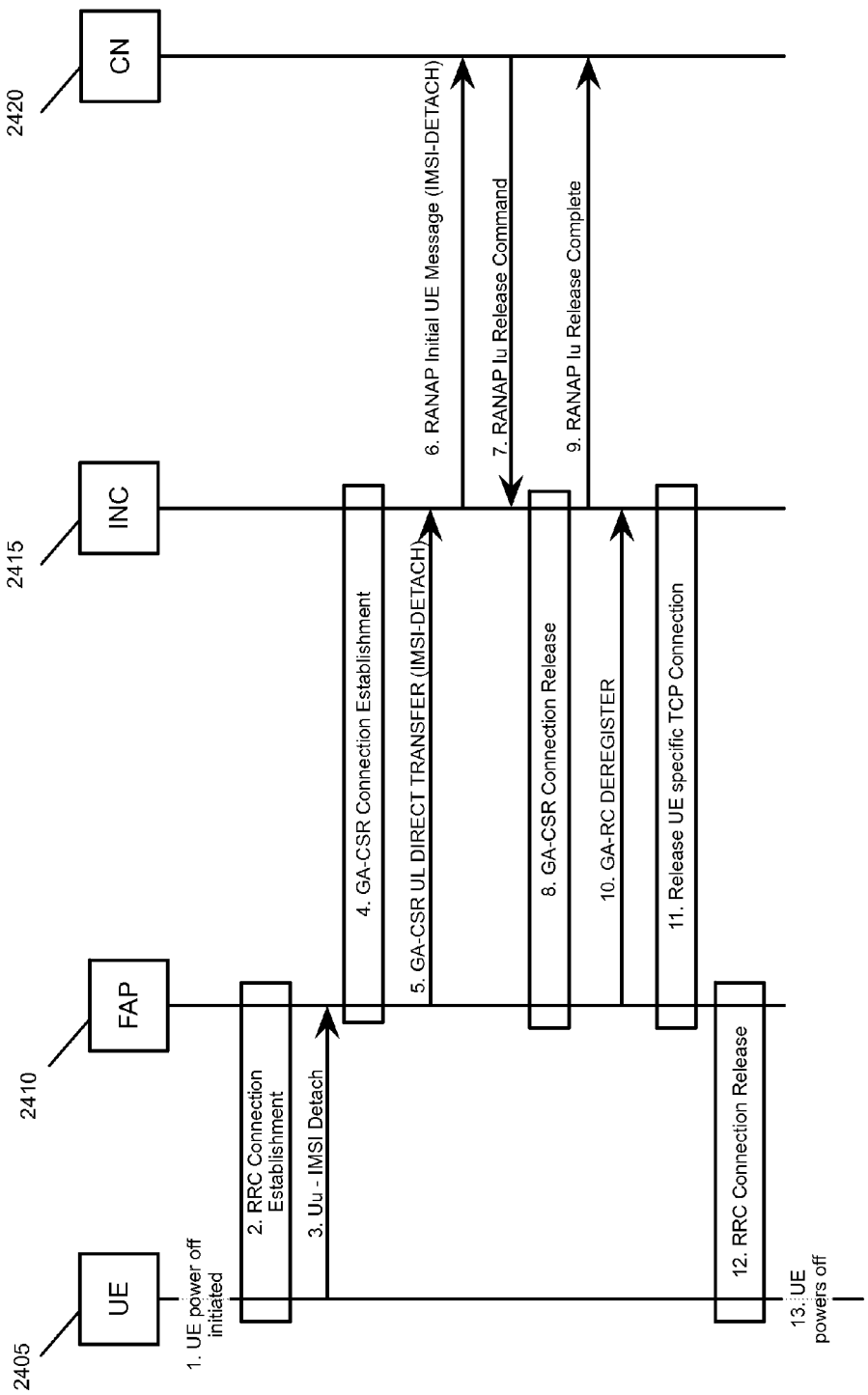
FIG. 24 illustrates a scenario where the UE powers down and performs an IMSI detach in some embodiments.

FIG. 24 illustrates the case when the UE powers down and performs an IMSI detach via the GAN network in some embodiments. As shown, UE 2405 in idle mode initiates (in Step 1) power off sequence. Next, the UE 2405 establishes (in Step 2) an RRC Connection with the FAP 2410. The UE sends (in Step 3) a MM Layer IMSI-Detach message over the air interface to the FAP. The FAP 2410 establishes (in Step 4) a GA-CSR connection with the INC 2415.

The FAP 2410 encapsulates the IMSI-Detach NAS PDU within a GA-CSR UL DIRECT TRANSFER message that is forwarded (in Step 5) to the INC 2415 via the existing TCP connection. The INC 2415 establishes a SCCP connection to the CN 2420 and forwards (in Step 6) the IMSI-Detach NAS PDU to the CN 2420 using the RANAP Initial UE Message. The CN 2420 initiates (in Step 7) a normal resource cleanup via RANAP Iu Release Command to the INC 2415. The Iu Release from the CN 2420 results in INC 2415 tearing down (in Step 8) the corresponding GA-CSR connection.

Next, INC 2415 acknowledges (in Step 9) resource cleanup via RANAP Iu Release Complete message to the CN. FAP 2410 deregisters (in Step 10) the UE using the UE specific TCP connection. In some embodiments, the FAP utilizes the mechanism described in Subsection "UE rove out" above to detect that the UE has roved and trigger the UE deregistration. As an optimization, the FAP can also monitors the IMSI-Detach NAS message from the UE and trigger deregistration of the UE.

Next, the FAP 2410 releases (in Step 11) the UE specific TCP connection. FAP initiates (in Step 12) RRC Connection release procedure towards the UE. Finally, the UE powers off (in Step 13).

7. UE Power Down without IMSI Detach

The sequence of events is same as UE Roving out of Femtocell as described in Subsection "UE rove out" above.

8. Loss of Up Interface Connectivity

Figure 25:
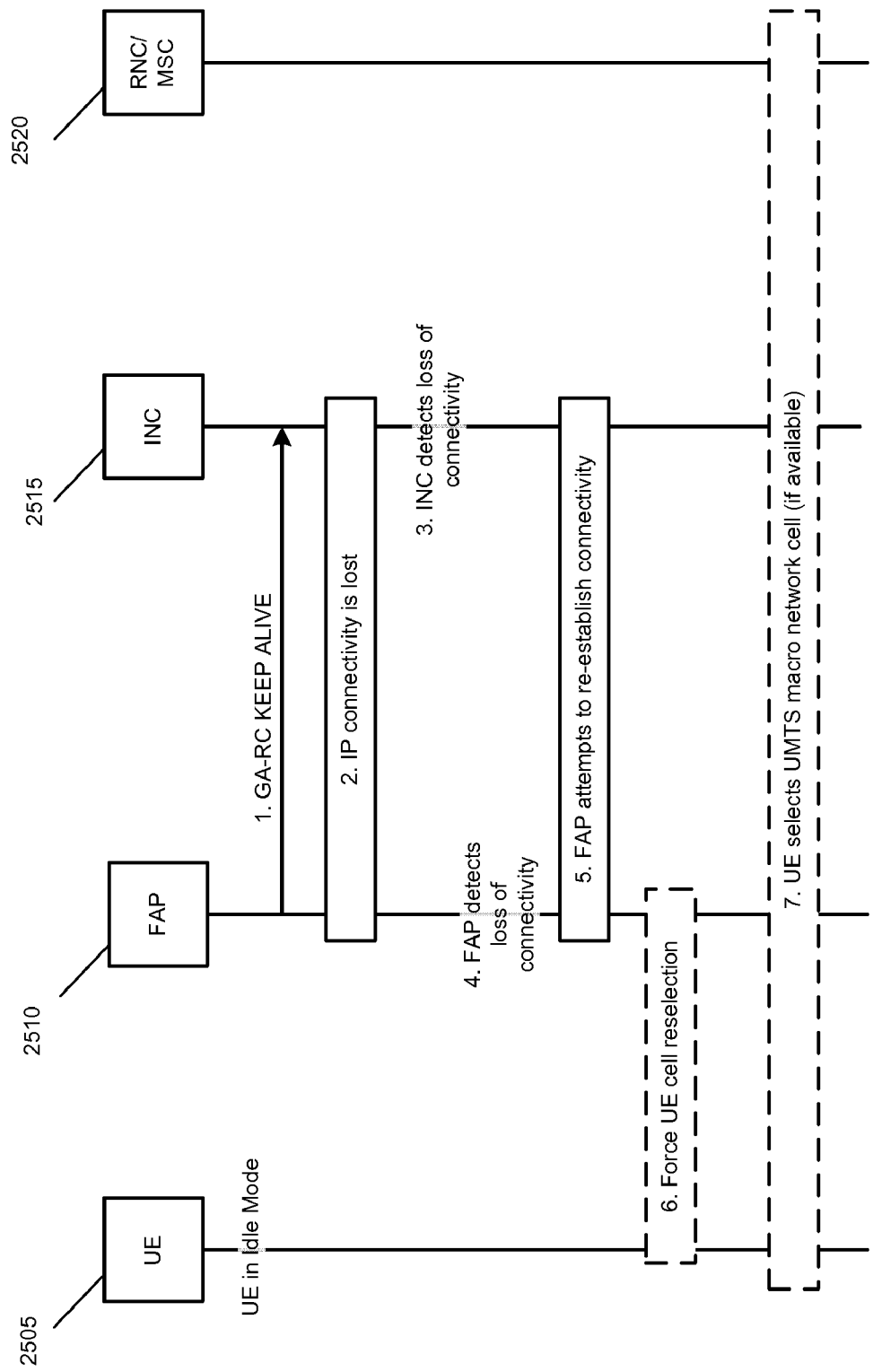
FIG. 25 illustrates a scenario for loss of Up interface connectivity in some embodiments.

FIG. 25 illustrates the case when Up interface connectivity is lost. As shown, the UE 2505 is in idle mode. The FAP 2510 periodically sends (in Step 1) GA-RC KEEP ALIVE message to the INC 2515 to check that the TCP connection exists. In Step 2, the TCP (or IP) connectivity between the FAP 2510 and INC 2515 is lost (e.g., due to a broadband network problem).

If the INC detects (in Step 3) the loss of connectivity, it releases the resources assigned to the FAP (e.g., TCP connection) and deletes the subscriber record (i.e., performs a local deregistration of the FAP). Optionally, the INC implementation may also delete UE specific connections originating on that FAP.

If the FAP 2510 detects (in Step 4) the loss of TCP connectivity and if the loss is on the FAP specific TCP connection, the FAP 2510 attempts (in Step 5) to re-establish the TCP connection and re-register with the INC. If the FAP re-establishes connectivity and re-registers before the INC detects the problem, the INC must recognize that the FAP is already registered and adjust accordingly (e.g., release the old TCP connection resources). In some embodiments, the FAP specific TCP is a unique TCP connection dedicated to the FAP and is used for FAP IMSI related signaling to the INC such as FAP registration, FAP call setup if the FAP offers local calling using the FAP IMSI, etc.

Different embodiments use different methods for the FAP to detect the loss of a TCP connection. In some embodiments, the TCP sub-layer (TCP stack) in the FAP indicates (to the upper layers) if the connectivity to the other end point (i.e., the INC) is lost. The notification from the TCP sub-layer on the FAP can happen either when the upper layers attempt to transmit data over the TCP connection or the stack can detect connectivity loss via a TCP Keep Alive mechanism.

When the FAP is unsuccessful in re-establishing connectivity, the FAP will do the followings (not shown) to deregister all the UEs currently camped on the FAP: (1) The FAP sends a GA-RC DEREGISTER message to the INC using the currently established TCP connection for each UE, (2) releases the TCP connection towards the GANC, and (3) releases all resources associated with the deregistered UE.

Additionally, the FAP 2510 forces (in Step 6) all the UEs, currently camped on that FAP, to do a cell-reselection and rove out of Femtocell coverage. If the TCP connectivity loss is detected on the UE specific connection, the FAP will deregister the UE and trigger cell reselection on the UE immediately without attempting to re-establish the UE specific TCP connection. Finally, the UE 2505, as a result of the cell re-selection, will switch (in Step 7) to UMTS macro cell 2520 (if UMTS macro network coverage is available).

9. INC-Initiated Deregister

In some embodiments, the INC deregisters the FAP under the following error cases: (1) INC receives GA-RC REGISTER UPDATE UPLINK message, but FAP is not registered, (2) INC receives GA-RC REGISTER UPDATEUPLINK message, but encounters a resource error and cannot process the message, (3) INC receives GA-RC REGISTER UPDATE UPLINK message with new macro network cell information, and the macro cell is Femtocell-restricted, and (4) INC receives a GA-RC REGISTER UPDATE UPLINK message and sends a request to the AAA server for a registered FAP, and one of the following happens: (a) INC receives an authentication failure for the user from AAA server, (b) INC doesn't receive a response from AAA server, and transaction timer expires, or (c) S1 interface is enabled but no AAA server is configured, so the user couldn't be authenticated. In some embodiments, the INC deregisters the UE when the INC receives GA-RC SYNCHRONIZATION INFORMATION message for a UE that is not registered.

10. FAP-Initiated Register Update

Figure 26:
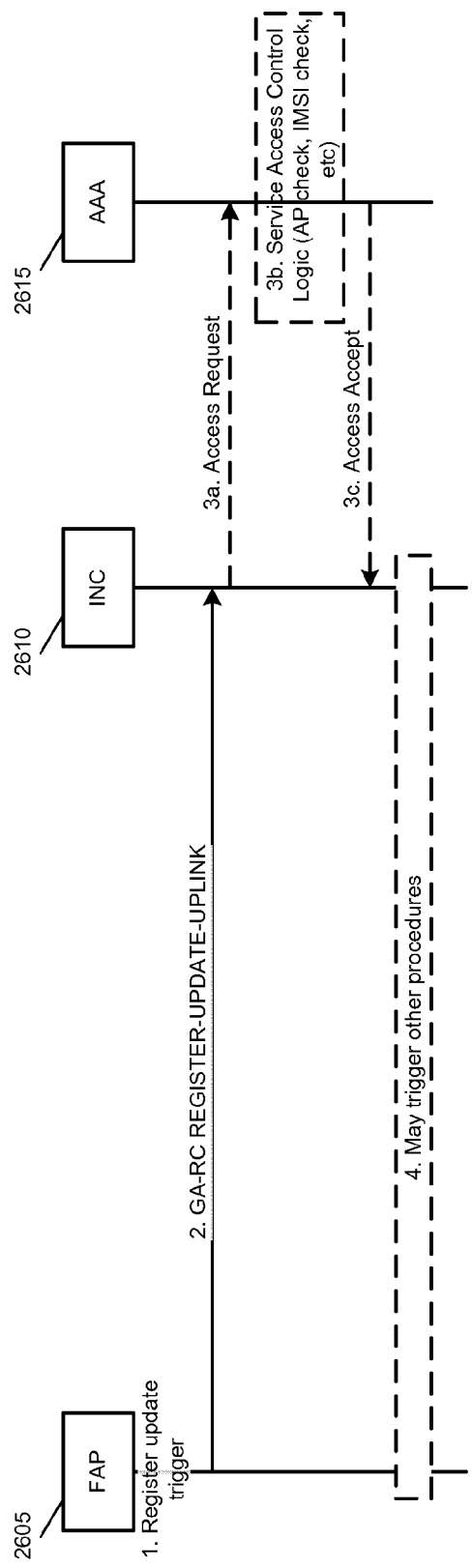
FIG. 26 illustrates FAP-initiated register update scenario of some embodiments.

FIG. 26 illustrates a scenario where the FAP initiates a registration update in some embodiments. As shown, a register update is triggered (in Step 1) in the FAP 2605 (e.g., Detection of macro network coverage). The FAP sends (in Step 2) a GA-RC REGISTER-UPDATE-UPLINK to the INC 2610.

The INC 2610 exchanges (in Steps 3a-3c) S1 RADIUS messages with the AAA server 2615 for service access control (SAC). Based on the outcome of SAC, additional procedures may be triggered (in Step 4) by this operation (e.g., deregistration or register update downlink).

11. INC-Initiated Register Update

Figure 27:
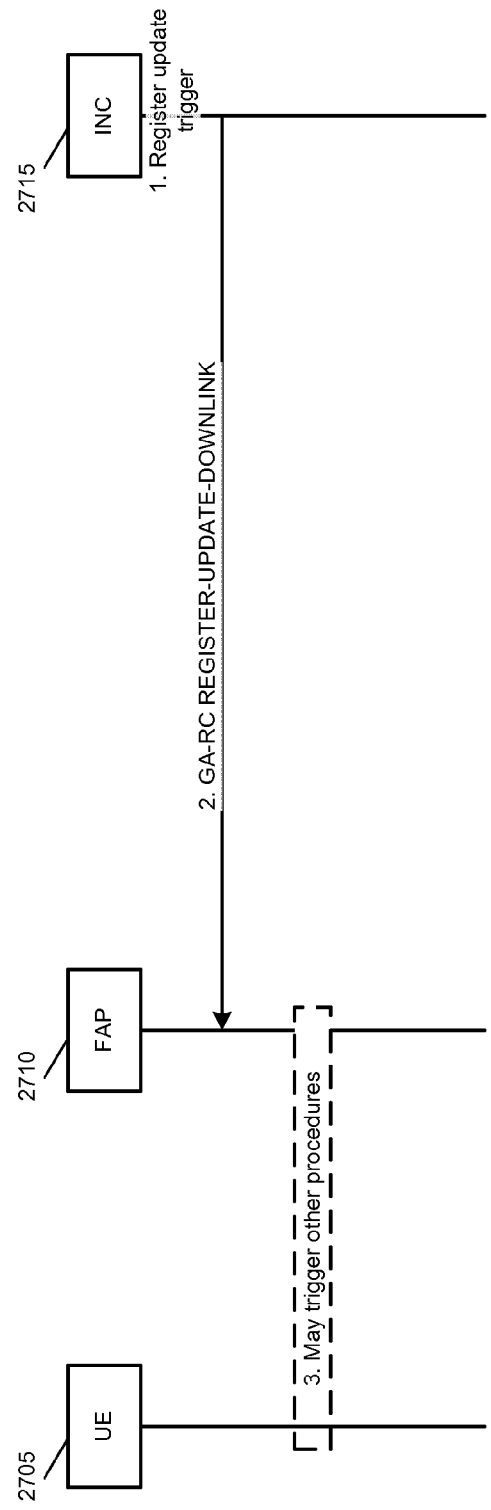
FIG. 27 illustrates INC-initiated register update scenario in some embodiments.

FIG. 27 illustrates a scenario where the INC initiates a registration update. As shown, a register update is triggered (in Step 1) in the INC 2715 (e.g. due to change in SAC list for the FAP, or change in System Information, etc).

Next, the INC 2715 sends (in Step 2) a GA-RC REGISTER UPDATE DOWNLINK message to the FAP 2710. As shown, some other procedures may be triggered (in Step 3) by this operation (e.g. FAP 2710 rejecting UEs 2705 due to updated SAC list received from the INC).

12. FAP Initiated UE Synchronization after TCP Connection Reestablishment

Figure 28:
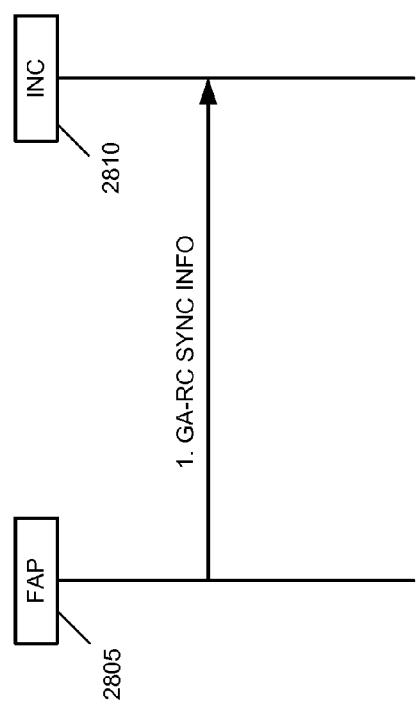
FIG. 28 illustrates the FAP initiated synchronization procedure in some embodiments.

In some embodiments, when FAP receives TCP RST after TCP connection failure, the FAP tries to re-establish the signaling connection using GA-RC Synchronization procedure. FIG. 28 illustrates the FAP initiated synchronization procedure in some embodiments.

a) Initiation of the UE Synchronization Procedure by the FAP

In some embodiments, when FAP receives TCP RST after TCP connection failure, the FAP attempts to re-establish TCP connection once. As shown in FIG. 28, after successfully re-establishing TCP connection, the FAP 2805 sends (in Step 1) GA-RC SYNCHRONIZATION INFORMATION to the GANC 2810 to synchronize the UE's state information. When unsuccessful, the FAP releases the resources for the UE and forces the UE to rove-out of the FAP and select an alternate cell (either a macro cell or another FAP) for camping b) Processing of the UE Synchronization Information Message by the GANC Upon receiving the GA-RC SYNCHRONIZATION INFORMATION message from the FAP on a UE's TCP connection, the GANC updates the UE state information as specified in the request. The GANC also verifies that the associated FAP is in the registered state. When the FAP is not in registered state, the GANC deregisters the UE by sending a GA-RC-DEREGISTER message (not shown) with reject cause code "FAP not registered" to the FAP on the UE's TCP connection. When the GA-RC layer in the GANC has submitted the GA-RC DEREGISTER message to the TCP layer, it initiates the release of its half of the bidirectional TCP connection. The GANC also verifies that the binding (IMSI, TCP connection) as received in the GA-RC SYNCHRONIZATION INFORMATION is valid.

VI. Call Management

A. Voice Bearer Establishment (Using Iu-UP Over AAL2)

Figure 29:
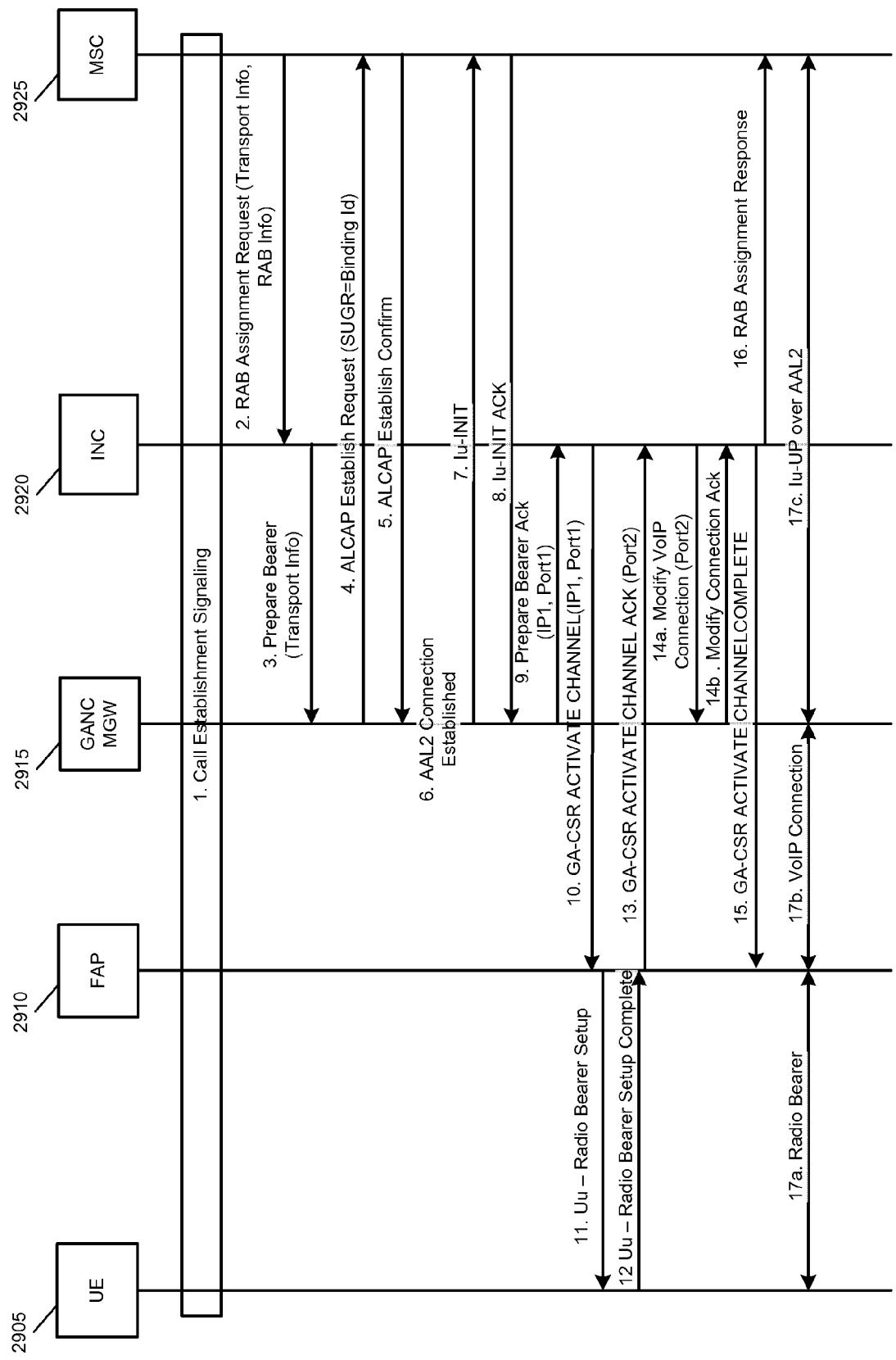
FIG. 29 illustrates voice bearer establishment procedures (for MO/MT calls, using Iu-UP over AAL2) in some embodiments.

FIG. 29 illustrates the normal procedures associated with successfully establishing the voice bearer between the UE and MSC for mobile originated (MO) or mobile terminated (MT) call purposes in some embodiments. As shown, the signaling for a call origination or termination is in progress (in Step 1) between UE 2905, FAP 2910, GANC MGW 2915, INC 2920, and MSC 2925. The MSC 2925 sends (in Step 2) a RANAP Assignment Request (RAB) message to the INC 2920. The assignment request includes the address for ALCAP signaling (an ATM E.164 or NSAP address) and also the binding-id.

Next, the INC 2920 requests (in Step 3) the GANC MGW 2915 to prepare a bearer connection between the endpoints (VoIP towards the FAP and Iu-UP over AAL2 towards the MSC). The MGW 2915 initiates (in Step 4) ALCAP signaling towards the MSC 2925 using the ATM address and the binding-id.

Next, the MSC 2925 acknowledges (in Step 5) the AAL2 connection request using the ALCAP Establish confirm message. At this point (Step 6) an AAL2 connection with appropriate QoS exists between the GANC MGW and the MSC. The GANC MGW then sends (in Step 7) an Iu-UP control (Iu-INIT) message over this AAL2 connection to request Iu-UP initialization The MSC 2925 responds (in Step 8) with Iu-UP init acknowledgement (Iu-INIT ACK). Next, the MGW 2915 assigns a MGW IP address and port for the VoIP side of the connection. The MGW sends (in Step 9) the VoIP information to the INC using a Prepare Bearer Ack message. Next, the INC 2920 sends (in Step 10) a GA-CSR ACTIVATE CHANNEL message to the FAP 2910 and starts a timer (e.g., Tqueuing, as described in "UTRAN Iu interface Radio Access Network Application Part (RANAP) signaling", 3GPP TS 25.413) to ensure that the RANAP Assignment Response is sent to the MSC on or before the expiry of Tqueuing. The GA-CSR ACTIVATE CHANNEL message includes the VoIP connection description created by the GANC MGW.

The FAP 2910 initiates (in Step 11) appropriate RRC layer Radio Bearer Setup message towards the UE 2905. The UE confirms (in Step 12) the setup via Radio Bearer Setup Complete message to the FAP. The FAP sends (in Step 13) a GA-CSR ACTIVATE-CHANNEL-ACKNOWLEDGE message to the INC, including the local IP address and port to be used for the VoIP connection.

The INC requests (in Step 14*a*) the GANC MGW, to modify the previously created connection and send the voice stream to the IP address and port provided by the FAP. The GANC MGW acknowledges (in Step 14*b*) the connection modification. The INC 2920 acknowledges (in Step 15) completion of the traffic channel establishment to the FAP 2910 via the GA-CSR ACTIVATE-CHANNEL COMPLETE message.

The INC 2920 signals (in Step 16) the MSC 2925 about the RAB assignment completion. At this point (Steps 17*a*-17*c*), there is voice bearer between the UE 2905 and MSC 2925 via the FAP 2910 and the GANC MGW 2915. The rest of the call establishment continues after the voice bearer establishment.

B. Call Management Scenarios

The following scenarios illustrate the message flows involved for various call management scenarios via the Femtocell.

1. Mobile Originated Call

Figure 30:
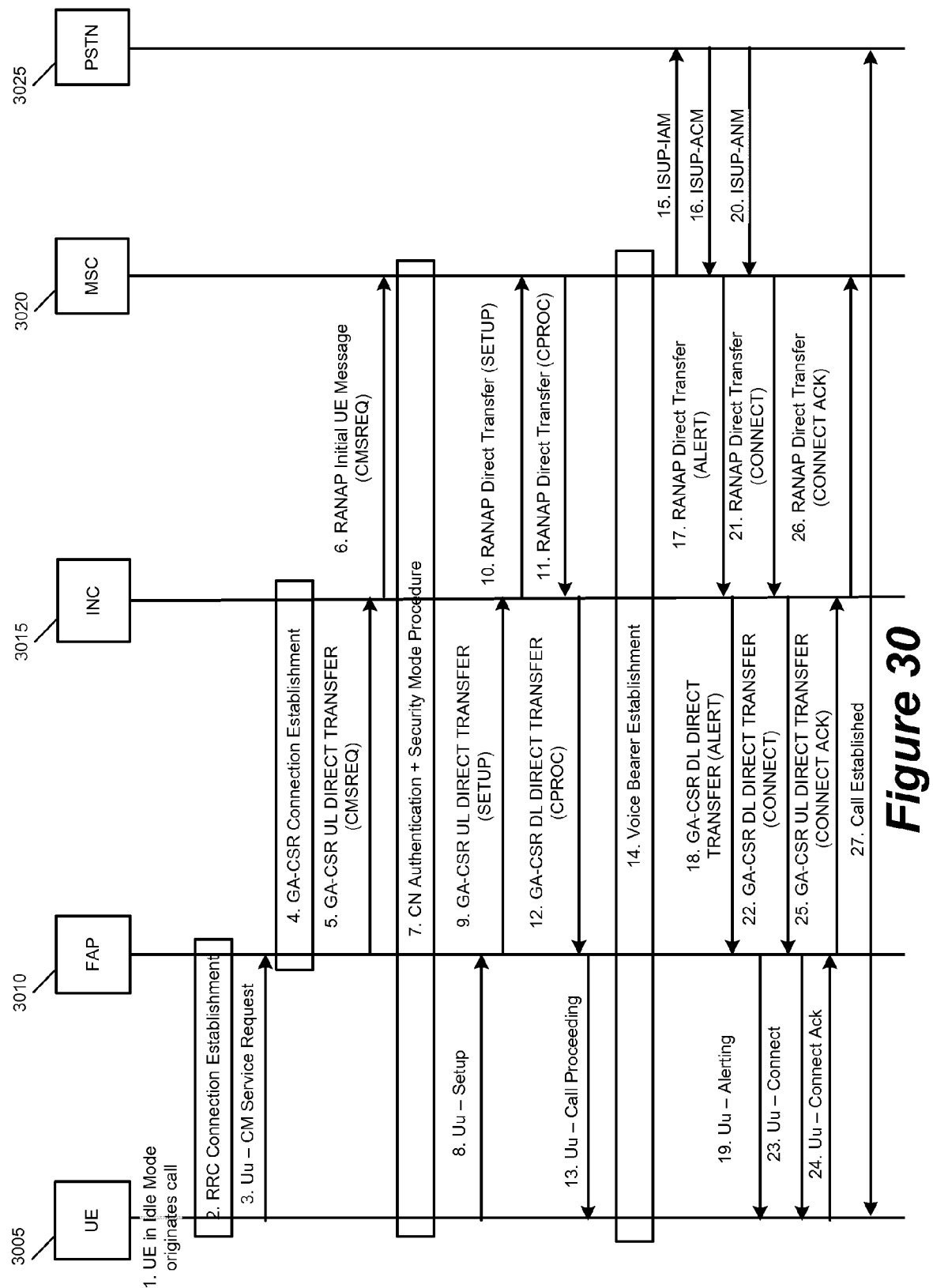
FIG. 30 illustrates the mobile originated mobile-to-PSTN call in some embodiments.

FIG. 30 illustrates a mobile originated call in some embodiments. The scenario shown is for a mobile-to-PSTN call. As shown, the UE 3005 in GAN idle mode originates (in Step 1) a call. The UE 3005 establishes (in Step 2) a RRC connection with the FAP 3010. Upon request from the upper layers, the UE sends (in Step 3) the CM Service Request to the FAP.

The FAP performs (in Step 4) the GA-CSR Connection Establishment procedure with the INC as described in previous sections. The FAP 3010 then forwards (in Step 5) the CM Service Request to the INC 3015 using a GA-CSR UL DIRECT TRANSFER message. Next, the INC 3015 establishes a SCCP connection to the MSC 3020 and forwards (in Step 6) the CM Service Request to the MSC using the RANAP Initial UE Message. Subsequent NAS messages between the UE and MSC will be sent between INC and MSC using the RANAP Direct Transfer message.

Next, the MSC 3020 authenticates (in Step 7) the UE 3005 using standard UTRAN authentication procedures. The MSC also initiates (in Step 7) the Security Mode Control procedure described in previous sections. The UE sends (in Step 8) the Setup message to the FAP providing details on the call to the MSC and its bearer capability and supported codecs.

The FAP forwards (in Step 9) this message within the GA-CSR UL DIRECT TRANSFER between the FAP and the INC. The INC relays (in Step 10) the Setup message to the MSC using a RANAP Direct Transfer message.

The MSC 3020 indicates (in Step 11) it has received the call setup and it will accept no additional call-establishment information using the Call Proceeding message to the INC. The INC forwards (in Step 12) this message to the FAP in the GA-CSR DL DIRECT TRANSFER. The FAP then relays (in Step 13) the Call Proceeding message to the UE over the air interface. At this point (Step 14) an end to end bearer path is established between the MSC and UE using one of the procedures shown in previous section.

The MSC 3020 constructs (in Step 15) an ISUP IAM using the subscriber address, and sends it towards the called party's destination exchange 3025. The destination Exchange responds (in Step 16) with an ISUP ACM message. The MSC then signals to the UE, with the Alerting message, that the called party is ringing. The message is transferred (in Step 17) to the INC.

The INC forwards (in Step 18) the Alerting message to the FAP in the GA-CSR DL DIRECT TRANSFER. The FAP relays (in Step 19) the Alerting message to the UE and if the UE has not connected the audio path to the user, it shall generate ring back to the calling party. Otherwise, the network-generated ring back will be returned to the calling party.

The called party answers and the destination Exchange indicates this (in Step 20) with an ISUP ANM message. The MSC signals that the called party has answered, via the Connect message. The message is transferred (in Step 21) to the INC. The INC forwards (in Step 22) the Connect message to the FAP in the GA-CSR DL DIRECT TRANSFER.

The FAP relays (in Step 23) the Connect message to the UE and the UE connects the user to the audio path. If the UE is generating ring back, it stops and connects the user to the audio path. The UE sends (in Step 24) the Connect Ack in response, and the two parties are connected for the voice call. The FAP relays (in Step 25) this message within the GA-CSR UL DIRECT TRANSFER between the FAP and the INC.

The INC forwards (in Step 26) the Connect Ack message to the MSC. The end-to-end two way path is now (Step 27) in place and bi-directional voice traffic flows between the UE and MSC through the FAP and the INC. A FAP with local service can support MO using the FAP IMSI. The necessary message flows would be similar as above without the FAP-UE message exchanges over the air interface.

2. Mobile Terminated Call

Figure 31:
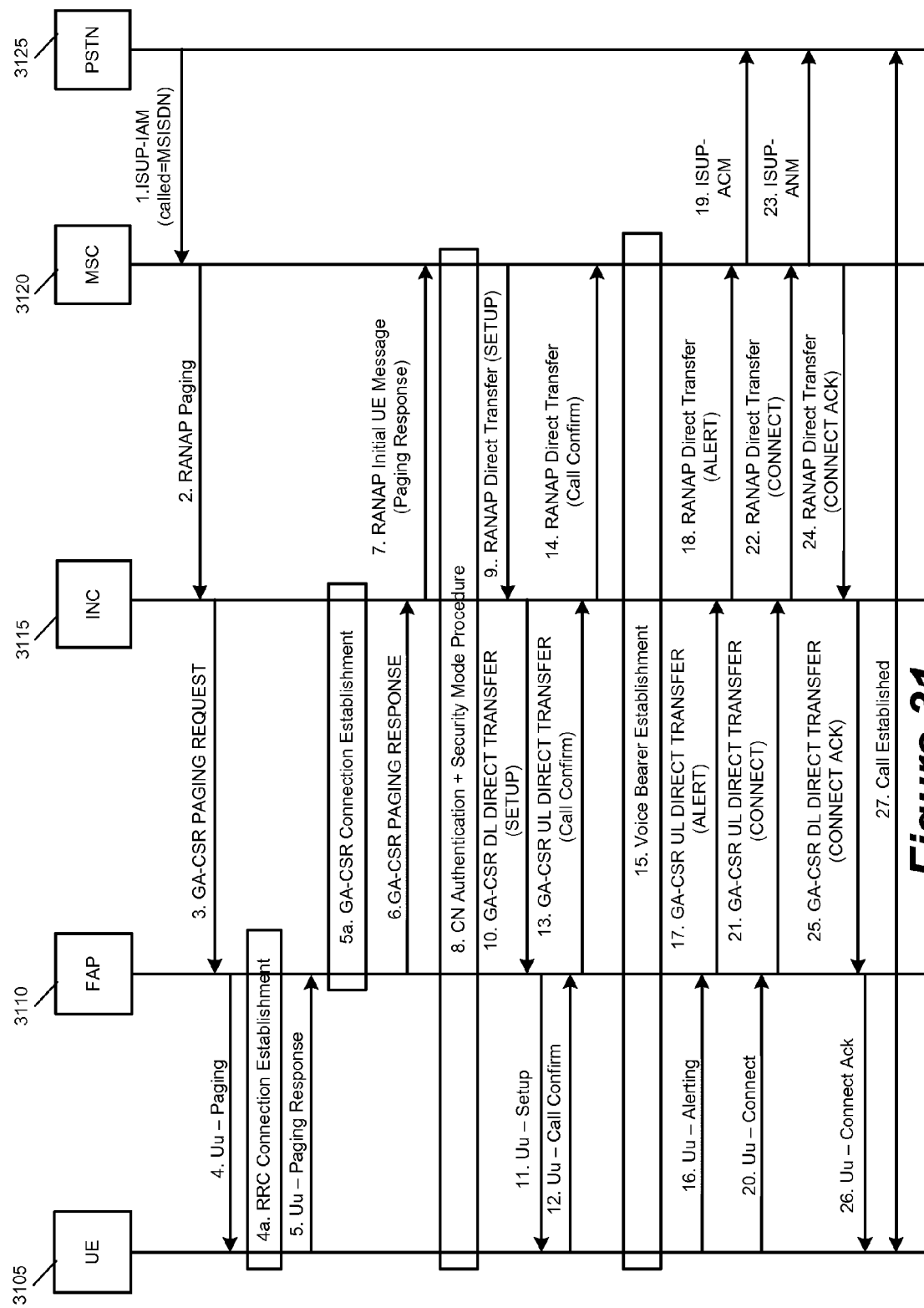
FIG. 31 illustrates a mobile terminated PSTN-to-mobile call in some embodiments.

FIG. 31 illustrates a mobile terminated call. The scenario shown is for a PSTN-to-mobile call. As shown, the MSC (i.e., the GMSC function) receives (in Step 1) a call from party A intended for the Femtocell subscriber 3105. The MSC 3120 sends (in Step 2) a RANAP Paging message to the INC 3115 identified through the last Location Update received by it and includes the TMSI if available. The IMSI of the mobile being paged is always included in the request.

The INC 3115 identifies the UE registration context using the IMSI provided by the MSC. It then pages (in Step 3) the associated FAP 3110 using the GA-CSR PAGING REQUEST message. The message includes the TMSI, if available in the request from the MSC, else it includes only the IMSI of the mobile.

The FAP 3110 relays (in Step 4) the Paging request to the UE. The FAP may use Paging Type 1 or 2 based on the RRC state of the UE as described in "Radio Resource Control (RRC) protocol specification", 3GPP TS 25.331, hereinafter "TS 25.331". The UE 3105 establishes (in Step 4*a*) a RRC connection with the FAP 3110 if one doesn't exist. This step is omitted if there is an already existing RRC connection (e.g. an RRC connection may have been established for PS domain).

Next, the UE 3105 processes the paging request and sends (in Step 5) the Paging response to the FAP 3110. The FAP then performs (in Step 5*a*) the GA-CSR Connection Establishment procedure with the INC as described in previous sections. The FAP responds (in Step 6) with a GA-CSR PAGING RESPONSE.

The INC 3115 establishes an SCCP connection to the MSC 3120. The INC 3115 then forwards (in Step 7) the paging response to the MSC using the RANAP Initial UE Message. Subsequent NAS messages between the UE and core network will be sent using the RANAP Direct Transfer message. The MSC then authenticates (in Step 8) the UE using standard UTRAN authentication procedures. The MSC also initiates (in Step 8) the Security Mode Control procedure described in previous sections.

The MSC initiates (in Step 9) call setup using the Setup message sent to the FAP via INC. The INC then forwards (in Step 10) this message to the FAP in the GA-CSR DL DIRECT TRANSFER message. The FAP relays (in Step 11) the Setup message to the UE.

The UE 3105 responds (in Step 12) with Call Confirmed after checking its compatibility with the bearer service requested in the Setup and modifying the bearer service as needed. If the Setup included the signal information element, the UE alerts the user using the indicated signal, else the UE alerts the user after the successful configuration of the user plane.

The FAP relays (in Step 13) the Call Confirmed to the INC using the GA-CSR UL DIRECT TRANSFER message. The INC then forwards (in Step 14) the Call Confirmed message to the MSC using RANAP direct transfer message. At this point (Step 15) an end to end bearer path is established between the MSC 3120 and UE 3105 using the procedure for voice bearer establishment as described in previous sections.

The UE signals (in Step 16) that it is alerting the user, via the Alerting message to the FAP. The FAP relays (in Step 17) the Alerting message to the INC using the GA-CSR UL DIRECT TRANSFER. The INC (in Step 18) forwards the Alerting message to the MSC.

The MSC 3120 returns (in Step 19) a ISUP ACM message towards the originating PSTN Exchange 3125. The UE signals (in Step 20) that the called party has answered, via the Connect message. The FAP relays (in Step 21) the Connect message to the INC in the GA-CSR UL DIRECT TRANSFER message.

Next, the INC forwards (in Step 22) the Connect message to the MSC. The MSC then returns (in Step 23) an ISUP ANM message towards the originating PSTN exchange 3125. The MSC acknowledges (in Step 24) via the Connect Ack message to the INC. The INC forwards (in Step 25) this message to the FAP in the GA-CSR DL DIRECT TRANSFER.

The FAP relays (in Step 26) the Connect Ack to the UE. The two parties on the call are connected on the audio path. The end-to-end two way path is now (Step 27) in place and bi-directional voice traffic flows between the UE and MSC through the FAP and the INC. A FAP with local service can support MT using the FAP IMSI. The necessary message flows would be similar as above without the FAP-UE message exchanges over the air interface.

3. Call Release by Femtocell Subscriber

Figure 32:
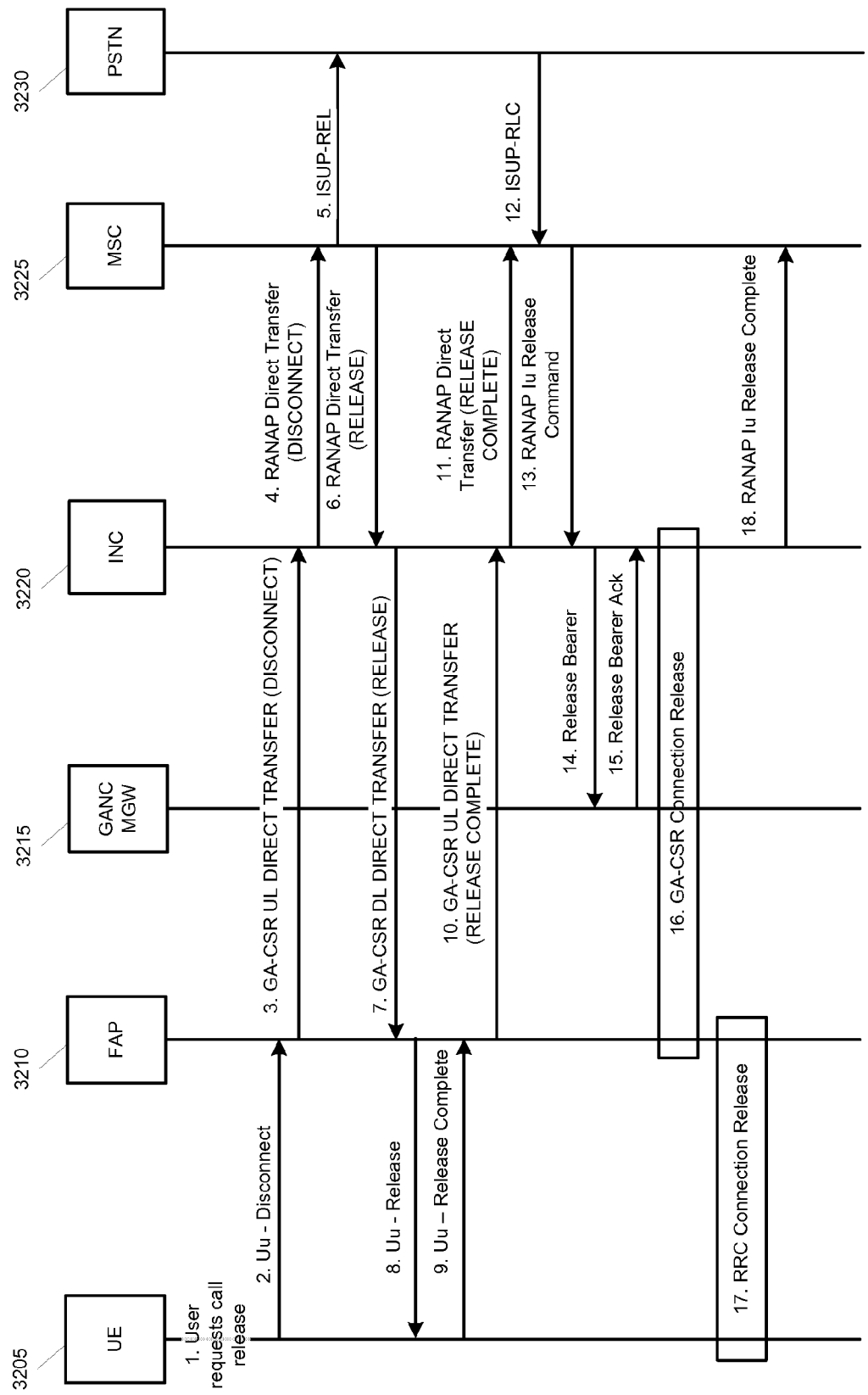
FIG. 32 illustrates call release by Femtocell subscriber in some embodiments.

FIG. 32 illustrates a scenario where a Femtocell call is released by the Femtocell subscriber in some embodiments. As shown, the Femtocell subscriber 3205 requests (in Step 1) call release (e.g., by pressing the END button). Upon request from the upper layers, the UE sends (in Step 2) the Disconnect message to the FAP 3210. The FAP forwards (in Step 3) the Disconnect message to the INC (embedded in a GA-CSR UL DIRECT TRANSFER message).

The INC 3220 relays (in Step 4) the Disconnect message to the MSC 3225 via RANAP Direct Transfer message. The MSC 3225 sends (in Step 5) an ISUP RELEASE message towards the other party 3230. The MSC sends (in Step 6) a Release to the INC using RANAP Direct Transfer message.

Next, the INC forwards (in Step 7) the Release message to FAP using GA-CSR DL DIRECT TRANSFER message. The FAP then sends (in Step 8) the Release message to the UE over the air interface. The UE 3205 confirms (in Step 9) the Release via the Release Complete message to the FAP. The FAP relays (in Step 10) the Release Complete message to the INC using GA-CSR UL DIRECT TRANSFER message The INC forwards (in Step 11) the message to the MSC using RANAP Direct Transfer message. At this point, the MSC considers the connection released. Sometime after Step 5, the MSC receives (in Step 12) an ISUP RLC message from the other party's exchange.

The MSC 3225 sends (in Step 13) an Iu Release command to the INC 3220 indicating a request to release the call resources. The SCCP Connection Identifier is used to determine the corresponding call. The INC 3220 requests (in Step 14) the GANC MGW 3215 to release associated resources with the call. The GANC MGW 3215 confirms (in Step 15) release of associated resources.

The INC initiates (in Step 16) a GA-CSR Connection Release procedure towards the FAP (as described in previous sections). The FAP in turn releases (in Step 17) any radio resource associated for the specific call. If there is an active PS session for the UE, the RRC connection may not be released by the FAP, and only the corresponding CS radio bearers are released. Finally, the INC acknowledges (in Step 18) the resource release to the MSC using the Iu Release Complete message to the MSC. The SCCP connection associated with the call between the INC and the MSC is released as well 4. Other Calling Scenarios The following services are supported by the Femtocell solution:

Calling Line Identification Presentation (CLIP)
Calling Line Identification Restriction (CLIR)
Connected Line Identification Presentation (CoLP)
Connected Line Identification Restriction (CoLR)
Call Forwarding Unconditional
Call Forwarding Busy
Call Forwarding No Reply
Call Forwarding Not Reachable
Call Waiting (CW)
Call Hold (CH)
Multi Party (MPTY)
Closed User Group (CUG)
Advice of Charge (AoC)
User User Signaling (UUS)
Call Barring (CB)
Explicit Call Transfer (ECT)
Name Identification
Completion of Calls to Busy Subscriber (CCBS)

These supplementary services involve procedures that operate end-to-end between the UE and the MSC. Beyond the basic Direct Transfer Application Part (DTAP) messages already described for MO and MT calls, the following DTAP messages are used for these additional supplementary service purposes:

HOLD
    HOLD-ACKNOWLEDGE
    HOLD-REJECT
    RETRIEVE
    RETRIEVE-ACKNOWLEDGE
    RETRIEVE-REJECT
    FACILITY
    USER-INFORMATION
    CONGESTION-CONTROL
    CM-SERVICE-PROMPT
    START-CC
    CC-ESTABLISHMENT
    CC-ESTABLISHMENT-CONFIRMED
    RECALL

Figure 33:
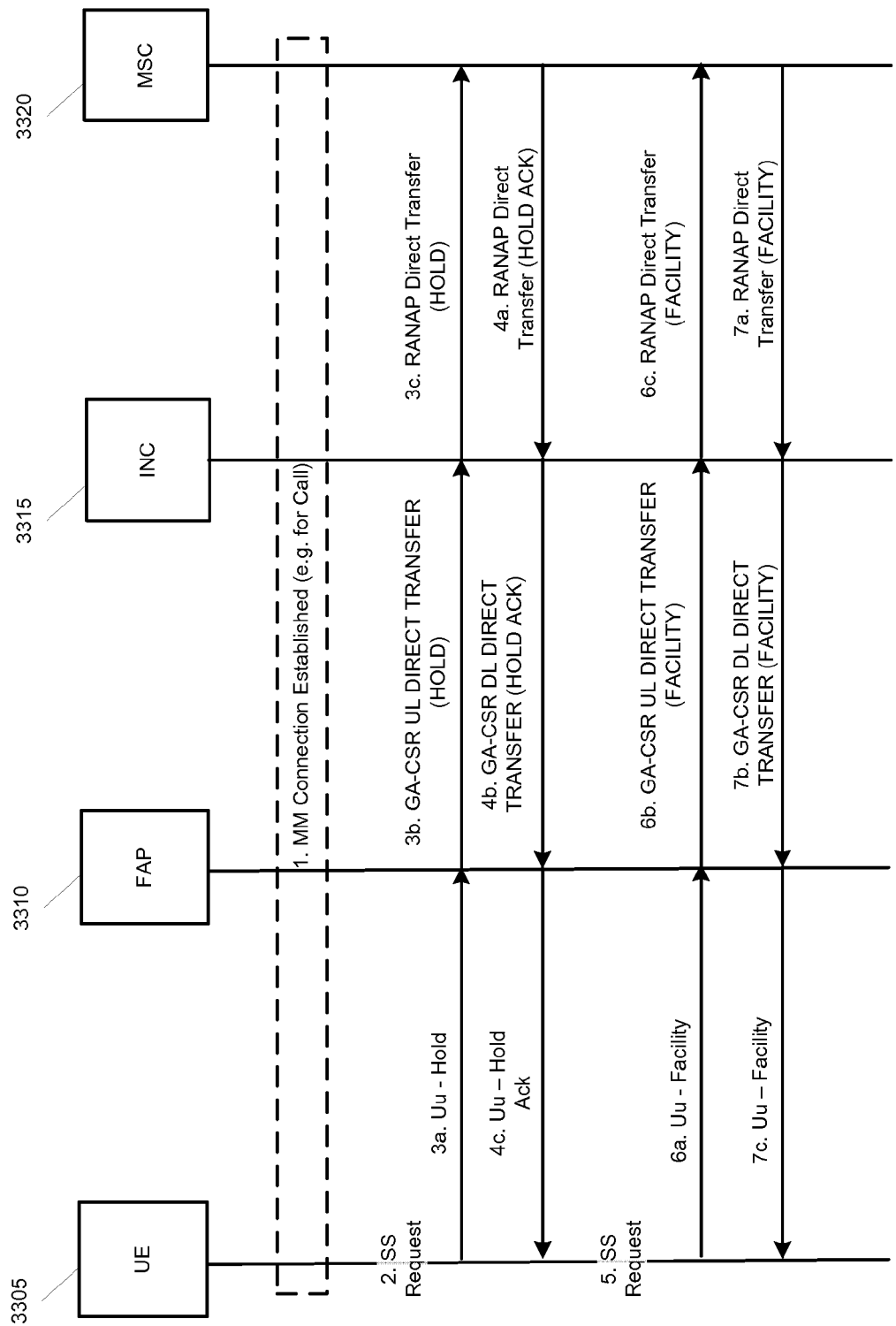
FIG. 33 illustrates an example of relay of DTAP supplementary service messages in some embodiments.

These DTAP message are relayed between the UE and MSC by the INC in the same manner as in the other call control and mobility management scenarios described in this disclosure. A generic example is illustrated in FIG. 33. As shown (in Step 1), there is an existing MM connection established between the UE and the MSC for an ongoing call. The user requests (in Step 2) a particular supplementary service operation (e.g., to put the call on hold).

The UE 3305 sends (in Step 3a) the HOLD message to the FAP 3310 over the air. The FAP in turn forwards (in Step 3b) the message to INC 3315, embedded in a GA-CSR UPLINK DIRECT TRANSFER message. The INC relays (in Step 3c) the DTAP HOLD message to the MSC 3320 over the Iu-interface.

Next, the DTAP HOLD-ACK message is sent (in Steps 4a-4c) from MSC 3320 to UE 3305 through the INC and FAP. Later in the call, the user requests (in Step 5) another supplementary service operation (e.g., to initiate a MultiParty call).

The UE sends (in Step 6a) the FACILITY message to the FAP over the air. The FAP in turn forwards (in Step 6b) the message to the INC. The INC relays (in Step 6c) the DTAP FACILITY message to the MSC over the Iu-interface. Finally, the DTAP FACILITY message including the response is sent (in Steps 7a-7c) from MSC to UE through the INC and FAP.

VII. Packet Services

A. GA-PSR Transport Channel Management Procedures

The GA-PSR Transport Channel (GA-PSR TC) provides an association between the FAP and INC for the transport of the user data over the Up interface. Given that the Femtocell user data transport is UDP based, the GA-PSR Transport Channel is associated with corresponding FAP and INC IP addresses and UDP ports used for user data transfer. The FAP and INC manage the GA-PSR Transport Channel based on the requests for data transfer and the configurable GA-PSR TC Timer.

1. States of the GA-PSR Sub-Layer

The GA-PSR Transport Channel (GA-PSR TC) management procedures are the basic procedures for PS services specified to facilitate the control of the GA-PSR connection for user data transfer. Given that the GTP-U user data transport is extended to the FAP in GAN solution for Femtocell support, these procedures are tightly integrated with RAB Assignment procedures for user data. GTP-U based connection between the FAP and the SGSN for user data transfer is referred to as the GA-PSR Transport Channel.

The GA-PSR Transport Channel consists of the following: (1) The IP address and destination UDP port number to be used for user data transfer at both the SGSN and FAP, and (2) The GA-PSR TC Timer. The FAP or INC will activate a GA-PSR Transport Channel only when needed; i.e., when the user data transfer is initiated.

The GA-PSR maintains a separate PS entity for each PDP context that is established. Each individual GA-PSR PS entity can be in two different states, GA-PSR-PS-STANDBY or GA-PSR-PS-ACTIVE state. The state of the GA-PSR PS entity and the corresponding transport channel are always synchronized.

In GA-PSR-PS-STANDBY state the FAP is not able to send or receive user data associated with the specific PDP context to and from the SGSN. The INC or the FAP needs to activate the GA-PSR Transport Channel before sending any user data for that PDP context. In this state a corresponding GA-PSR Transport Channel does not exist. When the GA-PSR Transport Channel is activated, the GA-PSR entity associated with that PDP context enters the GA-PSR-PS-ACTIVE state.

In GA-PSR-PS-ACTIVE state the FAP and UE are able to send and receive user data associated with the specific PDP context to and from the SGSN. Furthermore there exists a corresponding GA-PSR Transport Channel for this FAP/UE.

A GA-PSR TC Timer is also defined to control the transition from GA-PSR-PS-ACTIVE to GA-PSR-PS-STANDBY state as follows. The FAP GA-PSR layer implements a timer associated with each GA-PSR Transport Channel. The timer is started when that entity enters GA-PSR-PS-ACTIVE state and restarted each time a data packet for that PDP context is transmitted to or received from the network. When the timer expires, the FAP deactivates the GA-PSR Transport Channel and the corresponding PDP service entity enters GA-PSR-PS-STANDBY state.

The GA-PSR TC Timer value is provided to the FAP as part of the Femtocell Registration procedure (i.e., in GA-RC REGISTER ACCEPT message).

2. FAP Initiated GA-PSR Transport Channel Activation

Figure 34:
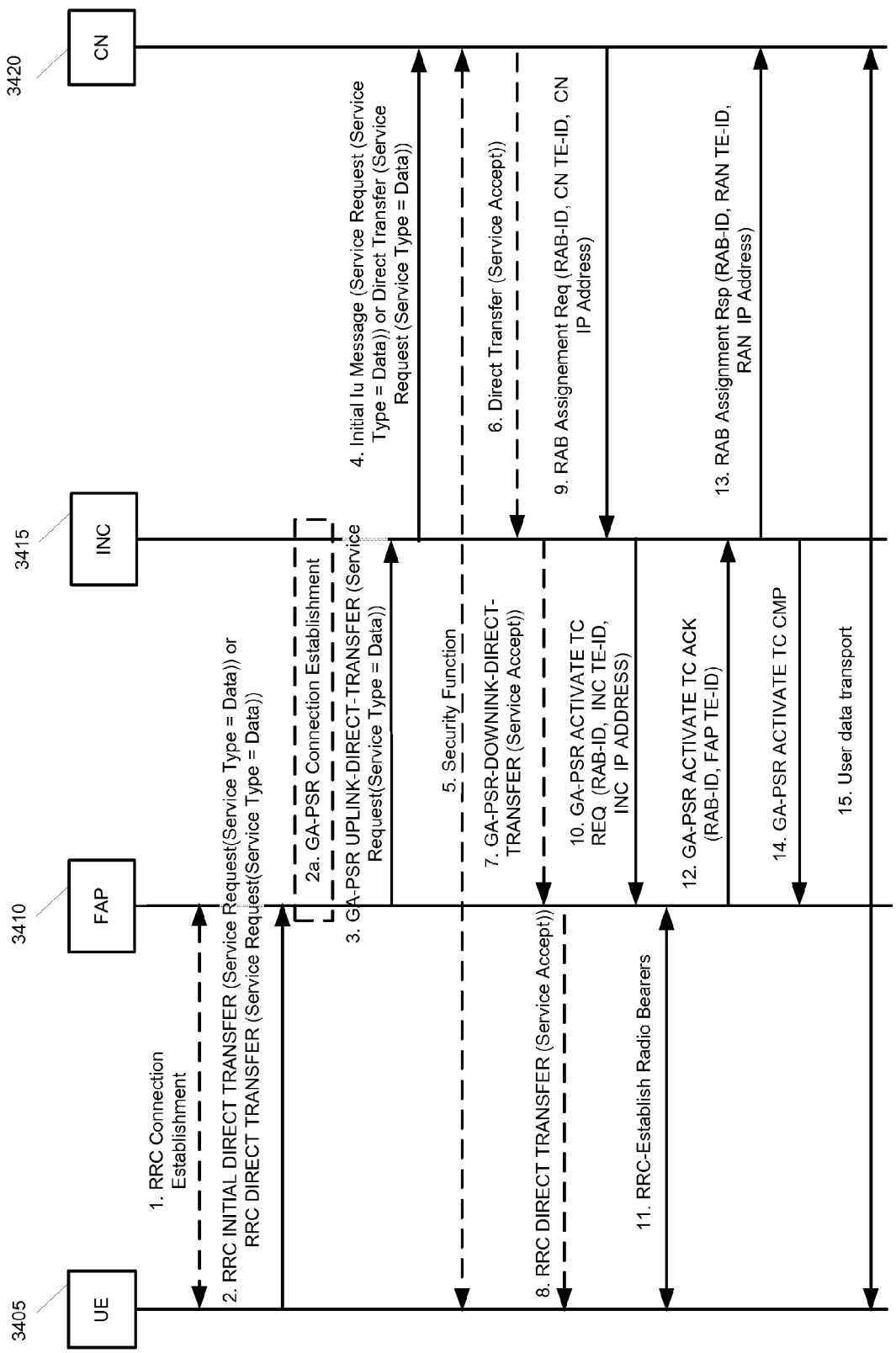
FIG. 34 illustrates FAP initiated GA-PSR Transport Channel activation in some embodiments.

FIG. 34 depicts the FAP initiated GA-PSR Transport Channel activation procedure of some embodiments. Initially, the corresponding GA-PSR PS PDP entity is in GA-PSR-PS-IDLE state when the uplink data transfer for that PDP context is requested. The FAP has to establish the GA-PSR Transport channel prior to resuming the uplink data transfer.

As shown, if the RRC connection does not exist, the UE 3405 initiates (in Step 1) RRC Connection establishment procedure as per standard 3GPP procedure. Upon successful RRC Connection establishment, the UE 3405 forwards (in Step 2) a Service Request message to the SGSN via the FAP 3410 indicating data transfer. The FAP performs (in Step 2a) the GA-PSR Connection Establishment procedure with the INC as described in "FAP initiated GA-PSR connection establishment" Subsection under "Resource Management" Section, above.

The FAP 3410 then encapsulates the request within the GA-PSR-UPLINK-DIRECT-TRANSFER message and forwards (in Step 3) the request to the INC 3415. The INC forwards (in Step 4) the Service Request to the CN (SGSN) 3420 encapsulated within the Initial Iu Message or within the Direct Transfer message depending on PMM state. Optionally, the CN (SGSN) may initiate (in Step 5) security function as specified in "Security Mode Control" Subsection and "Core network authentication" Subsections under "Femtocell Security" Section, further below. Optionally, upon receiving the request and if the UE was in PMM-CON-NECTED state, the CN (SGSN) responds (in Step 6) with a Service Accept message.

Optionally, if the Service Accept message was received, the INC 3415 forwards (in Step 7) the message to the FAP 3410. The FAP then forwards (in Step 8) the message to the UE 3405. The CN (SGSN) 3420 initiates (in Step 9) RAB Assignment procedure and includes the RAB-ID, the CN Transport Layer Address (IP address) and the CN Iu Transport Association (GTP-U Terminal Endpoint Identifier (TEID)) for user data to be used with this GA-PSR Transport Channel.

Next, the INC forwards (in Step 10) the GA-PSR ACTIVATE TC REQ to the FAP to activate the Transport Channel for user data transfer. The message includes the RAB-ID, and the INC IP Address and INC TEID. To allow the FAP to send GA-PSR TC packets (i.e., GTP-U messages) directly to the SGSN, the INC sets the INC IP Address to the CN IP Address and the INC TEID to the CN TEID. In an alternate embodiment, it is possible for the GANC to assume the role of a GTP-U proxy gateway, where two separate GTP-U tunnels exist for a given GA-PSR TC i.e. first GTP-U between FAP and GANC and the corresponding GTP-U between the GANC and the SGSN. The GANC is responsible for relaying the actual PS data packets between the two GTP-U tunnels. Next, corresponding Radio Bearers are established (in Step 11) between the FAP 3410 and UE 3405.

The FAP then responds (in Step 12) to the INC with acknowledgment. The message includes the RAB-ID and a GTP-U TEID assigned by the FAP for the specific PS session. Upon receiving the acknowledgment, the INC sends (in Step 13) the RAB Assignment Rsp message to the CN (SGSN) to complete the RAB Assignment procedure. To allow the SGSN to send GTP-U messages directly to the FAP, the INC sets the RAN IP Address to the FAP's IP Address and the RAN TEID to the TEID allocated by the FAP for the UE specific PS session.

The INC notifies (in Step 14) the FAP that the procedure is complete and the FAP modifies the state of the corresponding GA-PSR PS PDP entity to GA-PSR-PS ACTIVE and starts GA-PSR PS TC Timer. The UE initiates (in Step 15) uplink user data transfer via the established transport channel and the SGSN may use the same transport channel to send downlink user data packets. While the transport channel is active, both FAP and SGSN can continue sending user data associated with the same PDP context directly using this transport channel.

3. FAP Initiated Deactivation of the GA-PSR Transport Channel

Figure 35:
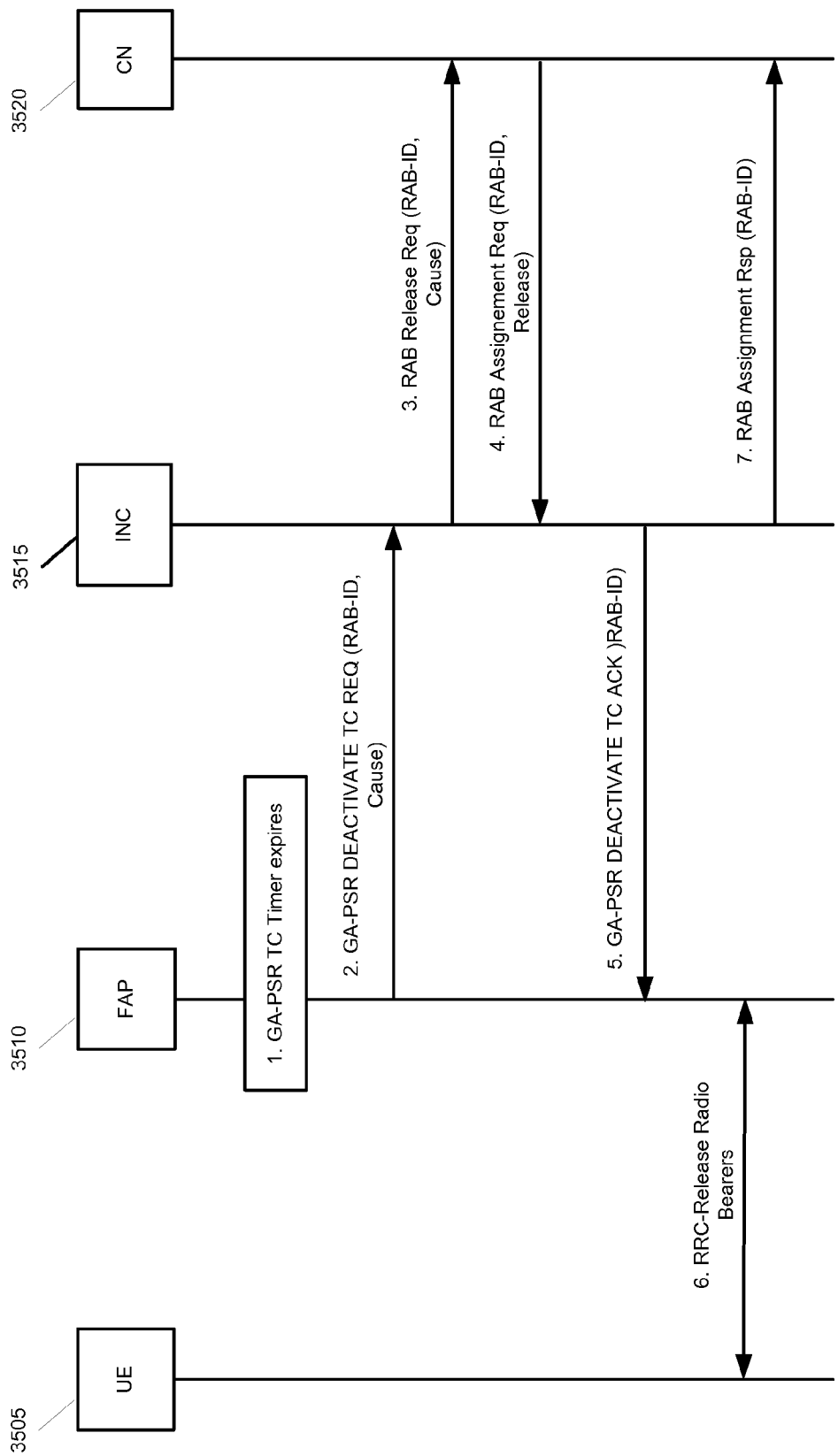
FIG. 35 illustrates FAP initiated Transport Channel deactivation in some embodiments.

FIG. 35 illustrates the scenario in some embodiments when the FAP deactivates the GA-PSR Transport Channel after the GA-PSR TC Timer expires. As shown, GA-PSR TC Timer associated with one of the active GA-PSR Transport Channels expires (in Step 1). The FAP 3510 sends (in Step 2) GA-PSR DEACTIVATE TC REQ message to the INC 3515 including the RAB-ID to identify the GA-PSR Transport Channel and indicating the normal release as a cause for deactivation.

The INC 3515 forwards (in Step 3) RAB Release Req message to the CN (SGSN) 3520 to request the release of the associated RAB. The CN (SGSN) responds (in Step 4) with the RAB Assignment Request indicating release for the requested RAB.

Next, the INC 3515 responds (in Step 5) to the FAP with a GA-PSR DEACTIVATE TC ACK message to acknowledge successful deactivation. Upon receiving acknowledgment message, the FAP initiates (in Step 6) release of the associated Radio Bearers. Finally, the INC sends (in Step 7) RAB Assignment Rsp message to notify the SGSN that the RAB Release procedure is complete.

4. Network Initiated Transport Channel Activation for PS Service

Figure 36:
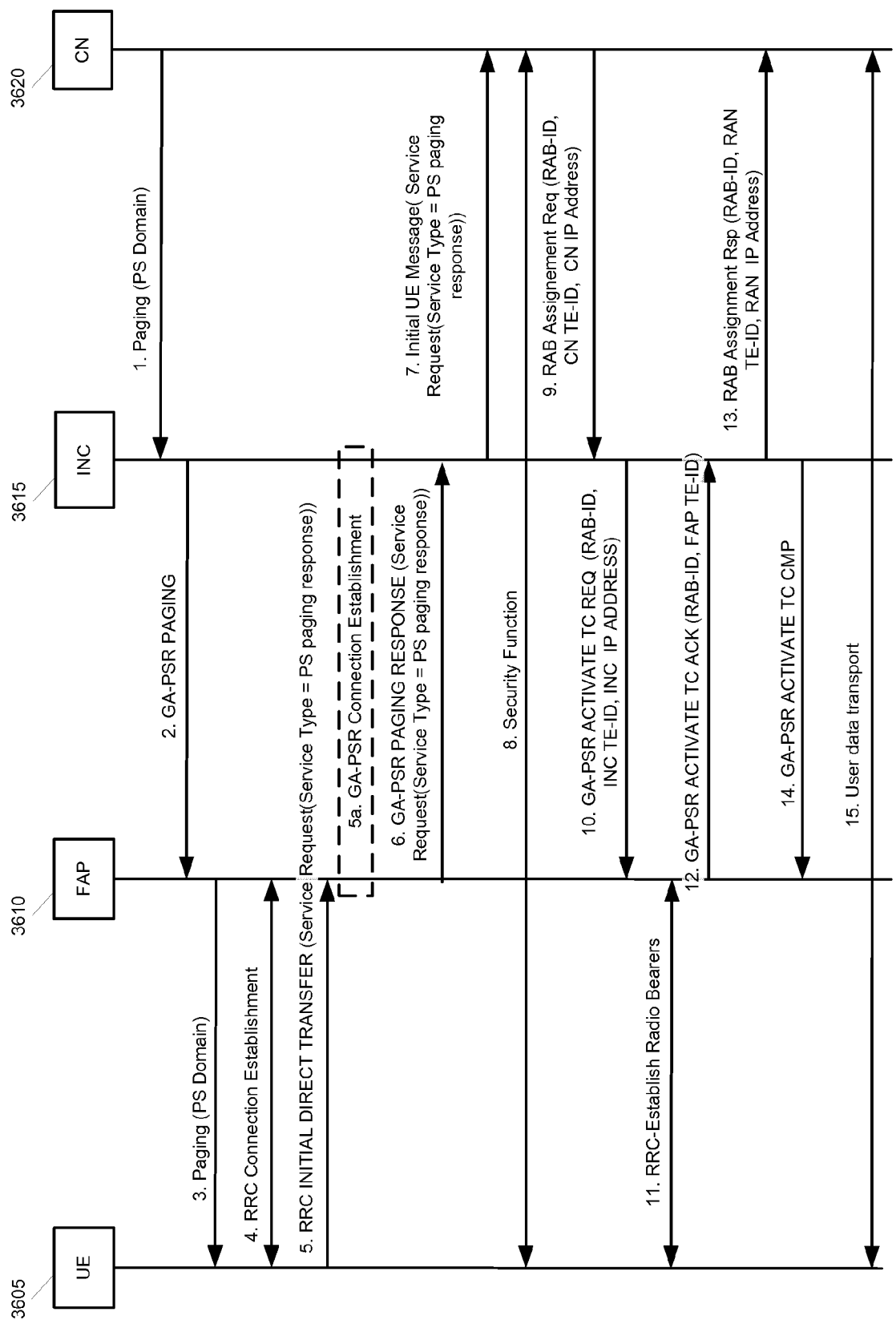
FIG. 36 illustrates network initiated Transport Channel Activation for user data service in some embodiments.

FIG. 36 depicts a scenario when the CN (SGSN) initiates activation of a PS Transport Channel for user data service. This scenario covers the case when the SGSN receives a downlink user data packet from the GGSN and the RAB for that PDP context is not established. Initially, the CN (SGSN) received downlink user data to transfer to the UE and the associated RAB is not established. The UE is in PMM-IDLE state. The UE 3605 is in PMM-IDLE state and the CN (SGSN) 3610 sends (in Step 1) the RANAP Paging request to the UE 3605 via the INC 3615 to locate the user. The paging request indicates paging for PS Domain. The INC 3615 forwards (in Step 2) the GA-PSR PAGING message to the FAP 3610.

Next, the FAP forwards (in Step 3) the PS Page to the UE 3605 as per standard 3GPP procedure. The FAP may use Paging Type 1 or 2 based on the RRC state of the UE as described in TS 25.331. Next, an RRC connection is established (in Step 4) between the UE 3605 and FAP 3610. This step is omitted if there is an already existing RRC connection (e.g. a RRC connection may have been established for CS domain)

Next, the UE responds (in Step 5) to the SGSN via the FAP with a Service request indicating PS paging response. The message is encapsulated within the RRC INITIAL DIRECT TRANSFER message. The FAP performs (in Step 5a) the GA-PSR Connection Establishment procedure with the INC as described in Subsection "FAP initiated GA-PSR connection establishment" under "RESOURCE MANAGEMENT" Section, above. The FAP forwards (in Step 6) the PS paging response to the INC using GA-PSR PAGING RESPONSE message.

The INC forwards (in Step 7) the Service Request message to the SGSN encapsulated in the RANAP Initial UE Message. Security function is performed (in Step 8) as specified in "Security mode control" Subsection and "Core network authentication" under "FEMTOCELL SECURITY" Section, below. Steps 9 to 15 are same as described in the "FAP initiated GA-PSR transport channel activation" Subsection, above.

5. Network Initiated Transport Channel Deactivation

Figure 37:
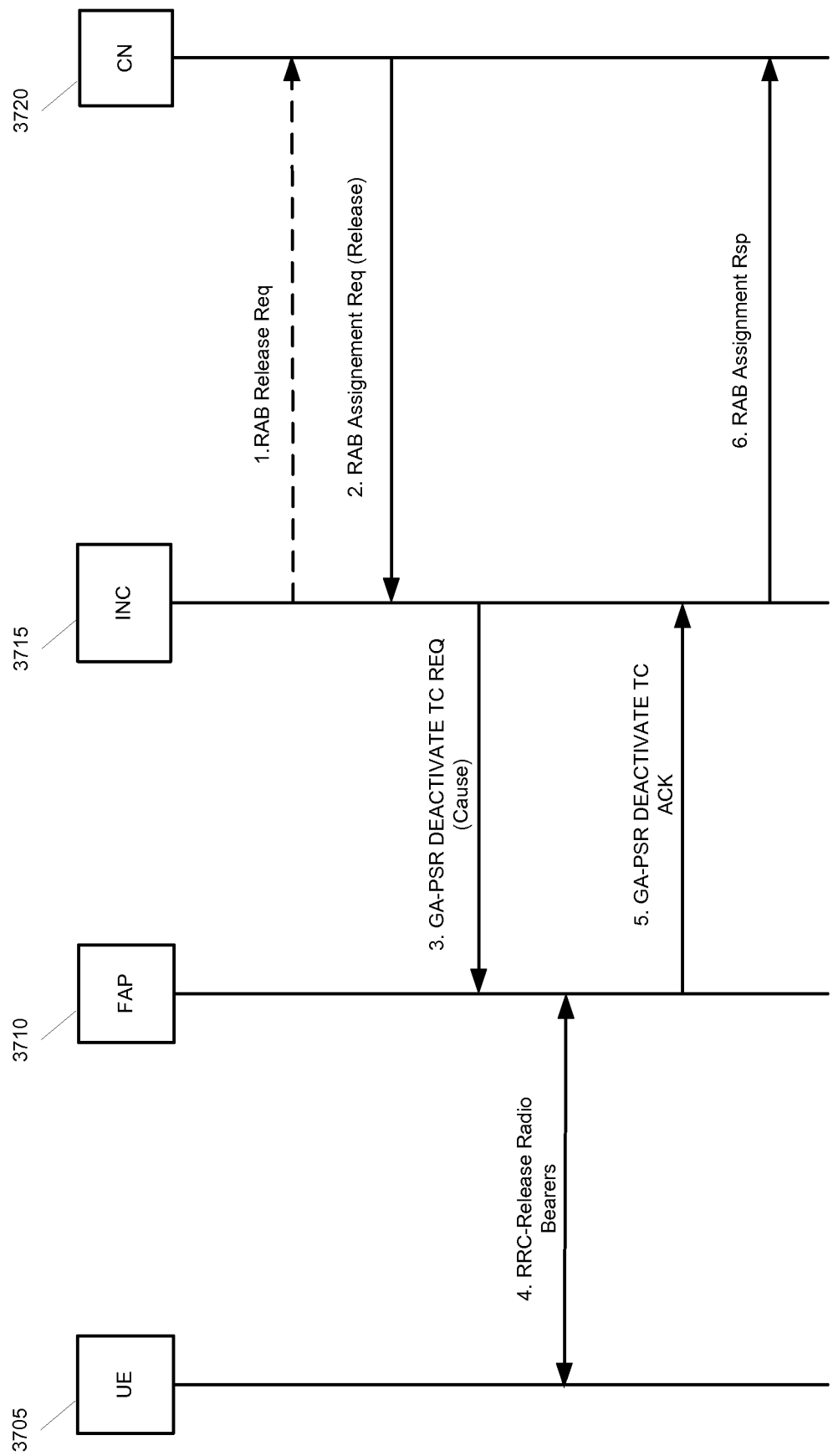
FIG. 37 illustrates network initiated Transport Channel deactivation in some embodiments.

FIG. 37 depicts a network initiated GA-PSR Transport Channel deactivation procedure that includes Radio Access Barer release in some embodiments. Initially, active GA-PSR Transport Channel associated with the UE 3705 that is registered for Femtocell service is active.

As shown, optionally, the INC 3715 may initiate (in Step 1) RAB Release procedure as a result of error handling procedure. This would trigger CN (SGSN) 3720 to release the corresponding RAB. The CN (SGSN) 3720 sends (in Step 2) a RAB Assignment Request to request the release of the associated RAB. The release request may include one or more RABs.

The INC 3715 requests (in Step 3) deactivation of the associated GA-PSR Transport Channel. As a result, the corresponding Radio Bearers are (in Step 4) released. The FAP 3710 then updates (in Step 5) the state of the corresponding GA-PSR PS PDP entity to STANDBY, stops GA-PSR TC Timer and sends the acknowledgment back to the INC. Steps 3, 4 and 5 are repeated for each additional RAB that needs to be released. Finally, the INC 3715 notifies (in Step 6) the CN (SGSN) 3720 that the release was successful.

B. User Data and Signaling Transport

1. User Data Transport Procedures

Figure 38:
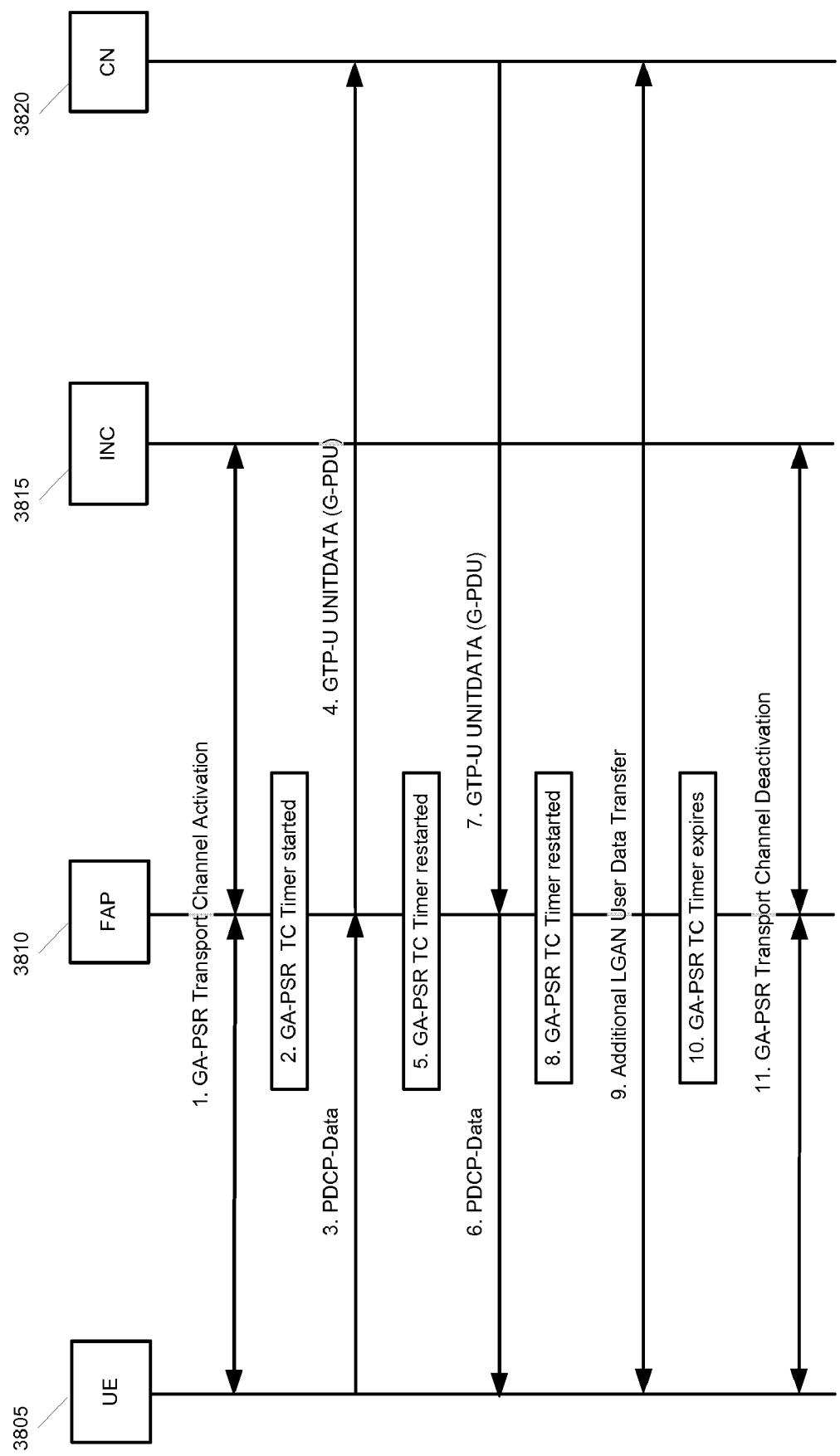
FIG. 38 illustrates Femtocell User Plane Data Transport procedures in some embodiments.

FIG. 38 illustrates the transport of user data packets via Femtocell in some embodiments. As shown, if the corresponding GA-PSR Transport Channel is not active, the GA-PSR TC activation procedure is initiated (in Step 1) as specified in the "FAP initiated GA-PSR transport channel activation" Subsection, above. Upon the GA-PSR Transport Channel establishment, the FAP 3810 starts (in Step 2) GA-PSR TC Timer.

The UE 3805 initiates (in Step 3) the transfer of an uplink user data packet using PDCP Data service. The FAP 3810 forwards (in Step 4) the packet using the standard GTP-U protocol as specified in "GPRS Tunnelling Protocol (GTP) across the Gn and Gp interface", 3GPP TS 29.060, and restarts (in Step 5) GA-PSR TC Timer.

The CN (SGSN) 3820 transfers (in Step 6) downlink user data packet utilizing the same GA-PSR Transport Channel associated with the specific PDP context. Downlink user data packets are transferred using the standard GTP-U protocol as specified in 3GPP TS 29.060. Upon receiving the downlink data packet, the FAP restarts (in Step 7) GA-PSR TC Timer associated with the corresponding GA-PSR Transport Channel and forwards (in Step 8) the packet to the UE via the PDCP.

Additional uplink and downlink user data packets are transferred (in Step 9) via the same GA-PSR Transport Channel as described in steps 2 and 3 respectively. After the GA-PSR TC Timer expires (Step 10), the FAP initiates (in Step 11) GA-PSR Transport Channel deactivation procedure as described in the "FAP initiated deactivation of the GA-PSR transport channel" Subsection, above. A FAP with local service can support PS user plane activity using the FAP IMSI. The necessary message flows would be similar as above without the FAP-UE message exchanges over the air interface.

2. GA-PSR Signaling Procedures

A single TCP connection per UE is established for the transport of signaling messages within the Femtocell. This TCP connection is used to transport all CS and PS related signaling and SMS messages.

a) UE Initiated PS Signaling Procedure

Figure 39:
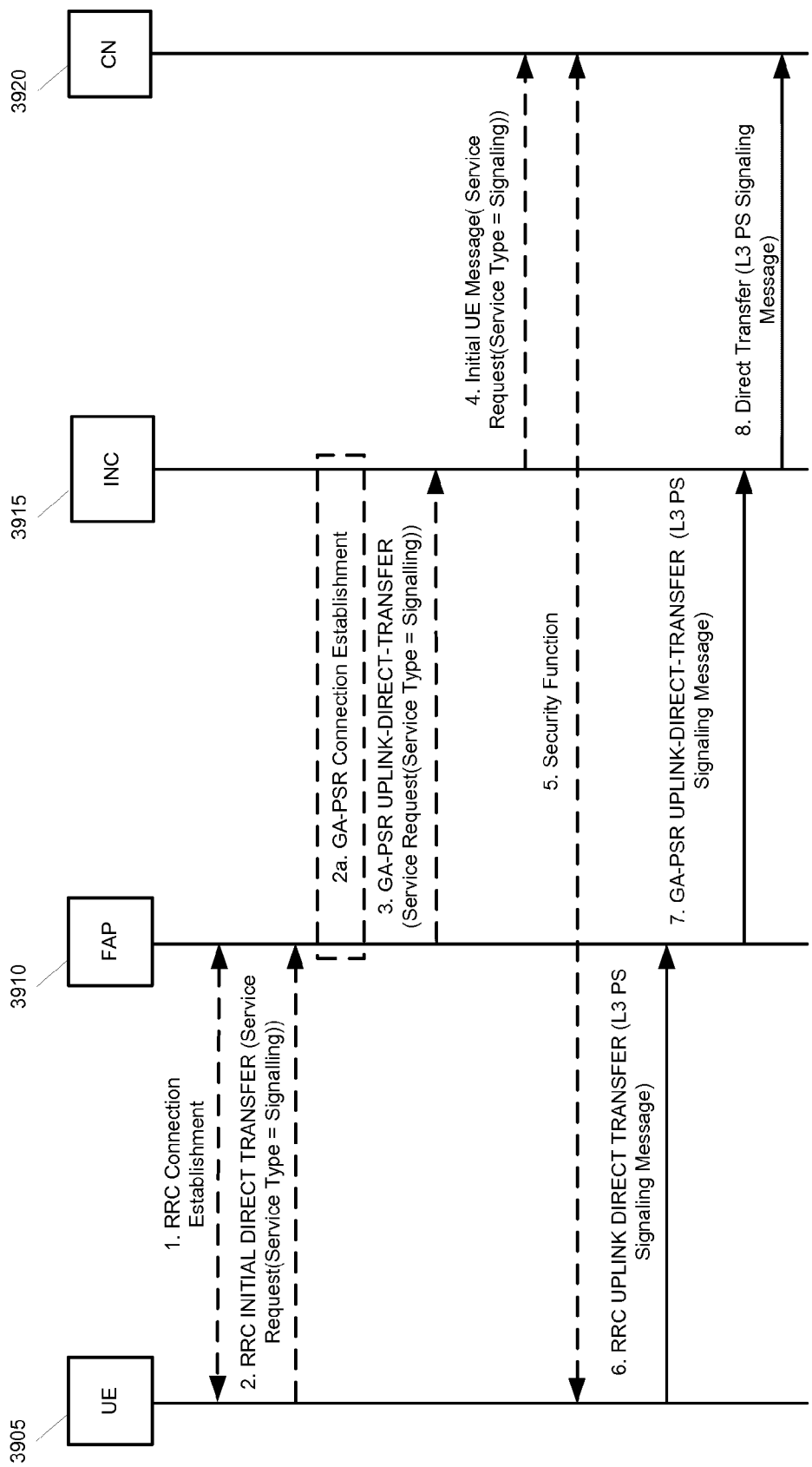
FIG. 39 illustrates Uplink Control Plane Data Transport of some embodiments.

For UE initiated PS related signaling, the UE sends a PS signaling message to the CN, via the INC which forwards it to the CN over the Iu-ps interface as per standard UMTS; e.g. the signaling message may include GMM attach or SM PDP context activation message. The INC encapsulates the received signaling message within a RANAP Direct Transfer message that is forwarded to the SGSN over the Iu-ps interface. FIG. 39 illustrates Uplink Control Plane Data Transport of some embodiments.

Initially, the UE 3905 is ready to send an uplink signaling message for PS services to the CN (SGSN) 3920. This could be any of the GMM or SM signaling messages. As shown, if the RRC connection does not exist, the UE 3905 initiates (in Step 1) RRC Connection establishment procedure as per standard 3GPP procedure.

Upon successful RRC Connection establishment, the UE forwards (in Step 2) a Service Request message to the SGSN via the FAP 3910 indicating PS Signaling message. The FAP performs (in Step 2*a*) the GA-PSR Connection Establishment procedure with the INC as described in the "FAP initiated GA-PSR connection establishment" Subsection under the "RESOURCE MANAGEMENT" Section, above. The FAP encapsulates the Service Request within the GA-PSR-UPLINK-DIRECT-TRANSFER message and forwards (in Step 3) the request to the INC 3910.

Next, the INC forwards (in Step 4) the Service Request to the SGSN encapsulated within the Initial Iu Message or within the Direct Transfer message depending on PMM state. Optionally, the CN (SGSN) may initiate (in Step 5) security function as specified in Sections "Security Mode Control" and "Core Network Authentication", below. The UE 3805 sends (in Step 6) the PS signaling message to the FAP 3910 using RRC Uplink Direct Transfer service.

The FAP 3910 forwards (in Step 7) the PS signaling message to the INC encapsulated within the GA-PSR-UPLINK-DIRECT-TRANSFER message. Finally, the INC 3915 forwards (in Step 8) the PS signaling message to the CN (SGSN) 3920 using RANAP Direct Transfer procedure.

b) Network Initiated PS Signaling Procedure

Figure 40:
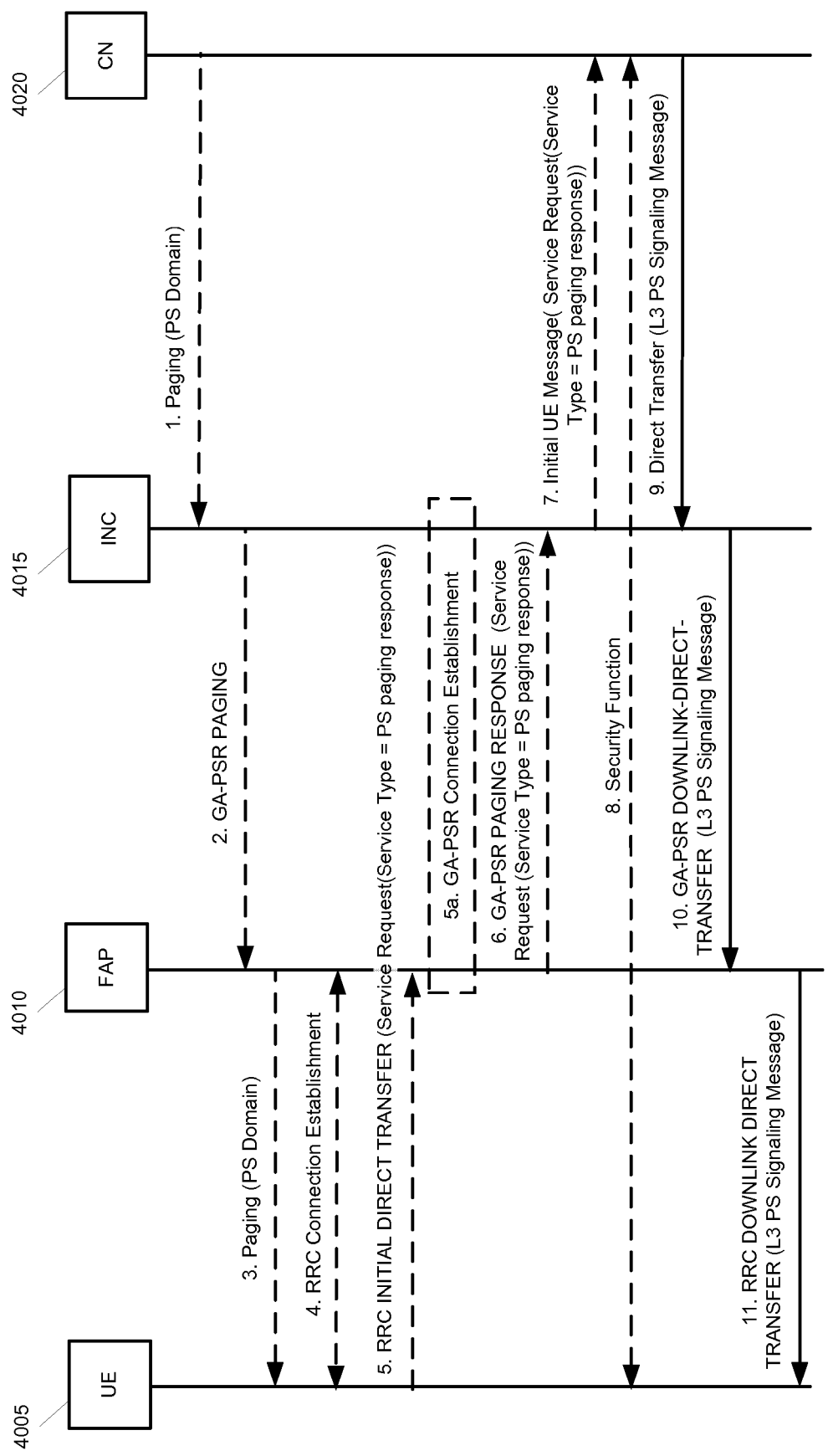
FIG. 40 illustrates Downlink Control Plane Data Transport of some embodiments.

For Network initiated PS related signaling, the Core Network sends a PS signaling message to the INC via the IuPS interface as per standard UMTS; e.g. the signaling message may include GMM attach accept or SM PDP context activation accept message. The INC encapsulates the received signaling message within a GA-PSR-DOWNLINK-DIRECT-TRANSFER OR GA-PSR PAGING message that is forwarded to the FAP via the existing TCP signaling connection. FIG. 40 illustrates Downlink Control Plane Data Transport of some embodiments. Initially, the CN (SGSN) 4020 is ready to send a downlink signaling message for PS services to the UE 4005. This could be any of the GMM or SM signaling messages. Given that the signaling procedure is network initiated and if the UE is in PMM-IDLE state, the SGSN will first page the UE. If the UE is in PMM-CONNECTED state the SGSN will send the downlink PS signaling message using RANAP Direct Transfer procedure starting with Step 9.

As shown, optionally, if the UE 4005 is in PMM-IDLE state, the CN (SGSN) 4020 sends (in Step 1) the RANAP Paging request to the UE via the INC 4015 to locate the user. The paging request indicates paging for PS Domain. Optionally, if the paging request was received, the INC forwards (in Step 2) the paging request using the GA-PSR PAGING message to the FAP 4010.

Also, optionally, if the paging message is received, the FAP forwards (in Step 3) the PS page to the UE as per standard 3GPP procedure. Optionally, if the RRC connection does not exist for that UE, it is established (in Step 4) as per standard 3GPP procedure. Optionally, if the page for PS services was received, the UE responds (in Step 5) to the SGSN via the FAP with a Service Request message indicating PS paging response. The Service Request message is encapsulated within the RRC INITIAL DIRECT TRANSFER message.

The FAP 4010 performs (in Step 5*a*) the GA-PSR Connection Establishment procedure with the INC as described in the "FAP initiated GA-PSR connection establishment" Subsection under the "RESOURCE MANAGEMENT" Section, above. The FAP forwards (in Step 6) the response encapsulated within the GA-PSR PAGING RESPONSE message to the INC.

Next, the INC 4015 forwards (in Step 7) the Service Request message to the SGSN 4020 encapsulated in the RANAP Initial UE Message. Optionally, the CN (SGSN) initiates (in Step 8) Security Function.

The CN (SGSN) forwards (in Step 9) the PS signaling message to the INC using RANAP Direct Transfer procedure. The INC forwards (in Step 10) the PS signaling message to the FAP encapsulated within the GA-PSR-DOWNLINK-DIRECT-TRANSFER message. Finally, the FAP sends (in Step 11) the signaling message to the UE using RRC Downlink Direct Transfer service. A FAP with local service can support PS signaling plane activity using the FAP IMSI. The necessary message flows would be similar as above without the FAP-UE message exchanges over the air interface.

VIII. Error Handling Procedures

In some embodiments, the checks described in this section are applied to all messages exchanged in the Femtocell system. This section also specifies procedures for the handling of unknown, unforeseen, and erroneous protocol data by the receiving entity. These procedures are called "error handling procedures", but in addition to providing recovery mechanisms for error situations they define a compatibility mechanism for future extensions of the protocols. In some embodiments, Sub-sections A to F, below, are applied in order of precedence.

In this section the following terminology is used (1) An information element (IE) is defined to be syntactically incorrect in a message if it includes at least one value defined as "reserved" in the corresponding message, or if its value part violates rules of any corresponding messages. However it is not a syntactical error that an IE specifies in its length indicator a greater length than defined in for the specific message, and (2) A message is defined to have semantically incorrect contents if it includes information which, possibly dependent on the state of the receiver, is in contradiction to the resources of the receiver and/or to the procedural part of this specification. The procedures described in this sub-section apply to both GA-CSR and GA-PSR messages, unless explicitly specified otherwise.

A. Message Too Short

When a message is received that is too short to include a complete message header and all the mandatory information elements, that message is ignored.

B. Invalid Message Header

When the FAP receives a message over UDP with message type not defined or not implemented, the FAP ignores the message. When the FAP receives a message over TCP with protocol discriminator not defined or not implemented, the FAP ignores the message. When the FAP receives a message with Skip Indicator IE not encoded as 0000 or Length IE greater than 2048, the FAP ignores the message.

When the FAP receives a message over TCP with message type not defined for the specific PD (GA-CSR or GA-PSR) or not implemented, the FAP returns a GA-CSR STATUS or GA-PSR STATUS respectively, with cause "message type non-existent or not implemented". When the FAP receives a message not compatible with the protocol state, the FAP ignores the message and shall return a (GA-CSR or GA-PSR) STATUS message with cause "Message type not compatible with protocol state".

C. Invalid Information Elements

When the FAP receives a GA-RC OR GA-CSR OR GA-PSR message with a missing or syntactically incorrect mandatory IE, the FAP ignores the message and returns a (GA-RC or GA-PSR) STATUS message with cause "Invalid mandatory information". The FAP also ignores all unknown IEs in received messages. The FAP further treats all optional IEs that are syntactically incorrect in a message as not present in the message.

When the FAP diagnoses a missing or unexpected conditional IE or when it receives at least one syntactically incorrect conditional IE, the FAP ignores the message and returns a (GA-RC or GA-PSR) STATUS message with cause value "conditional IE error". When the FAP receives a message with semantically incorrect contents, the FAP ignores the message and returns a (GA-RC or GA-PSR) STATUS message with cause value "semantically incorrect message".

D. Handling of Lower Layer Faults

The handling of lower layer failures in the FAP while in the GA-RC-DEREGISTERED state is as follows. If a TCP connection was established towards the Provisioning GANC, the FAP releases the connection. If a secure connection was established towards SeGW of the Provisioning GANC, the FAP releases the secure connection (as defined in "Internet Key Exchange (IKEv2) Protocol", IETF RFC 4306. additionally, when the lower layer failures happen during a Discovery procedure, the FAP doubles the current timer value for TU3903 but not exceeding the maximum value (32 minutes). The FAP also starts timer TU3903.

When the lower layer failures happen during a Registration procedure, and if the registration is still unsuccessful after a number of attempts defined the FAP parameter "Up Connect Attempt Count" (maximum value of 3), and if the FAP had attempted the registration towards the Default GANC, then the FAP deletes the stored information about the Default GANC, increments Redirection Counter, and initiates the Discovery Procedure. When the lower layer failures happen during a Registration procedure, the registration is still unsuccessful after a number of attempts defined the FAP parameter "Up Connect Attempt Count" (maximum value of 3), and the FAP had attempted the registration towards a Serving GANC, then the FAP increments Redirection Counter and initiates Registration Procedure towards the Default GANC.

When the lower layer failures happen during a Registration procedure and the registration is successful before a number of attempts defined the FAP parameter "Up Connect Attempt Count" (maximum value of 3), then the FAP starts timer TU3905 and waits for it to expire.

The handling of lower layer failures in the FAP while not in the GA-RC-DEREGISTERED state is as follows. For all lower layer failures in the FAP (for example related to DNS, IPSec or TCP failures other than RST) except the TCP connection failure which is handled as described in the "FAP initiated FAP Synchronization after TCP connection reestablishment" sub-section described above, the FAP (1) releases the TCP connection towards the current GANC, if established, (2) releases the secure connection towards SeGW of the current GANC, if established, (3) starts timer TU3905 (for FAP TCP connection) or TU3955 (for UE specific TCP connection), and (4) enters GA-RC-DEREGISTERED state.

E. Out of Sequence IEs

The FAP ignores all out of sequence IEs in a message. In some embodiments, the GANC also takes the same approach and ignores all out of sequence IEs in a message.

F. Unexpected Messages

The FAP silently discards all unexpected messages (unless specific behavior is defined for certain messages) which are either inconsistent with the current state of the device or out of sequence. The network should take the same approach.

IX. Message and Information Elements Used

This section provides a list of messages and Information elements (IEs) used in some embodiments. IEs are similar to "attributes" or "parameters" and are used in messages to exchange information across interfaces.

Table IX-1 summarizes the messages for Generic Resources management.

TABLE IX-1

Messages for Unlicensed Radio Resources management

Discovery messages:

GA-RC DISCOVERY REQUEST
GA-RC DISCOVERY ACCEPT
GA-RC DISCOVERY REJECT
Registration messages:

GA-RC REGISTER REQUEST
GA-RC REGISTER ACCEPT
GA-RC REGISTER REDIRECT
GA-RC REGISTER REJECT
GA-RC DEREGISTER
GA-RC REGISTER UPDATE UPLINK
GA-RC REGISTER UPDATE DOWNLINK
Miscellaneous message:

GA-RC KEEP ALIVE
GA-RC SYNCHRONIZATION INFORMATION

Table IX-2 summarizes the messages for Generic Access Circuit Switched Resources (GA-CSR) management

TABLE IX-2

Messages for GA-CSR management

GA-CSR connection establishment messages:

GA-CSR REQUEST
GA-CSR REQUEST ACCEPT
GA-CSR REQUEST REJECT
Traffic Channel establishment messages:

GA-CSR ACTIVATE CHANNEL
GA-CSR ACTIVATE CHANNEL ACK
GA-CSR ACTIVATE CHANNEL FAILURE
GA-CSR ACTIVATE CHANNEL COMPLETE
Channel release messages:

GA-CSR RELEASE
GA-CSR RELEASE COMPLETE
GA-CSR CLEAR REQUEST
Paging messages:

GA-CSR PAGING REQUEST
GA-CSR PAGING RESPONSE
Security Mode messages:

GA-CSR SECURITY MODE COMMAND
GA-CSR SECURITY MODE COMPLETE
GA-CSR SECURITY MODE REJECT
Miscellaneous messages:

GA-CSR UPLINK DIRECT TRANSFER
GA-CSR DOWNLINK DIRECT TRANSFER
GA-CSR STATUS

Table IX-3 summarizes the messages for Generic Access Packet Services Resource (GA-PSR) management.

TABLE IX-3

Messages for Generic Access Radio Link Control management

| | Transport Layer used |
|---|---|
| GA-PSR Connection Management messages: | |
| GA-PSR-REQUEST | TCP |
| GA-PSR REQUESTACCEPT | TCP |
| GA-PSR REQUEST REJECT | TCP |
| GA-PSR-RELEASE | TCP |
| GA-PSR RELEASE COMPLETE | TCP |

TABLE IX-3-continued

Messages for Generic Access Radio Link Control management

| | Transport Layer used |
|---|---|
| GA-PSR TC Management messages: | |
| GA-PSR-ACTIVATE-TC-REQ | TCP |
| GA-PSR-ACTIVATE-TC-ACK | TCP |
| GA-PSR-ACTIVATE-TC-CMP | TCP |
| GA-PSR-DEACTIVATE-TC-REQ | TCP |
| GA-PSR-DEACTIVATE-TC-ACK | TCP |
| GPRS Tunneling messages: | |
| GA-PSR-UPLINK-DIRECT-TRANSFER | TCP |
| GA-PSR-DOWNLINK-DIRECT-TRANSFER | TCP |
| GAN Specific Signaling messages: | |
| GA-PSR-PAGING | TCP |
| GA-PSR-PAGING RESPONSE | TCP |
| GA-PSR-STATUS | TCP |
| Security messages: | |
| GA-PSR SECURITY MODE COMMAND | TCP |
| GA-PSR SECURITY MODE COMPLETE | TCP |
| GA-PSR SECURITY MODE REJECT | TCP |
| GA-PSR CLEAR REQUEST | TCP |

TABLE 9.2.1

IE type and identifiers for Unlicensed Radio Resources management

| IE | Identifier |
|---|---|
| Mobile Identity (FAP) | 1 |
| GAN Release Indicator | 2 |
| Access Identity | 3 |
| GERAN Cell Identity | 4 |
| Location Area Identification | 5 |
| GERAN/UTRAN coverage Indicator | 6 |
| GAN Classmark | 7 |
| Geographical Location | 8 |
| GANC-SeGW IP Address | 9 |
| GANC-SeGW Fully Qualified Domain/Host Name | 10 |
| Redirection Counter | 11 |
| Discovery Reject Cause | 12 |
| GAN Cell Description | 13 |
| GAN Control Channel Description | 14 |
| Cell Identifier List | 15 |
| TU3907 Timer | 16 |
| GSM RR/UTRAN RRC State | 17 |
| Routing Area Identification | 18 |
| GAN Band | 19 |
| GA-RC/GA-CSR State | 20 |
| Register Reject Cause | 21 |
| TU3906 Timer | 22 |
| TU3910 Timer | 23 |
| TU3902 Timer | 24 |
| L3 Message | 26 |
| Channel Mode | 27 |
| Mobile Station Classmark 2 | 28 |
| RR Cause | 29 |
| Cipher Mode Setting | 30 |
| GPRS Resumption | 31 |
| Handover From GAN Command | 32 |
| UL Quality Indication | 33 |
| TLLI | 34 |
| Packet Flow Identifier | 35 |
| Suspension Cause | 36 |
| TU3920 Timer | 37 |
| QoS | 38 |
| GA-PSR Cause | 39 |
| User Data Rate | 40 |
| Routing Area Code | 41 |
| AP Location | 42 |

TABLE 9.2.1-continued

IE type and identifiers for Unlicensed Radio Resources management

| IE | Identifier |
|---|---|
| TU4001 Timer | 43 |
| Location Status | 44 |
| Cipher Response | 45 |
| Ciphering Command RAND | 46 |
| Ciphering Command MAC | 47 |
| Ciphering Key Sequence Number | 48 |
| SAPI ID | 49 |
| Establishment Cause | 50 |
| Channel Needed | 51 |
| PDU in Error | 52 |
| Sample Size | 53 |
| Payload Type | 54 |
| Multi-rate Configuration | 55 |
| Mobile Station Classmark 3 | 56 |
| LLC-PDU | 57 |
| Location Black List indicator | 58 |
| Reset Indicator | 59 |
| TU4003 Timer | 60 |
| AP Service Name | 61 |
| GAN Service Zone Information | 62 |
| RTP Redundancy Configuration | 63 |
| UTRAN Classmark | 64 |
| Classmark Enquiry Mask | 65 |
| UTRAN Cell Identifier List | 66 |
| Serving GANC table indicator | 67 |
| Registration indicators | 68 |
| GAN PLMN List | 69 |
| Required GAN Services | 71 |
| Broadcast Container | 72 |
| 3G Cell Identity | 73 |
| FAP Radio Identity | 96 |
| GANC IP Address | 97 |
| GANC Fully Qualified Domain/Host Name | 98 |
| IP address for GPRS user data transport | 99 |
| UDP Port for GPRS user data transport | 100 |
| GANC TCP port | 103 |
| RTP UDP port | 104 |
| RTCP UDP port | 105 |
| GERAN Received Signal Level List | 106 |
| UTRAN Received Signal Level List | 107 |
| Integrity Protection Information | 75 |
| Encryption Information | 76 |
| Key Status | 77 |
| Chosen Integrity Algorithm | 78 |
| Chosen Encryption Algorithm | 79 |
| Security Mode Reject Cause | 80 |
| RAB ID | 81 |
| RAB Parameters | 82 |
| GTP TEID | 83 |
| Service Handover | 84 |
| PDP Type Information | 85 |
| Data Volume Reporting Indicator | 86 |
| DL GTP-PDU Sequence Number | 86 |
| UL GTP-PDU Sequence Number | 88 |
| DL N-PDU Sequence Number | 89 |
| UL N-PDU Sequence Number | 90 |
| Alternate RAB Parameter Values | 91 |
| Assigned RAB Parameter Values | 92 |
| Data Volume List | 93 |
| DRX Cycle Length Coefficient | 94 |
| Paging Cause | 95 |
| URA Identity | 110 |
| GA-PSR State | 111 |
| Mobile Identity (UE) | 112 |
| RABS Data Volume Report List | 113 |
| Allocation/Retention Priority Information | 114 |
| NAS Synchronization Indicator | 115 |

X. Short Message Services

The Femtocell system provides support for both circuit mode (CS mode) and packet mode (PS mode) SMS services. CS/PS mode of operation UEs may be able to send and receive short messages using either the MM sub-layer or the GMM sub-layer. PS mode of operation UEs may be able to send and receive short messages using only GMM sub-layer. Inter-working with Femtocell related to SMS services is described in the following sections.

A. Circuit Mode (CS Mode) SMS Services

Figure 41:
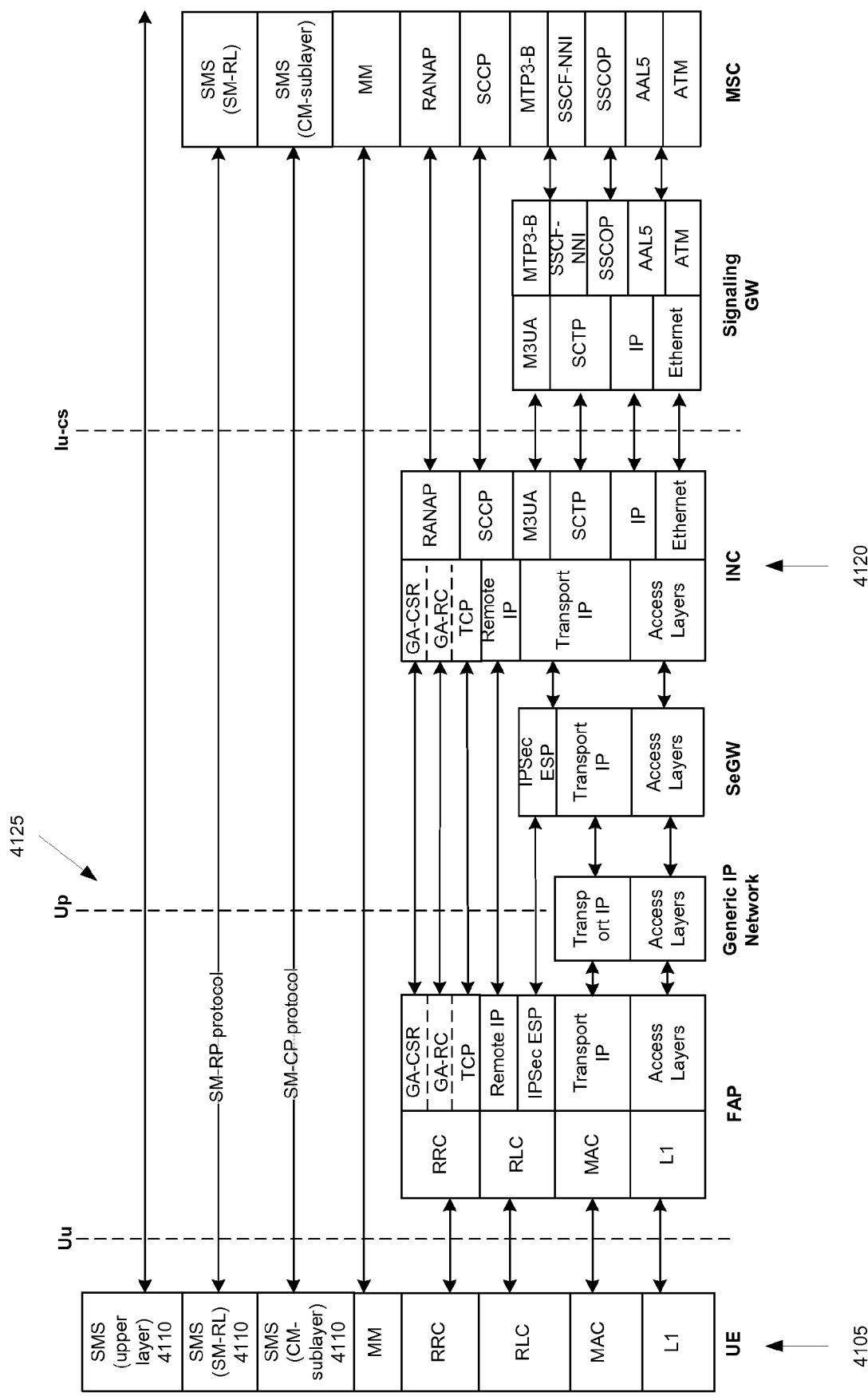
FIG. 41 illustrates the protocol architecture for CS mode SMS in some embodiments.

The Femtocell protocol architecture related to CS mode SMS support builds on the circuit services signaling architecture described in the "CS domain—control plane architecture" Subsection under the "FEMTOCELL SYSTEM ARCHITECTURE" Section, above. FIG. 41 illustrates the protocol architecture for CS mode SMS in some embodiments.

The Femtocell CS mode SMS support is based on the same mechanism that is utilized for CS mobility management and call control. On the UE 4105 side, the SMS layers 4110 (including the supporting CM sub-layer functions) utilize the services of the MM layer 4115 to transfer SMS messages per standard circuit mode implementation. The SM-CP protocol is effectively tunneled between the UE 4105 and the MSC 4115 using the message relay functions in the GA-CSR protocol. As with CS mobility management and call control procedures, SMS uses the UE specific TCP signaling connection between the FAP and the INC 4120, providing reliable SMS delivery over the Up interface 4125.

B. Packet Mode (PS Mode) SMS Services

Figure 42:
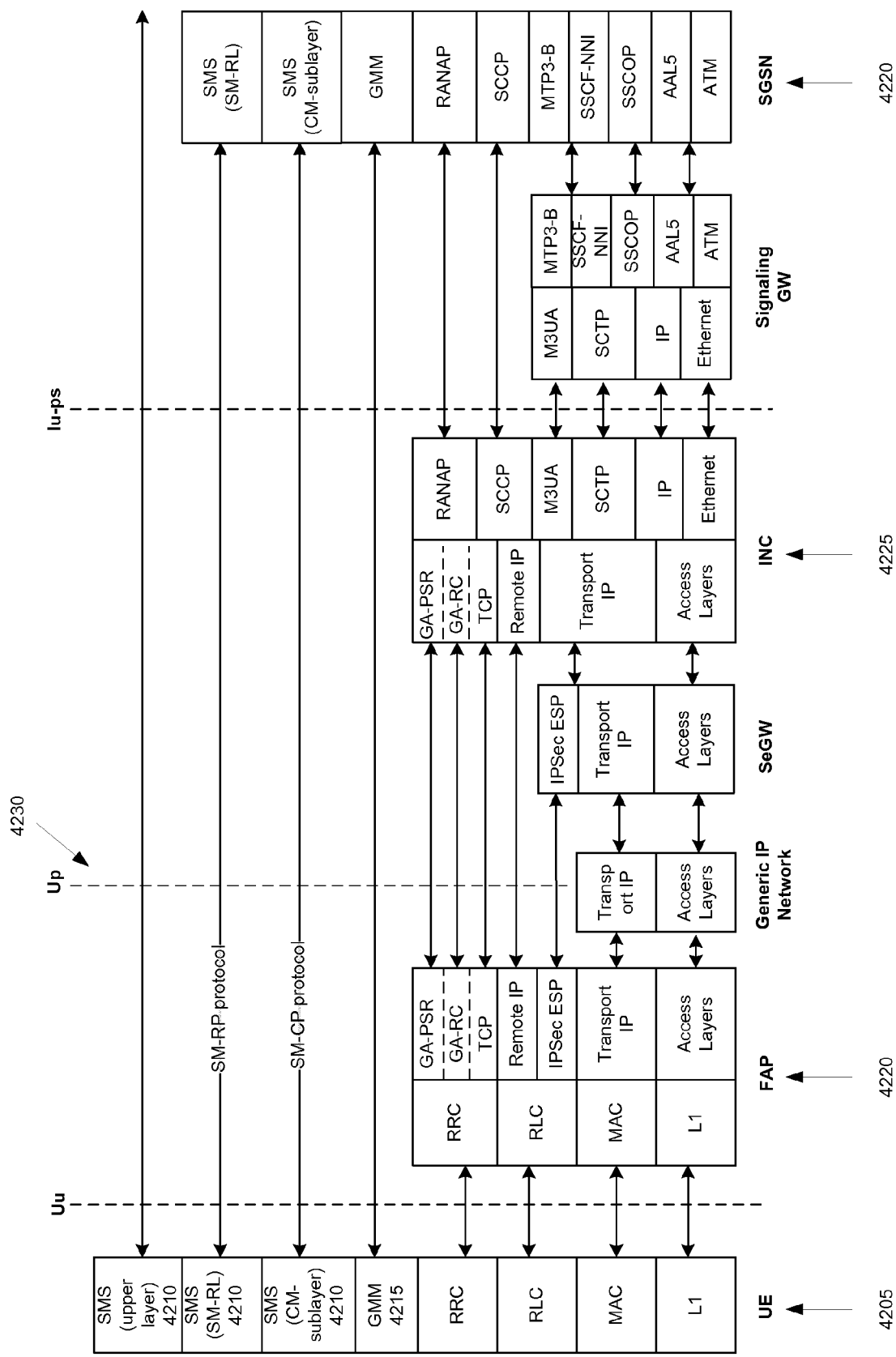
FIG. 42 illustrates the GAN protocol architecture for packet mode SMS in some embodiments.

The Femtocell protocol architecture related to PS mode SMS support builds on the packet services signaling architecture described in the "PS domain—control plane architecture" Subsection under the "FEMTOCELL SYSTEM ARCHITECTURE" Section, above. FIG. 42 illustrates the GAN protocol architecture for packet mode SMS in some embodiments.

On the UE 4205 side, the SMS layers 4210 (including the supporting CM sublayer functions) utilize the services of the GMM layer 4215 to transfer SMS messages per the standard packet mode implementation. The SM-CP protocol is effectively tunneled between the UE 4205 and the SGSN 4220 using the message relay functions in the GA-PSR protocol. As with the packet services signaling procedures, SMS uses the UE specific TCP signaling connection between the FAP and the INC 4225, providing reliable SMS delivery over the Up interface 4230.

C. SMS Scenarios

The following scenarios illustrate the message flows involved for various SMS scenarios via the Femtocell.

1. Circuit Mode Mobile-Originated SMS

Figure 43:
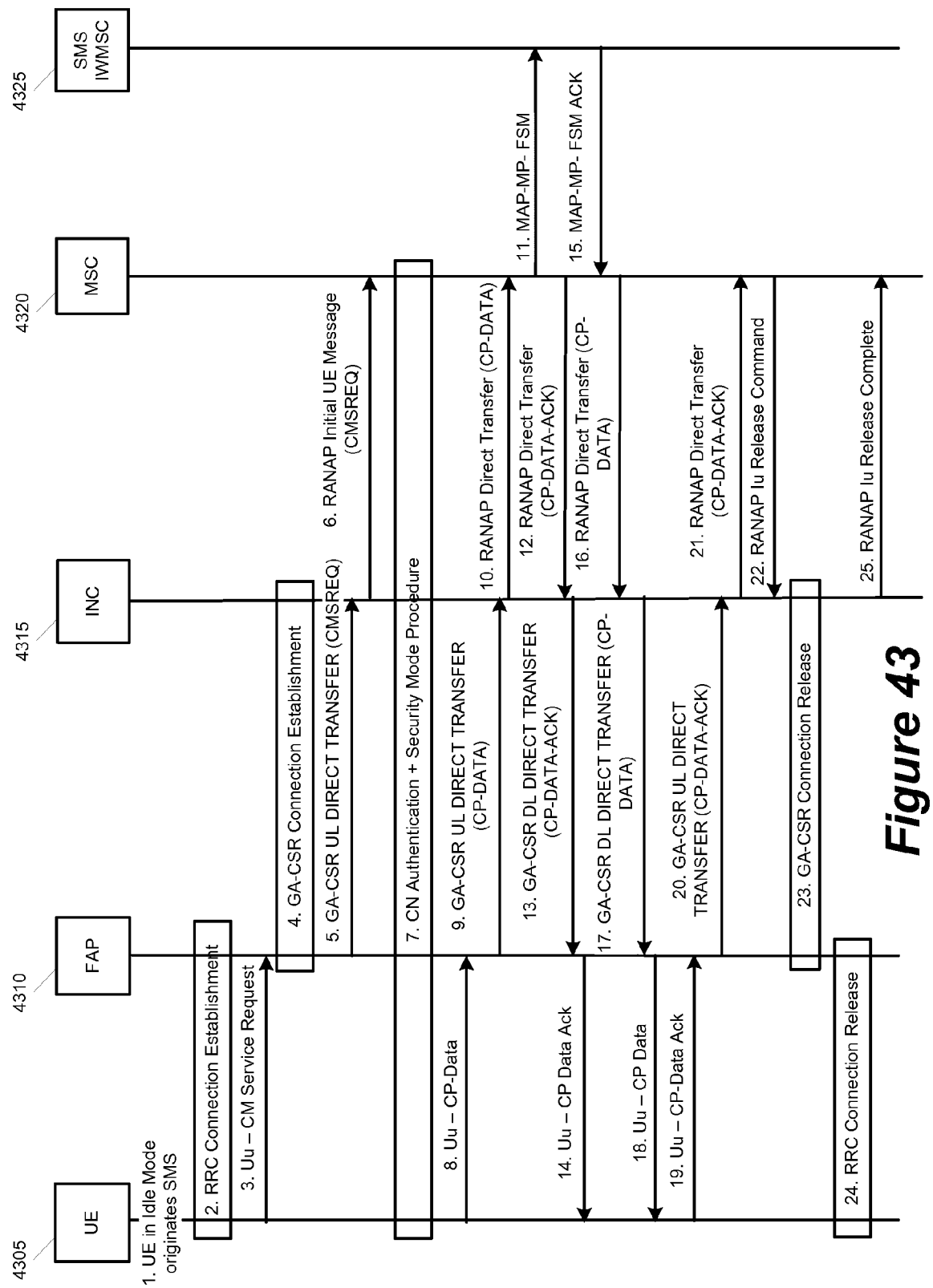
FIG. 43 illustrates a mobile originated SMS transfer via GAN circuit mode in some embodiments.

FIG. 43 illustrates a mobile originated SMS transfer via GAN circuit mode in some embodiments. As shown, the user enters a message and invokes the mobile-originated SMS function on the UE 4305 in idle mode. Steps 4 to 10 in FIG. 43 are Steps 2 to 7 in the "Mobile originated call" Subsection under the "CALL MANAGEMENT" Section, above. Next, the UE 4305 sends (in Step 8) the SMS message encapsulated in a CP-DATA message to the FAP 4310 over the air interface.

The FAP relays (in Step 9) the CP-DATA message encapsulated in a GA-CSR UL DIRECT TRANSFER message to the INC 4315. The INC forwards (in Step 10) the CP-DATA message to the MSC 4320 using RANAP Direct Transfer message. The MSC forwards (in Step 11) the message to the SMSC via the SMS interworking MSC (IWMSC) 4325 using the MAP-MO-FORWARD-SM Invoke message.

The MSC sends (in Step 12) CP-DATA-ACK to acknowledge the receipt of the CP-DATA message. The SM-CP is designed in a way that every CP-DATA block is acknowledged on each point-to-point connection between the UE and SMSC (SM Service Center) to ensure that the under-laying transport layer (in this case RANAP) works error free since there is no explicit ack to a RANAP Direct Transfer message.

The INC 4315 relays (in Step 13) the acknowledgement to the FAP 4310. The FAP forwards (in Step 14) the CP-DATA-ACK to the UE 4305 over the air interface. The SMSC sends (in Step 15) a SMS message in response to the IWMSC and the IWMSC sends the response to the MSC in the MAP-MO-FORWARD-SM Return Result message.

Next, the MSC 4320 relays the response (in Step 16) to the INC 4315 in the CP-DATA message. The INC 4315 relays (in Step 17) this to the FAP 4310 using GA-CSR DL DIRECT TRANSFER. The FAP relays (in Step 18) the response to the UE over the air interface using the existing RRC connections.

As part of SM-CP ack process, the UE acknowledges (in Step 19) the receipt of CP-DATA to the FAP. The FAP relays (in Step 20) the acknowledgement to the INC. The INC forwards (in Step 21) the acknowledgement to the MSC using the RANAP Direct Transfer message.

Next, the MSC 4320 sends (in Step 22) Iu Release message to the INC indicating a request to release the session resources. The SCCP Connection Identifier is used to determine the corresponding session. The INC 4315 in turn releases (in Step 23) the GA-CSR connection to the FAP for the specific session. Also, the FAP 4310 releases (in Step 24) corresponding radio resources towards the UE. Finally, the INC acknowledges (in Step 25) the release in an Iu Release Complete message to the MSC. The SCCP connection associated with the call between the INC and the MSC is released.

2. CS Mode Mobile-Terminated SMS

Figure 44:
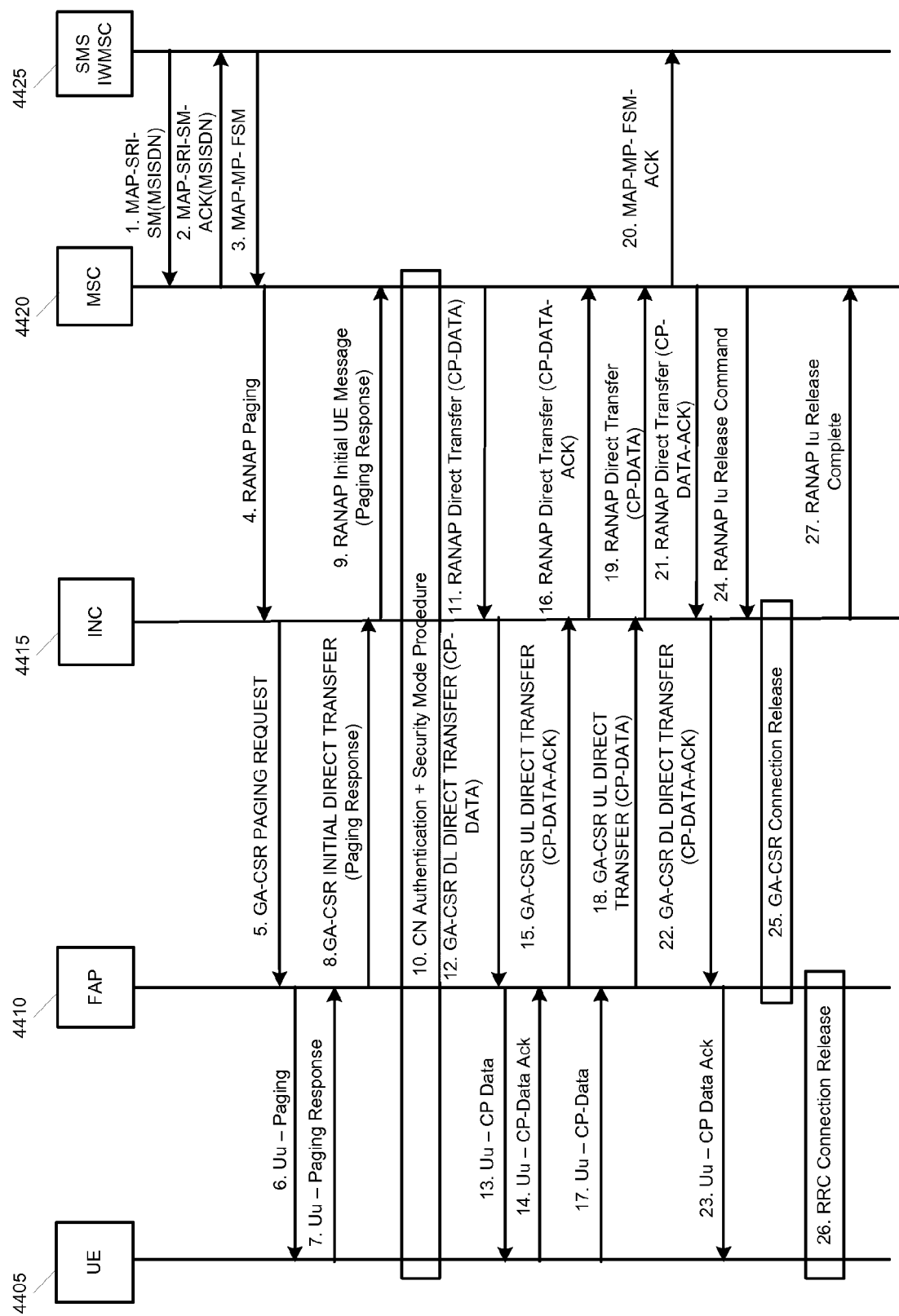
FIG. 44 illustrates a CS mode mobile terminated SMS transfer via Femtocell in some embodiments.

FIG. 44 illustrates a CS mode mobile terminated SMS transfer via Femtocell in some embodiments. As shown, the SMSC 4425 sends (in Step 1) a SMS message destined for the UE 4405 to the SMS gateway MSC (GMSC) 4420. The GMSC queries the HLR for routing information using the MAP-SEND-ROUTING-INFO-SM Invoke message.

The HLR responds (in Step 2) with the MSC number associated with the serving MSC. The SMS GMSC delivers (in Step 3) the SMS message to the MSC using the MAP MT-FORWARD-SM Invoke message. Steps 4 to 10 are the same as Steps 2 to 8 in "Mobile Terminated Call" Section above, except that the user is attempting to terminate an SMS message; therefore, only a signaling channel is necessary.

Next, the MSC 4420 sends (in Step 11) the SMS message encapsulated in a CP-DATA message to the INC 4415. The INC relays (in Step 12) this to the FAP 4410 using GA-CSR DL DIRECT TRANSFER. The FAP relays (in Step 13) the CP-DATA message to the UE 4405 over the air interface using the existing RRC connections.

As part of SM-CP ack process, the UE acknowledges (in Step 14) the receipt of CP-DATA to the FAP. The FAP relays (in Step 15) the acknowledgement to the INC. The INC forwards (in Step 16) the acknowledgement to the MSC using the RANAP Direct Transfer message.

The SMS entity on the UE acknowledges (in Step 17) the SMS message via another CP-DATA message (response) which is sent to the FAP over the air interface. The FAP relays (in Step 18) the response CP-DATA message encapsulated in a GA-CSR UL DIRECT TRANSFER message to the INC. The INC forwards (in Step 19) the response CP-DATA message to the MSC using RANAP Direct Transfer message.

Next, the MSC 4420 sends the response (in Step 20) to the SMS GMSC 4425 in the MAP-MT-FORWARD-SM Return Result message. The GMSC relays the response to the SMSC. The MSC acknowledges (in Step 21) the receipt of CP-DATA to the INC. The INC 4415 relays (in Step 22) the CP-DATA-ACK to the FAP.

Next, the FAP 4410 forwards (in Step 23) the CP-DATA-ACK to the UE 4405 over the air interface. The MSC 4420 sends (in Step 24) Iu Release message to the INC 4415 indicating a request to release the session resources. The SCCP Connection Identifier is used to determine the corresponding session.

The INC 4415 in turn releases (in Step 25) the GA-CSR connection to the FAP for the specific session. The FAP releases (in Step 26) corresponding radio resources towards the UE. The INC acknowledges (in Step 27) the release in an Iu Release Complete message to the MSC. The SCCP connection associated with the call between the INC and the MSC is released XI. EMERGENCY SERVICES Transparent support for emergency services is a key regulatory requirement. Femtocell emergency services support capabilities include support for flexible UMTS-to-Femtocell SAI mapping and INC assignment functionality. This allows the FAP to be assigned to an INC that is, in turn, connected to an MSC that can route calls to the PSAP in the Femtocell service area. It also allows the service provider to define Femtocell service areas that align with macro network service areas, to leverage the existing service area based PSAP routing approach.

Femtocell emergency services support capabilities also include support for the retrieval and storage of FAP location information from an external database, using the enhanced service access control functions. Femtocell emergency services support capabilities further include support for the RANAP Location Report procedure, by which the INC returns the FAP location information to the MSC during emergency call processing. Some embodiments do not support emergency calling from an un-authorized UE over a given FAP (due to the Service Access Control for the specific FAP).

One of the functions of the UMTS-Femtocell mapping process is to assign a Femtocell Service Area for calls made by the UE using the Femtocell. The FAP, during registration, provides information on macro coverage (such as macro LAI, macro 3G cell-id, etc) which can be mapped to a Femtocell Service Area Identification (SAI). This Femtocell SAI can be used to support the ability to route emergency calls to the correct PSAP; i.e., based on SAI. However, to meet the requirement to route the emergency call to the correct PSAP, there are actually two possible approaches: (1) Service Area (i.e. SAI) Based Routing, and (2) Location Based Routing.

A. Service Area Based Routing

Figure 45:
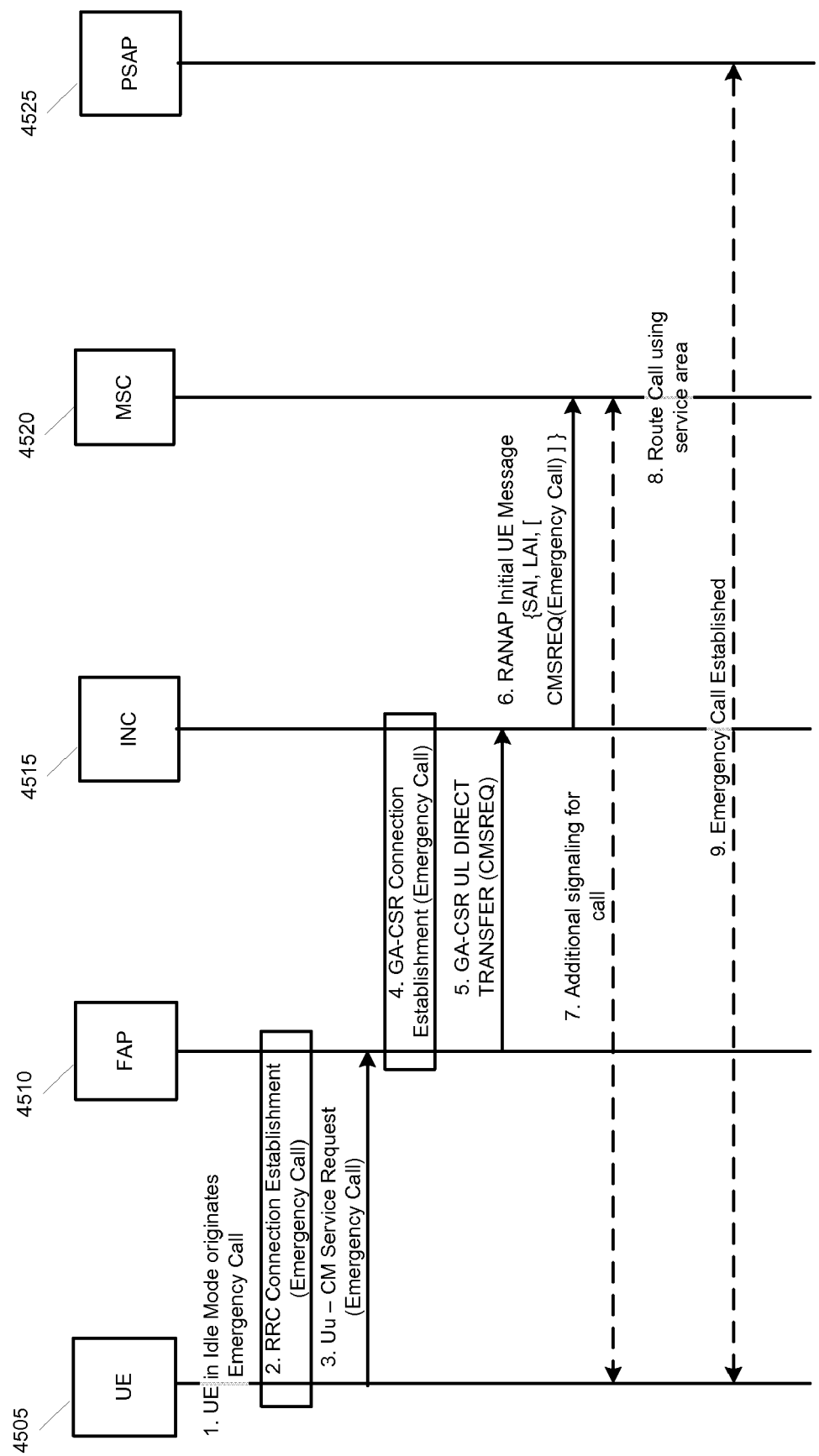
FIG. 45 illustrates a service area based routing scenario of some embodiments.

With Service Area Based Routing, the PSAP routing decision is based on the Service Area Code (SAC) included within the SAI. FIG. 45 illustrates a service area based routing scenario of some embodiments. As shown, the user originates (in Step 1) an emergency call using the UE 4505 camped on the Femtocell. The UE establishes (in Step 2) a RRC connection with the FAP with the establishment cause of emergency call.

Upon request from the upper layers, the UE sends (in Step 3) the CM Service Request (with CM Service Type set to "Emergency Call Establishment") to the FAP 4510. The FAP performs (in Step 4) the GA-CSR Connection Establishment procedure (with establishment cause indicating an Emergency call) with the INC 4515 as described in previous sections.

The FAP 4510 then forwards (in Step 5) the CM Service Request to the INC 4515 using a GA-CSR UL DIRECT TRANSFER message. The INC 4515 establishes a SCCP connection to the MSC 4520 and forwards (in Step 6) the CM Service Request to the MSC 4520 using the RANAP Initial UE Message. This initial message includes information about the location area (LAI) and service area (SAI) assigned to the specific FAP over which the emergency call was initiated.

The MSC 4520, INC 4515 and UE 4505 continue (in Step 7) call establishment signaling. The MSC determines the serving PSAP based on the service area of the calling UE and routes (in Step 8) the emergency call to the appropriate PSAP. Additional signal messages are exchanged between the UE and PSAP and the emergency call is established (in Step 9) between the UE and the appropriate serving PSAP.

B. Location Based Routing

One of the drawbacks service area based routing is that it would require that Femtocell service area be split into multiple service areas based on PSAP routing requirements. The location based routing method removes this limitation. Location based routing is also known as "X/Y routing" or "Routing by position" and is defined in "Location Services (LCS); Functional description; Stage 2", 3GPP TS 23.271. Some embodiments support Location based routing while some other embodiments do not support Location based routing.

XII. Femtocell Security

Figure 46:
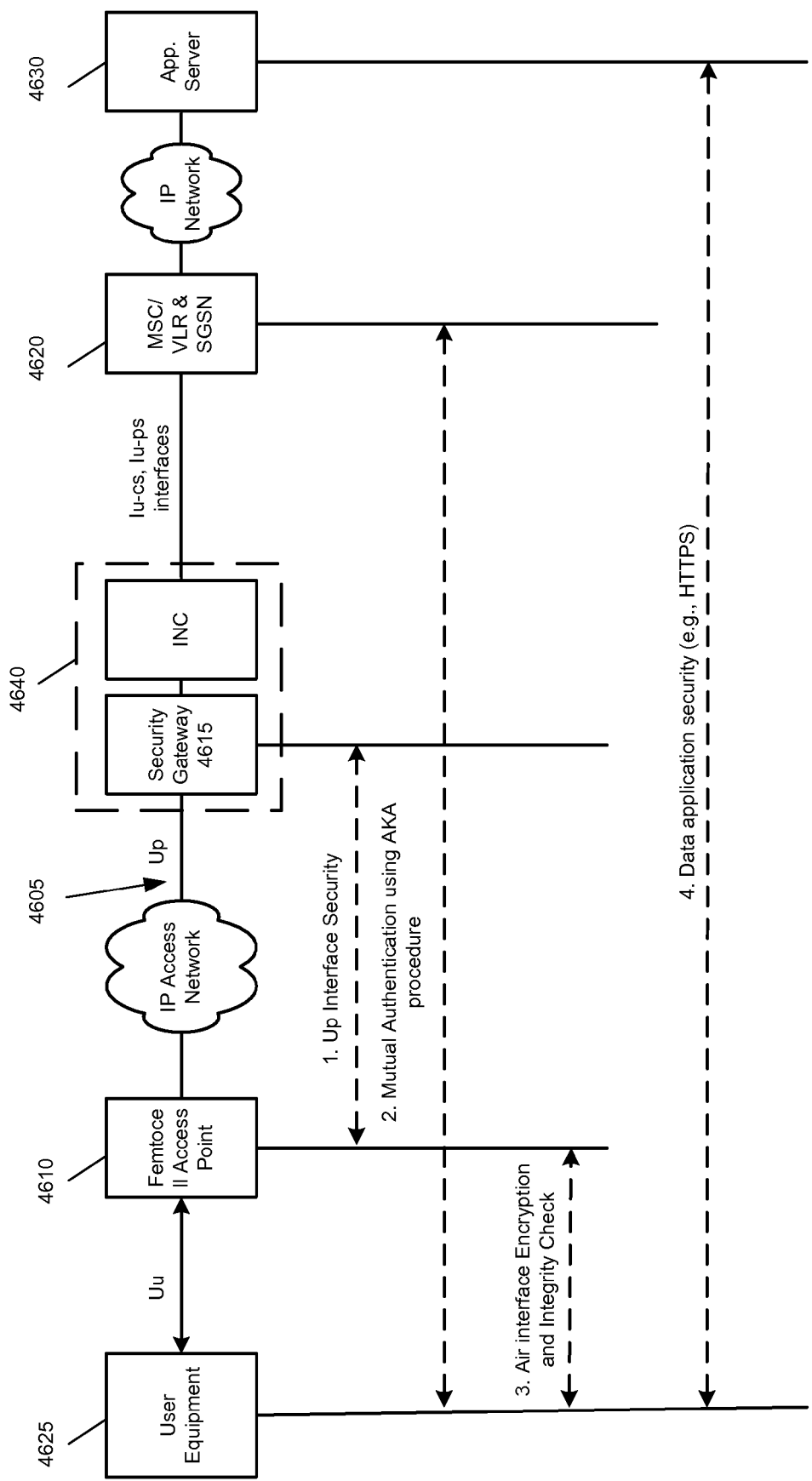
FIG. 46 illustrates GAN Femtocell security mechanisms in some embodiments.

GAN Femtocell supports security mechanisms at different levels and interfaces as depicted in FIG. 46. As shown, the security mechanisms over the Up interface 4605 protect signaling, voice and data traffic flows between the FAP 4610 and the GANC SeGW 4615 from unauthorized use, data manipulation and eavesdropping; i.e. authentication, encryption and data integrity mechanisms are supported.

Authentication of the subscriber by the core network occurs between the MSC/VLR or SGSN 4620 and the UE 4625 and is transparent to the GANC 4640. The air interface between the UE 4625 and FAP 4610 is protected via encryption (ciphering) and integrity checks. In some embodiments the use of ciphering on the air interface is optional.

Additional application level security mechanisms may be employed in the PS domain to secure the end-to-end communication between the FAP 4605 and the application server 4630. For example, the FAP may run the HTTP protocol over an SSL session for secure web access.

All signaling traffic and user-plane traffic sent between FAP and GANC over the Up interface 4605 is protected by a secure tunnel (e.g., an IPSec tunnel) between the FAP 4605 and GANC-SeGW 4615, that provides mutual authentication (using SIM or USIM credentials), encryption and data integrity using the same mechanisms as specified in "3G security; Wireless Local Area Network (WLAN) interworking security", 3GPP TS 33.234 standard, hereinafter "TS 33.234 standard". The use of a single secure tunnel between the FAP 4610 and the GANC 4640 enables multiple UEs 4625 (only one is shown in FIG. 46 for simplicity) as well as the Femtocell itself (e.g., the FAP signaling or when the FAP supports local service using the FAP IMSI, the signaling and the user plane for the FAP utilize the same IPSec tunnel). The advantages of using a single IPSec tunnel between the FAP and the GANC include relieving the SeGW from supporting a large number of secure tunnels.

A. Authentication

In some embodiments, the Up interface supports the ability to authenticate the FAP with the GANC (for the purposes of establishing the secure tunnel) using UMTS credentials. Authentication between FAP and GANC shall be performed using EAP-AKA or EAP-SIM within IKEv2.

The FAP and GANC-SeGW establish a security association for protecting signaling traffic and user-plane (voice and data) traffic. The protocol for authentication is IKEv2. Mutual authentication and key generation is provided by EAP-AKA or EAP-SIM.

The basic elements of these procedures are the following. The FAP connection with the GANC-SeGW is initiated by starting the IKEv2 initial exchanges (IKE_SA_INIT). The EAP-AKA or EAP-SIM procedure is started as a result of these exchanges. The EAP-SIM procedure for FAP with SIM only or FAP with USIM, but not capable of UMTS AKA, is performed between FAP and AAA server (that has access to the AuC/HLR/HSS to retrieve subscriber information). The EAP-AKA procedure for FAP with USIM and the FAP is capable of UMTS AKA, is performed between FAP and AAA server. The GANC-SeGW acts as relay for the EAP-SIM/EAP-AKA messages.

When the EAP-AKA/EAP-SIM procedure has completed successfully, the IKEv2 procedure can be continued to completion and the signaling channel between FAP and GANC-SeGW is secured. The FAP can then continue with the discovery or registration procedure. Signaling flows for EAP-AKA/EAP-SIM authentication are shown in the following subsection.

1. EAP-SIM Procedure for Authentication

Figure 47:
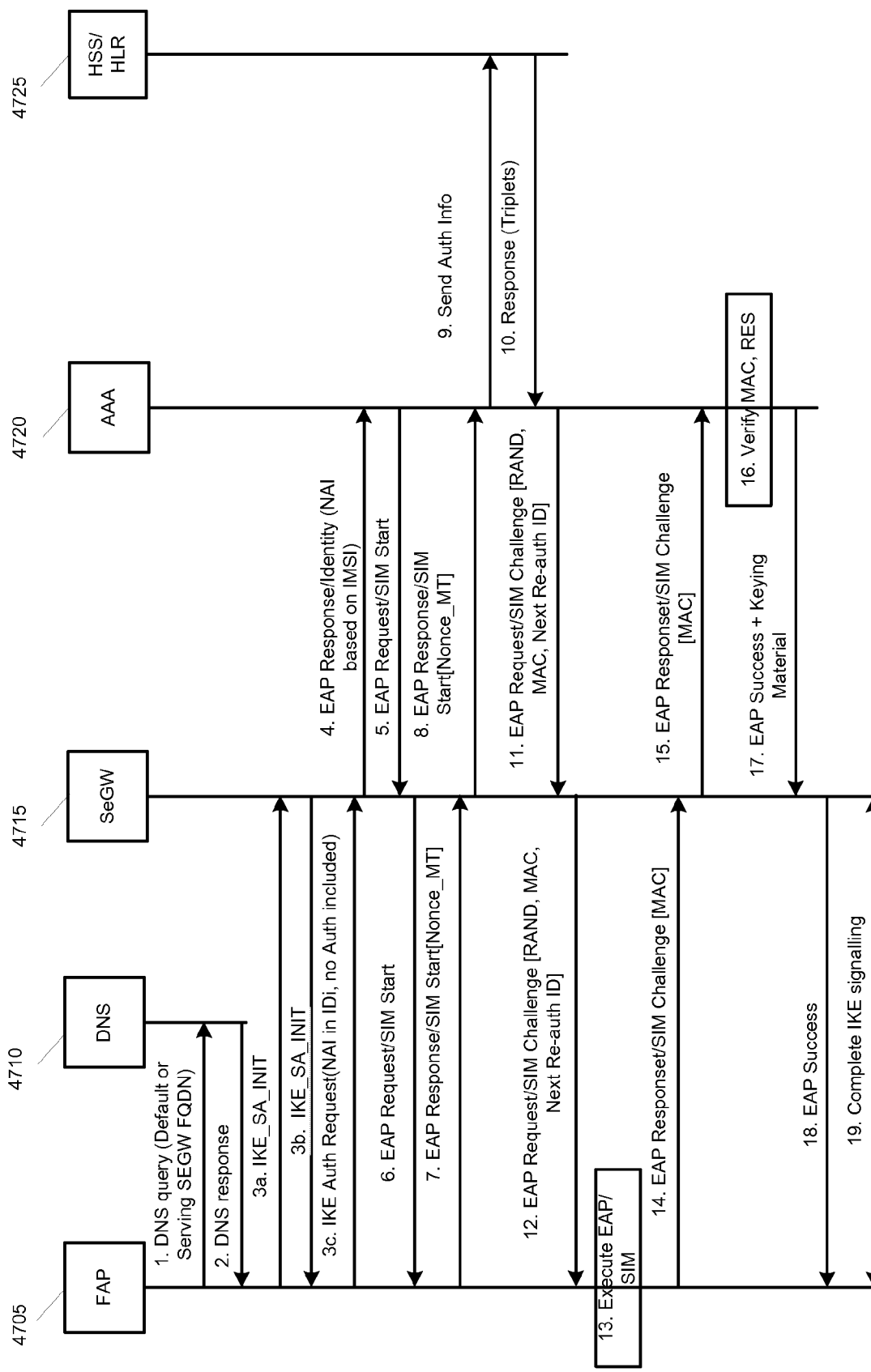
FIG. 47 illustrates EAP-SIM authentication procedure in some embodiments.

The EAP-SIM authentication mechanism is specified in "Extensible Authentication Protocol Method for GSM Subscriber Identity Modules (EAP-SIM)", IETF RFC 4686. This section describes how this mechanism is used in Femtocell. FIG. 47 illustrates EAP-SIM authentication procedure in some embodiments. As shown, the FAP 4705 connects to the generic IP access network and obtains (in Step 1) the IP address of the Default or the Serving SeGW via DNS query. In response, the DNS server 4710 returns (in Step 2) the IP address of the SeGW.

Next, the FAP 4705 initializes the IKEv2 authentication procedure by starting (in Steps 3a-3c) the IKE_SA_INIT exchange. It indicates the desire to use EAP by leaving out the AUTH payload from message 3, the first message of the IKE_AUTH exchange, and the initiator identity is composed compliant with the Network Access Identifier (NAI) format specified in "The Network Access Identifier", IETF RFC 2486, hereinafter "IETF RFC 2486", which includes the IMSI and an indication that EAP-SIM should be used.

Next, the GANC-SeGW 4715 sends (in Step 4) an EAP Response/Identity message to the AAA server 4720, including the initiator identity included in the third IKE message. The leading digit of the NAI indicates that the FAP wishes to use EAP-SIM. The AAA server 4720 identifies the subscriber as a candidate for authentication with EAP-SIM, based on the received identity, and verifies that EAP-SIM shall be used based on subscription information. The AAA then sends (in Step 5) the EAP Request/SIM-Start packet to GANC-SeGW 4715.

The GANC-SeGW forwards (in Step 6) the EAP Request/SIM-Start packet to FAP. The FAP chooses a fresh random number NONCE_MT. The random number is used in network authentication. The FAP sends (in Step 7) the EAP Response/SIM-Start packet, including NONCE_MT, to the GANC-SeGW.

The GANC-SeGW forwards (in Step 8) the EAP Response/SIM-Start packet to the AAA Server. The AAA server 4720 requests (in Step 9) authentication data from the HLR 4725, based on the IMSI. The AAA server could instead use cached triplets previously retrieved from the HLR to continue the authentication process.

Optionally, the AAA 4720 receives (in Step 10) user subscription and multiple triplets from the HSS/HLR 4725. AAA server determines the EAP method (SIM or AKA) to be used, according to the user subscription and/or the indication received from the FAP. In this sequence diagram, it is assumed that the FAP holds a SIM and EAP-SIM will be used.

The AAA server formulates an EAP-SIM/Challenge with multiple RAND challenges, and includes a message authentication code (MAC) whose master key is computed based on the associated Kc keys, as well as the NONCE_MT. A new re-authentication identity may be chosen and protected (i.e. encrypted and integrity protected) using EAP-SIM generated keying material. The AAA Server sends (in Step 11) this RAND, MAC and re-authentication identity to the GANC-SeGW in the EAP Request/SIM-Challenge message. The GANC-SeGW forwards (in Step 12) the EAP Request/SIM-Challenge message to the FAP.

The FAP runs (in Step 13) N times the GSM A3/A8 algorithm in the SIM, once for each received RAND. This computing gives N SRES and Kc values. The FAP calculates its copy of the network authentication MAC with the newly derived keying material and checks that it is equal with the received MAC. If the MAC is incorrect, the network authentication has failed and the FAP cancels the authentication. The FAP continues the authentication exchange only if the MAC is correct. The FAP calculates a new MAC with the new keying material covering the EAP message concatenated to the N SRES responses. If a re-authentication ID was received, then the FAP stores this ID for future authentications.

The FAP 4705 sends (in Step 14) EAP Response/SIM-Challenge including calculated MAC to the GANC-SeGW 4715. The GANC-SeGW forwards (in Step 15) the EAP Response/SIM-Challenge message to the AAA Server 4720. The AAA Server verifies (in Step 16) that its copy of the response MAC is equal to the received MAC.

If the comparison in step 16 is successful, then the AAA Server sends (in Step 17) the EAP Success message to the GANC-SeGW. The AAA Server includes derived keying material for confidentiality and/or integrity protection between FAP and GANC-SeGW, in the underlying AAA protocol message (i.e. not at EAP level).

The GANC-SeGW informs (in Step 18) the FAP about the successful authentication with the EAP Success message. Now the EAP-SIM exchange has been successfully completed, the IKE signaling can be completed (in Step 19). The Secure Association between FAP and GANC-SeGW has been completed and the FAP can continue with the Femtocell discovery or registration procedure.

2. EAP-AKA Procedure for Authentication

Figure 48:
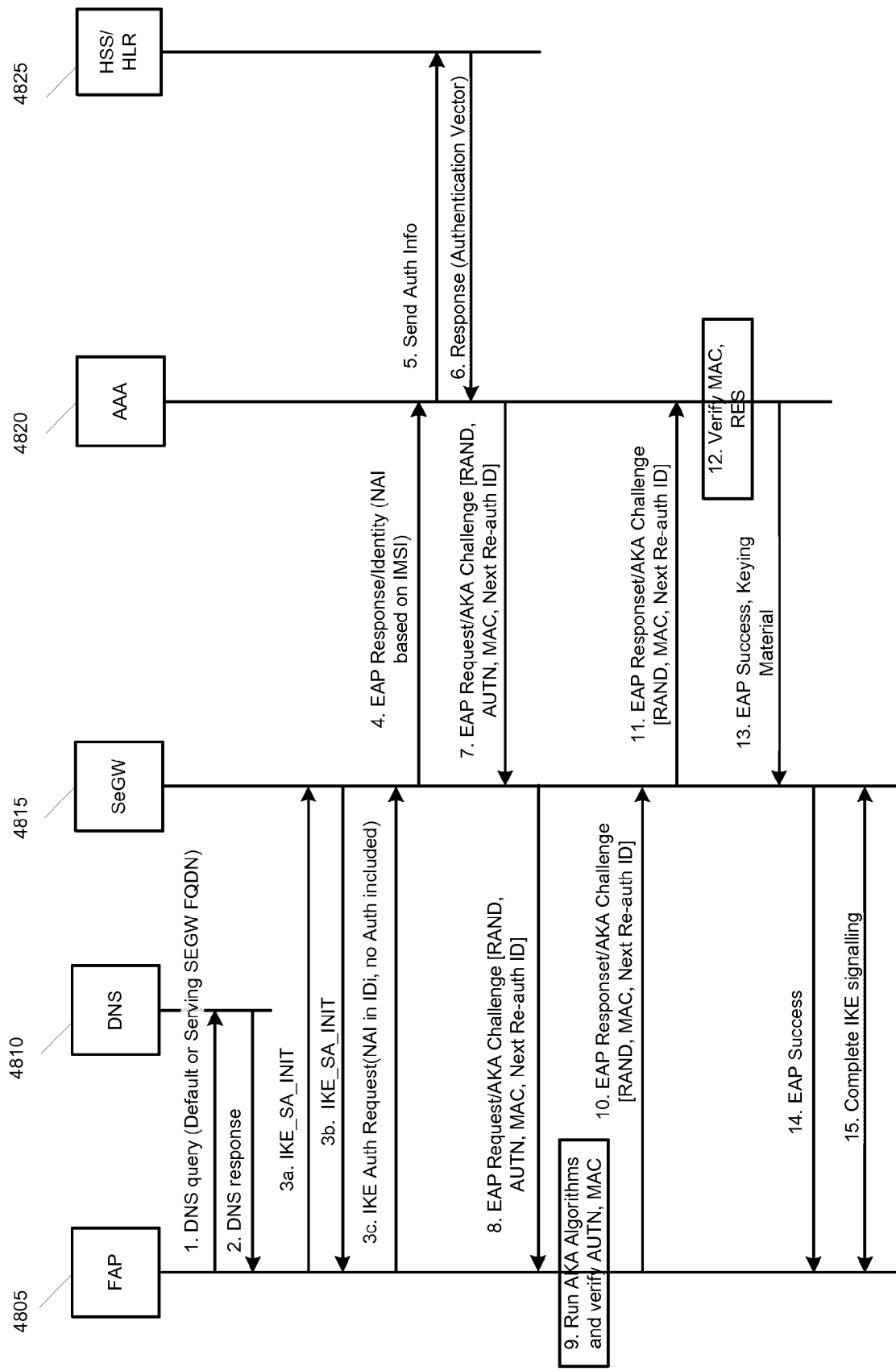
FIG. 48 illustrates EAP-AKA authentication procedure of some embodiments.

The EAP-AKA authentication mechanism is specified in "Extensible Authentication Protocol Method for 3rd Generation Authentication and Key Agreement (EAP-AKA)", IETF RFC 4187. This section describes how this mechanism is used in Femtocell. FIG. 48 illustrates EAP-AKA authentication procedure of some embodiments. As shown, the FAP 4805 connects to the generic IP access network and obtains (in Step 1) the IP address of the Default or the Serving SeGW via DNS query. The DNS server 4810 returns (in Step 2) the IP address of the SeGW.

The FAP 4805 initializes the IKEv2 authentication procedure by starting the IKE_SA_INIT exchange (Steps 3a-3c). It indicates the desire to use EAP by leaving out the AUTH payload from message 3, the first message of the IKE_AUTH exchange, and the initiator identity is composed compliant with the Network Access Identifier (NAI) format specified in the IETF RFC 2486 which includes the IMSI and an indication that EAP-AKA should be used.

Next, the GANC-SeGW 4815 sends (in Step 4) an EAP Response/Identity message to the AAA server 4820, including the initiator identity included in the third IKE message. The leading digit of the NAI indicates that the FAP wishes to use EAP-AKA. The AAA server identifies the subscriber as a candidate for authentication with EAP-AKA, based on the received identity, and verifies that EAP-AKA shall be used based on subscription information, The AAA server requests (in Step 5) the user profile and UMTS authentication vector(s) from the HSS/HLR 4825, if these are not available in the AAA server.

Optionally, the AAA receives (in Step 6) user subscription and UMTS authentication vector(s) from the HSS/HLR. The UMTS authentication vector consists of random part (RAND), an authentication token (AUTN), an expected result part (XRES) and sessions keys for integrity check (IK) and encryption (CK). The AAA server determines the EAP method (SIM or AKA) to be used, according to the user subscription and/or the indication received from the FAP. In this sequence diagram, it is assumed that the FAP holds a USIM and EAP-AKA will be used.

Next, the AAA server 4820 formulates an EAP-Request/AKA Challenge with RAND, AUTN and includes a message authentication code (MAC) whose master key is computed based on the associated IK and CK. A new re-authentication identity may be chosen and protected (i.e. encrypted and integrity protected) using EAP-AKA generated keying material. The AAA Server sends (in Step 7) the RAND, AUTN, MAC and re-authentication identity to the GANC-SeGW 4815 in the EAP Request/AKA-Challenge message.

The GANC-SeGW forwards (in Step 8) the EAP Request/AKA-Challenge message to the FAP. The FAP runs (in Step 9) UMTS algorithm on the USIM. The USIM verifies that the AUTN is correct and hereby authenticates the network. If AUTN is incorrect, the FAP rejects the authentication. If AUTN is correct, the USIM computes RES, IK and CK. The FAP calculates a new MAC with the new keying material (IK and CK) covering the EAP message. If a re-authentication ID was received, then the FAP stores this ID for future authentications.

The FAP then sends (in Step 10) EAP Response/AKA-Challenge including calculated RES and MAC to the GANC-SeGW. The GANC-SeGW forwards (in Step 11) the EAP Response/AKA-Challenge message to the AAA Server.

The AAA Server verifies (in Step 12) the received MAC and compares XRES to the received RES. If the checks in Step 12 are successful, then the AAA Server sends (in Step 13) the EAP Success message to the GANC-SeGW. The AAA Server includes derived keying material for confidentiality and/or integrity protection between FAP and GANC-SeGW, in the underlying AAA protocol message (i.e. not at EAP level).

The GANC-SeGW informs (in Step 14) the FAP about the successful authentication with the EAP Success message. Now the EAP-SIM exchange has been successfully completed, the IKE signaling can be completed (in Step 15). The Security Association between FAP and GANC-SeGW has been completed and the FAP can continue with the Femtocell discovery or registration procedure.

3. Fast Re-Authentication

When the authentication process is performed frequently, especially with a large number of connected Femtocell Access Points, performing fast re-authentication can reduce the network load resulting from this authentication. The fast re-authentication process allows the AAA server to authenticate a user based on keys derived from the last full authentication process.

The FAP and GANC-SeGW can use a procedure for fast re-authentication in order to re-authenticate an FAP e.g. when setting up a new SA because the IP address of the FAP has changed. Fast re-authentication is provided by EAP-AKA, and does not make use of the UMTS algorithms. The FAP may use the re-authentication ID in the IKE_SA_INIT. The decision to make use of the fast re-authentication procedure is taken by the AAA server.

The basic elements of these procedures are the following. The FAP initiates a new SA with a GANC-SeGW that it was previously connected to and uses the re-authentication ID (re-authentication ID received during the previous full authentication procedure) in the IKE_SA_INIT exchange. The EAP-AKA procedure is started as a result of these exchanges. The AAA server and FAP re-authenticate each other based on the keys derived on the preceding full authentication.

B. Encryption

All control and user plane traffic over the Up interface shall be sent through the IPSec tunnel that is established as a result of the authentication procedure. Encryption shall use the negotiated cryptographic algorithm, based on core network policy, enforced by the GANC-SeGW.

The FAP and GANC-SeGW set up one Security Association through which all traffic is sent. A single negotiated ciphering algorithm is applied to the connection.

1. Establishment of a Security Association

After the authentication procedure, the FAP shall request an IP address on the network protected by the GANC-SeGW (i.e. the public IP interface of the INC). The FAP shall set up one IPSec Security Association (SA) between FAP and GANC-SeGW.

The FAP shall initiate the creation of the SA; i.e. it shall act as initiator in the Traffic Selector negotiation. The protocol ID field in the Traffic Selectors (TS) shall be set to zero, indicating that the protocol ID is not relevant. The IP address range in the TSi shall be set to the address assigned to the FAP (within the network protected by the GANC-SeGW). The IP address range in the TSr shall be set to 0.0.0.0-255.255.255.255. The FAP and GANC-SeGW shall use the IKEv2 mechanisms for detection of NAT, NAT traversal and keep-alive.

All control and user plane data over the Up interface between FAP and INC shall be sent through the SA. The ciphering mode is negotiated during connection establishment. During setup of the SA, the FAP includes a list of supported encryption algorithms as part of the IKE signaling, which include the mandatory and supported optional algorithms defined in the IPSec profile, and NULL encryption. The GANC-SeGW selects one of these algorithms, and signals this to the FAP.

When NULL encryption is applied, both control and user-plane traffic is sent unencrypted. This configuration can be selected e.g. when the connection between the generic IP access network and the GANC is under operator control. The integrity algorithm is the same as for either configuration i.e. non-ciphered traffic is still integrity protected.

C. Profile of IKEv2

In some embodiments, profile of IKEv2 for Femtocell system is similar to the profile defined in TS 43.318 standard.

D. Profile of IPSec ESP

In some embodiments, profile of IPSEC ESP for Femtocell system is similar to the profile defined in TS 43.318 standard.

E. Security Mode Control

Figure 49:
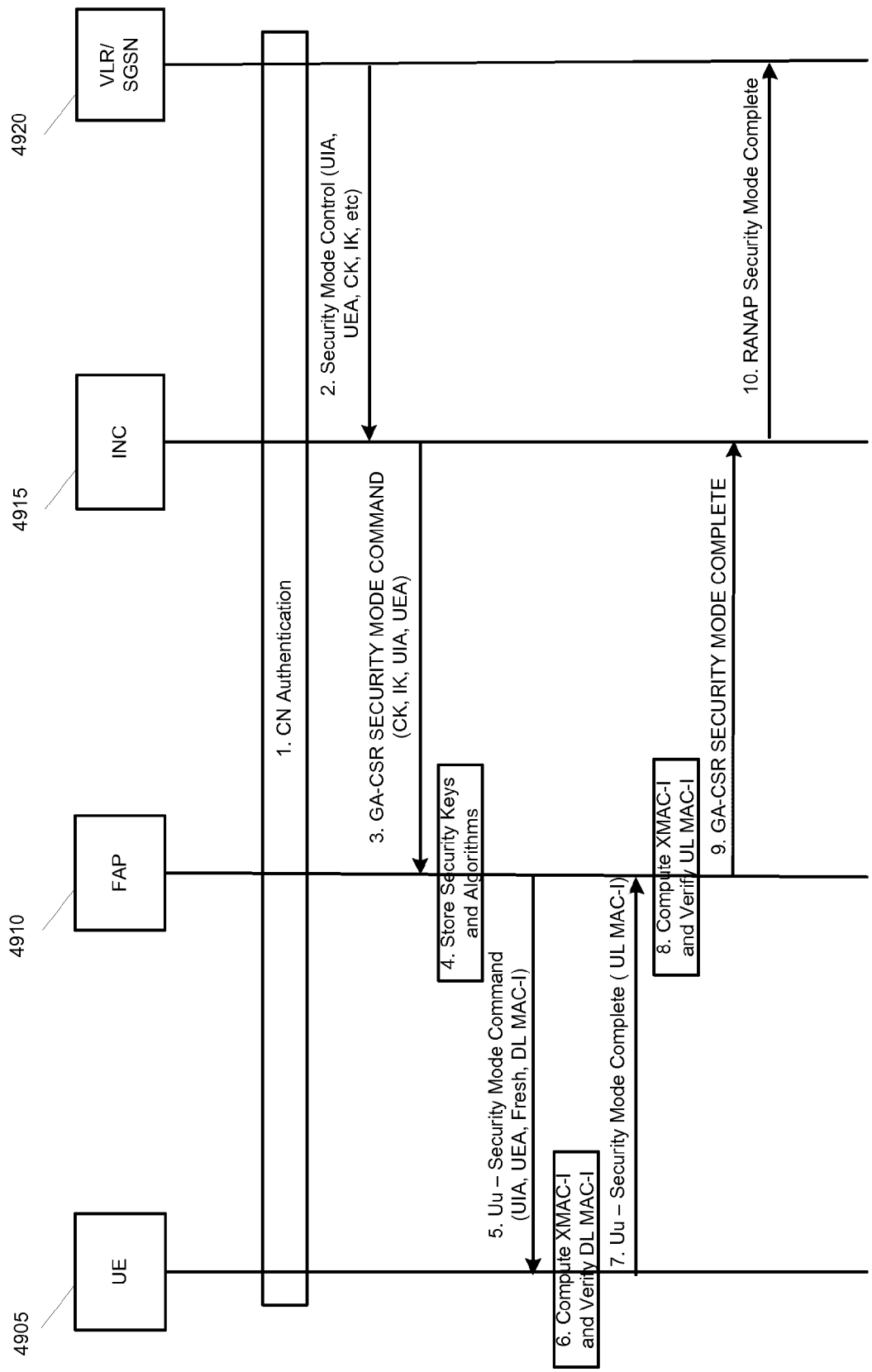
FIG. 49 illustrates the message flow for security mode control in some embodiments.

FIG. 49 illustrates the message flow for security mode control in some embodiments. As shown, the CN (VLR/SGSN) 4920 and the UE 4905 performs (in Step 1) mutual authentication using AKA procedures. The CN authentication is initiated by the CN as a result of the CN processing an initial L3 message from the UE.

Upon successful authentication, the CN sends (in Step 2) RANAP "Security Mode Command" message to GANC. This message includes the integrity key (IK) key, the ciphering (or encryption) key (CK), the user integrity algorithm (UIA), and the ciphering (or user encryption) algorithm (UEA) to be used for ciphering.

In some embodiments, the GANC stores the ciphering and integrity keys and the algorithms. The GANC sends (in Step 3) a GA-CSR SECURITY MODE COMMAND with the ciphering and integrity keys and algorithms associated with the specific UE IMSI to the FAP 4910. The FAP stores the ciphering and integrity keys and algorithm (in Step 4) for the specific UE. The FAP should ensure that these keys are not accessible to $3^{rd}$ party applications or any other module on the FAP. Additionally, these keys should not be stored on any persistent storage. The CK and UEA are used to protect the air interface between the FAP and the UE by encrypting the traffic between the FAP and the UE. The IK and the UIA are used to ensure the integrity of the messages exchanged between the FAP and the UE over the air interface, for example by determining that the messages are not changed. In some embodiments, the UIA and the UEA are software methods executed by a processor.

The FAP generates a random number (FRESH) and computes the downlink (i.e., from the FAP to the UE) message authentication code (MAC) using the integrity key (IK) and integrity algorithms (MAC-I) and sends (in Step 5) the Security Mode command to the UE 4905 along with the computed message authentication code for integrity (MAC-I) and the FRESH. The FRESH variable represents a random number or nonce as defined in "3G Security; Security architecture", 3GPP TS 33.102 standard, hereinafter "TS 33.102 standard". The UE computes (in Step 6) the MAC-I locally (expected MAC-I or XMAC-I) and verifies (in Step 6) that the received downlink MAC-I is the same. The UE computes XMAC-I on the message received by using the indicated UTA, COUNT-I generated from the stored START and the received FRESH parameter as defined in TS 33.102 standard. The downlink integrity check is started from this message onwards. For all subsequent messages sent from the FAP to the UE (the downlink messages), steps similar to Steps 5 to 6 are used to ensure the integrity of the messages.

Upon successful verification of the MAC, the UE responds back (in step 7) with the Security Mode Complete command and also sends the MAC-I for the uplink (i.e., from the UE to the FAP) message. The FAP computes (in Step 8) XMAC-I for the uplink message and verifies (in Step 8) the received MAC-I is the same as that of the computed XMAC-I. The uplink integrity check is started from this message onwards. For all subsequent messages sent from the UE to the FAP (the uplink messages), steps similar to Steps 7 to 8 are used to ensure the integrity of the messages.

MAC-I is the sender's computed MAC-I and XMAC-I is the expected MAC-I computed by the receiver. As described above, the computation is done for a given message using the algorithms and other variables which are known to the sender and receiver only. This prevents a man-in-the-middle attack, as the middle entity will not have the necessary information to compute MAC-I and hence cannot tamper the message.

Upon successful verification of the uplink MAC, the FAP sends (in Step 9) the GA-CSR Security mode complete command to the GANC. The GANC relays (in Step 10) the Security Mode Complete command to the CN via corresponding RANAP message.

F. Core Network Authentication

The core network AKA based authentication provides mutual authentication between the user and the network. The AKA procedure is also used to generate the ciphering keys (encryption and integrity) which in turn provide confidentiality and integrity protection of signaling and user data. The basis of mutual authentication mechanism is the master key K (permanent secret with a length of 128 bits) that is shared between the USIM of the user and home network database. The ciphering key (Ck) and the integrity key (Ik) are derived from this master key K.

Figure 50:
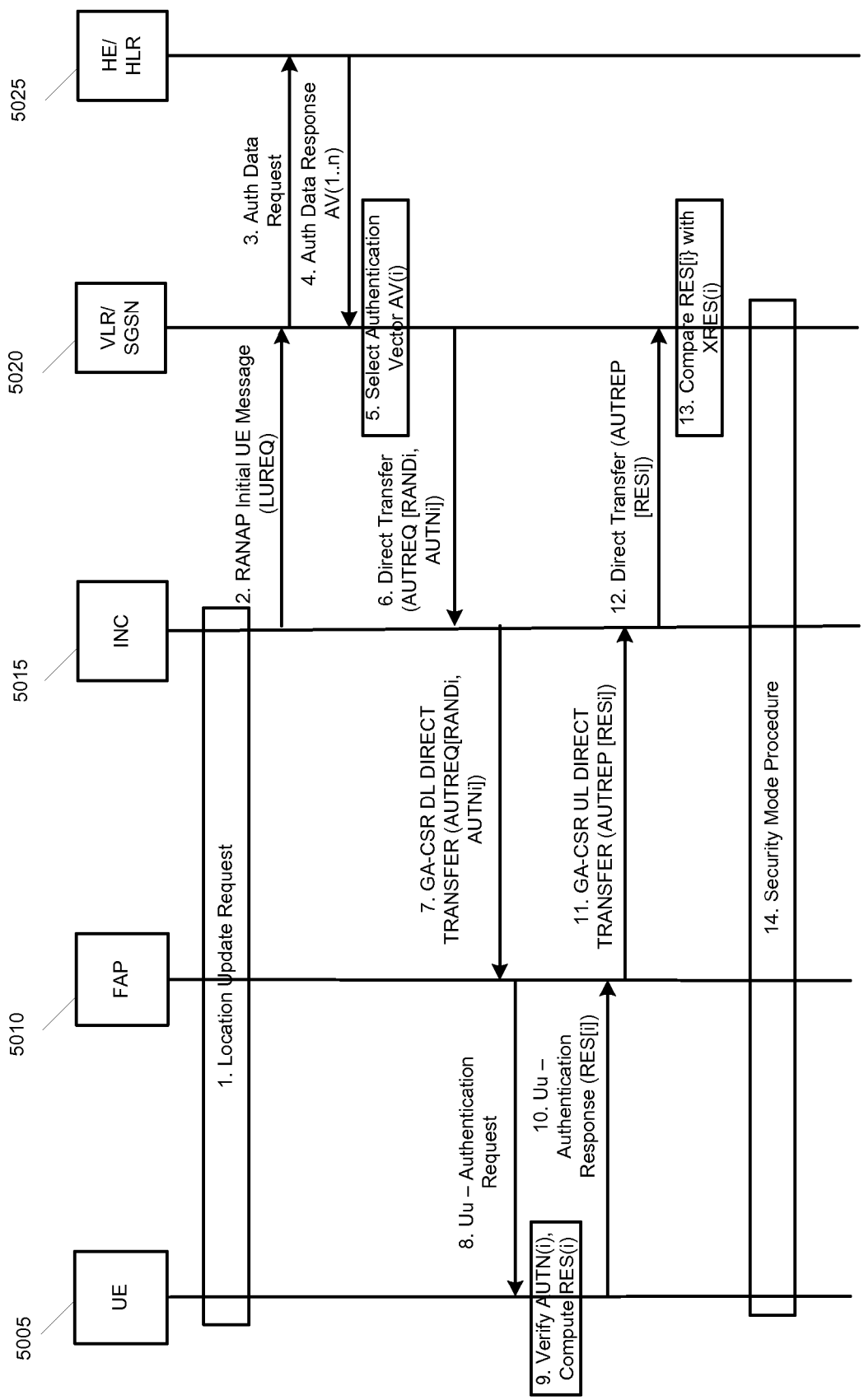
FIG. 50 illustrates the AKA procedure used for mutual authentication in some embodiments.

FIG. 50 illustrates the AKA procedure used for mutual authentication in some embodiments. As shown, when the UE 5005 camps on the Femtocell Access Point 5010, it initiates (in Step 1) a Location Update Request (or Location Updating Request) towards the CN. The INC 5015 forwards (in Step 2) the Location Update request in a RANAP message to the VLR/SGSN 5020.

This triggers the authentication procedure in the VLR/SGSN and it sends (in Step 3) an authentication data request MAP message to the Authentication Center (AuC) in the Home Environment (HE) 5025. The AuC includes the master keys of the UEs and based on the IMSI, the AuC will generate the authentication vectors for the specific UE. The vector list is sent back (in Step 4) to the VLR/SGSN in the authentication data response MAP message.

The VLR/SGSN selects (in Step 5) one authentication vector from the list (only 1 vector is needed for each run of the authentication procedure). The VLR/SGSN sends (in Step 6) user authentication request (AUTREQ) message to the INC. This message also includes two parameters RAND and AUTN (from the selected authentication vector).

The INC 5015 relays (in Step 7) the AUTREQ message to the FAP 5010 in a GA-CSR DL DIRECT TRANSFER message. The FAP forwards (in Step 8) the AUTREQ to the UE over the air interface. The USIM on the UE includes the master key K and using it with the parameters RAND and AUTN as inputs, the USIM carries out computation resembling generation of authentication vectors in the AuC. From the generated output, the USIM verifies (in Step 9) if the AUTN was generated by the right AuC.

The USIM computation also generates (in Step 10) a RES which is sent towards the CN in an authentication response message to the CN. The FAP forwards (in Step 11) the Authentication Response to INC. The INC relays (in Step 12) the response along with the RES parameter in a RANAP message to the CN.

The VLR/SGSN verifies (in Step 13) compares the UE response RES with the expected response XRES (which is part of authentication vector). If there is a match, authentication is successful. The CN may then initiate (in Step 14) a Security Mode procedure (as described in the Subsection "Security mode control", above) to distribute the ciphering keys to the INC.

G. Service Theft in Femtocell

By definition, the FAP has a radio interface (Uu) to communicate with UEs and a network interface (Up) to the mobile network. The FAP relays messages between the UE and core network and can eavesdrop and intercept these messages. The FAP, if compromised, becomes the infamous 'man' of the man-in-the-middle security exposure.

In normal operation, the macro cell network directs UEs to scan for the Femtocell UTRA Absolute Radio Frequency Channel Number (UARFCN) and scrambling code (SC) so when a UE detects FAP radio coverage, the UE can attempt to camp on the FAP. The FAP {UARFCN, SC} is expected to be configured in the macro network RNC's neighbor cell list so that RNC can provide the UE with this neighbor cell list, thus resulting in the UE performing the scans of the neighbors cells and eventual cell selection of a better neighbor for camping. The UE performs a location update, provides its identity, whether IMSI or TMSI, expects to be authenticated, and then proceeds to camp on the Femtocell for mobile service. This is exactly what is supposed to happen when the UE visits a network authorized FAP.

When the FAP is compromised or is a rogue, then the UE could be exposing itself to theft of service. When the UE provides its identity to the FAP, the FAP can masquerade as the UE to the mobile network. Normally, UE authentication would prevent this kind of identity theft, but being in the middle of the communication between the core network and the UE, the FAP can relay authentication requests to the victim UE to defeat authentication.

The UE believes it is being authenticated by the network and provides the correct authentication response to the FAP. The FAP sends the correct response to the core network and the core network now believes the FAP has been authenticated. In between network initiated authentication requests, the FAP can request and receive service from the mobile network disguised as the victim UE. For example, calls originated by the FAP would now be charged to the victim UE. UMTS signaling message integrity mechanisms do not help in this case because the integrity protection is provided over the air interface between the UE and the FAP.

Since the FAP is in the possession of the end user and communicates with the GANC over the Internet, it is possible for a compromised or rogue FAP to attempt to circumvent the UMTS security architecture. A rogue FAP is the classical man-in-the-middle attacker between the UE and the CN. Without adequate network security validations and the enforcement of access policies, rogue FAPs can masquerade as a victim UE and use mobile network services using the victim UE's identity. A FAP is categorized in the following three access control modes: closed access, semi-open access, or open access.

In a closed access case, access to complete Femtocell services over a given FAP is restricted to a closed group of subscribers. In a semi-open access case, limited access is provided to all subscribers. A subscriber who is not part of the closed group is allowed to receive incoming calls and SMS over the semi-open FAP. Additionally, the subscriber is also allowed to make emergency calls using the FAP operating in semi-open access mode. All other services, such as outgoing calls, are blocked. Finally, in an open access case, all subscribers of a given operator are allowed full service access over a FAP operating in open access mode. The following techniques are used in some embodiments to protect against UE masquerade and theft of service at a FAP operating in one of above mentioned modes.

1. Closed Access Points

In a closed access FAP, UEs that are members of the FAP's private user group cannot be victimized because the FAP and the UEs in the private user group are linked by the subscription process. The GANC can enforce network-based service access controls to prevent victim UEs from being trapped by a rogue FAP. If the UE is not a member of the private user group of the rogue FAP, the GANC will deny service access to the UE. This means the rogue FAP is prevented from stealing service with the victim UE's identity.

The GANC also strictly binds transactions performed under each UE registration context to the original authorized UE identity to prevent a rogue FAP from piggybacking messages using a victim UE identity through the authorized UE context. The strict binding requires the GANC to track the identity of each UE even as it is assigned TMSI and P-TMSI for User Identity Confidentiality. Prevention of service theft in a closed access mode is described in detail further below.

2. Semi-Open and Open Access Points

The potential for a rogue FAP to masquerade as a victim UE is only available on the semi-open and open access points. The victim UEs would be the UEs that the network allows to camp on the rogue FAP but is not a member of the FAP's private user group. For those UEs, the theft of service potential is real because the rogue FAP has an incentive to charge its usage to the victim UE subscription account.

Note, the theft-of-service scenario is only possible while a victim UE is camped on the rogue FAP. The rogue FAP can authenticate to the core network (CN) as the UE and then request services from the CN masquerading as the UE. So long that the victim UE remains camped at the rogue FAP, the FAP can continue to pass authentication requests and carry on the masquerade.

For semi-open FAPs, by definition, prevents outgoing services to be initiated by UEs that are not a member of the FAP's private user group. Network-based enforcement of the semi-open access controls can prevent rogue FAPs from stealing service by masquerading as a victim UE. However, a rogue FAP can block incoming calls to the victim UE or eavesdrop on the conversation while the victim UE is camped on the rogue FAP. The semi-open FAP scenario is similar to the open FAP scenario described below.

For open FAPs, the GANC by definition cannot place restrictions on the usage of mobile network services for any UE. It is also not possible to determine on a per call basis whether the call was legitimately made by the UE or whether the FAP is masquerading as a victim UE. This makes network enforcement of UE access controls ineffective for preventing UE masquerade. The prevention method must focus on ensuring only genuine and unmodified FAPs are granted open access.

3. Enhanced Security Solution for Open Access Points

Open FAPs can be misused through the following two scenarios: (1) Complete replacement of a genuine FAP with rogue equipment and (2) Modification of the existing software executing on the FAP from an authorized vendor.

a) Detection of Genuine FAP

The replacement of a genuine FAP with rogue equipment can be prevented using a technique based on public and private keys. In this solution the FAP is required to provide a Message Authentication Code (MAC), computed from the vendor's private key, with the UMA Registration message. The GANC, using the AAA, can verify the MAC on the UMA Registration message by comparing the MAC with one computed with the FAP vendor's public key. Only genuine FAPs can provide the correct MAC in the UMA Registration message.

Procedure details are as follows. Each FAP vendor generates a private/public key pair. The public key is stored in a FAP database in the network. When the FAP registers with the GANC, the GANC sends a Register challenge message by including a RAND number in the challenge. The FAP sends the challenge response and includes the MAC (message authentication code) generated using the vendor's private key. The MAC is generated using the standard algorithms for SHA1.

The GANC relays the random number and the generated MAC to the AAA via the S1 interface. The AAA retrieves the public key from the FAP database and computes its expected MAC. If the locally computed MAC is the same as that received over the network, then AAA has verified the FAP is genuine. If the MAC check in the AAA fails, the registration is rejected thus preventing access to services using the GANC. Note there is one private key for all FAPs from the same vendor so every FAP has the same image. The private key should never be stored in an unencrypted fashion. This detection method must be combined with the following method to protect the private keys from being extracted from the FAP.

b) Ensuring Unmodified FAPs

The FAP hardware may implement a "software authentication" technique to ensure only authentic, authorized software is allowed to execute on the FAP hardware. Some embodiments perform the following software authentication technique. The "bootloader" software, which is responsible for establishing the initial state of the system, so that the proper operating system and application can be loaded, will control the download and authorization of the software. The "bootloader" software must be implicitly trusted and therefore needs to be immutable. This requirement can be met, for example, by implementing the bootloader software in ROM or OTP flash.

The software loaded on the FAP is signed using the private key for each vendor. The bootloader software would be responsible for verification of this signature using the public key of the vendor. A failed signature check will prevent the "rogue" software from executing successfully. Note that the public key can be delivered to the bootloader software via signed certificates or it can be stored directly locally in the bootloader.

The above technique prevents the loading of software onto the FAP hardware by anyone except the vendor. Only the vendor possesses the private key necessary to sign the software and pass the "software authentication."

4. High Level Procedure

Figure 51:
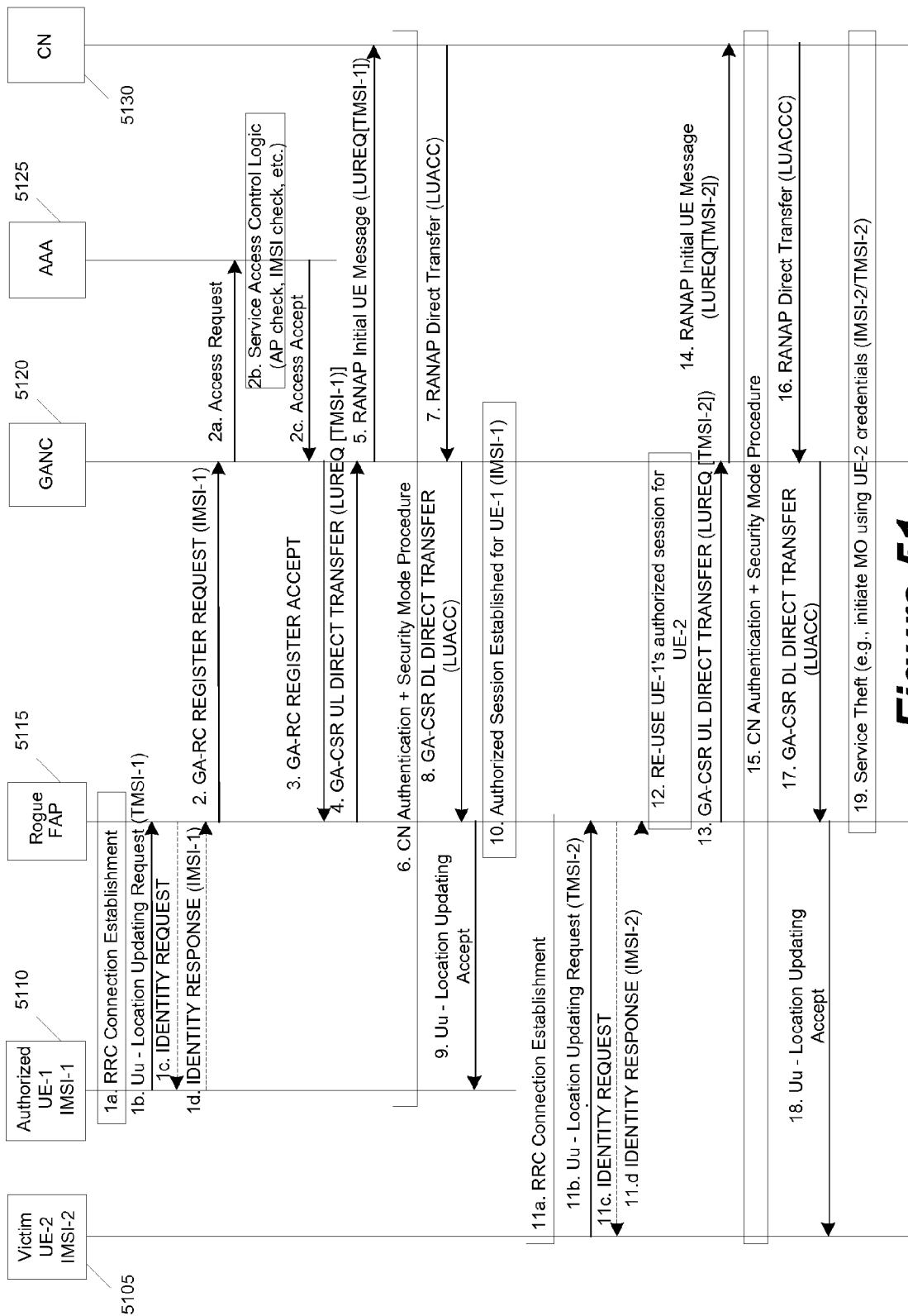
FIG. 51 illustrates the high level procedure which can result in theft of service by a rogue FAP.
Figure 52:
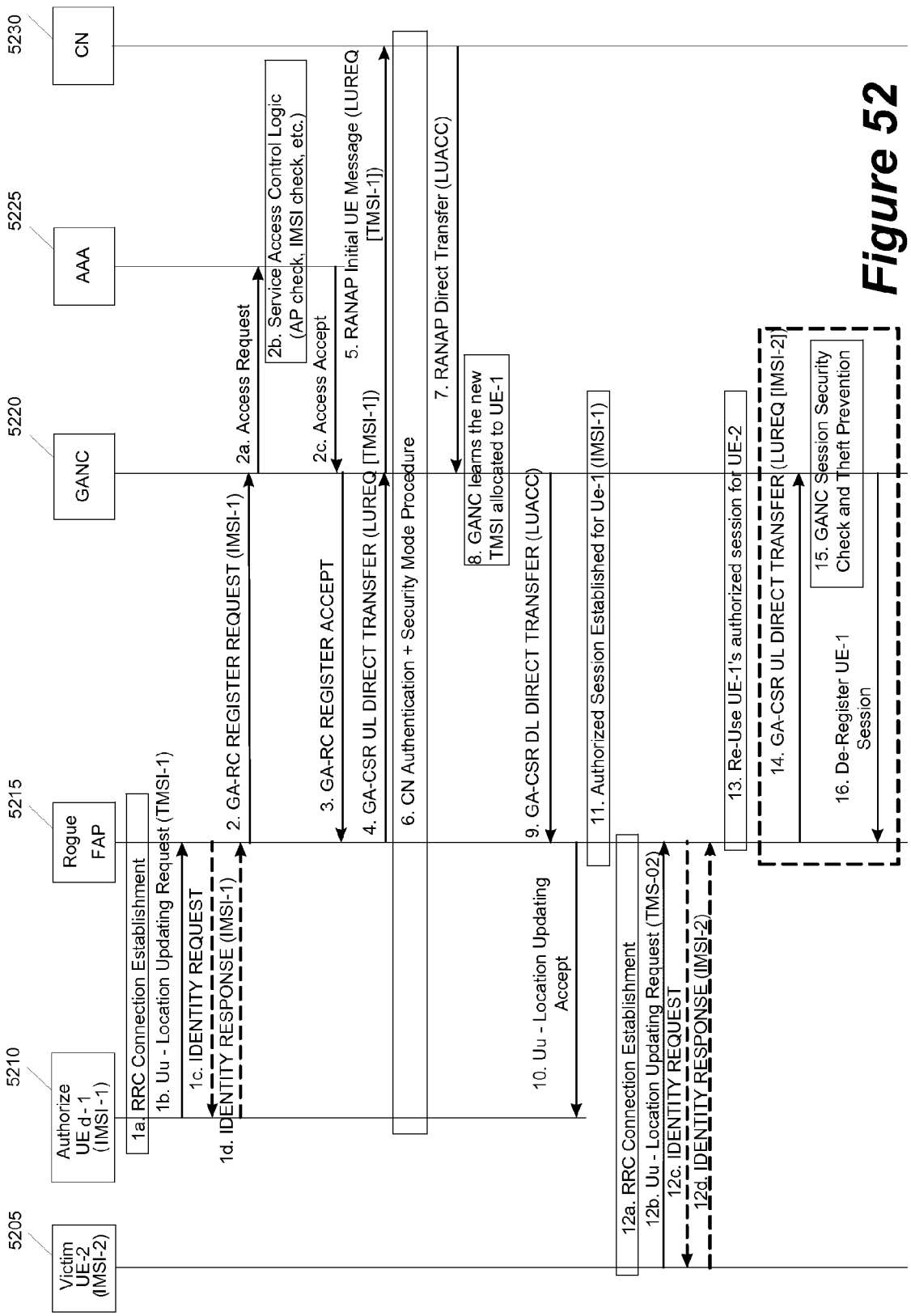
FIG. 52 illustrates the Femtocell service theft prevention approach of some embodiments.
Figure 53:
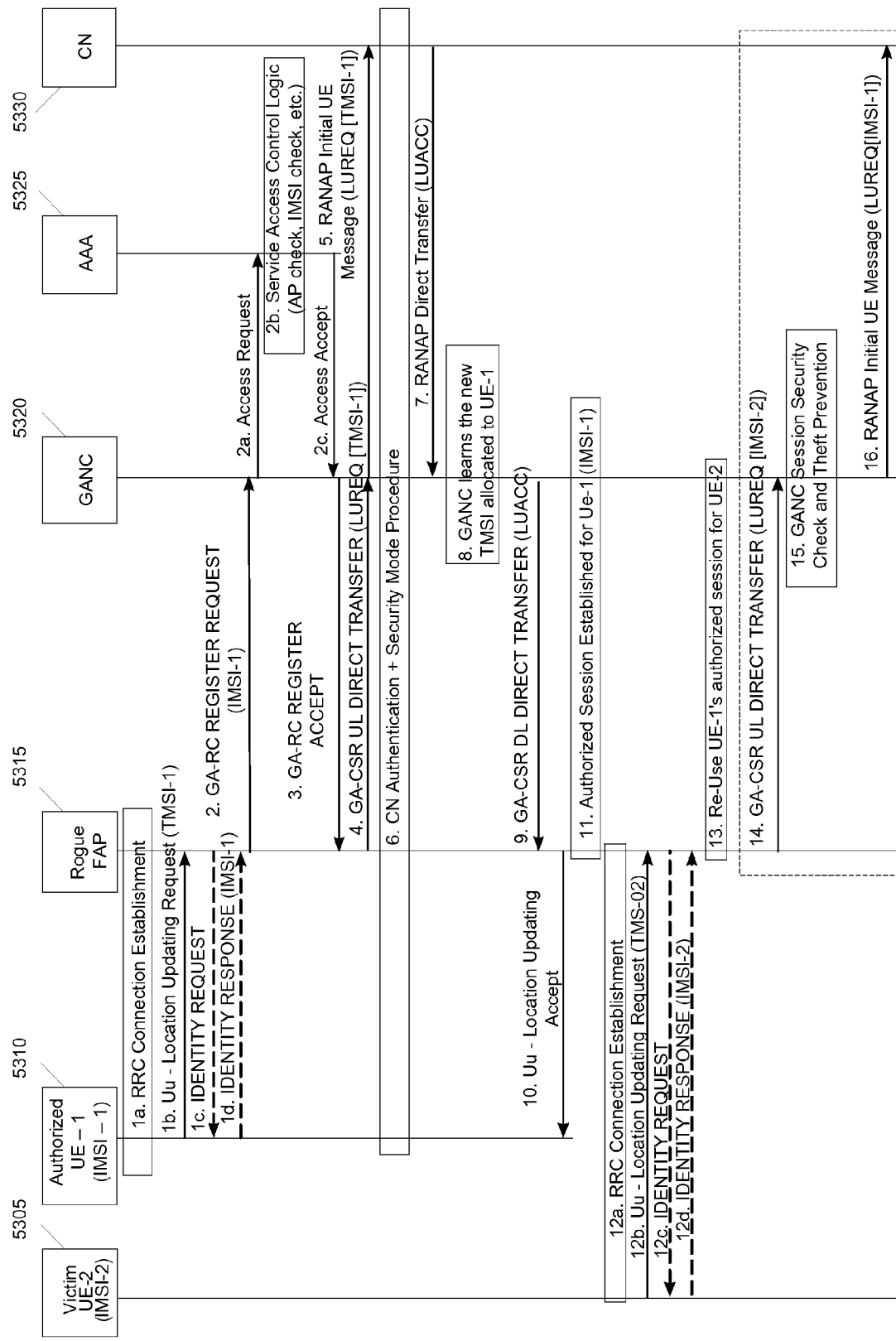
FIG. 53 illustrates the Femtocell service theft prevention in some embodiments.

FIG. 51 illustrates the high level procedure which can result in theft of service by a rogue FAP. The following description of the Femtocell service theft procedure assumes the following: (1) the Rogue FAP is a closed AP i.e. Femtocell service access is limited to a trusted list of UEs (in this example, only UE-1 associated with identity IMSI-1/TMSI-1 is allowed Femtocell service access using the Rogue FAP), (2) closed AP has implied security as part of mutual trust between FAP and the associated UEs. The close AP behavior is ensured by the network using service access control (SAC) at the time of UE registration, (3) victim UE is associated with identity IMSI-2/TMSI-2 and is NOT allowed service on this Rogue FAP, and (4) the 'Rogue' FAP has been compromised and is attempting to steal services using victim UE identity outside the trust list. Although FIGS. 51 to 53 illustrate steps related to circuit switched resources (CSR), a person of ordinary skill in the art would be able to apply the same techniques to packet switched resources (PSR).

As shown in FIG. 51, the authorized UE 5110 establishes (in Step 1a) a RRC connection with the FAP 5115 on which it camps. The UE 5110 starts (in Step 1b) a Location Update procedure towards the CN 5130. The FAP 5115 will intercept the Location Update request and attempts to register the UE 5110 with the associated Serving GANC 5120 over the existing IPSEC tunnel. The FAP 5115 may request (in Step 1c) and receive (in Step 1d) the IMSI of the UE 5110 if the Location Update is done using the TMSI, since the IMSI is required for the initial registration of the UE.

Next, the FAP 5115 attempts to register the UE 5110 on the GANC 5120 using the UE specific TCP connection by transmitting (in Step 2) the GA-RC REGISTER REQUEST. The message includes: (1) Registration Type: Indicates that the registering device is a UE, (2) Generic IP access network attachment point information: AP-ID, (3) UE Identity: UE- IMSI, and (4) FAP identity: FAP-IMSI. The GANC 5120 will, via AAA server 5125, authorize (in Steps 2a-2c) the UE 5110 using the information provided in the REGISTER REQUEST. The authorization logic on the AAA server 5125 would also check to see if the UE 5110 is allowed Femtocell access using the specific FAP 5115.

When the GANC 5115 accepts the registration attempt, the GANC responds (in Step 3) with a GA-RC REGISTER ACCEPT. The FAP 5115 encapsulates (in Step 4) the Location Update NAS PDU within a GA-CSR UL DIRECT TRANSFER message that is forwarded to the GANC 5120 via the existing TCP connection.

The GANC 5120 establishes a SCCP connection to the CN and forwards (in Step 5) the Location Update request NAS PDU to the CN using the RANAP Initial UE Message. Subsequent NAS messages between the UE and core network will be sent between GANC and CN using the RANAP Direct Transfer message. The CN 5130 authenticates (in Step 6) the UE 5110 using standard UTRAN authentication procedures. The CN 5130 also initiates (also in Step 6) the standard Security Mode Control procedure as described in TS 33.102 standard, which results in distribution of the security keys {CK, IK} for the specific UE to the FAP via the GANC.

Next, the CN 5130 indicates (in Step 7) that it has received the location update and it will accept the location update using the Location Update Accept message to the GANC 5120. The GANC 5120 forwards (in Step 8) this message to the FAP 5115 in the GA-CSR DL DIRECT TRANSFER. Next, the FAP relays (in Step 9) the Location Update Accept over the air interface to the UE 5110.

At this point, a session authorized for the specific UE-1 using its credentials IMSI-1 is established (in Step 10) between the FAP 5115 and GANC 5120. Next, a victim UE 5105, in the vicinity of the rogue FAP 5115, upon discovering the FAP 5115 over the air interface, will attempt to camp on the rogue FAP 5115 based on its internal cell selection logic. This will trigger the UE 5105 to establish (in Step 11a) an RRC connection with the Rogue FAP 5115. The UE will then start (in Step 11b) a Location Update procedure towards the CN 5130. The FAP 5115 will intercept the Location Update request. The FAP will then request (in Step 11c) and receive (in Step 11d) the IMSI of the victim UE 5105 if the Location Update is done using the TMSI.

The rogue FAP (in Step 12) instead of attempting a registration of the victim UE 5105 with the GANC 5120, will re-use the existing authorized session of UE-1 5110 (as described in Step 10) to transfer messages to the CN 5130 via GANC 5120. It is important to note that if the registration for the victim UE was attempted by the rogue FAP using the victim UE credentials (i.e., IMSI-2), the network based SAC would have rejected the registration request since the victim UE-2 5105 is not authorized to use Femtocell service over the specific rogue FAP 5115.

The FAP 5115 encapsulates the Location Update NAS PDU within a GA-CSR UL DIRECT TRANSFER message that is forwarded (in Step 13) to the GANC 5120 via the existing TCP connection of UE-1 5110. The GANC 5120 establishes a SCCP connection to the CN 5130 and forwards (in Step 14) the Location Update request NAS PDU to the CN 5130 using the RANAP Initial UE Message. Subsequent NAS messages between the UE 5105 and core network 5130 will be sent between GANC 5120 and CN 5130 using the RANAP Direct Transfer message.

Next, the CN 5130 authenticates (in Step 15) the victim UE-2 using standard UTRAN authentication procedures. The authentication messages are relayed transparently to the UE 5105 by the GANC 5120 and FAP 5115. The CN 5130 also initiates (in Step 15) the standard Security Mode Control procedure as described in TS 33.102 standard, which results in distribution of the security keys {CK, IK} for the victim UE to the FAP via the GANC.

Upon completion of the authentication, the CN 5130 indicates (in Step 16) it has received the location update and it will accept the location update using the Location Update Accept message to the GANC 5120. The GANC 5120 forwards (in Step 17) this message to the FAP 5115 in the GA-CSR DL DIRECT TRANSFER. The FAP 5115 relays (in Step 17) the Location Update Accept over the air interface to the victim UE.

The CN 5130 now thinks that the victim UE 5105 has been authenticated via the FAP 5115 and the GANC 5120 and will accept service requests from the victim UE 5105 without additional authentication for a specific time window. This time window, during which no additional authentication is performed for a given subscriber, is typically controlled by the CN 5130 based on specific implementation. The FAP 5115 takes advantage of this window and can now initiate service requests using the victim UE 5105 credentials and identity e.g. the FAP 5115 can now originate a Mobile Originated (MO) call using IMSI-2 as the subscriber identity resulting in fraudulent charge to the victim UE's subscription. It is important to note that even if the CN 5130 decides to authenticate every service request from a given subscriber (such as MO), the FAP 5115 can relay the authentication messages to the victim UE 5105 and accomplish successful authentication to the CN 5130.

H. Mechanisms for Preventing Service Theft in Femtocell

In this sub-section, a GANC is disclosed that protects the mobile network from the kind of man-in-the-middle theft scenario described above. The theft-of-service risk is different for different classes of UEs. For UEs that are affiliated with the FAP through a linked subscription account such as a family plan, the theft-of-service risk can be mitigated through the design of the plan pricing to remove any incentive to mislead the network. The FAP would only be stealing service from its own account.

For UEs that are not affiliated with the FAP, the theft of service potential is real because the rogue FAP now has an incentive to charge its usage to a victim UE account. The GANC has the responsibility to prevent non-affiliated UEs from being captured by the FAP. The GANC does this by restricting each FAP to serve a defined list of affiliated UEs. The disclosed GANC AAA-based service access controls provides the decision logic to enable this UE restriction. Every UE access is individually authorized through the AAA during the UE UMA registration. The AAA only authorizes UE access after validating that the UE and the FAP are affiliated and the UE access originated from the same IP address, through the same IPSec tunnel as the FAP. The GANC enforces the AAA authorization decision by accepting or denying the UMA registration request for the UE.

In addition, all subsequent communications from the UE are validated by the GANC to prevent rogue FAPs from attempting to insert control plane messages for the victim UE into previously authorized registration contexts. The GANC monitors the allocation of TMSI and P-TMSI to the UE so it can associate the UE with any of the UE's identities: IMSI, TMSI, and P-TMSI. This allows the GANC to enforce the UE-FAP affiliation on communication between the UE and the core network no matter whether the control plane messages are addressed with the UE IMSI, TMSI, or P-TMSI. The following two sub-sections describe the high level procedures with two different approaches which prevent attempted service theft by a rogue FAP 1. Service Theft Prevention—Approach 1

FIG. 52 illustrates the Femtocell service theft prevention approach of some embodiments. Steps 1-7 are the same as Step 1-7 described in relation with FIG. 51 above. The GANC 5220 monitors (in Step 8) allocation of new temporary identity to the UE 5210 by the CN 5230, i.e. TMSI for CS services and P-TMSI for PS services, and creates an association between the TMSI or P-TMSI and session identity for the specific UE. The GANC will utilize this information to perform security checks on session identity for subsequent NAS layers messages originating on the UE specific session.

The GANC 5220 forwards (in Step 9) the Location Update information received from the CN 5230 to the FAP 5215 using a GA-CSR DL DIRECT TRANSFER message. The FAP 5215 relays (in Step 10) the Location Update Accept over the air interface to the UE 5210.

At this point, a session authorized for the specific UE-1 using its credentials IMSI-1 is established (in Step 11) between the FAP 5215 and GANC 5220. Next, a victim UE 5205, in the vicinity of the rogue FAP 5215, upon discovering the FAP 5215 over the air interface, attempts to camp on the rogue FAP based on its internal cell selection logic. This will trigger the UE 5205 to establish (in Step 12*a*) a RRC connection with the Rogue FAP. The UE 5205 then starts (in Step 12*b*) a Location Update procedure towards the CN 5230. The FAP 5215 intercepts the Location Update request. The FAP will then request (in Step 12*c*) and receives (in Step 12*d*) the IMSI of the victim UE 5205 if the Location Update is done using the TMSI.

The rogue FAP 5215 instead of attempting a registration of the victim UE 5205 with the GANC 5220, re-uses (in Step 13) the existing authorized session of UE-1 5210 (as described in Step 11 above) to transfer messages to the CN 5230 via GANC 5220. It is important to note that if the registration for the victim UE 5205 was attempted by the rogue FAP 5215 using the victim UE 5205 credentials (i.e. IMSI-2), the network based SAC would have rejected the registration request since the victim UE-2 5205 is not authorized Femtocell service over the specific rogue FAP 5215.

Next, the FAP 5215 encapsulates the Location Update NAS PDU within a GA-CSR UL DIRECT TRANSFER message that is forwarded (in Step 14) to the GANC 5220 via the existing TCP connection of UE-1 5210. The GANC 5220 performs (in Step 15) a security check on the session identity. Since the identity carried in the Location Update messages (i.e., IMSI-2 does not match any of the known identities for the session (IMSI-1 which is the identity used for registration and authorization or the TMSI learned by the GANC 5220 as described in Step 8 above), the GANC 5220 is able to detect the attempted service theft.

The GANC prevents the attempted service theft by deregistering the session for UE-1 5210. The GANC 5220 sends (in Step 16) a deregistration message to the FAP 5215 on the specific session (the authorized session for UE-1) on which the service theft was being attempted.

2. Service Theft Prevention—Approach 2

FIG. 53 illustrates the Femtocell service theft prevention in some embodiments. Steps 1-15 are the same as Steps 1-15 described in relation with FIG. 52 above. Since the identity carried in the NAS PDU does not match any of the known identities for that session, GANC 5320 replaces the identity in the Location Update message with the original authorized identity for the specific session (i.e., IMSI-2 is replaced with IMSI-1 in the NAS PDU). The GANC establishes a SCCP connection to the CN 5330 and forwards (in Step 16) the modified Location Update request NAS PDU to the CN 5330 using the RANAP Initial UE message. The CN 5330 receives a service request with UE-1's identity in the request and will associate the request with UE-1 5310 subscriber data including billing, etc.

XIII. Femtocell Service Access Control

Femtocell service access control (SAC) and accounting services are based on the S1 interface between the INC and one or more AAA servers. The S1 interface functions are defined in detail in the above mentioned U.S. application Ser. No. 11/349,025, now issued as U.S. Pat. No. 7,283,822.

The objective of Femtocell service access control is to provide operators with the tools to properly implement their Femtocell service plans based on real-time information from the subscriber and non real-time information provisioned within the operator's IT systems and service databases. Using service policies, the operator can implement a range of creative services and controls to be applied on a per individual subscriber basis, which results in the acceptance or rejection of any discrete Femtocell session registration request. Primarily, service policies are used to identify whether a subscriber's current request for access meets the conditions of the service plan to which they are subscribed.

In some embodiments, Femtocell SAC encompasses the discovery, registration and redirection functions as well as enhanced service access control functions, such as restricting Femtocell service access based on the reported FAP MAC address or neighboring macro network UMTS cell information.

A local SAC may be performed by the FAP for performance reasons (example: FAP may use local SAC for faster rejection of UEs which are not allowed access to either Femtocell services or not allowed access to Femtocell services via the specific FAP).

Key elements of the service access control design approach are as follows:

1) There are two service access control configuration options:
   a) Basic service access control: The S1 (INC-AAA) interface is not deployed and a limited set of service access control capabilities is provided by the INC.
      i) The INC is responsible for the Femtocell discovery, registration and redirection functions.
      ii) The UMTS-to-Femtocell mapping logic and data is in the INC; i.e., this is used to support the discovery, registration and redirection functions and to assign service areas to specific FAPS.
      iii) There is no subscriber or FAP-specific service access control.
   b) Enhanced service access control: The S1 interface is deployed and the AAA provides expanded service access control features, including custom features per service provider requirements.
      i) The UMA discovery, registration and redirection functions remain on the INC.
      ii) The UMTS-to-Femtocell mapping logic and data remains in the INC.
      iii) The AAA supports interfaces to external database servers; e.g., via LDAPv3.
      iv) The details of these enhanced service access control functions are defined in the above mentioned U.S. application Ser. No. 11/349,025, now issued as U.S. Pat. No. 7,283,822.
2) Enablement of the enhanced service access control support functions (i.e., the service access control functions of the S1 interface) is an INC configuration option; if enabled, the INC forwards attributes received in the discovery and registration requests to the AAA using RADIUS. This allows the AAA to (for example):
 a) Determine when UE registration attempts should be allowed or rejected (e.g., limiting service to a single FAP).
 b) Retrieve FAP location information from an external database and send the information to the INC.
 c) Provide a billing rate indicator to the INC that is incorporated in the UMTS-to-Femtocell SAI mapping process.
 d) Indicate that hand-in, hand-out, or both are enabled or disabled for the subscriber.

A. UMTS-to-Femtocell Mapping

The UMTS-to-Femtocell mapping processes include the following:
 1) UMTS-INC Mapping (or "INC Selection") serves the following functions:
  a) It allows an INC functioning as a "provisioning INC" to direct a mobile station to its designated "default INC".
  b) It allows an INC functioning as a "default INC" to direct a mobile station to an appropriate "serving INC" (e.g., in case the FAP is outside its normal default INC coverage area).
  c) It allows the INC to determine if the UMTS coverage area is Femtocell-restricted and, if so, to deny service.
 2) UMTS-Femtocell Service Area Mapping (or "Femtocell Service Area Selection") serves the following functions:
  a) It allows an INC functioning as a "default or serving INC" to assign the Femtocell service area that shall be associated with the FAP registration (and all the UEs camped on that specific FAP). The service area can then be utilized for emergency call routing as described in the "Service area based routing" Subsection under the "EMERGENCY SERVICES" Section, above.

B. Service Access Control (SAC) Examples

The following example service access control are described in this section: (1) new FAP connects to GAN Femtocell network, (2) FAP connects to GAN Femtocell network (redirected connection), (3) FAP attempts to connect in a restricted UMTS coverage area, (4) authorized UE roves into an authorized FAP for Femtocell service, and (5) unauthorized UE roves into an authorized FAP for Femtocell service.

1. New FAP Connects to GAN Femtocell Network

Figure 54:
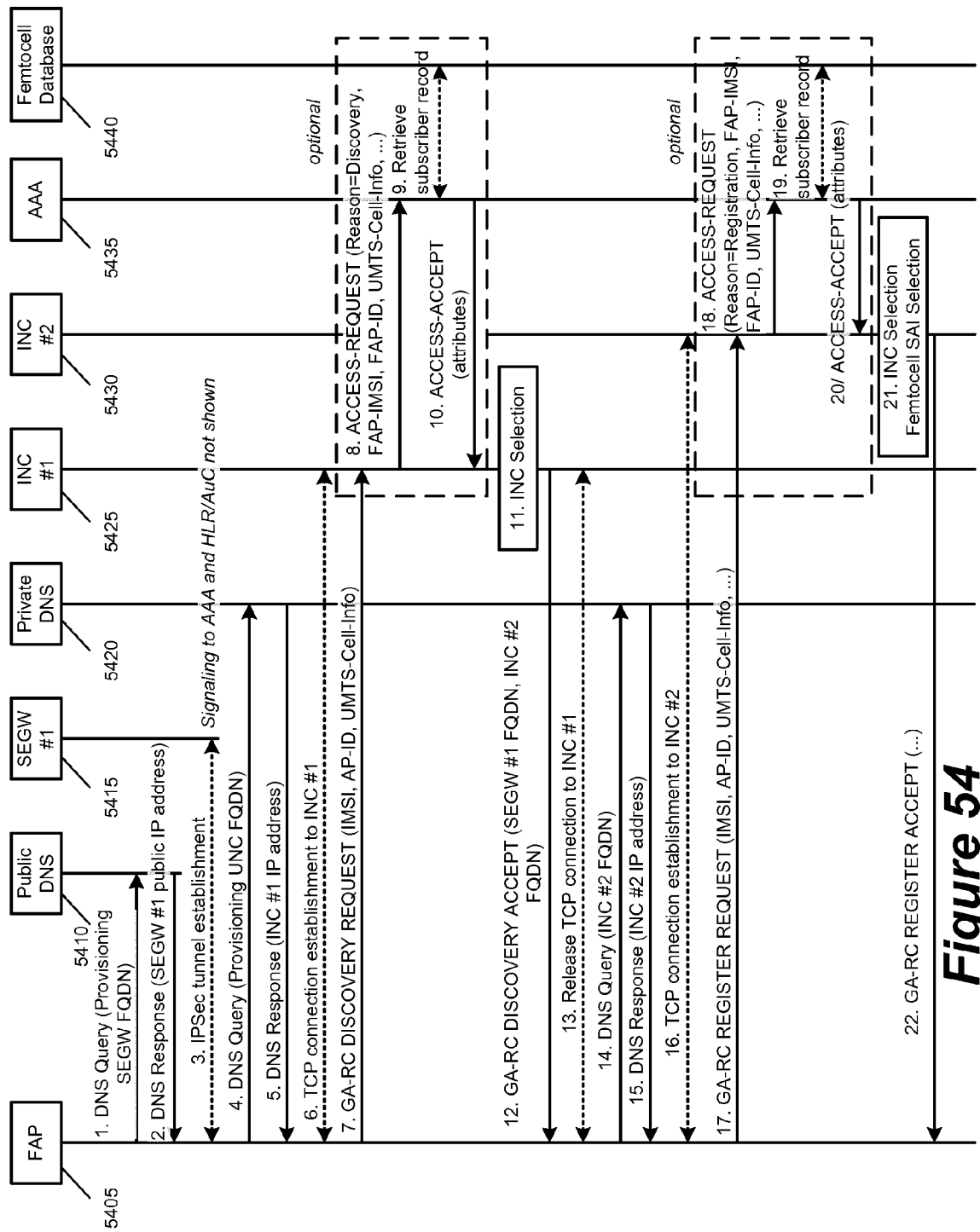
FIG. 54 illustrates the Service Access Control for new FAP connecting to Femtocell network in some embodiments.

FIG. 54 illustrates SAC for new FAP connecting to Femtocell network in some embodiments. As shown, if the FAP 5405 has a provisioned or derived FQDN of the Provisioning SeGW, it performs (in Step 1) a DNS query (via the generic IP access network interface) to resolve the FQDN to an IP address. If the FAP has a provisioned IP address for the Provisioning SeGW, the DNS step is omitted.

The DNS Server 5410 returns (in Step 2) a response including the IP Address of the Provisioning SeGW 5415. The FAP 5405 establishes (in Step 3) a secure tunnel to the Provisioning SeGW 5415 using IKEv2 and EAP-AKA or EAP-SIM.

If the FAP has a provisioned or derived FQDN of the Provisioning INC, it performs (in Step 4) a DNS query (via the secure tunnel) to resolve the FQDN to an IP address. If the FAP has a provisioned IP address for the Provisioning INC, the DNS step (step 4) will be omitted. The DNS Server 5420 returns (in Step 5) a response including the IP Address of the Provisioning INC.

Next, the FAP 5405 sets up (in Step 6) a TCP connection to a well-defined port on the Provisioning INC 5425. The FAP 5405 then queries (in Step 7) the Provisioning INC for the Default INC, using GA-RC DISCOVERY REQUEST. The message includes Cell Info and FAP Identity. For Cell Info, if the FAP detects macro network coverage, then it provides the detected UTRAN cell ID and the UTRAN LAI. If the FAP does not detect macro network coverage it provides the last LAI where the FAP successfully registered, along with an indicator stating which one it is. For FAP Identity, the message includes IMSI.

The INC 5425 sends (in Step 8) a RADIUS Access-Request message to the AAA server 5435, including attributes derived from GA-CSR DISCOVERY REQUEST message. The AAA server 5435 queries (in Step 9) the Femtocell subscriber database 5440 for a record matching the IMSI of the FAP. The subscriber record is returned (in Step 9) to the AAA server. The AAA server verifies that FAP IMSI is authorized and FAP is allowed (based on AP-ID i.e., MAC address of the FAP).

AAA server returns (in Step 10) selected Femtocell location information based on AP-ID and IMSI to the INC 5425 using the Access Accept message. The INC 5425 determines (in Step 11) the default security gateway and INC (e.g., INC #2 5430) using the UMTS-Femtocell mapping function (see UMTS-to-Femtocell Mapping Section, above). This is done so the FAP 5405 is directed to a "local" Default INC in the HPLMN to optimize network performance.

The Provisioning INC 5425 returns (in Step 12) the default INC information in the GA-RC DISCOVERY ACCEPT message. The DISCOVERY ACCEPT message also indicates whether the INC and SeGW address provided shall or shall not be stored by the FAP. The FAP releases (in Step 13) the TCP connection and IPSec tunnel and proceeds to register on INC #2.

The FAP performs (in Step 14) a private DNS query using the assigned Default INC FQDN. The private DNS server 5420 returns (in Step 15) the IP address of INC #2 5430. The FAP establishes (in Step 16) a TCP connection to INC #2 5430. The FAP sends (in Step 17) a GA-RC REGISTER REQUEST message to the INC.

The INC sends (in Step 18) a RADIUS Access-Request message to the AAA server, including attributes derived from GA-RC REGISTER REQUEST message. The AAA server queries (in Step 19) the Femtocell subscriber database for a record matching the FAP IMSI. The subscriber record is returned (in Step 19) to the AAA server. The AAA server verifies that IMSI is authorized and FAP is allowed (based on AP-ID).

Next, the AAA server returns (in Step 20) selected Femtocell service attributes to the INC. The INC determines (in Step 21) that it is the correct serving INC for the mobile current location using the UMTS-Femtocell mapping function. It also determines (in Step 21) the Femtocell service area to associate with the FAP using the UMTS-Femtocell mapping functions. The INC returns (in Step 22) a GA-RC REGISTER ACCEPT message to the FAP.

2. FAP Connects to GAN Femtocell Network (Redirected Connection)

Figure 55:
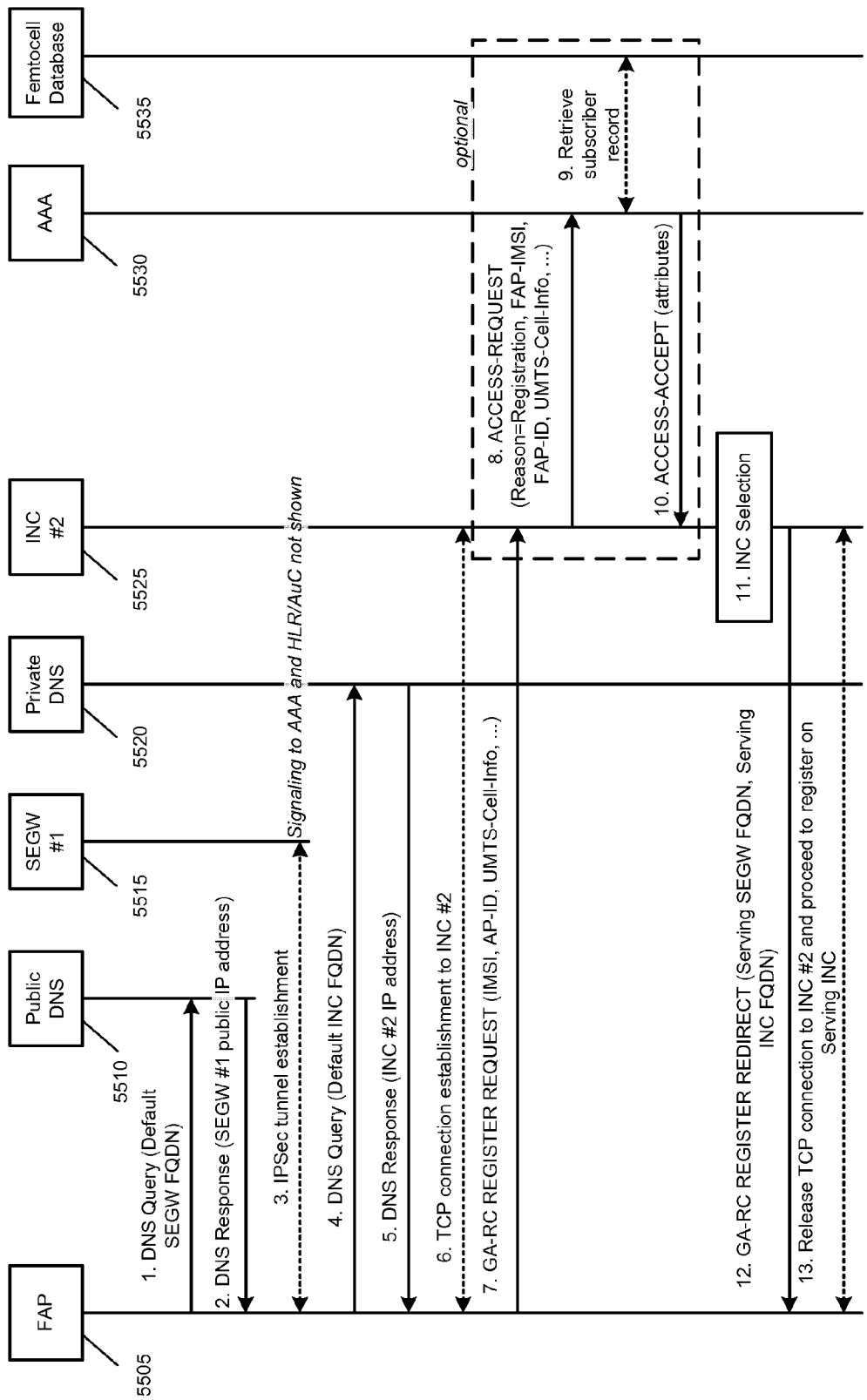
FIG. 55 illustrates the Service Access Control for the FAP getting redirected in Femtocell network in some embodiments.

FIG. 55 illustrates SAC for the FAP getting redirected in Femtocell network in some embodiments. Steps 1 to 10 are the same steps as described in the "New FAP connects to GAN Femtocell network" Subsection, above. Next, the INC 5525 uses the UMTS-Femtocell mapping function to determine (in Step 11) that the FAP 5505 should be served by another INC.

The INC 5525 sends (in Step 12) the new serving SeGW and INC FQDNs to the FAP 5505 in the GA-RC REGISTER REDIRECT message. The FAP releases (In Step 13) the TCP connection and IPSec tunnel and proceeds to register with the designated INC.

3. FAP Attempts to Connect in a Restricted UMTS Coverage Area

Figure 56:
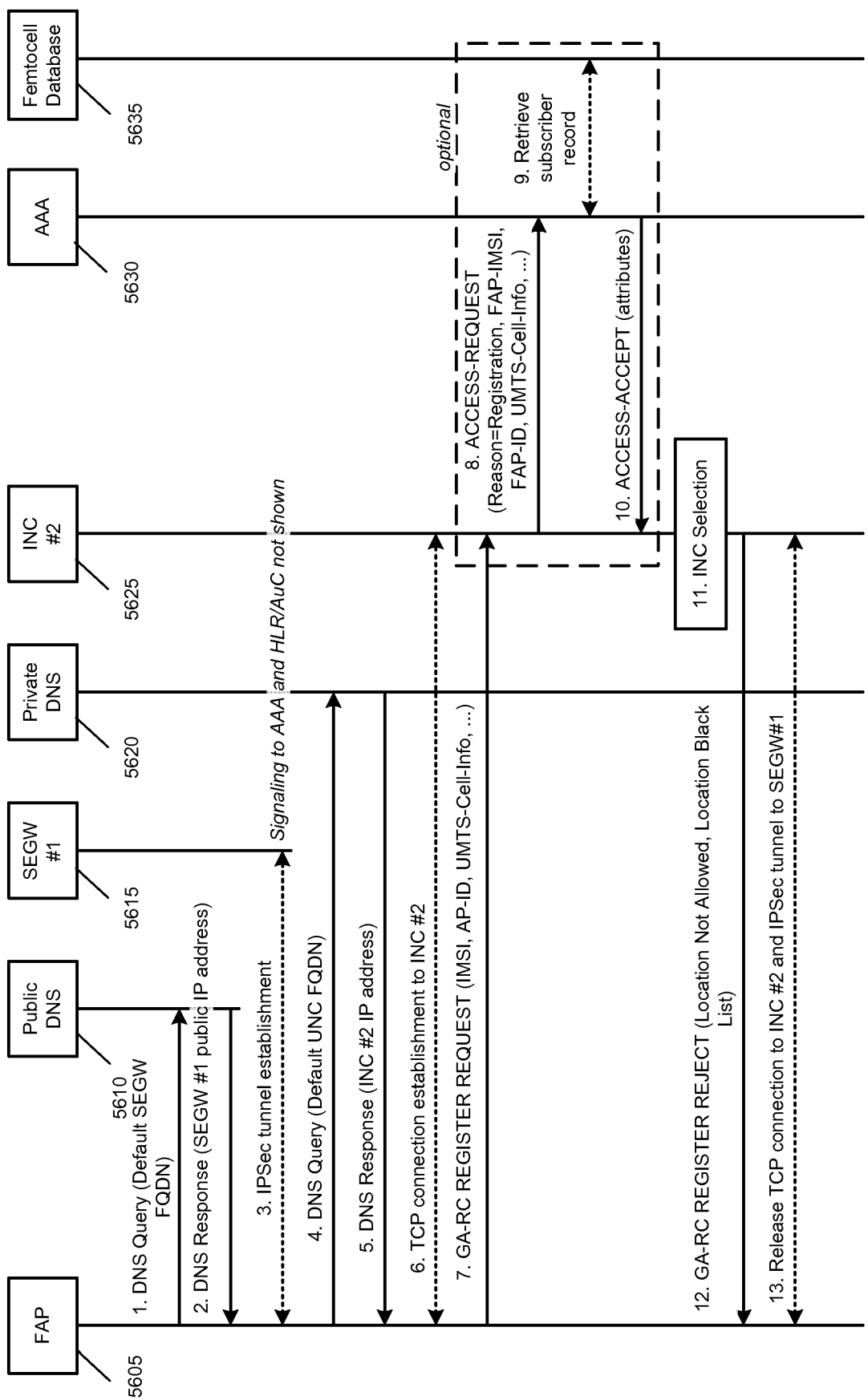
FIG. 56 illustrates the Service Access Control for FAP registering in restricted UMTS coverage area in some embodiments.

FIG. 56 illustrates the SAC for FAP registering in restricted UMTS coverage area in some embodiments. As shown, Steps 1 to 10 are the same steps as described in the "New FAP connects to GAN Femtocell network" Subsection, above. Next, the INC 5625 uses the UMTS-Femtocell mapping function to determine (in Step 11) that the FAP 5605 is in an UMTS area that is Femtocell restricted (i.e., Femtocell access is not allowed in the area).

The INC sends (in Step 12) a GA-RC REGISTER REJECT message to the FAP, including reject cause "Location not allowed". The FAP releases (in Step 13) the TCP connection and IPSec tunnel and does not attempt to register again from the same UMTS coverage area until powered-off.

4. Authorized UE Roves into an Authorized FAP for Femtocell Service

The sequence of events is same as described in UE Registration Section, above.

5. Unauthorized UE Roves into an Authorized FAP for Femtocell Service

Figure 57:
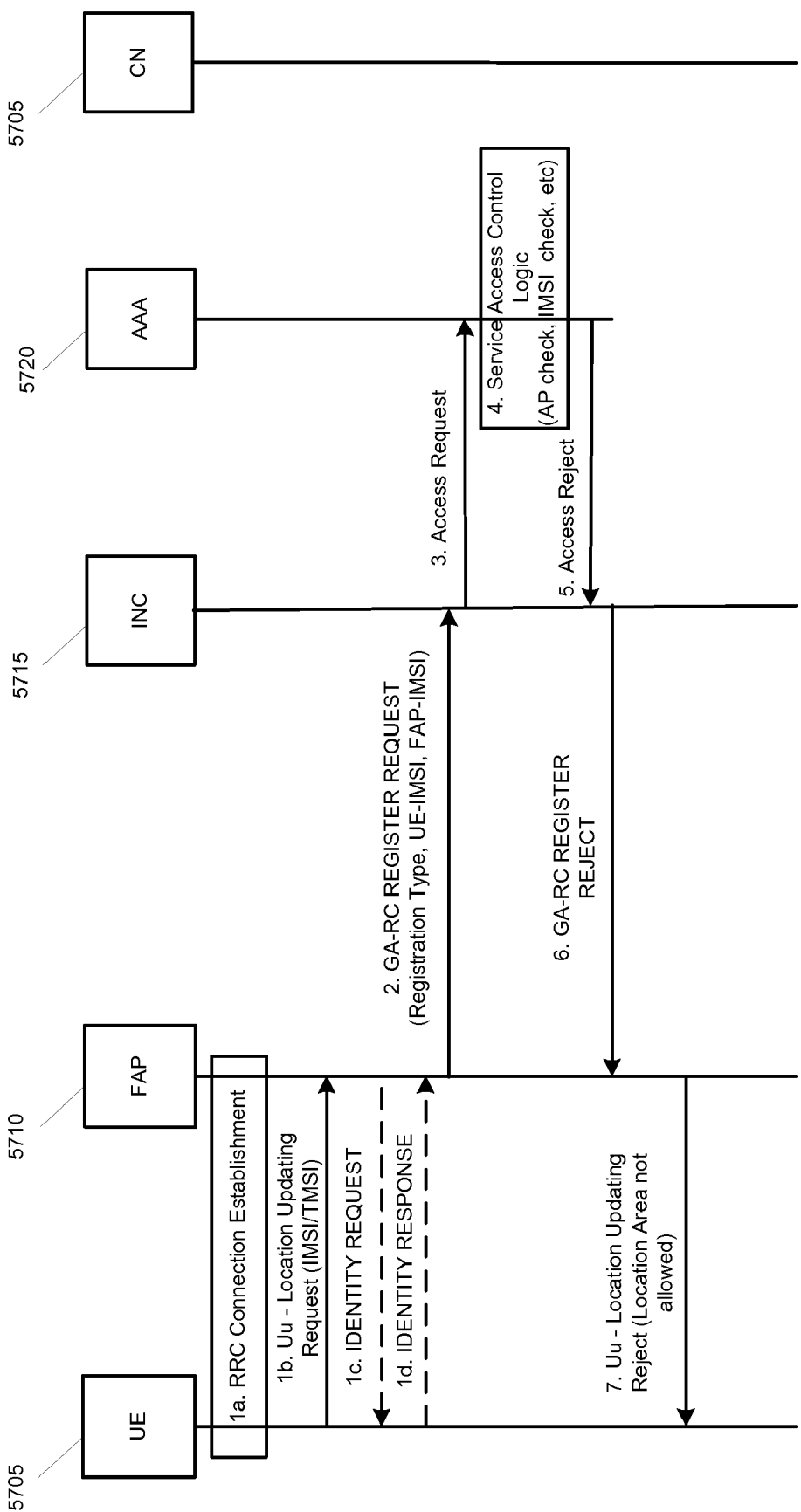
FIG. 57 illustrates the Service Access Control for Unauthorized UE accessing authorized FAP in some embodiments.

An unauthorized UE (unauthorized for Femtocell service over the specific FAP), upon camping on the FAP (via its internal cell selection mechanism), will initiate a NAS layer Location Update procedure towards the CN via the FAP (The LU is triggered since the FAP broadcasts a distinct LAI than its neighboring macro cells and other neighboring Femtocells). The FAP will intercept the Location Update message and attempt to register the UE with the INC as described below. FIG. 57 illustrates the SAC for Unauthorized UE accessing authorized FAP in some embodiments.

As shown, the UE 5705 establishes (in Step 1a) a RRC connection with the FAP on which it camps. The UE starts (in Step 1b) a Location Update procedure towards the CN. The FAP 5710 will intercept the Location Update request and attempts to register the UE with the associated Serving INC over the existing IPSec tunnel. Optionally, the FAP may request (in Step 1c) the IMSI of the UE if the Location Update is done using the TMSI, since the initial registration for the UE must be done using the permanent identity i.e. the IMSI of the UE.

The FAP sets up a separate TCP connection (for each UE) to a destination TCP port on the INC 5715. The INC destination TCP port is the same as that used for FAP registration. The FAP attempts to register the UE on the INC by transmitting (in Step 2) the GA-RC REGISTER REQUEST. The message includes (1) Registration Type which indicates that the registering device is a UE, (2) the UE Identity which is UE-IMSI, and (3) the FAP identity which is FAP-IMSI.

Optionally, if the INC has been configured for Service Access Control (SAC) over S1 interface, the INC will (in Step 3), via AAA server 5420, authorize the UE 5405 using the information provided in the REGISTER REQUEST. The authorization logic on the AAA server also checks (in Step 4) to see if the UE is allowed Femtocell access using the specific FAP. The AAA SAC logic indicates that the registering UE is not authorized to access Femtocell service over the specific FAP.

Next, the AAA 5720 sends (in Step 5) Access Reject (with reject cause equivalent to "UE not allowed on FAP") to the INC 5715. The INC maps (in Step 6) the Access Reject to a GA-RC REGISTER REJECT message to the FAP indicating the reject cause.

The FAP 5710 in turn sends (in Step 7) a Location Updating Reject to the UE 5705 with cause of "Location Area Not Allowed". This will prevent the UE from attempting to camp on the specific FAP again. While some embodiments use "Location Area Not Allowed" as a mechanism for rejecting unauthorized UEs, other embodiments may use other appropriate UE rejection mechanisms.

XIV. Computer System

Figure 58:
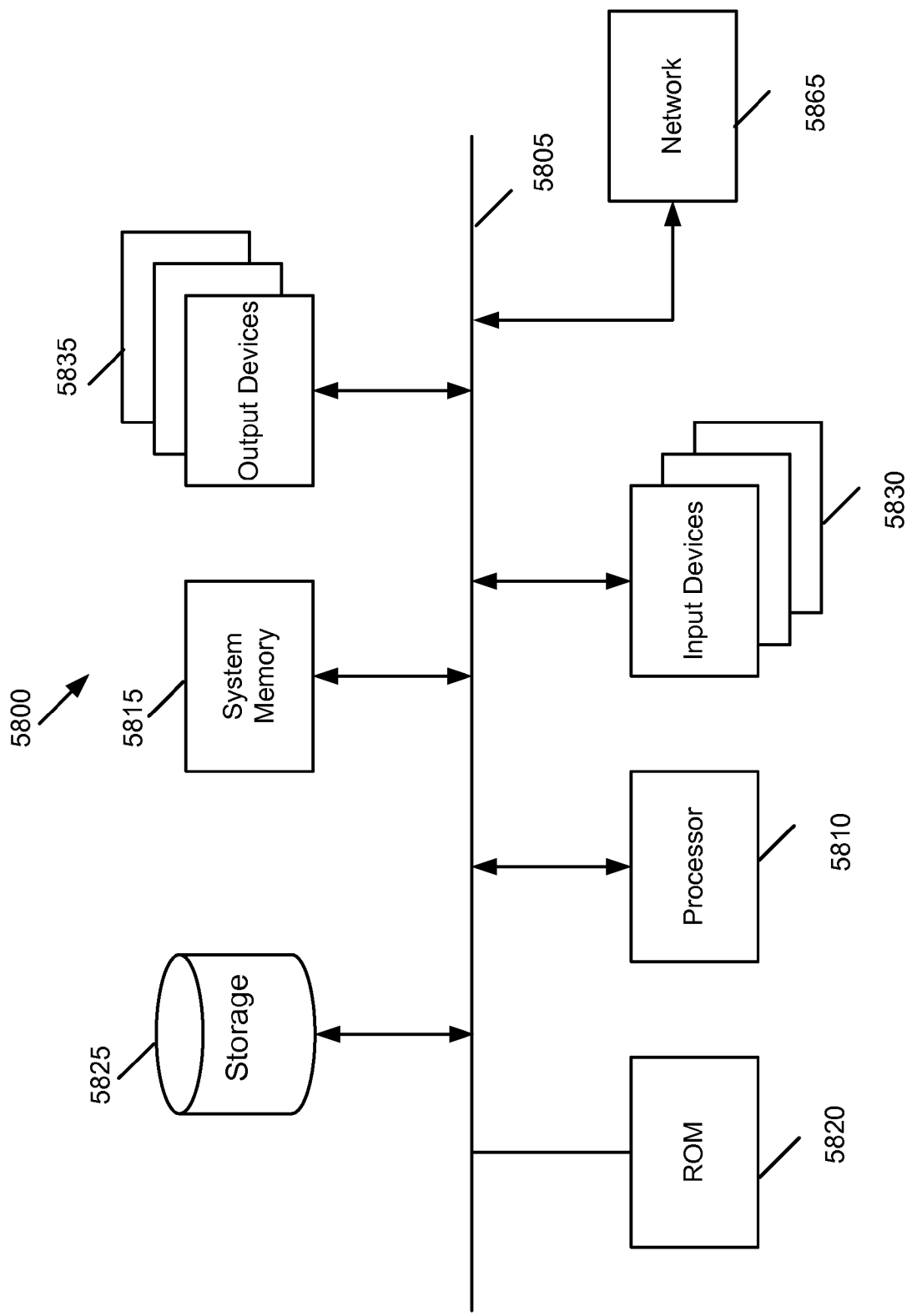
FIG. 58 conceptually illustrates a computer system with which some embodiments are implemented.

FIG. 58 conceptually illustrates a computer system with which some embodiments of the invention are implemented. The computer system 5800 includes a bus 5805, a processor 5810, a system memory 5815, a read-only memory 5820, a permanent storage device 5825, input devices 5830, and output devices 5835.

The bus 5805 collectively represents all system, peripheral, and chipset buses that support communication among internal devices of the computer system 5800. For instance, the bus 5805 communicatively connects the processor 5810 with the read-only memory 5820, the system memory 5815, and the permanent storage device 5825.

From these various memory units, the processor 5810 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 5820 stores static data and instructions that are needed by the processor 5810 and other modules of the computer system. The permanent storage device 5825, on the other hand, is a read-and-write memory device. This device is a non-volatile memory unit that stores instruction and data even when the computer system 5800 is off. Some embodiments of the invention use a mass-storage device (such as a magnetic or optical disk and its corresponding disk drive) as the permanent storage device 5825. Some embodiments use one or more removable storage devices (flash memory card or memory stick) as the permanent storage device.

Like the permanent storage device 5825, the system memory 5815 is a read-and-write memory device. However, unlike storage device 5825, the system memory is a volatile read-and-write memory, such as a random access memory. The system memory stores some of the instructions and data that the processor needs at runtime.

Instructions and/or data needed to perform processes of some embodiments are stored in the system memory 5815, the permanent storage device 5825, the read-only memory 5820, or any combination of the three. For example, the various memory units include instructions for processing multimedia items in accordance with some embodiments. From these various memory units, the processor 5810 retrieves instructions to execute and data to process in order to execute the processes of some embodiments.

The bus 5805 also connects to the input and output devices 5830 and 5835. The input devices enable the user to communicate information and select commands to the computer system. The input devices 5830 include alphanumeric keyboards and cursor-controllers. The output devices 5835 display images generated by the computer system. The output devices include printers and display devices, such as cathode ray tubes (CRT) or liquid crystal displays (LCD). Finally, as shown in FIG. 58, bus 5805 also couples computer 5800 to a network 5865 through a network adapter (not shown). In this manner, the computer can be a part of a network of computers (such as a local area network ("LAN"), a wide area network ("WAN"), or an Intranet) or a network of networks (such as the Internet).

It should be recognized by one of ordinary skill in the art that any or all of the components of computer system 5800 may be used in conjunction with the invention. For instance, some or all components of the computer system described with regards to FIG. 58 comprise some embodiments of the UE, FAP, GANC, and GGSN described above. Moreover, one of ordinary skill in the art will appreciate that any other system configuration may also be used in conjunction with the invention or components of the invention.

XV. Definitions and Abbreviations

The following is a list of definitions and abbreviations used:

AAA Authentication, Authorization, and Accounting
ACL Access Control List
AES Advanced Encryption Standard
AH Authentication Header (IPSec)
AKA Authentication and Key Agreement
ALI Automatic Location Identification
AMS access Point Management System
ANI Automatic Number Identification
AP Access Point
APN Access Point Name
ATM Asynchronous Transfer Mode
AuC Authentication Center
CBC Cell Broadcast Center
CBC Cipher Block Chaining
CC Call Control
CDR Call Detail Records
CMDA Code Division Multiple Access
CGI Cell Global Identification
CgPN Calling Party Number
CLIP Calling Line Presentation
CK Cipher Key
CM Connection Management
CM-sub Connection Management sublayer
CN Core Network
CPE Customer Premises Equipment
CRC Cyclic Redundancy Code
CRDB Coordinate Routing Database
CS Circuit Switched
CTM Cellular Text telephone Modem, as specified in 3GPP 26.226
DL Downlink
DNS Domain Name System
EAP Extensible Authentication protocol
EAPOL EAP over LANs
ECB Electronic Code Book (AES Mode)
ELID Emergency Location Information Delivery
E-OTD Enhanced Observed Time Difference
ESN Emergency Services Number
ESP Emergency Services Protocol or Encapsulating Security Payload (IPSec)
ESRD Emergency Services Routing Digits
ESRK Emergency Services Routing Key
ETSI European Telecommunications Standards Institute
FCAPS Fault, Configuration, Accounting, Performance, and Security management
FAP Femtocell Access Point
FCC US Federal Communications Commission
FQDN Fully Qualified Domain Name
GA-CSR Generic Access-Circuit Switched Resources
GAN Generic Access Network
GANC GAN Network Controller
GA-PSR Generic Access-Packet Switched Resources
GA-RC Generic Access-Resource Control
GDP Generic Digits Parameter
GERAN GSM EDGE Radio Access Network
GGSN Gateway GPRS Support Node
GMLC Gateway Mobile Location Center
GMM/SM GPRS Mobility Management and Session Management
GMSC Gateway MSC
GPRS General Packet Radio Service
GPS Global Positioning System
GMM-sub GPRS Mobility Management sublayer
GRR-sub GPRS Radio Resource sublayer in GSM
GSM Global System for Mobile communications
GSN GPRS Support Node
GTP GPRS Tunnelling Protocol
GTT GSM Global Text Telephony or SS7 Global Title Translation
HLR Home Location Register
HMAC Hashed Message Authentication Code
HPLMN Home PLMN
IAM Initial Address Message
ICMP Internet Control Message Protocol
IETF Internet Engineering Task Force
IK Integrity Key
IKEv2 Internet Key Exchange Version 2
IMEI International Mobile station Equipment Identity
IMSI International Mobile Subscriber Identity
INC IP Network Controller
IP Internet Protocol
IPSec IP Security
IPv4 Internet Protocol version 4
IPv6 Internet Protocol version 6
ISDN Integrated Services Digital Network
ISP Internet Service Provider
ISUP ISDN User Part
Iu Interface UTRAN
IV Initialization Vector
LA Location Area
LAC Location Area Code
LAI Location Area Identity
LAU Location Area Update
LU Location Update
LCS Location Service
LEAP Lightweight EAP (same as EAP-Cisco)
LLC Logical Link Control
LLC-sub Logical Link Control sublayer
LMSI Local Mobile Subscriber Identity
LSB Least Significant Bit
LSP Location Services Protocol
M Mandatory
M3UA MTP3 User Adaptation Layer
MAC Media Access Control or Message Authentication Code (same as MIC)
MAC Address Media Access Control Address
MAC-I Message Authentication Code for Integrity
MAP Mobile Application Part
MDN Mobile Directory Number
ME Mobile Equipment
MIC Message Integrity Check (same as Message Authentication Code)
MG or MGW Media Gateway
MM Mobility Management
MM-sub Mobility Management sublayer
MPC Mobile Positioning Center
MS Mobile Station MSB Most Significant Bit
MSC Mobile Switching Center
MSISDN Mobile Station International ISDN Number
MSRN Mobile Station Roaming Number
MTP1/2/3 Message Transfer Part Layer 1/2/3
NAS Non Access Stratum
NCAS Non Call Associated Signaling
NDC National Destination Code
NS Network Service
NSAPI Network layer Service Indoor Base Station Identifier
NSS Network SubSystem
O Optional
OCB Offset Code Book (AES Mode)
OTP One Time Programmable
pANI pseudo-ANI: Either the ESRD or ESRK
PCS Personal Communications Services
PCU Packet Control Unit
PDCH Packet Data CHannel
PDE Position Determining Entity
PDN Packet Data Network
PDP Packet Data Protocol, e.g., IP or X.25
PDU Protocol Data Unit
PEAP Protected EAP
PKI Public Key Infrastructure
PLMN Public Land Mobile Network
POI Point of Interface
PPF Paging Proceed Flag
PPP Point-to-Point Protocol
PSAP Public Safety Answering Point
PSTN Public Switched Telephone Network
PTM Point To Multipoint
P-TMSI Packet TMSI
PTP Point To Point
PVC Permanent Virtual Circuit
QoS Quality of Service
R Required
RA Routing Area
RAB RANAP Assignment Request
RAC Routing Area Code
RADIUS Remote Authentication Dial-In User Service
RAI Routing Area Identity
RAN Radio Access Network
RANAP Radio Access Network Application Part
RFC Request for Comment (IETF Standard)
RLC Radio Link Control
RNC Radio Network Controller
RR-sub Radio Resource Management sublayer
RSN Robust Security Network
RTCP Real Time Control Protocol
RTP Real Time Protocol
SAC Service Access Control
SAC Service Area Code SC Scrambling Code
SCCP Signaling Connection Control Part
SDCCH Standalone Dedicated Control Channel
SDU Service Data Unit
SeGW GANC Security Gateway
SGSN Serving GPRS Support Node
SK Service Key
SIM Subscriber Identity Module
SM Session Management
SMLC Serving Mobile Location Center
SMS Short Message Service
SM-AL Short Message Application Layer
SM-TL Short Message Transfer Layer
SM-RL Short Message Relay Layer
SM-RP Short Message Relay Protocol
SMR Short Message Relay (entity)
SM-CP Short Message Control Protocol
SMC Short Message Control (entity)
SM-SC Short Message Service Centre
SMS-GMSC Short Message Service Gateway MSC
SMS-IWMSC Short Message Service Interworking MSC
SNDCP SubNetwork Dependent Convergence Protocol
SN-PDU SNDCP PDU
S/R Selective Router
SS Supplementary Service
SSID Service Set Identifier (also known as "Network Name")
SSL Secure Socket Layer
STA Station (802.11 client)
TA Timing Advance
TCAP Transaction Capabilities Application Part
TCP Transmission Control Protocol
TDOA Time Difference of Arrival
TEID Terminal Endpoint Identifier
TID Tunnel Identifier
TKIP Temporal Key Integrity Protocol
TLLI Temporary Logical Link Identity
TLS Transport Layer Security
TMSI Temporary Mobile Subscriber Identity
TOA Time of Arrival
TRAU Transcoder and Rate Adaptation Unit
TTY Text telephone or teletypewriter
UARFCN UMTS Absolute Radio Frequency Channel Number
UDP User Datagram Protocol
UE User Equipment
UL Uplink
UMA Unlicensed Mobile Access
UMTS Universal Mobile Telecommunication System
USIM UMTS Subscriber Identity Module/Universal Subscriber Identity Module
USSD Unstructured Supplementary Service Data
UTC Coordinated Universal Time
UTRAN UMTS Terrestrial Radio Access Network
VLR Visited Location Register
VMSC Visited MSC
VPLMN Visited Public Land Mobile Network
VPN Virtual Private Network
W-CDMA Wideband Code Division Multiple Access
WEP Wired Equivalent Privacy
WGS-84 World Geodetic System 1984
WPA Wi-Fi Protected Access
WZ1 World Zone 1

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. Moreover, while the invention has been described with reference to numerous specific details, one of ordinary skill in the art will recognize that the invention can be embodied in other specific forms without departing from the spirit of the invention.

In some examples and diagrams, two components may be described or shown as connected to each other. The connection may be a direct wire connection or the two components may be communicatively coupled to each other through other components or through wireless or broadband links. Thus, one of ordinary skill in the art would understand that the invention is not to be limited by the foregoing illustrative details, but rather is to be defined by the appended claims.

What is claimed is:

1. A communication system comprising:
   a) a wireless first communication system comprising a licensed radio access network and a core network comprising a general packet radio service (GPRS) support node (GSN); and
   b) a second communication system comprising a network controller and an access point that operates using licensed wireless frequencies covering a short-range distance, the access point communicatively coupled to the network controller, the network controller communicatively coupling the second communication system to the core network of the wireless first communication system,
   wherein the GSN comprises a GPRS tunnelling protocol (GTP-U) protocol layer, wherein the access point comprises a GTP-U protocol layer directly coupled to the GTP-U protocol layer of the GSN, wherein the GSN further comprises a user datagram protocol (UDP) protocol layer below the GTP-U protocol layer of the GSN, wherein the access point further comprises a UDP protocol layer below the GTP-U protocol layer of the access point, wherein the UDP protocol layer of the access point is communicatively coupled to the UDP protocol layer of the GSN.

2. The communication system of claim 1, wherein the access point terminates a GTP-U tunnel directly between the access point and the GSN.

3. The communication system of claim 1, wherein the network controller is communicatively coupled to the core network of the wireless first communication system through a universal mobile telecommunication system (UMTS) terrestrial radio access network (UTRAN) Iu interface.

4. The communication system of claim 1, wherein the GSN is a serving general packet radio service (GPRS) support node (SGSN).

5. The communication system of claim 1, wherein the GSN is a gateway general packet radio service (GPRS) support node (GGSN).

6. An access point of a first communication network, the access point operates using licensed wireless frequencies covering a short-range distance, the first communication network further comprising a network controller communicatively coupling the access point to a core network of a wireless second communication network comprising a licensed radio access network, the core network of the wireless second communication network comprising a general packet radio service (GPRS) support node (GSN), the access point comprising:
   a) a GPRS tunnelling protocol (GTP-U) protocol layer for directly coupling the access point to a GTP-U protocol layer of the GSN; and
   b) a user datagram protocol (UDP) protocol layer below the GTP-U protocol layer of the access point, wherein the UDP protocol layer of the access point is communicatively coupled to a UDP protocol layer of the GSN.

7. The access point of claim 6, wherein the GSN is a serving general packet radio service (GPRS) support node (SGSN).

8. The access point of claim 6, wherein the GSN is a gateway general packet radio service (GPRS) support node (GGSN).

9. The access point of claim 6, wherein the network controller is communicatively coupled to the core network of the wireless second communication network through a universal mobile telecommunication system (UMTS) terrestrial radio access network (UTRAN) Iu interface.

10. The access point of claim 6, wherein the network controller does not comprise a GTP-U protocol layer, wherein the coupling of the GTP-U protocol layer of the access point to the GTP-U protocol layer of the GSN comprises coupling the GTP-U protocol layer of the access point to the GTP-U protocol layer of the GSN over a remote Internet Protocol (IP) protocol layer of the network controller.

11. The access point of claim 6, wherein the network controller does not comprise a UDP protocol layer for a packet switch domain, wherein the coupling of the UDP protocol layer of the access point to the UDP protocol layer of the GSN comprises coupling the UDP protocol layer of the access point to the UDP protocol layer of the GSN over a remote Internet Protocol (IP) protocol layer of the network controller.

12. The access point of claim 6, wherein the access point terminates a GTP-U tunnel directly between the access point and the GSN.

13. The communication system of claim 1, wherein the network controller does not comprise a GTP-U protocol layer, wherein the coupling of the GTP-U protocol layer of the access point to the GTP-U protocol layer of the GSN comprises coupling the GTP-U protocol layer of the access point to the GTP-U protocol layer of the GSN over a remote Internet Protocol (IP) protocol layer of the network controller.

14. The communication system of claim 1, wherein the network controller does not comprise a UDP protocol layer, wherein the coupling of the UDP protocol layer of the access point to the UDP protocol layer of the GSN comprises coupling the UDP protocol layer of the access point to the UDP protocol layer of the GSN over a remote Internet Protocol (IP) protocol layer of the network controller.

* * * * *